(12) United States Patent
Pickett

(10) Patent No.: US 7,379,455 B2
(45) Date of Patent: May 27, 2008

(54) SYSTEMS AND METHODS FOR PROVIDING CONFIGURABLE CALLER ID INFORMATION

(75) Inventor: Scott K. Pickett, Los Gatos, CA (US)

(73) Assignee: Converged Data Solutions LLC, Chicago, IL (US)

(*) Notice: Subject to any disclaimer, the term of this patent is extended or adjusted under 35 U.S.C. 154(b) by 1074 days.

(21) Appl. No.: 10/326,718

(22) Filed: Dec. 18, 2002

(65) Prior Publication Data

US 2003/0219029 A1    Nov. 27, 2003

Related U.S. Application Data

(63) Continuation-in-part of application No. 09/368,460, filed on Aug. 4, 1999, now Pat. No. 6,366,578, which is a continuation-in-part of application No. 09/283,101, filed on Mar. 31, 1999, now Pat. No. 6,266,340, which is a continuation-in-part of application No. 09/163,596, filed on Nov. 16, 1998, now Pat. No. 6,343,074, which is a continuation-in-part of application No. 09/167,408, filed on Oct. 6, 1998, now Pat. No. 6,154,465, which is a continuation-in-part of application No. 09/161,550, filed on Sep. 25, 1998, now Pat. No. 6,208,658, which is a continuation-in-part of application No. 09/055,072, filed on Apr. 3, 1998, now Pat. No. 6,181,694, which is a continuation-in-part of application No. 09/055,036, filed on Apr. 3, 1998, now abandoned.

(51) Int. Cl.
*H04L 12/56* (2006.01)

(52) U.S. Cl. .................................. 370/389; 379/207.13
(58) Field of Classification Search ...................... None
See application file for complete search history.

(56) References Cited

U.S. PATENT DOCUMENTS

| | | | | |
|---|---|---|---|---|
| 4,740,955 | A | * 4/1988 | Litterer et al. | 370/264 |
| 4,958,366 | A | 9/1990 | Hashimoto | 379/70 |
| 5,136,633 | A | 8/1992 | Tejada et al. | 379/88.2 |
| 5,153,908 | A | 10/1992 | Kakizawa et al. | 379/157 |
| 5,195,086 | A | 3/1993 | Baumgartner et al. | 370/264 |
| 5,255,314 | A | 10/1993 | Applegate et al. | 379/229 |
| 5,276,678 | A | * 1/1994 | Hendrickson et al. | 370/267 |
| 5,333,266 | A | 7/1994 | Boaz et al. | 709/206 |
| 5,381,468 | A | 1/1995 | Ozawa | 379/136 |
| 5,452,289 | A | 9/1995 | Sharma et al. | |
| 5,475,738 | A | 12/1995 | Penzias | 379/67 |
| 5,479,411 | A | 12/1995 | Klein | 379/88 |
| 5,521,910 | A | 5/1996 | Matthews | |

(Continued)

OTHER PUBLICATIONS

Mier et al., "IP-PBXs: Ready and waiting", apparently dated Jan. 1, 2002.

(Continued)

*Primary Examiner*—Anh-Vu H. Ly
(74) *Attorney, Agent, or Firm*—Loudermilk & Associates

(57) ABSTRACT

Systems and methods for providing configurable caller ID information are disclosed. A communications service includes a caller ID configuration function. The communications service controls packetized call data, and outbound caller ID options are configurable via the caller ID configuration function.

8 Claims, 77 Drawing Sheets

U.S. PATENT DOCUMENTS

| | | | |
|---|---|---|---|
| 5,533,018 A | 7/1996 | DeJager et al. | 370/352 |
| 5,533,110 A | 7/1996 | Pinard et al. | 379/201 |
| 5,541,921 A | 7/1996 | Swenson et al. | 370/376 |
| 5,546,392 A | 8/1996 | Boal et al. | |
| 5,568,540 A | 10/1996 | Greco et al. | 379/89 |
| 5,577,105 A | 11/1996 | Baum et al. | |
| 5,579,301 A | 11/1996 | Ganson et al. | |
| 5,600,646 A | 2/1997 | Polomski | |
| 5,602,846 A * | 2/1997 | Holmquist et al. | 370/384 |
| 5,606,599 A | 2/1997 | O'Mahoney et al. | |
| 5,652,789 A | 7/1997 | Miner et al. | 379/201 |
| 5,659,542 A | 8/1997 | Bell et al. | |
| 5,659,597 A | 8/1997 | Bareis et al. | 455/563 |
| 5,689,550 A | 11/1997 | Garson et al. | 379/89 |
| 5,689,553 A | 11/1997 | Ahuja et al. | 379/202 |
| 5,692,035 A | 11/1997 | O'Mahoney et al. | |
| 5,717,689 A | 2/1998 | Ayanoglu | |
| 5,719,858 A * | 2/1998 | Moore | 370/347 |
| 5,742,596 A | 4/1998 | Baratz et al. | 370/356 |
| 5,751,968 A | 5/1998 | Cohen | |
| 5,761,201 A | 6/1998 | Vaudreuil | 370/392 |
| 5,761,281 A | 6/1998 | Baum et al. | |
| 5,778,058 A | 7/1998 | Gavin | 379/225 |
| 5,809,021 A | 9/1998 | Diaz et al. | 370/364 |
| 5,809,493 A | 9/1998 | Ahamed et al. | 706/52 |
| 5,812,795 A | 9/1998 | Horovitz et al. | 709/245 |
| 5,821,937 A | 10/1998 | Tonelli et al. | 345/356 |
| 5,825,771 A | 10/1998 | Cohen et al. | |
| 5,838,664 A | 11/1998 | Polomski | 370/263 |
| 5,838,923 A | 11/1998 | Lee et al. | 709/236 |
| 5,841,763 A | 11/1998 | Leondires et al. | 370/260 |
| 5,862,136 A | 1/1999 | Irwin | 370/395 |
| 5,864,560 A | 1/1999 | Li et al. | 370/465 |
| 5,864,608 A | 1/1999 | Brownmiller et al. | |
| 5,867,714 A | 2/1999 | Todd et al. | 717/172 |
| 5,875,192 A | 2/1999 | Cam et al. | |
| 5,887,139 A | 3/1999 | Madison, Jr. et al. | 709/223 |
| 5,892,764 A | 4/1999 | Riemann et al. | 370/401 |
| 5,896,512 A | 4/1999 | Einbinder et al. | |
| 5,898,830 A | 4/1999 | Wesinger, Jr. et al. | 713/201 |
| 5,912,888 A | 6/1999 | Walsh et al. | 370/355 |
| 5,923,737 A | 7/1999 | Weishut et al. | 379/93.17 |
| 5,926,463 A | 7/1999 | Ahearn et al. | 370/254 |
| 5,926,745 A | 7/1999 | Threadgill et al. | 455/12.1 |
| 5,940,488 A | 8/1999 | DeGrazia et al. | 379/201 |
| 5,944,786 A | 8/1999 | Quinn | 709/206 |
| 5,946,386 A | 8/1999 | Rogers et al. | |
| 5,950,167 A | 9/1999 | Yaker | 704/275 |
| 5,978,468 A | 11/1999 | Boakes | 379/377 |
| 5,978,672 A | 11/1999 | Hartmaier et al. | 455/413 |
| 5,978,835 A | 11/1999 | Ludwig et al. | 709/204 |
| 5,982,767 A | 11/1999 | McIntosh | 370/352 |
| 5,991,723 A | 11/1999 | Duffin | 704/260 |
| 5,996,010 A | 11/1999 | Leong et al. | 709/223 |
| 5,999,179 A | 12/1999 | Kekic et al. | 345/349 |
| 5,999,605 A | 12/1999 | Yoo | 379/165 |
| 6,003,077 A | 12/1999 | Bawden et al. | 709/223 |
| 6,009,101 A | 12/1999 | Schoo et al. | |
| 6,012,088 A | 1/2000 | Li et al. | 709/219 |
| 6,018,567 A | 1/2000 | Dulman | 379/34 |
| 6,018,571 A | 1/2000 | Langlois et al. | |
| 6,034,968 A | 3/2000 | Park et al. | |
| 6,040,834 A | 3/2000 | Jain et al. | 345/356 |
| 6,041,306 A | 3/2000 | Du et al. | 705/8 |
| 6,043,816 A | 3/2000 | Williams et al. | 345/340 |
| 6,044,107 A | 3/2000 | Gatherer et al. | 375/222 |
| 6,044,403 A | 3/2000 | Gerszberg et al. | 709/225 |
| 6,047,053 A | 4/2000 | Miner et al. | 379/201 |
| 6,047,054 A | 4/2000 | Bayless et al. | 379/202 |
| 6,049,531 A | 4/2000 | Roy | 370/260 |
| 6,054,987 A | 4/2000 | Richardson | 345/348 |
| 6,055,574 A | 4/2000 | Smorodinsky et al. | 709/226 |
| 6,058,117 A | 5/2000 | Ennamorato et al. | |
| 6,058,166 A | 5/2000 | Osder et al. | 379/88.05 |
| 6,072,796 A | 6/2000 | Christensen et al. | |
| 6,083,163 A | 7/2000 | Wegner et al. | |
| 6,088,361 A | 7/2000 | Hughes et al. | |
| 6,131,121 A | 10/2000 | Mattaway et al. | |
| 6,145,465 A | 11/2000 | Murphree | 370/465 |
| 6,151,628 A | 11/2000 | Xu et al. | |
| 6,154,463 A | 11/2000 | Aggarwal et al. | 370/466 |
| 6,181,694 B1 | 1/2001 | Pickett | 370/353 |
| 6,181,736 B1 | 1/2001 | McLaughlin et al. | |
| 6,208,658 B1 * | 3/2001 | Pickett | 370/401 |
| 6,219,697 B1 | 4/2001 | Lawande et al. | |
| 6,226,303 B1 | 5/2001 | Levens et al. | |
| 6,240,084 B1 | 5/2001 | Oran et al. | 370/352 |
| 6,243,398 B1 | 6/2001 | Kahane et al. | |
| 6,259,538 B1 | 7/2001 | Amit et al. | |
| 6,263,016 B1 * | 7/2001 | Bellenger et al. | 370/468 |
| 6,266,340 B1 | 7/2001 | Pickett et al. | 370/442 |
| 6,292,773 B1 | 9/2001 | Bernardes et al. | 379/88.05 |
| 6,304,574 B1 | 10/2001 | Schoo et al. | |
| 6,317,783 B1 | 11/2001 | Freishtat et al. | 709/218 |
| 6,332,153 B1 | 12/2001 | Cohen | |
| 6,343,074 B1 * | 1/2002 | Pickett | 370/353 |
| 6,366,578 B1 | 4/2002 | Johnson | 370/353 |
| 6,498,791 B2 * | 12/2002 | Pickett et al. | 370/353 |
| 6,577,623 B1 | 6/2003 | Kawai et al. | 370/354 |
| 6,628,650 B1 | 9/2003 | Saito et al. | 370/369 |
| 6,633,848 B1 | 10/2003 | Johnson et al. | 704/277 |
| 6,651,063 B1 | 11/2003 | Vorobiev | 707/10 |
| 6,721,308 B1 | 4/2004 | Ahn | 370/356 |
| 6,775,373 B2 | 8/2004 | Stoughton | 379/219 |
| 6,801,609 B2 | 10/2004 | Fullarton et al. | 379/201.02 |
| 6,868,509 B2 | 3/2005 | Gale et al. | 714/43 |
| 2003/0165230 A1 | 9/2003 | Reuss | 379/265.02 |
| 2004/0120254 A1 | 6/2004 | Shanley et al. | 370/225 |

OTHER PUBLICATIONS

"Key/Hybrid Systems and PBX Systems: Comparison Columns", Google cache of http://mdev.temple.edu/gartner/datapro/z1945_9.htm, apparently dated May 1, 2001.

Microsoft White Paper, "The Microsoft Windows Telephony Platform: Using TAPI2.0 and Windows to Create the Next Generation of Computer-Telephony Integration", 1996, from title page through p. 27.

Press Release, "VocalTec Links Phones to Web", Aug. 2, 1996, pp. 1 through 3.

System Brief, "VocalTec Telephony Gateway", 1997, pp. 1 through 4.

Press Release, "VocalTec, Cisco, Dialogic & other industry leaders band together in internet telephony rapid deployment team for widespread product compatibility", Nov. 12, 1996, pp. 1 through 2.

Press Release, "VocalTec introduces the internet phone telephony gateway linking traditional and internet telephone networks", Mar. 8, 1996, pp. 1 through 2.

Brochure, "VocalTec Telephony Gateway Key Components", undated, pp. 1 through 3.

Brochure, "VocalTec Telephony Gateway Features", undated, pp. 1 through 2.

Brochure, "VocalTec Telephony Gateway Requirements", undated, pp. 1 through 2.

Brochure, "VocalTec Telephony Gateway Calling Options", undated, pp. 1 through 2.

Brochure, "VocalTec Telephony Gateway", undated, pp. 1 through 2.

Lucent Technologies, "Definity Enterprise Communications Server, Release 6 Overview", Jan. 1998, title page through p. IN10.

Lucent Technologies, "Multimedia Communications eXchange System Administrator's Guide and Technical Reference Manual Release 2.0M", Jul. 1997, title page through p. 685.

Black, ATM Foundation For Broadband Networks, pp. 137-152, 170-173 (1995).

Stallings, William, SNMP, SNMPv2, SNMPv3, and RMON1 and 2 third edition, pp. 41-43, 76-77, 80-81, 85-86, 99-101, 110, 138-141, 43-144, 150-152, 155-157, 179, 181-183 (1996).

Lucent Technologies, "Definity Communications System," Generic 3 System Description and Specifications, Mar. 1996.

Intel Telecom Products D/41ESC Global SCSA 4-Port Voice Processing Board—Date unknown.

Preliminary Invalidity Contentions of Altigen Communications, Inc., U.S. District Court, Northern District of California, San Francisco Division, Case No. C02 04253 JSW, Jun. 3, 2003.

* cited by examiner

FIG. 16C

Frame Relay Configuration

Virtual Port: [ ] ▼  ☐ Removed   [ Add ]

Port Settings

Name: [                    ]

DLCI (16-991): [100] ▲▼

LMI Mode: [User] ▼

LMI Type: [T1.617 Annex D] ▼

Encapsulation: [RFC1490] ▼

[ Restore ]  [ Apply ]  [ Done ]  [ Help ]

| Trunk Monitor | | | | | | | |
|---|---|---|---|---|---|---|---|
| ○ Use Periodic Polling Polling Intervals (in secs): 1 | | | | | | | |
| ● Refresh On Demand Refresh | | | | | | | |
| Slot | Board | | Port | State | Called Party | Calling Party |
| 14 | T1 Card | 3 | | Incoming Call | | 300 |
| 14 | T1 Card | 3 | | Incoming Call | | 301 |
| 14 | T1 Card | 3 | | Incoming Call | | 302 |
| 14 | T1 Card | 3 | | Incoming Call | | 303 |
| 14 | T1 Card | 3 | | Incoming Call | | 304 |
| 14 | T1 Card | 3 | | Incoming Call | | 305 |
| 14 | T1 Card | 3 | | Incoming Call | | 306 |
| 14 | T1 Card | 3 | | Outbound Call | | 8481307 |
| 14 | T1 Card | 3 | | Outbound Call | | 8481308 |
| 14 | T1 Card | 3 | | Outbound Call | | 8481309 |
| 14 | T1 Card | 3 | | Outbound Call | | 8481310 |
| 14 | T1 Card | 3 | | Outbound Call | | 8481311 |
| 14 | T1 Card | 3 | | Outbound Call | | 8481312 |
| 14 | T1 Card | 3 | | Outbound Call | | 8481313 |
| 14 | T1 Card | 3 | | Outbound Call | | 8481314 |
| 14 | T1 Card | 3 | | Outbound Call | | 8481314 |
| 14 | T1 Card | 3 | | Outbound Call | | 8481314 |
| 14 | T1 Card | 3 | | Outbound Call | | 8481314 |
| 14 | T1 Card | 3 | | Outbound Call | | 8481314 |
| 14 | T1 Card | 3 | | Outbound Call | | 8481314 |
| 14 | T1 Card | 3 | | Outbound Call | | 8481314 |
| 14 | T1 Card | 3 | | Outbound Call | | 8481314 |
| 14 | T1 Card | 3 | | Outbound Call | | 8481314 |

Done

| Slot | Board | Port | Admin | Auto Partition | Link |
|---|---|---|---|---|---|
| 7 | Ethernet Hub Card | 15 | Enabled | No | No Link |
| 7 | Ethernet Hub Card | 16 | Enabled | No | No Link |
| 7 | Ethernet Hub Card | 17 | Enabled | No | No Link |
| 7 | Ethernet Hub Card | 18 | Enabled | No | No Link |
| 7 | Ethernet Hub Card | 19 | Enabled | No | No Link |
| 7 | Ethernet Hub Card | 20 | Enabled | No | No Link |
| 7 | Ethernet Hub Card | 21 | Enabled | No | No Link |
| 7 | Ethernet Hub Card | 22 | Enabled | No | No Link |
| 7 | Ethernet Hub Card | 23 | Enabled | No | No Link |
| 7 | Ethernet Hub Card | 24 | Enabled | No | No Link |
| 5 | Resource Switch C.... | 1 | Enabled | No | No Link |
| 5 | Resource Switch C.... | 2 | Enabled | No | No Link |
| 5 | Resource Switch C.... | 3 | Enabled | No | No Link |
| 5 | Resource Switch C.... | 4 | Enabled | No | No Link |
| 5 | Resource Switch C.... | 5 | Enabled | No | Link |
| 5 | Resource Switch C.... | 6 | Enabled | No | No Link |
| 5 | Resource Switch C.... | 7 | Enabled | No | No Link |
| 5 | Resource Switch C.... | 8 | Enabled | No | No Link |
| 5 | Resource Switch C.... | 9 | Enabled | No | No Link |
| 5 | Resource Switch C.... | 10 | Enabled | No | No Link |
| 5 | Resource Switch C.... | 11 | Enabled | No | No Link |
| 5 | Resource Switch C.... | 12 | Enabled | No | No Link |

FIG. 17C

| Access Profile | | |
|---|---|---|
| Name: Default | | |

Area Code Table | Privileges | Trunk Group Access Codes

| Area Code | Office Code Range | Routing Table |
|---|---|---|
| 212 | Default | Local Calls |
| 408 | Default | Acme West |
| Default | Default | *Blocked* ▼ |
| | | *Blocked* |
| | | Acme West |
| | | 3xx Offpremise |
| | | Modems Route |
| ◀ | | Local Calls |
| | | (New Routing Table) |
| | Edit Routing Table | New  Delete |

OK  Cancel

FIG. 38B

| Access Profile | | | ☒ |
|---|---|---|---|

Name: Default

| Area Code Table | Privileges | Trunk Group Access Codes |
|---|---|---|

| Area Code | Office Code Range | Routing Table |
|---|---|---|
| 212 | Default | Local Calls |
| 408 | Default | Acme West |
| Default | Default | *Blocked* ▼ |
| | | *Blocked* |
| | | Acme West |
| | | 3xx Offpremise |
| | | Modems Route |
| ◀ | | Local Calls |
| | | (New Routing Table) |
| | Edit Routing Table | New  Delete |

OK   Cancel

FIG. 39A

Routing Table

Name: Local Calls

| Step | Strip First n Digits | Keep Last n Digits | Prepend Digits | Postpend Digits | Destination | Service Code |
|------|---------------------|-------------------|----------------|-----------------|-------------|--------------|
| 1    | 0                   |                   |                |                 | T1 Interface... | Default |
| 2    |                     | 3                 |                |                 | T1 Interface... | Custom |
| 3    | 0                   |                   | 9              |                 | Voice An... ▼ | N/A |

Dropdown:
- Testing
- T1 Interface 1
- T1 Interface 2
- Modems
- DID Digital
- DID Analog
- Voice Digital
- Voice Analog

[New] [Delete]     [Up] [Down]     [OK] [Cancel]

FIG. 40

First Digit Table

First Digits | Local Area Codes

Digit (Type)

- 0 (Attendant)
- 1 (Extension)
- 2 (Extension)
- 3 (Extension)
- 4 (Not Configured)
- 5 (Extension)
- 6 (Not Configured)
- 7 (Not Configured)
- 8 (External)
- 9 (External)

Digit Type: External

Additional Settings

○ One-Digit  ● Two-Digit

| Access Code | Routing | Collect Digits | Dialtone |
|---|---|---|---|
| 80 | T1 Interface 1 | 3 | ☑ |
| 81 | T1 Interface 2 | 5 | ☑ |
| 82 | Voice Digital | 4 | ☑ |
| 83 | Voice Analog | 24 | ☑ |
| 84 | Outbound Routing | NANP | ☑ |
| 85 | Testing | NANP | ☑ |
| 86 | Not Configured | 5 | ☑ |
| 87 | Not Configured | 6 | ☑ |
| 88 | Not Configured | 7 | ☑ |
| 89 | Not Configured | 8 | ☑ |
|  |  | 9 |  |
|  |  | 10 |  |
|  |  | 11 |  |
|  |  | 12 |  |

[Restore] [Apply] [Done] [Help]

FIG. 41

SYSTEMS AND METHODS FOR PROVIDING CONFIGURABLE CALLER ID INFORMATION

This application is a continuation-in-part of the following applications, all by the inventor(s) hereof, which are hereby incorporated by reference: U.S. application Ser. No. 09/055,072, filed on Apr. 3, 1998, now U.S. Pat. No. 6,181,694 for Systems and Methods for Multiple Mode Voice and Data Communications Using Intelligently Bridged TDM and Packet Buses; U.S. application Ser. No. 09/055,036, filed on Apr. 3, 1998, now abandoned for System and Method for Generating Voltages in Telephony Station Cards; U.S. application Ser. No. 09/161,550, filed on Sep. 25, 1998, now U.S. Pat. No. 6,208,658 for Systems and Methods for Multiple Mode Voice and Data Communications Using Intelligently Bridged TDM and Packet Buses and Methods for Performing Telephony and Data Functions Using the Same; U.S. application Ser. No. 09/163,596, filed on Nov. 16, 1998, now U.S. Pat. No. 6,343,074 for Systems and Methods for Multiple Mode Voice and Data Communications Using Intelligently Bridged TDM and Packet Buses and Methods for Performing Telephony and. Data Functions Using the Same; U.S. application Ser. No. 09/167,408, filed on Oct. 6, 1998, now U.S. Pat. No. 6,154,465 for Systems and Methods for Multiple Mode Voice and Data Communications Using Intelligently Bridged TDM and Packet Buses and Methods for Performing Telephony and Data Functions Using the Same; U.S. application Ser. No. 09/283,101, filed on Mar. 31, 1999 now U.S. Pat. No. 6,266,340 for Systems and Methods For Multiple Mode Voice and Data Communications Using Intelligently Bridged TDM and Packet Buses and Methods For Performing Telephony And Data Functions Using the Same; and U.S. application Ser. No. 09/368,460, filed on Aug. 4, 1999 now U.S. Pat. No. 6,366,578 for Systems and Methods For Multiple Mode Voice and Data Communications Using Intelligently Bridged TDM and Packet Buses and Methods For Implementing Language Capabilities Using the Same (all of the foregoing applications are hereby incorporated by reference).

FIELD OF THE INVENTION

The present invention relates to systems and methods for transmitting and receiving voice and data in multiple modes, and more particularly to systems and methods for multiple native mode voice and data transmissions and receptions with a communications system having a multi-bus structure, including, for example, a time division multiplexed ("TDM") bus, a packet bus, and a control bus, and multi-protocol framing engines, preferably including subsystem functions such as PBX, voice mail, file server, web server, communications server, telephony server, LAN hub and data router, and method for performing telephony and data functions using the same.

BACKGROUND OF THE INVENTION

Businesses, particularly small to medium size offices, typically have a need for a variety of voice and data communications. For example, a typical office might have a dedicated fax machine, using a dedicated or shared telephone line, one or more telephone lines for voice communications, perhaps coupled to a central or distributed voice mail system(s), and one or more computers or computer networks, often coupled to telephone lines via one or more modems. Many offices now use the Internet in some form for business communications or research or the like, often by way of a modem or modem pool coupled to individual computers.

Typically, such business communication needs have been fulfilled with piecemeal technical solutions, typically from separate equipment and service vendors, and with separate hardware, software and design considerations.

FIG. 1 illustrates a conventional small office communication configuration. Voice communication system 1 typically is implemented by way of multiple analog trunks 16 from wide area network ("WAN") 18. WAN 18 often consists of a telecommunication network by way of a local telephone company or other telecommunications service provider. Analog trunks 16 may be directed through switching system 10, which may be a conventional PBX or similar telephone switch. Telephones 12 and voice mail system 14 are coupled to switching system 10. Often, dedicated analog line 16A is coupled to facsimile 44 for facsimile communications.

Data system 2 typically is implemented with a plurality of computers (or workstations, etc.) 24 interconnected by way of packet network 26, which may be a standard Ethernet compliant network or other office network. Network 26 often is coupled to remote access server 32, which is connected to one or more analog trunks 40, and which may include one or more modems in a modem pool. Computers 24 may communicate with remote systems via the modem pool of remote access server 32 over analog lines 40 and WAN 42. Network 26 typically includes a connection to printer 22 and file server 20. In more sophisticated systems, network 26 may be coupled to switching hub 28 and router 30, which is coupled to WAN 42 over digital trunks 38. Data system 2 also may include a connection between one or more of computers 24 to modem 36, which in term is coupled to WAN 42 over dedicated analog trunk 40A.

Such a conventional system often is characterized by piecemeal equipment and network solutions, limited or non-existent coordination and management between voice system 1 and data system 2, non-optimized or non-integrated equipment, and inefficient use of costly network services (telephone lines, data lines, etc.), such as duplicate and often idle phone and data network lines, often provided from multiple equipment/service providers. In general, such conventional systems are neither constructed nor operated in a manner to provide efficient and integrated voice/data communications.

SUMMARY OF THE INVENTION

The present invention is intended to address various disadvantages of such conventional communication systems. The present invention provides various systems and methods, perhaps more succinctly a platform, by which voice and data communications may occur in multiple modes and various protocols, and more particularly systems and methods for multiple native mode voice and data transmissions and receptions with a communications/computing system having a multi-bus structure, including, for example, a TDM bus, a packet bus and a control bus, and multi-protocol framing engines, preferably including subsystem functions such as PBX, voice mail and other telephony functions, email and/or file server, Internet server, LAN hub and data router. With the present invention, a platform and various processes are provided in which a TDM bus and a packet bus are intelligently bridged and managed, thereby enabling such multiple mode/protocol voice and data transmissions to be intelligently managed and controlled with a single, integrated system.

In preferred embodiments, a computer or other processor includes a local area network controller, which provides routing and hubs and/or switches for one or more packet networks. The computer also is coupled to a multiple buffer/framer, which serves to frame/deframe data to/from the computer from TDM bus. The buffer/framer includes a plurality of framer/deframer engines, supporting, for example, ATM and HDLC framing/deframing, and raw buffering of voice data or the like. The buffer/framer is coupled to the TDM bus by way of a multiple port or multiport switch/multiplexer, which includes the capability to intelligently map data traffic between the buffer/framer and the TDM bus to various slots of the TDM frames. Preferably, a DSP pool is coupled to one or more switch/multiplexer ports and/or the buffer/framer in a manner to provide various signal processing and telecommunications support, such as dial tone generation, DTMF detection and the like. The TDM bus is coupled to a various line/station cards, serving to interface the TDM bus with telephone, facsimiles and other telecommunication devices, and also with a various digital and/or analog WAN network services. The present invention provides a platform by which processing functions may be switched to provide support for a wide range of network, vendor and application services.

With the present invention, a full PBX-type telecommunication system may be provided by way of the computer/processor and associated telephony hardware and software. Functions such as voice mail, automated attendant, call forwarding, hold, transfer, caller ID, conferencing and other telephony functions may be similarly provided. While supporting such telephony functions in their native mode primarily by way of the TDM bus, the computer/processor also supports concurrent packet data transmissions over the LAN subsystem and packet bus(es). As needed to efficiently support various voice/data communications in the particular office/work environment, the buffer/framer and switch/multiplexer provide a multi-protocol router functionality, enabling the TDM bus traffic and the packet bus traffic to be intelligently bridged and managed without degradation of each other, and without requiring translation or transcoding. With the present invention, the same WAN services may be intelligently managed and controlled for simultaneous voice, video, and data traffic.

The computer/processor supports a variety of applications, such as remote configuration, management and back-up, bandwidth allocation and control, least cost routing, voice over Internet Protocol (or "voice over IP"), as well various telephony related applications. In certain preferred embodiments, audio/video data streams, including such as H.320 and H.323 data streams, also are intelligently managed and controlled. In certain preferred embodiments, management applications (such as the SNMP protocol) enable the system to be remotely monitored and configured via a web browser-type access.

In accordance with the present invention, various telephony and data functions useful in offices and other settings may be more conveniently and efficiently performed, and various methods for performed telephony and data functions are provided in accordance with various preferred embodiments of the present invention.

Accordingly, it is an object of the present invention to provide simultaneous voice, video and data communications with a single, integrated system.

It is another object of the present invention to provide an intelligently controlled and managed processor bridge between one or more TDM buses and one or more packet buses.

It is yet another object of the present invention to provide an integrated PBX, router and hub to support such simultaneous voice, video and data communications.

It is still another object of the present invention to provide a multi-protocol buffer/framer and switch/multiplexer in order to provide multi-protocol routing and intelligent time slot mapping to the TDM bus, preferably including DSP resources coupled to the buffer/framer.

It is an object of the present invention to provide systems and methods allowing a broad set of services and functions to co-exist in the same system, and leveraging shared resources while providing a high level interface and intelligence that allows for the shared resources to be dynamically allocated and re-allocated.

Finally, it is an object of the present invention to provide various methods of performing telephony and data functions in novel and more efficient ways, particularly in combination with the various preferred embodiments of systems in accordance with the present invention.

Other objects, features and advantages of the various embodiments of the present invention described herein will be apparent to those skilled in the art.

BRIEF DESCRIPTION OF THE DRAWINGS

The above objects and other advantages of the present invention will become more apparent by describing in detail the preferred embodiments of the present invention with reference to the attached drawings in which:

FIG. 16C illustrates a window for configuration of station ports of a station card in accordance with preferred embodiments of the present invention;

FIG. 16E illustrates a window for configuration of frame relay type WAN resources in accordance with preferred embodiments of the present invention;

FIG. 17B illustrates a window for providing a trunk monitoring function in accordance with preferred embodiments of the present invention;

FIG. 17C illustrates a window for providing a link monitoring function in accordance with preferred embodiments of the present invention;

FIGS. 37-43 illustrate windows used for configuring telephony features in accordance with preferred embodiments of the present invention;

DETAILED DESCRIPTION OF THE PREFERRED EMBODIMENTS

Although various preferred embodiments of the present invention will be disclosed for illustrative purposes, those skilled in the art will appreciate that various modifications, additions and/or substitutions are possible without departing from the scope and spirit of the present invention.

Figure 2:
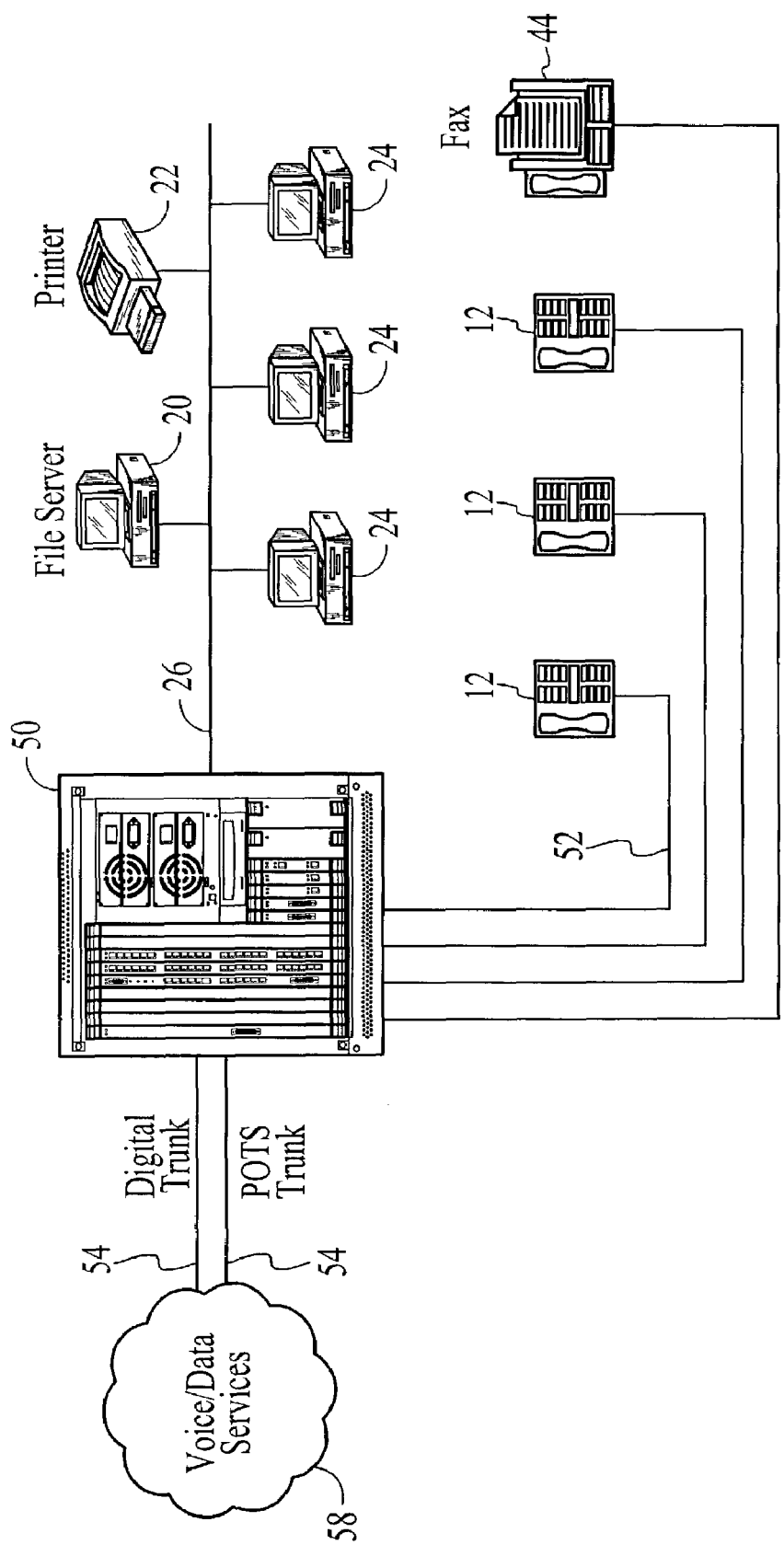
FIG. 2 provides an overview of an office communications system in accordance with preferred embodiments of the present invention.

In accordance with preferred embodiments of the present invention, systems and methods are provided to enable voice, data, video and other communications to occur in an efficient and integrated manner, intelligently allocating and utilizing available communications resources. FIG. 2 provides an overview of such a system in accordance with one preferred embodiment of the present invention.

Communications system 50 provides an integrated system for controlling and managing communications such as in an office. Communications system 50 communicates over ports 26 to file server 20, printer 22 and one or more computers 24. Ports 26 typically includes a packet bus such as Ethernet, "fast" Ethernet, ATM or other LAN technology (in other embodiments, LAN technology, such as token ring, may be coupled to an appropriately configured port). Communications system 50 includes devices for controlling ports 26, including controllers such as what are known as a network interface controller (NIC), which may integrate a media access controller (MAC) for control of and interface to ports 26. Connected to ports 26 may be a variety of devices, such as one or more file servers 20, computers 24, printers 24 and other computing, peripheral or similar devices suitable for interconnection with ports 26. Other network devices, such as routers, switches, bridges and the like also may be connected to ports 26. In a one preferred embodiment, ports 26 is an Ethernet-type LAN to which is connected to a variety of devices as determined by the needs of the particular office/work environment. The present invention effective integration of the packet data LAN and router-type functions with the telephony and server functions, which enables unique operations and the initiation or completion of calls or transactions or the like, without having access to traditional, dedicated devices, peripherals and communications services.

It will be appreciated that communications system 50 also may implement hardware and software for additional network functions, which are included in alternative embodiments. Such network functions include, but are not limited to: name server, such as DNS (Domain Naming System, which is used in the Internet for translating names of host computers into addresses) or WINS (Windows Internet Name Service, which is a name resolution service that maps or resolves Windows networking computer names to IP addresses particularly in a routed environment); firewall (as is known in the art, a firewall is a hardware/software implement that limits the exposure of a computing system such as communications system 50 or computers coupled thereto to access from a computer external to the system, which may include a network level firewall or packet filter that examines data traffic at the network protocol packet level, or an application-level firewall that examines data traffic at the application level, such as FTP or file transfer protocol, email, etc.); proxy server (as is known in the art, a proxy server is a type of firewall that uses a process known as address translation to map internal user IP addresses to the IP address associated with the proxy server firewall in order to provide extra security, etc.); DHCP (Dynamic Host Configuration Protocol, which is a protocol which allows a server to assign dynamically IP addresses to particular computers in real time, etc., which may support manual, automatic and/or dynamic address assignment, which may be used to verify a particular computer's identify, temporarily assign it an IP address for a particular period of time, and reclaim the IP address later for reassignment at the expiration of the particular period of time, etc.); and/or email server or gateway (which, as is known in the art, may be used to send and receive emails and/or send and receive faxes for the computers connected to the LAN or LANs, etc.).

Communications system 50 includes the functionality of what is known as a PBX (as will be described further). In preferred embodiments, communications system 50 is connected to a plurality of telecommunication devices, such as telephones 12, facsimile 44 and other suitable telecommunications devices and access and server functions (such as private voice mail, recording devices, WAN service interface cards, etc.). What is important is that communications system 50 include interfaces for a plurality of telecommunications devices for the particular and complete office/work environment and infrastructure.

Communications system 50 is coupled to WAN voice/data services network(s) 58 through trunks 54. Voice/data services network(s) may include private line, local or long distance carrier networks, Internet, intranet and/or any other current or future WAN-type network services. Trunks 54 may consist of high, medium or low speed digital and/or analog lines, either public or private, and in certain preferred embodiments consist of high speed dedicated resources such as what are known as T-1, PRI (Primary Rate ISDN), ATM, VDSL, HDSL, ADSL, DDS (Dataphone Digital Service, also called Digital Data System), wireless, cascade, proprietary and/or twisted pair analog lines from a local telephone company. What is important is the communications system 50 is coupled to WAN services, trunks and the like in a manner that the user, service provider, administrator and/or algorithm has determined will provide adequate or required resources, on a cost-effective basis, for the particular office/work environment and operating conditions.

Figure 1:
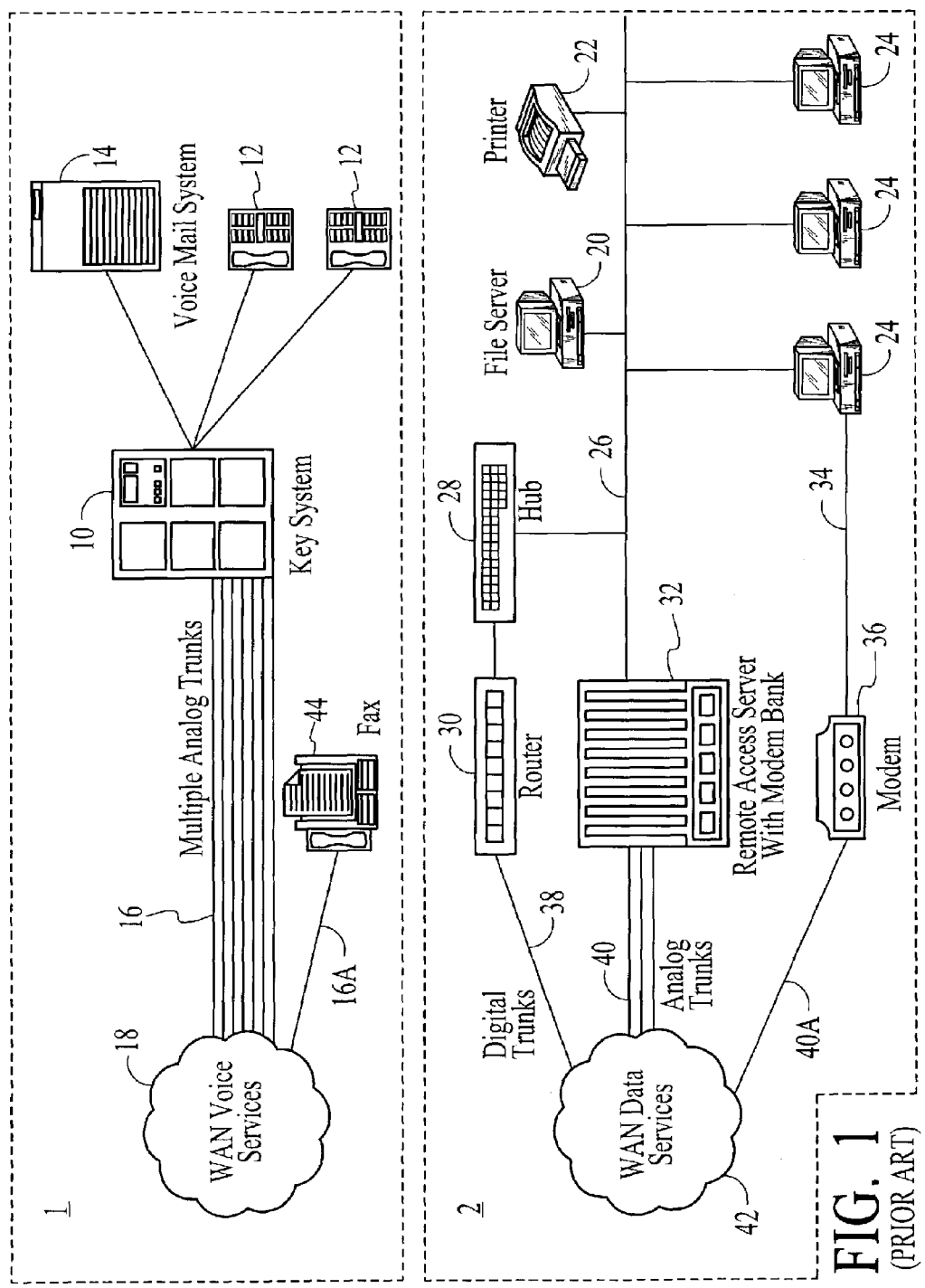
FIG. 1 illustrates a typical, conventional office communications configuration.

In contrast to FIG. 1, the communications system of FIG. 2 provides an integrated solution for voice and data communication services, to which may be connected the WAN network services and telecommunications, computing and other devices as determined by the particular office/work environment.

Figure 3:
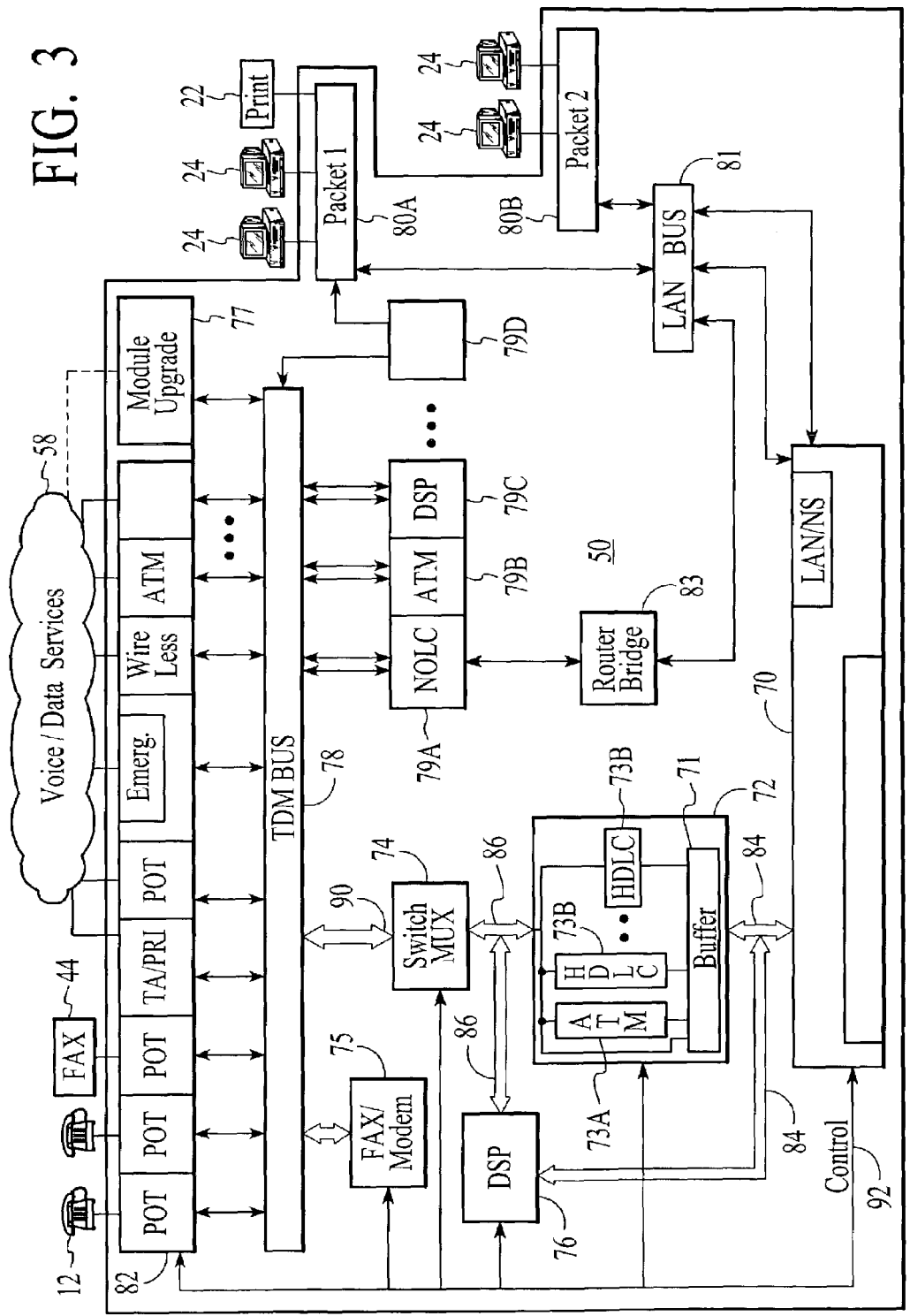
FIG. 3 is a block diagram illustrating preferred embodiments of the present invention.

Referring to FIG. 3, various subsystems, components, buses and the like of preferred embodiments of communications system 50 will be described in greater detail.

Communications system 50 is controlled by host processor/system resources 70, which in preferred embodiments include a computer powered, for example, by a commercially available or other microprocessor and an embedded and/or commercially available operating system. What is important is that processor/system resources 70 provide sufficient processing power, memory and storage resources (RAM, ROM, hard disk, magnetic or other storage, etc.), bus and other resources in order to control the various subsystems and components as will be described. In particular, computer/system resources 70 enables automatic internal negotiation, control and enabling of services and applications. Although not expressly shown, processor/system resources 70 also may include other components of a relatively high-end personal computer, workstation or server, such as a display device, keyboard, serial ports, parallel ports, power supply and the like. The various subsystems and components of communications system 50 are intelligently controlled, managed and monitored by processor/system resources 70. Processor/system resources 70 provides system and server management software and the like, and a platform for various server applications as described herein.

Host processor/system resources 70 is coupled to buffer/framer 72 via bus 84, which in preferred embodiments consists of a computer bus such as what are known as a PCI bus or ISA bus (in other embodiments, other suitable computer-type buses are utilized, which may include proprietary local buses). Buffer/framer 72 includes buffer 71 and preferably includes a plurality of multi-protocol framing/deframing engines, such as for what are known as asynchronous transfer mode (ATM) or high-level data link control (HDLC) protocols, which may be synchronous or asynchronous. In other embodiments, other communication protocol framers/deframers are provided, as may be desired by the particular office/work environment. Buffer/framer 72 in certain preferred embodiments includes, for example, one or more ATM framers/deframers 73A and one or more, and preferably a plurality of HDLC framers/deframers 73B. Although not expressly shown, buffer/framer 72 includes other controlling circuits (such as a slot mapping memory, multiplexers/demultiplexers, arbitration, control and other circuitry) such as, for example, described in U.S. Pat. No. 5,533,018 to DeJager, et al. for "MULTI-PROTOCOL PACKET FRAMING OVER AN ISOCHRONOUS NETWORK," which is hereby incorporated by reference. As will be described in greater detail, buffer/framer 72 includes the capability to transfer raw or protocol-processed data, which may be mapped to particular slots of TDM bus 78 and made available on different ports. Buffer/framer 72 is controlled by processor/system resources 70 as diagrammatically indicated by control line(s) 92 (control line(s) 92 may be implemented as part of a bus structure, such as bus 84). In preferred embodiments, processor/system resources 70 includes redundant disk or other storage, redundant power supplies and data back-up to magnetic or other media in order to enhance fault tolerance of the system.

Processor/resources 70 also may be connected to DSP 76. DSP 76 preferably consists of a single digital signal processor or multi-digital signal processor resource pool, which serves to provide a variety of functions within communications system 50. In preferred embodiments, DSP 76 generates dial tones (such as for telephones 12), DTMF digit detection and decoding, echo cancellation, coding/decoding functions, voice conferencing, voice compression, voice recognition and the like. In other embodiments, DSP 76 performs data compression, transcoding, processing for voice communications using an Internet protocol ("IP") or other voice over other network protocol or the like. In general, DSP 76 provides a set of processing and memory resources to support the various voice/data services controlled and managed by processor/resources 70. As illustrated by bus connection 84A, DSP 76 alternatively may be coupled directly to TDM bus 78.

Switch/multiplexer 74 communicates bidirectionally with buffer/framer 72 and preferably from DSP 76, as illustrated, over bus 86. Switch/multiplexer 74 also communicates with TDM bus 78, as illustrated, over bus 90. TDM bus 78 preferably is a time division multiplexed bus as is known in the art (such as, for example, what is known as an MVIP or multi-vendor integration protocol type bus, or what is known as an SCSA-type bus (SCSA is an acronym for Signal Computing System Architecture)), and provides in certain preferred embodiments 256 channels/slots per TDM frame (the present invention is not limited to a single TDM bus; in alternative embodiments, more than one TDM bus or other types of TDM buses are utilized). TDM bus 78 allows communication between devices on the bus by way of circuit switching techniques. This type of switching allows for simple and inexpensive communication of voice through, for example, what are known as pulse code modulation ("PCM") techniques. Switch/multiplexer 74 preferably is implemented with one or more switching/serial time division multiplexing circuits, such as, for example, described in U.S. Pat. No. 5,541,921 to Swenson, et al. for "ISOCHRONOUS SERIAL TIME DIVISION MULTIPLEXER," which is hereby incorporated by reference. Switch/multiplexer 74, under control of processor/system resources 70, provides the capability for various voice/data signals to be controllably switched to desired slots of TDM bus 78.

Coupled to TDM bus 78 are line, station, trunk, or other interface cards 82. Cards 82 provide CODEC, line interface, off-hook detect and other functions as are known in the art to support various telecommunication devices (such as telephones 12 and facsimile 44) and WAN-type network services (such as voice/data services 58) that are communicating with communications system 50 via TDM bus 78. In preferred embodiments cards 82 provide points of termination for a plurality of telephones 12, one or more facsimiles 44, and various T-1, PRI, ATM, analog and/or other WAN-type network services as determined by the particular office/work environment. Cards 92, under control of processor/system resources 70, may include points of termination for emergency or backup telephone services and the like, such as in the event of a power failure or to provide analog services in the event a dedicated resource such as a T-1 is unavailable for some reason.

Communication system 50 also may include fax modem 75, which, under control of processor/system resources 70, may process incoming/outgoing facsimile transmissions. In the preferred embodiment, fax modem 75 is coupled to TDM bus 78 as illustrated, although in other embodiments fax modem 75 may be coupled in alternative arrangements, such as to switch/multiplexer 74 and/or DSP 76.

Communication system 50 also may include available card slots on TDM bus 78 for one or more module upgrade 77. Additional resources and/or functionality may be added to communication system 50 as needed by way of module or line card upgrade(s) 77, or by, for example, the addition of one more cards such as ATM controller 79B and DSP 79C. Through the use of such module upgrades or additional cards, etc., one or more minimal configurations of communication system 50 may be provided, with additional resources and/or functionality added by the insertion of additional cards to TDM bus 78. Further aspects relating to upgrade and reconfiguration-type functionality of such line cards are described below in reference to FIG. 21. In accordance with preferred embodiments of the present invention, software upgrades for processor/system resources 70, or for other resources in the communications system, also may be applied.

Processor/system resources 70 also is coupled to one or more packet buses, such as packet buses 80A and 80B, which may be through a bus such as LAN bus 81. Effectively, packet buses 80A and 80B provide multiple hubs or switches to intercommunicate between one or more packet networks, which in preferred embodiments are Ethernet networks. It should be noted that the bus configuration of FIG. 3 may be considered "logical", and in preferred embodiments the physical bus configuration may be such that TDM bus 78 and packet buses 80A and/or 80B are part of the same physical bus. In such embodiments, packet buses 80A and/or 80B also can intercommunicate directly with central resources (such as processor/system resources 70) as well as station cards and WAN cards (or any other cards) coupled to the TDM bus (this is illustrated in FIG. 3 by card 79D, which is a card simultaneously inserted into/coupled to both TDM bus 78 and packet bus 80A and which may comprise, for example, a combined LAN interface/functionality and central office (or other WAN interface) card. Such a combined interface card, which may support both LAN and WAN functions (such as described elsewhere herein), enables substantial advantages over conventional systems.

Coupled to packet buses 80A and/or 80B are a variety of computing-type devices, such as computers 24, printer 22, other computers, file servers, backup or storage resources, other networks and the like. Processor/system resources 70, in software and/or hardware, provides a LAN/network subsystem, which includes routing and other related functions to support data communications to and from packet buses 80A and/or 80B and TDM bus 78, etc., through several paths or methods.

In preferred embodiments, a more direct connection between packet bus 80A and/or 80B may be established by way of embedded router or bridge 83. Router/bridge 83 includes a CPU, TCP/IP controller, router, stack, Ethernet interface or other functionality as may be desired to couple LAN bus 81 to, for example, one or more HDLC controllers 79A. Through the use of router/bridge 83, communications between packet buses 80A and 80B may be accomplished while consuming minimal resources of processor/system resources 70.

Figure 21:
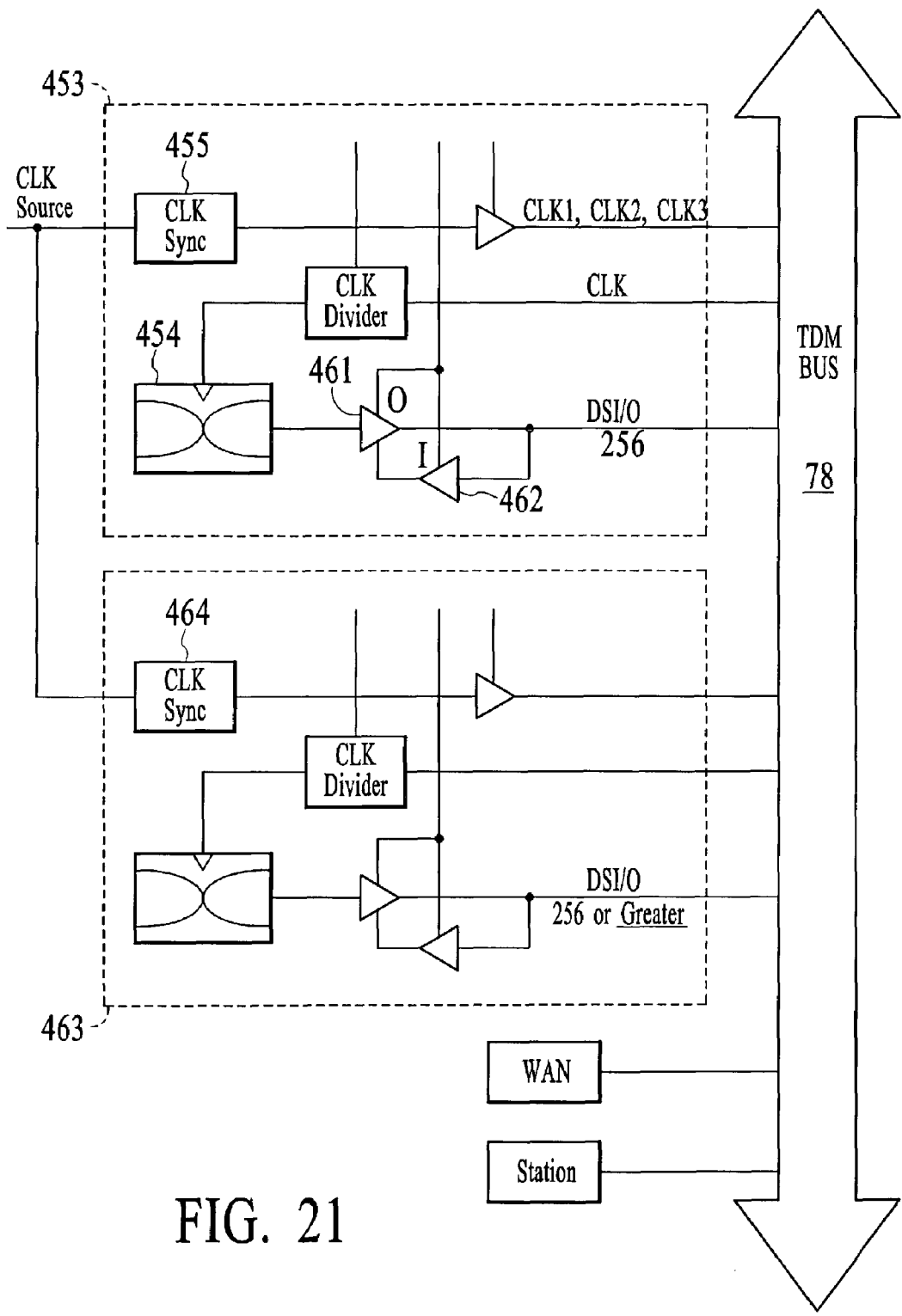
FIG. 21 illustrates a reconfigurable TDM clock source in accordance with preferred embodiments of the present invention.

Referring now to FIG. 21, additional aspects of preferred embodiments of the present invention will now be described.

One such aspect relates to the upgradeability of TDM bus 78 switch circuitry or "fabric," via software (e.g., RAM based firmware), and via hardware upgrade (e.g., adding new line cards with upgraded switch fabric to a TDM bus containing existing legacy line cards). TDM bus 78 is driven by a clock sync 455 in a first line card 453. This line card is equipped with additional circuitry, e.g., flip-flop 454 and tri-state drivers 461 and 462 that allow the isolation of the clock sync 455 from TDM bus 78 upon installation of a higher performance second line card 463 with a second clock sync 464. This example illustrates that the switch fabric of TDM bus 78 can be upgraded to a higher performing bus driven by a different clock sync 464, while still enabling the use of older first line card 453. Thus, first line card 453 may still use TDM bus 78, but with an insulated clock sync 455, while the TDM bus 78 is driven by the improved clock sync 464, and thus enabling a higher performing bus to second line card 463. Through this aspect of this preferred embodiment, additional features and functionality are possible. Due to the firmware basis for this switch fabric afforded by the use of tri-states (e.g., firmware control of the state of tri-state drivers/buffers such as drivers 461 and 462, such as by writing configuration or control data to a register or other location for controlling such tri-state devices, etc.) to effect the relationship between the clock source and TDM bus 78, the reconfigurable nature of the switch fabric on TDM bus 78 can be controlled via software, e.g., performance upgrade or for increasing fault tolerance. With multiple clock sources located on cards connected to TDM bus 78, the particular clock source that is driving the bus can be selected under software control to adjust for faults, e.g., framing errors and the like. This redundant aspect to such a TDM bus structure in accordance with such embodiments ensures greater fault tolerance and better overall performance. Additionally, because the switch fabric is controllable via software, the remote control of these features is possible, e.g., in a client/server context, such as described elsewhere herein.

While the present embodiment is illustrated with reference to an improved clock source located within the second line card, it will be apparent to those skilled in the art that other improved features within a second line card can be incorporated to reconfigure the characteristics of TDM bus 78 (e.g., a first line card with a first set of features, and a second line card with a second set of features or functions, may be incorporated into the system and coupled to TDM bus 78; under software or firmware control such as described above, the system may be remotely configured such as by selectively enabling or disabling, such as by tri-state isolation from TDM bus 78, some or all of the features/functions of the first or second line cards, etc.).

Figure 3A:
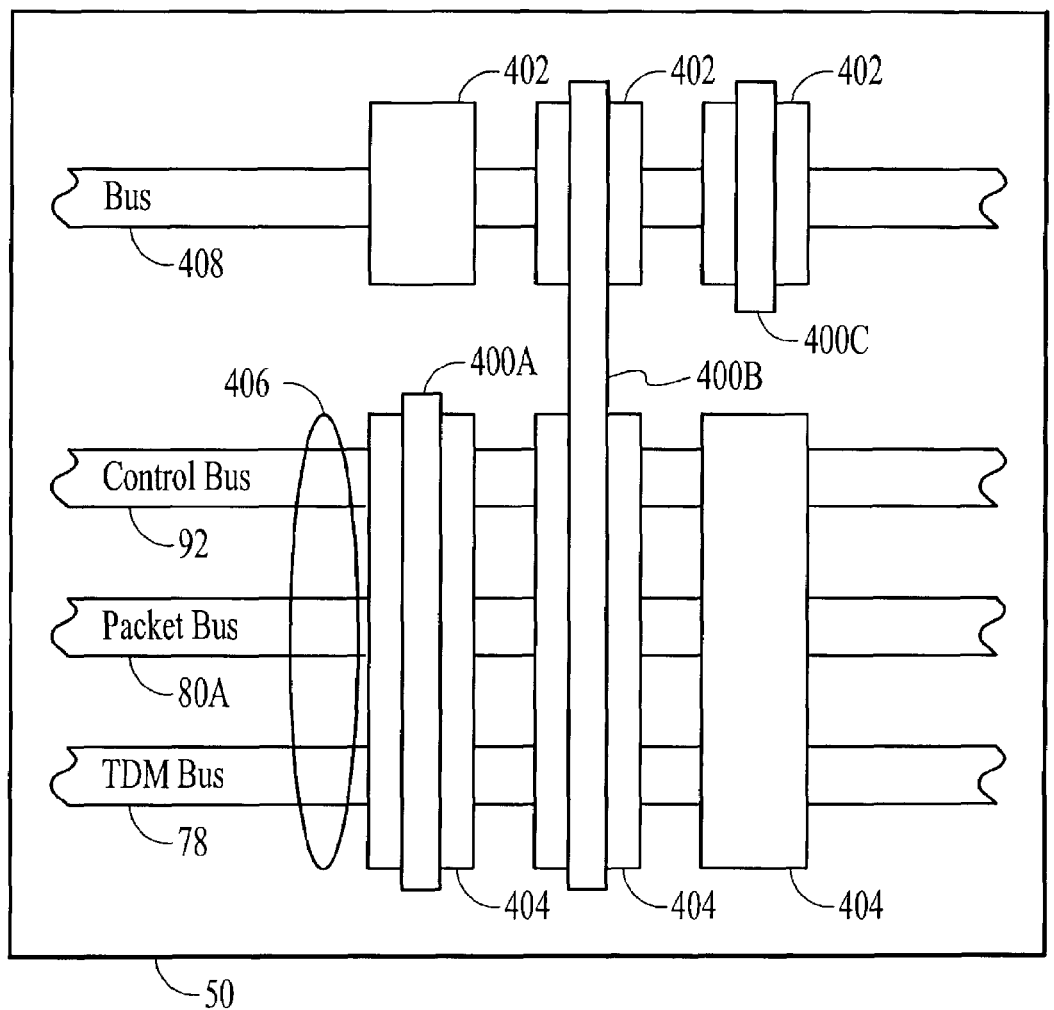
FIG. 3A illustrates communications buses in accordance with preferred embodiments of the present invention.

Referring now to FIG. 3A, additional aspects of preferred embodiments of the present invention will now be described.

As discussed in reference to FIG. 3, communications system 50 includes at least three (3) separate types of busses, e.g., TDM bus 78, packet bus 80A (or 80B), etc., and control bus 92, etc. In arranging such different busses, preferred embodiments of the present invention utilize an arrangement that desirably configures such busses into a passive backplane that may be used to plug in various printed circuit boards, cards, etc.

As illustrated in FIG. 3A, busses 92, 80A and 78 are physically arranged as part of system bus 406. Bus 408 is provided, for example, to serve as a bus for a computer backplane, such as a personal or other computer included in processor/system resources 70 (e.g., a computer system bus, such as what are known as PCI or ISA buses, etc.). Various boards or cards, etc. 400A, 400B and 400C may be physically plugged into sockets 402 and 404. Sockets 402 are provided for making electrical connection to bus 408, and sockets 404 are provided for making electrical connection to bus 406. It should be noted that, preferably, two rows of sockets 402 and 404 are provided, with at least certain of sockets 402 being positioned adjacent to and aligned with sockets 404. In this manner, boards such as board 400A may be coupled to bus 406 through one of sockets 404, board 400B may be coupled to both bus 406 and bus 408 via one each of sockets 404 and 402, and board 400C may be coupled to bus 408 through one of sockets 402. In accordance with such embodiments, bus 406, which includes control bus 92, packet bus 80A, and TDM bus 78, may be coupled to boards that couple only to bus 406 and also boards that couple to both bus 406 and bus 408. As will be appreciated, a plurality of sockets and boards may be provided, with one or a plurality of boards similar to board 400A, one or a plurality of boards similar to board 400B, and/or one or a plurality of boards similar to board 400C may be desirably provided in communications system 50.

It also should be noted that, in preferred embodiments, bus 92 is similar in form to a standard. ISA or PCI bus (although preferably modified/optimized for the particular implementation of communications system 50) and provides desired control to the various components and subsystems of communications system 50 (as described elsewhere herein). In addition, TDM bus 50 may consist of, for example, 256 channels at 64K bits/second. Packet bus 80A may support one or a plurality (e.g., 3, 4, 5 or more) of Ethernet or other packet buses, such as 100M bit, full duplex Ethernet capability or similar functionality (although only one such bus in illustrated in FIG. 3A).

In accordance with such embodiments, boards may be conveniently coupled to bus 406 and/or 408, which facilitates manufacture, upgrade, maintenance, etc. of communications system 50. It also should be noted that bus 408 may be, for example, an industry standard bus, such an ISA or PCI or similar bus, thereby enabling ready connection of available PC-type boards to communications system 50 if so desired for the particular application. Such a multi-backplane construction provides significant advantages in accordance with the present invention.

Figure 4:
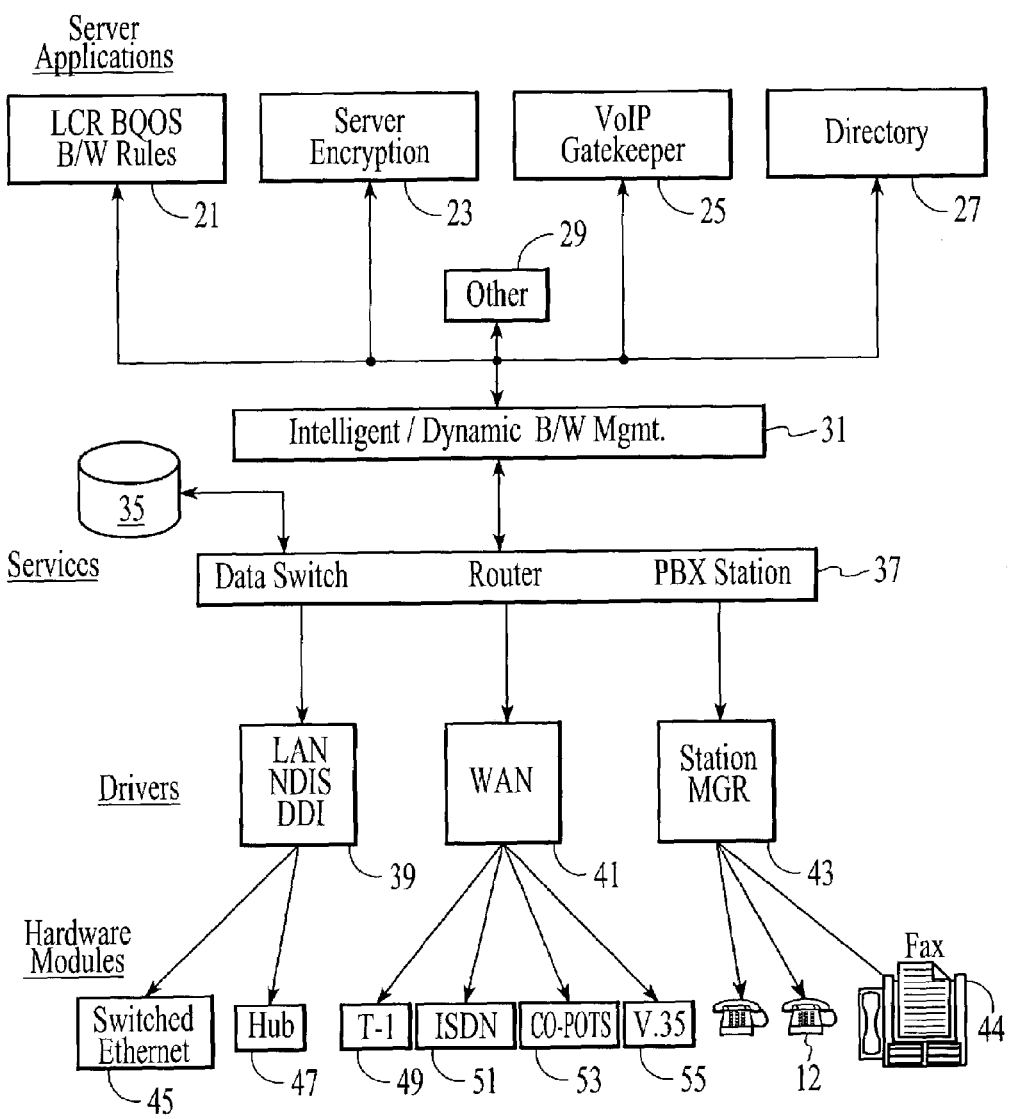
FIG. 4 provides a software/hardware overview of an office communications system in accordance with preferred embodiments of the present invention.

FIG. 4 provides a software/hardware overview of an office communications system in accordance with preferred embodiments of the present invention. It should be noted that the preferred embodiment of FIG. 3, with appropriate software in processor/system resources 70, may provide the software/hardware described in connection with FIG. 4, as will be appreciated by those skilled in the art.

At the server applications level, various software applications may be provided for operation in conjunction with the hardware illustrated, for example, in FIG. 3. Such software applications may include what are know as least cost routing ("LCR"), best quality of service ("BQOS") and bandwidth ("B/W") rules 21. LCR, BQOS and B/W rules 21 provide tables, information, rules and/or algorithms by which data and voice communications may be allocated and/or controlled with respect to, for example, the various types of voice/data network services that are available to communications system 50. Such information may include the current cost of utilizing various resources (based on time of date, amount of usage, integrated amount of usage over some period of time, etc.), and also priority rules for the various types of communications provided by communications system 50. For example, phone calls may be assigned a priority 1, facsimile calls a priority 2, VoIP calls a priority 3, facsimile over IP calls a priority 4, category 1 data communications a priority 5, and other data communications a priority 6. In preferred embodiments, the priority assignments may change by time of day or month, and/or the priority assignments may be different with respect to different network resources and the like.

Server encryption applications 23 may be provided in order to provide encryption or similar coding or processing of voice/data communications processed by communications system 50. VoIP gatekeeper 25 may be provided to service and control voice over Internet protocol ("VoIP") communications. As more specifically described below, various types of VoIP communications may be effectively managed and controlled in accordance with preferred embodiments of the present invention, such as, for example, a determination that acceptable conditions exist on the Internet for such communications. Directory 27 may be provided in order to make various types of directory information available to users of communications system 50. Directory information provided by directory 27 may include names, telephone extensions, address or other personal or work information regarding persons or departments, etc., serviced by communications system 50. Directory 27 also may include similar directory type information for persons or departments, etc. in a remote or other locations, such as may be accessed through voice/data services 58.

In general, with the present invention other applications 29 may be provided to support various types of communications in accordance with preferred embodiments of the present invention.

Intelligent/dynamic B/W, service and resource management 31 is provided to effectively and efficiently control and allocate and de-allocate services and communications resources, such as in accordance with LCR, BQOS, B/W rules 21 (e.g., rules to enable lowest cost, highest quality or otherwise desirable management and control of network or other resources, etc.) or other applications 29 or the like. B/W management 31 also receives as inputs information indicating the total number and types of network resources (of voice/data services 58, for example) that are available to communications system 50, and their status and availability at any given point in time. B/W management 31 may receive as an input, or may generate internally, information indicating how much of a measured usage resource may be available at a given point in time (for example, "frame relay," "private virtual channel" or other network services may be provided on the basis of a predetermined amount of data transmission per fixed time period for a fixed price, with additional charges for usage in excess of the predetermined amount, etc.). As more fully described below, based on the currently available and currently utilized services and resources, B/W management 31 may allocate and de-allocate such services and resources in a desired and/or cost efficient manner.

Additionally, other aspects of such embodiments with regard to service and resource management will now be described. Specifically, the use of realtime bandwidth and protocol statistics to assist in the administration of services and resources will now be described. With the example of a T1 connection, this aspect of such embodiments involves the collection and reporting of performance data statistics according to established specifications, e.g., RFC1406, AT&T TR54016, and ITU G.821, the documentation and specifications of which are hereby incorporated by reference. In this example, the statistics can be derived from registers adapted for storing information for the following: CEC (CRC Error Count), FEC (Framing Error Count), CSS (Controlled Slip Second), CVC (Code Violation Counter), and LOFC (Loss of Frame Count). Under control of, for example, processor/system resources 70, such registers may be read at predetermined intervals (or by locally generated or remote requests, etc.), and the following exemplary statistics of performance data or other statistics may be made available:

Errored Second (ES): Preferably a second consisting of a CRC error or a framing error or a controlled slip. Preferably, not counted during unavailable seconds.

Bursty Errored Second (BES): Preferably, framing=ESF (1<CEC<320). Preferably framing=D4 (1<CVC<1544). Preferably not counted during unavailable seconds or severely errored seconds.

Severely Errored Second (SES): Preferably framing=ESF (CEC>=320) or an out of frame error. Preferably framing=D4 (CVC>=1544) or an out of frame error. Preferably not counted during unavailable seconds.

Severely Errored Framing Second (SEFS): Preferably a second containing one or more framing errors (FEC).

Unavailable Second (UAS): Preferably incremented by one every second the driver is in the unavailable signal state. Preferably an unavailable signal state is declared when 10 consecutive SESs are detected and cleared when 10 consecutive non-SESs are detected; when declared any ES, BES, and SES errors that occurred during the 10 seconds are subtracted from the counters and the UAS counter is incremented by 10; when cleared any ES and BES seconds that occurred during the 10 seconds are added to the counters and the UAS counter is decremented by 10. Preferably, if the 10 second transition occurs over an interval boundary both intervals are adjusted accordingly.

Such statistics, and others similar to these, can be used to analyze each protocol to assist in B/W allocation and management, as well as overall administration, such as described elsewhere herein. Such information can be stored within the system and/or displayed on a user's screen via a direct LAN/WAN connection such as described herein, including through the use of HTML and widely available web-browsing software. Those skilled in the art will recognize that it may be desirable to monitor other kinds of real time protocol and bandwidth statistics in other environments.

Services 37, which may be supported by database storage 35 (which may be provided as a part of processor/system resources 70), include data switching services, router services and PBX station services. In general, in accordance with preferred embodiments of the present invention, and utilizing resources such as described in connection with FIG. 3, various communication-related services may be advantageously supplied by communications system 50.

For example, data switching services may be provided such as by LAN/NDIS/DDI drivers 39 (LAN, NDIS and DDI being exemplary) through hardware modules such as switched Ethernet 45 and hub 47. Routing services may be provided such as through WAN drivers (specific network services such as PRI and T-1 being exemplary) through hardware modules such as T-1 module(s) 49, ISDN module(s) 51, central office-plain old telephone service (CO-POTS) module(s) 53, V.35 module(s) (it should be understood that various hardware modules may be utilized in accordance with preferred embodiments of the present invention, as desired to implement the various data switching, routing and other communications connections as may be determined by the needs of the particular office/work environment. PBX station services, such as automated attendant, reception, voice mail and the like, may be provided through station manager 43. Station manager 43 provides hardware for connection to various telecommunications devices, such as phones 12, facsimile 44, etc. In general, station manager 43 provides sufficient interface hardware in order to connect to the various devices that may be determined by the needs of the particular office/work environment).

Additional features particularly of hardware components of such embodiments involving detection operations incorporating or utilizing DSP resources such as are included in preferred embodiments will now be described (DSP resources included in such embodiments are described, for example, in connection with FIG. 3. A technique for determining characteristics of an analog line is to send a known signal (preferably a known tone or combination of tones or frequencies of known energy, etc.) down a line, and convert a predetermined frequency (or frequencies) of a returned signal from the analog line to a voltage or to otherwise process the returned signal; characteristics of the analog are determined based on the voltage or otherwise from information extracted from the returned signal. In preferred embodiments the returned signal is processed by DSP resources (see DSP 76 of FIG. 3) in order, for example, to perform a Fast Fourier Transform ("FFT") or other signal processed on the returned signal. As example, particular frequency bands in the returned signal could be evaluated to determine whether a phone is physically connected to the line (e.g., an analog phone typically presents a 10K ohm impedance to the line in an on-hook condition, the presence of which could be determined by evaluation of the returned signal. In preferred embodiments, DSP resources could evaluate the returned signal energy, again preferably with an FFT, and the presence and/or type of telephone device physically attached to the line could be assessed/determined, and still preferably an assessment of the quality of the particular line could be made based on such an analysis of the returned signal.

Such signal processing could be done periodically or upon detection of errors, start-up or reboot, or upon initiation of a diagnostic or maintenance routine. With remote administration and configuration capabilities as described elsewhere herein, such phone presence detection, line quality assessment, etc., could be conducted from a remote location (such as enabling a central system administration to "map" the presence of phones to particular lines in a remotely located system. In accordance with such embodiments, such capability enables a similar functionality to the link status indicators that may be available on network ports. Such link status information for analog telephones can be incorporated into a visual representation of the system, easily viewable remotely via an HTTP link over the Internet, for example (such remote viewing of the physical status of a system, i.e., "chassis view," is described elsewhere herein). It should be understood that this approach to obtaining line status and information can easily be applied to other aspects of telephone lines. For example, the line condition, or suitability for high speed data transfer, or perhaps the highest speed available on a particular line (e.g., "speed grading" or "speed characterization" of individual lines) can be measured.

In still other embodiments, applying such techniques (i.e., sending a known signal down a line and analyzed a return signal, etc.) information pertaining to the Central Office can be obtained, for example, information about the Central Office battery (voltage of 20-50 volts) can be measured that indicate the distance to the Central Office as well as its presence, etc. Other aspects of such analog line or other detection can easily be realized through this method and beneficially used in other applications. For example, specific capabilities of the line and/or the device at the other end (including a Central Office, etc.) of the line can be detected, during on-hook and off-hook conditions, all of which may be initiated in a remote manner, viewed graphically, etc., as described elsewhere herein.

Figure 5:
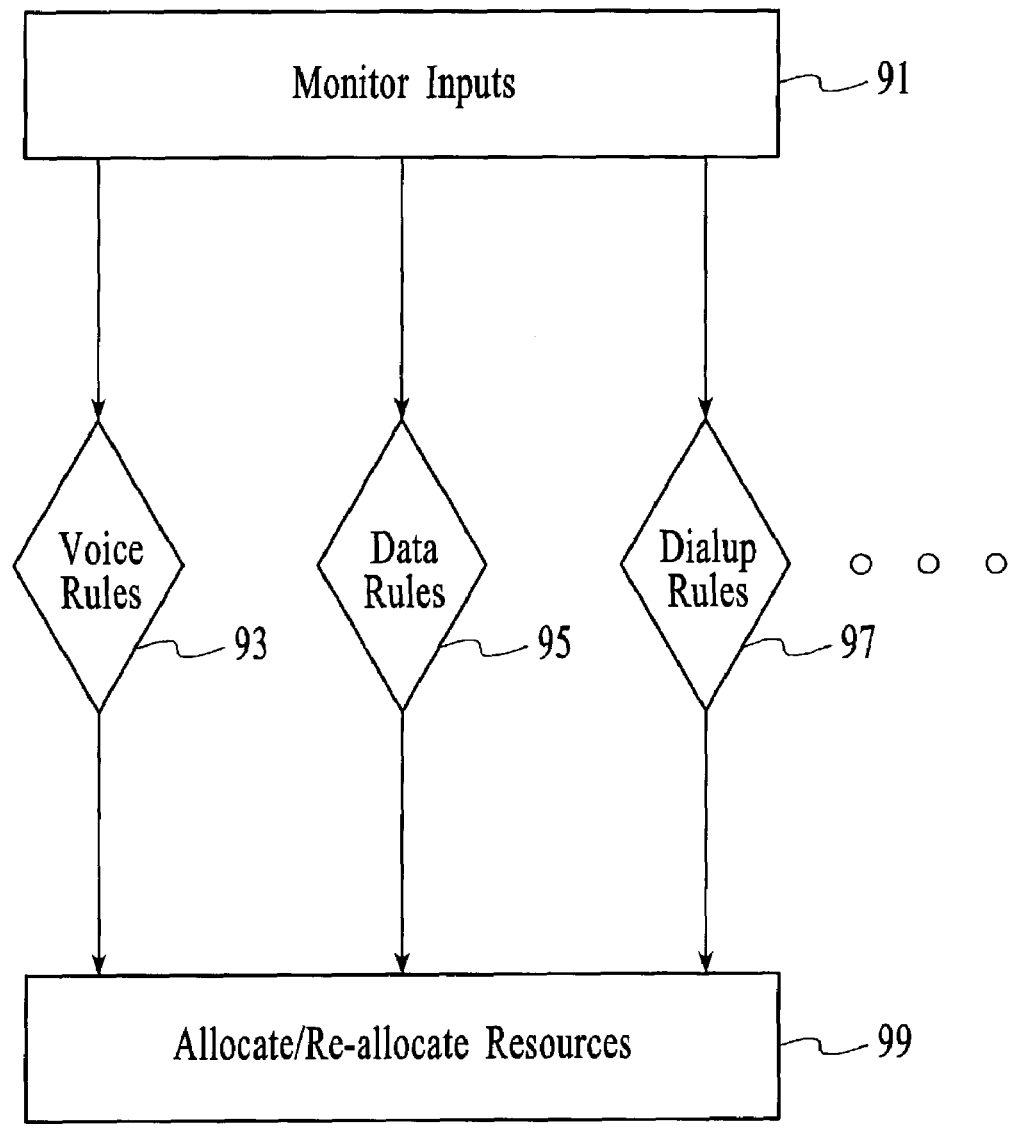
FIG. 5 illustrates the use of services/bandwidth allocation rule table(s) in accordance with preferred embodiments of the present invention.

Referring now to FIG. 5, a general flow chart will be described for illustrating the use of services/bandwidth allocation rules in accordance with preferred embodiments of the present invention.

Server applications, such LCR, BQOS, B/W rules 21, may be considered to have various rule sets, such voice rules 93, data rules 95 and dial-up rules 97 (other rule sets may be provided). Communications system 50 monitors inputs (illustrated as monitor input block 91 of FIG. 5), and based on such inputs and the overall service/network resources available, and in accordance with voice rules 93, data rules 95 and dial-up rules 97, allocates and de-allocates resources (illustrated as allocate/re-allocate resources block 99 of FIG. 5).

Exemplary operations of such preferred embodiments will now be described.

In the event a user picks up one of telephones 12, an off-hook condition is detected by the appropriate card 82, which signals processor/system resources 70 of the off-condition. Processor/system resources 70 controls switch/multiplexer 74 to couple the appropriate card 82 to DSP 76, which generates a dial tone that is coupled to the appropriate telephone 12. The user hears the dial tone and may then proceed to place the desired call. DSP 76 detects the digits of the telephone number of the desired call and provides the detected digits to processor/system resources 70. For an internal call, processor/system resources 70 directs that the called internal telephone receive a ring signal from the appropriate card 82. Upon pick-up of the called internal telephone, the telephone connection between the internal phones is established by way of TDM bus 78 and the appropriate cards 82.

For an external call, processor/system resources 70 attempts to establish the desired connection through the appropriate cards 82 and available voice/data services 58. In attempting to establish such a voice communication connection, processor/system resources preferably follows the general flow illustrated in FIG. 5. Namely, in accordance with available resources (such as of voice/date services 58) and rules such as voice rules 93, data rules 95, dial-up rules 97, etc., an external voice communication may be established by, for example, a POTS line connection, an ISDN B channel, a VoIP connection, etc. In accordance with the present invention, resources may be allocated for the processing of such an external call based on the available resources at the particular time and applicable rules (which may include time of day, priority of call, etc.)

Incoming calls are detected by the appropriate cards 82 and signaled to processor/system resources 70. Connections of voice incoming calls to telephones 12 are established under control of processor/system resources 70 over TDM bus 78.

Still additional operational advantages and features in accordance with still additional preferred embodiments of the present invention will now be described.

PBX and Telephony-Related Functions

With the hardware of preferred embodiments as illustrated in FIG. 3, various novel and/or improved or more efficient communications functions may be obtained. As noted in FIG. 2, with the present invention a plurality of workstations or computers 24 may be connected to communications system 50. Although only a single LAN is illustrated in FIG. 2, as illustrated in FIG. 3 two or more LANs may be coupled to communications system 50, with a plurality of computers coupled to each of the two or more LANs, etc.

In accordance with preferred embodiments of the present invention, one or more of computers 24 may execute a PBX/telephony control application software program. In accordance with the PBX/telephony control application, hereinafter referred to as the "office attendant type" program, control of the telephony and related functions of communications system 50 may be intelligently managed and controlled. With such an arrangement, one or more computers on the LAN may be used to control incoming and outgoing calls of the office using the computer in a natural and intuitive manner. A telephony headset or telephone preferably is associated with the particular computer that will be running the office attendant type program to enable traditional voice communications with incoming callers, etc.

Figure 6:
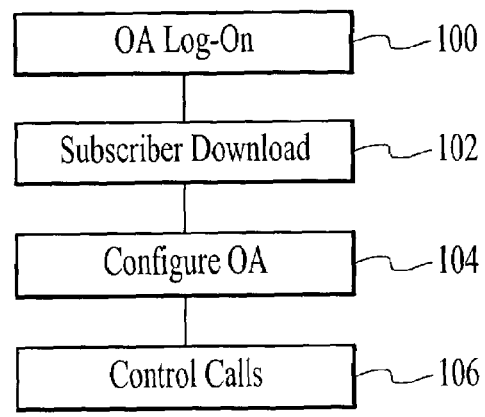
FIG. 6 illustrates a general flow chart for controlling incoming and outgoing calls in accordance with preferred embodiments of the present invention.

As illustrated in FIG. 6, a party desiring to control the incoming and outgoing calls and/or station to station calls of the office ("attendant 1") may log-on and run the office attendant type program from one of the computers connected to the LAN connected to communications system 50. At step 100, attendant 1 may be required to enter an appropriate user name/ID and password in order to recognize attendant 1 as an appropriate user to assume control of the telephony functions of the office. A network or systems administrator may set up password control for parties authorized to run the office attendant type program. At step 102, in preferred embodiments the computer running office attendant type program has downloaded to it the current telephone subscriber directory such as over packet bus 80A or 80B of FIG. 3 (e.g.: a complete listing of the telephone subscribers; extensions; status information such as do not disturb, forward and forwarding information, forward to voice mail, hunt group information, etc.) from communications system 50. In this manner, the computer or computers running the office attendant type program may locally contain current subscriber information for controlling the incoming and outgoing calls of the office. In preferred embodiments, communications system 50 automatically determines when subscriber information changes, e.g., a subscriber has been added to or deleted from the telephone directory, or an extension has changed, or a subscriber's status information has changed, or any state associated with communications system 50, etc., in order that updates may be timely made available. In such embodiments, computers running the office attendant type program may be updated promptly and automatically by communications system 50 so as to contain current subscriber information on an ongoing basis to more efficiently control telephony operations of the office. It also should be noted that in preferred embodiments the subscriber information also may include other information, such as the email address and extended directory information including personal information manager ("PIM") information of the particular subscriber and network identification for a computer associated with the particular subscriber. With such information, net messages or other communications with particular subscribers may be facilitated as more fully described herein.

It also should be noted that this subscriber download concept is applicable in various forms to all computers coupled to communications system 50. For example, communications system 50 includes information regarding all users registered in the PBX (i.e., all users having a telephone extension and/or computer coupled to communications system 50 such as over the LAN or WAN). Thus, in the event of a subscriber directory change, communications system 50 may "broadcast" updated subscriber directory information to all computers coupled to communications system 50, or, in alternate embodiments, communications system 50 sends a net message, email or other message to such computers coupled to communications system 50 that prompts the users of such computers to the availability of the subscriber directory update (e.g., the remote computers received a message indicting the availability of the subscriber directory update, which preferably includes an "accept" icon and a "reject" icon, thereby enabling the user to receive or not receive the update as he/she may desire).

This concept may be extended to system speed dial buttons (as described elsewhere herein), and other information that may be desirably controlled and distributed in/from a central location (e.g., communications system 50) in a particular office setting. For example, a company organization chart, financial reports, informational reports, etc. may be centrally stored, etc., which may include being maintained by a system administrator-type person for communications system 50. In accordance with such embodiments, centrally-controlled information may be broadcast to all users, or a selected subset of such users (communications system 50 also preferably accesses/stores information regarding the registered users, such as title, department, position within the company; e.g., Vice President, engineering department, sales and marketing department, etc.). Thus, a centrally-maintained document/file, such as a company organization chart, financial report, etc., may be conveniently distributed to computers coupled to communications system 50. Preferably, communications system 50 records which computers receive such information (for example, a record of those computers logged-on and receiving the information at the time it is first distributed), and thereafter may distribute the information to other computers at a later time (for example, at a later time when the users of such computers log-on to communications system 50). As described previously, such embodiments also may prompt the individual users whether they wish to receive the information, and thereafter provide the information to those computers whose users affirmatively indicate that they desire to receive the information.

In step 104, the computer running the office attendant type program optionally may run a configuration routine to more optimally configure the office attendant type program on the particular computer for control of the telephony operations. At step 106, the computer running the office attendant type program is in a ready condition for processing incoming or outgoing calls or the like.

Figure 7:
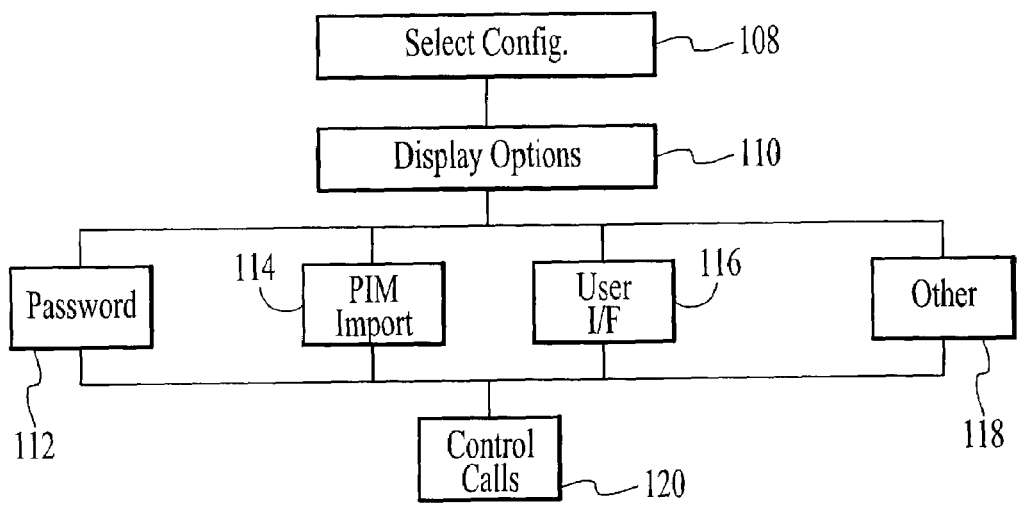
FIG. 7 illustrates an exemplary configuration algorithm for an office attendant type program in accordance with preferred embodiments of the present invention.

Referring to FIG. 7, an exemplary configuration algorithm for an office attendant type program will now be described. At step 108, the user selects a configuration icon or otherwise initiates a configuration command on the computer running the office attendant type program. At step 110, the office attendant type program displays a choice of configuration options. FIG. 7 illustrates options such as password change option 112, contact or personal information manager ("PIM") import option 114, user interface configuration option 116 and other option 118 (other option 118 indicates other configuration options that may be presented to the user to more optimally configure the office attendant-type program for the particular user or operating environment, etc). At step 120, the computer running the office attendant type program has completed the configuration process and is in a ready condition for processing incoming or outgoing calls or the like.

Figure 7A:
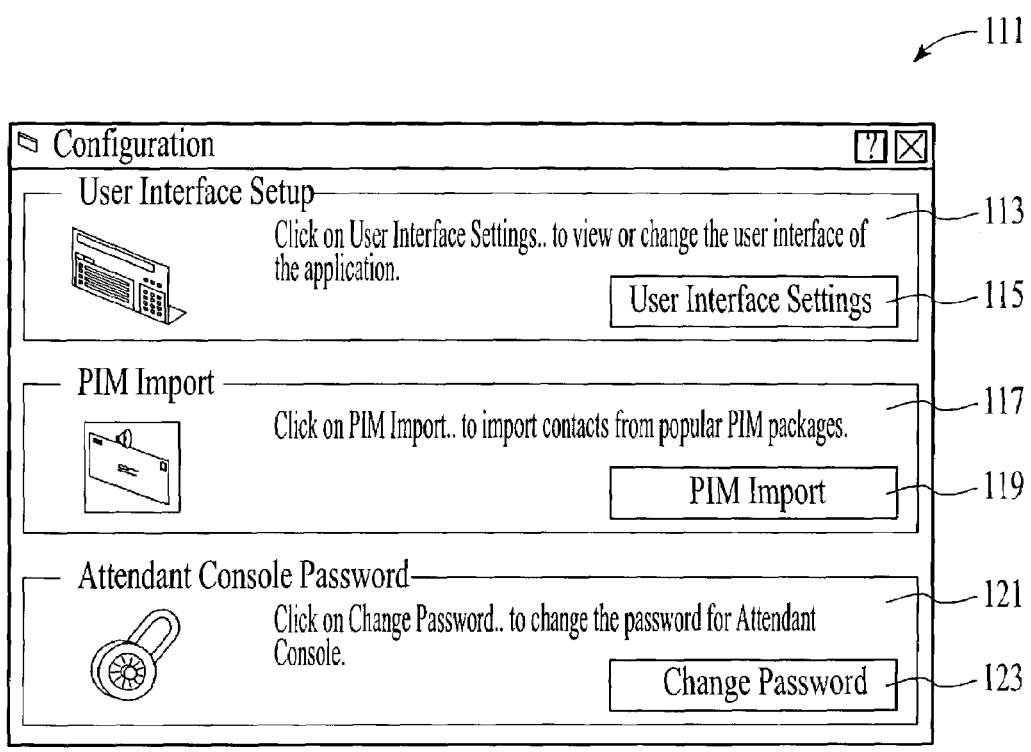
FIG. 7A illustrates an exemplary arrangement of configuration options of the present invention.

An exemplary arrangement of configuration options for such a configuration algorithm is illustrated in FIG. 7A. As illustrated, by configuration window 111, a user may be presented with configuration windows such as user interface configuration window 113, contact or PIM import window 117 or password control window 121. As an illustrative example, user interface window 113 may include icon 115 for displaying menus or windows for tailoring the user interface for the particular user and operational parameters; exemplary user interface options include user selectable tones, sounds, or volumes for indicate incoming calls, line status conditions, programmable call capacity before routing calls to another computer running an office attendant-type program or to an automated call answering algorithm of communications system 50, visual display options to vary the computer display (such as size, color of icons or background, etc.) of the screens of the particular office attendant type program, etc. What is important is that a particular user running an office attendant-type program on a particular computer may configure user interface-type attributes to more optimally configure the computer that the user will use to control the incoming and outgoing calls of the office, etc. It should be noted that, although other computers coupled to communications system 50 may simultaneously be running an office attendant-type program, each such computer in preferred embodiments may be independently configured to be more optimum for the particular computer users.

Other configuration windows illustrated in FIG. 7A include contact or PIM import window 117 and password control window 121. PIM import window 117 may include icon 119 for displaying menus or windows for importing contact information from a PIM-type software program or database. In accordance with such embodiments, contact information to be used by the user running the office attendant type program may be readily imported from a PIM-type information database or contact list (which may be resident on the particular computer, in communications system 50 or on another computer coupled to a LAN), thus saving the time from entering contacts from a manual or electronic list. Password control window 121 may include icon 123 for displaying menus or windows for enabling the user to change his/her password. In preferred embodiments, the office attendant-type program(s) used to control telephony functions of communications system 50 utilizes password protection to prevent database tampering and the like and also to prevent unauthorized use of the Office Attendant-type program(s).

Figure 22:
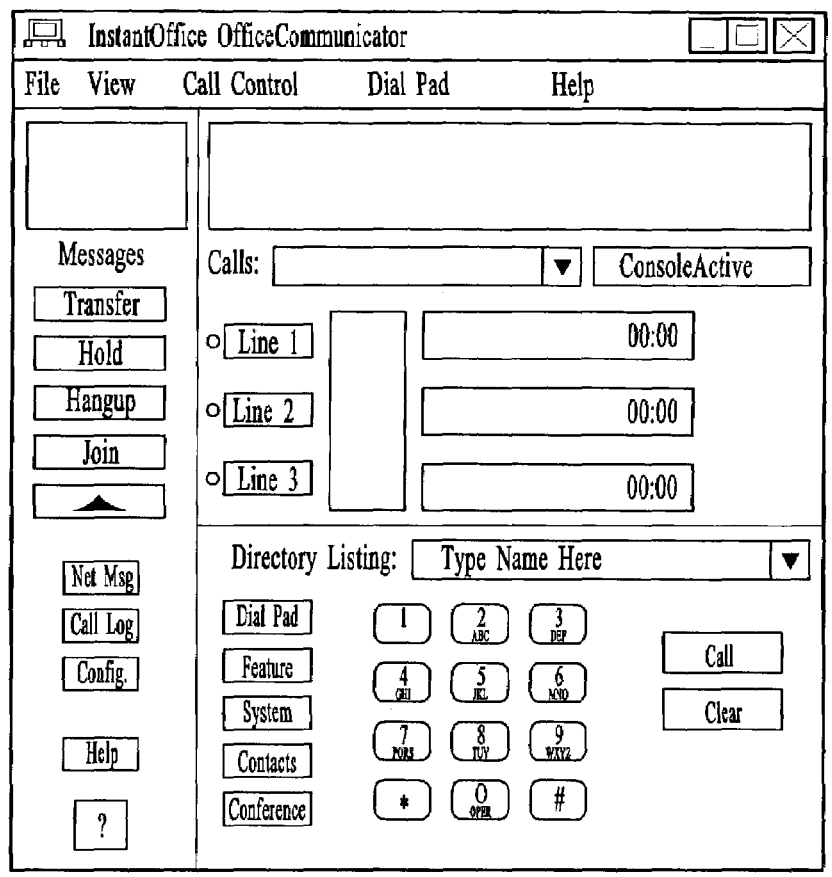
FIG. 22 illustrates an exemplary main window in accordance with preferred embodiments of the office communicator-type programs in accordance with the present invention.
Figure 23:
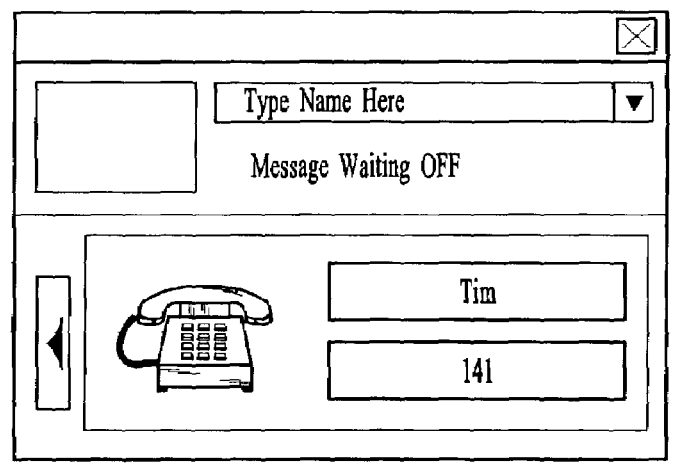
FIG. 23 illustrates an exemplary screen pop window in accordance with preferred embodiments of the office communicator-type programs in accordance with the present invention.

Referring now to FIGS. 22 and 23, additional aspects of these embodiments relating to office communicator-type programs (running on/in connection with processor/system resources 70, etc.) will now be described. These types of programs can be used in connection with the office attendant-type programs described elsewhere herein. Office communicator-type programs typically differ from office attendant-type programs in the types of functions they are optimized to perform. For example, the users of office communicator-type programs typically initiate and terminate calls, whereas the users of office attendant-type programs typically also route calls. FIG. 22 illustrates an exemplary main window of an office communicator-type program, and FIG. 23 illustrates an exemplary screen pop up window for such a program.

Referring to FIG. 22, the Main Window preferably includes a small appearance GUI footprint including three low profile line status indicators. Office communicator-type programs preferably do not include a 'Calls in Queue' or a 'Calls on Hold' indicator. Alternative views of this window can be sized and displayed to take up less physical space on the screen for the end user. Such feature buttons allow additional functionality to be added into the program, for example, multiple call parking features can be added. In this example, there are two types of park: Self-Park and System Park. Self-park preferably parks the call at the extension of the person parking the call. Hence, if an outside caller calls extension x125 and the user at x125 answers and self parks the call, then the user at x125 can page and announce "Pick up x125". System park returns a parking address, or slot number of a predetermined number of parking spaces that the system allocates for such call parking. Hence, if an outside caller calls extension 125 and the user at x125 system parks the call, then the display on ext 125's office communicator-type program will read: "Call Parked on <slot number>", e.g. "Call Parked on 2". Then the user at x125 can page, and announce "Pick up 2".

Referring now to FIG. 23, such an office communicator type program that is optimized for general telephone and computer use, can include a screen pop window as illustrated. The main user interface illustrated in part in FIG. 22 preferably consists of a three-line display. However, this main user interface is not intended to be maximized at all times. When an incoming call arrives, the screen pop illustrated in part in FIG. 23 will slide out and occupy a small portion of the screen to let the user know that there is an incoming call, and provide caller information to the user. In addition, such a screen pop may incorporate a visual signal, e.g., a rotating telephone icon, to help indicate that a call is trying to get through. When there are new messages at the extension, the screen pop will also appear to indicate (via an appropriate icon or other indicia, preferably rotating or otherwise moving in order to attract visual attention, etc.) that there is a message waiting. For making outbound call and other simple/more frequent call control operation, a toolbar with basic call control functions preferably is provided to the user. Other visual and operational variations suitable for other working environments will be apparent from the above discussion.

Referring to FIGS. 22 and 23, additional exemplary preferred features of such embodiments will now be described.

A user can answer incoming calls by point-and-click using the mouse, by using the keyboard or by using the phone. The user is notified of an incoming call by both visual and/or audible effects. Users can make outbound calls either using the mouse, by using the keyboard or by using the phone.

When an incoming call arrives, if the phone is in TAPI mode and the phone is off-hook with no dial tone, the user can answer the call via the software application (e.g., mouse click on an appropriate icon, etc.). When an incoming call arrives and the user is already on another call, the user will be signaled of the incoming call on both the application and the handset (e.g., beep). Users preferably are notified of the caller id on the screen by the application, and he can answer the call by the application or by the phone (e.g., hitting the Flash).

The user preferably may initiate a call from the application. If the phone is on-hook, preferably the phone would ring to indicate that the user has to pick up the handset to dial out. Once the handset is picked up, the call may then be made. The user preferably then hears ring-back on the handset. Alternatively, if the phone is already in TAPI mode, the call would be made immediately and the user would hear ring-back on the handset.

The user preferably may also initiate a call from the phone. The user would pick up the phone and hear dial tone. He or she can then dial the number from the phone set. When the user is already on another call and he wants to make another call by the application, he can choose to put the current caller on hold and dial the number, or the application would automatically put the current caller on hold when he dials the number. When the user is already on another call and he wants to make another call by the phone, he can put the current caller on hold by hitting 'FLASH' on the phone and dial the number.

The user can put a current call on hold using the mouse, by using the keyboard or by using the phone. By making an outbound call, or answering another call from the application, the current call can automatically be put on hold by the application. The user can put the current call on hold from the phone, for example, by hitting 'FLASH' on the phone set.

The user can transfer the current call to another extension or to an offsite number by using the mouse, the keyboard or the phone. The application supports two types of transfer i.e. Blind and Consultation. Blind transfer is transferring the caller to the destination number without talking to the person at the destination. Consultation transfer is transferring the caller to the destination number after talking to the person at the destination. The application would support both type of transfer with a single user interface to maintain the simplicity of usage.

The user can transfer the current call to another extension or to an offsite number from the phone by hitting 'Flash'. The user will then hear the dial tone. The user will then enter the transfer destination phone number. For blind transfer, the user hangs up the phone before the destination answers to complete the transfer. For consultation transfer, the user talks to the transfer destination, and hangs up the phone to complete the transfer.

The user can join two calls on the extension by using the mouse, the keyboard, or the phone. By hanging up the handset when there are two calls on the extension would join the two calls together.

The user can create a conference call with many attendees including the user by using the mouse, the keyboard, or the phone. The user can add conference attendees to the conference from the application by using the mouse or the keyboard. The conference attendees can already be on hold at the extension, or the user can dial out to the conference attendees to invite them to conference. The user can also add conference attendees by using entering the feature codes on the phone set. Regardless of how the conference is initiated (either by phone or by application), the user preferably may add additional attendees by using either the phone or the application.

For removing conference attendees, the attendees can hang up their phone voluntarily. If it is desired for certain attendee to drop out of the conference, the conference master can use the application to selectively drop the attendee. The user can also drop the conference call and allowing other attendees to continue with the conference call if he or she is the conference master.

When there are new voicemail messages on the extension, there will be a message waiting indication both on the phone set (e.g., a blinking LED), and the application (e.g., a rotating mailbox icon). On the application, the message waiting indication will be on the main user interface as well as the screen pop.

NetMessage is a feature preferably provided on the application. NetMessage can be initiated and received by any computers running office communicator-type programs or office attendant-type programs. The application provides two types of NetMessage i.e. transferring a call or leaving a text message.

Transferring a Call

During the transfer of a call, if the destination extension is on the phone or on DND (Do Not Disturb), the application preferably presents 3 options to the user. The user can put the caller on hold, sent the caller to the voicemail of the destination, or send a NetMessage to the destination's computer. On the receiving end of the NetMessage, the user would see a dialog box on his machine with the text message and 2 options i.e. accepting the call or ignore the call. If the user chooses to accept the call, the call automatically transfers from the originated extension to the destination. If the user chooses to refuse the call, the application will notify the originated user that the call was refused.

Leaving a Text Message

Anyone that is running either an office attendant or office communicator-type programs can initiate a NetMessage anytime. NetMessage in this scenario is just a text message posted on the destination machine. The receiver has the option of replying to the message.

PIM Integration

The user can import the contacts that have been stored in any of the supported PIM software. The user can then choose to put them in any folder he wants. After importing, he can then organize the contacts into different folders. The user can export the contacts that he has stored in the personal folders to any of the supporting PIM software format.

Office communicator-type programs provide the user with a screen pop which will appear on the screen when an incoming call arrives. The screen pop can do a lookup to a PIM database for records matching the caller id information of the call, and display this information even while the call is still ringing. This feature can be used in a variety of useful ways. For example, the end user can see customizable database information connected to the caller that could assist the end user in deciding how to (or even whether to) answer the call.

Off-site Call Forwarding, Trunk to Trunk Transfers & Conferences

Off-site call forwarding (OSCF): In this scenario, an internal or external call (call 1) terminates on the target station directly or via AA (auto attendant). The target station has configured the user forward number to an external number (ie: 9-555-1234). The system places an outgoing call to the external number and connects call-1 to this trunk. This results in a trunk to trunk or station to trunk call depending on the source of call-1.

Trunk to Trunk Transfer (TTT): In this scenario an incoming external call-1 terminates on station via either DID, DIL, AA. The user answers call-1 putting the connection from incoming trunk to internal station in the connected state. The user flashes and transfers call-1 to an offsite number (9-555-1234) or transfers call-1 to an extension that is forwarded off-site (off-prem forwarding).

Trunk to Trunk Conference (TTC): In this scenario an incoming external call-1 terminates on station via either DID, DIL, AA. The user answers call-1 putting the connection from incoming trunk to internal station in the connected state. The user flashes putting call-1 on hold and dials (call 2) an offsite number (9-555-1234) or extension that is forwarded off-site (off-prem forwarding). Once call-2 is connected the user flashes and completes the conference.

The user (conference master) then hangs up which allows call-1 and call-2 to stay connected via trunk to trunk.

The above, of course, are merely illustrations, and many other useful variations will be apparent to skilled artisans from the present teachings for answering calls, PIM integration, transferring calls, etc.

Figure 8A:
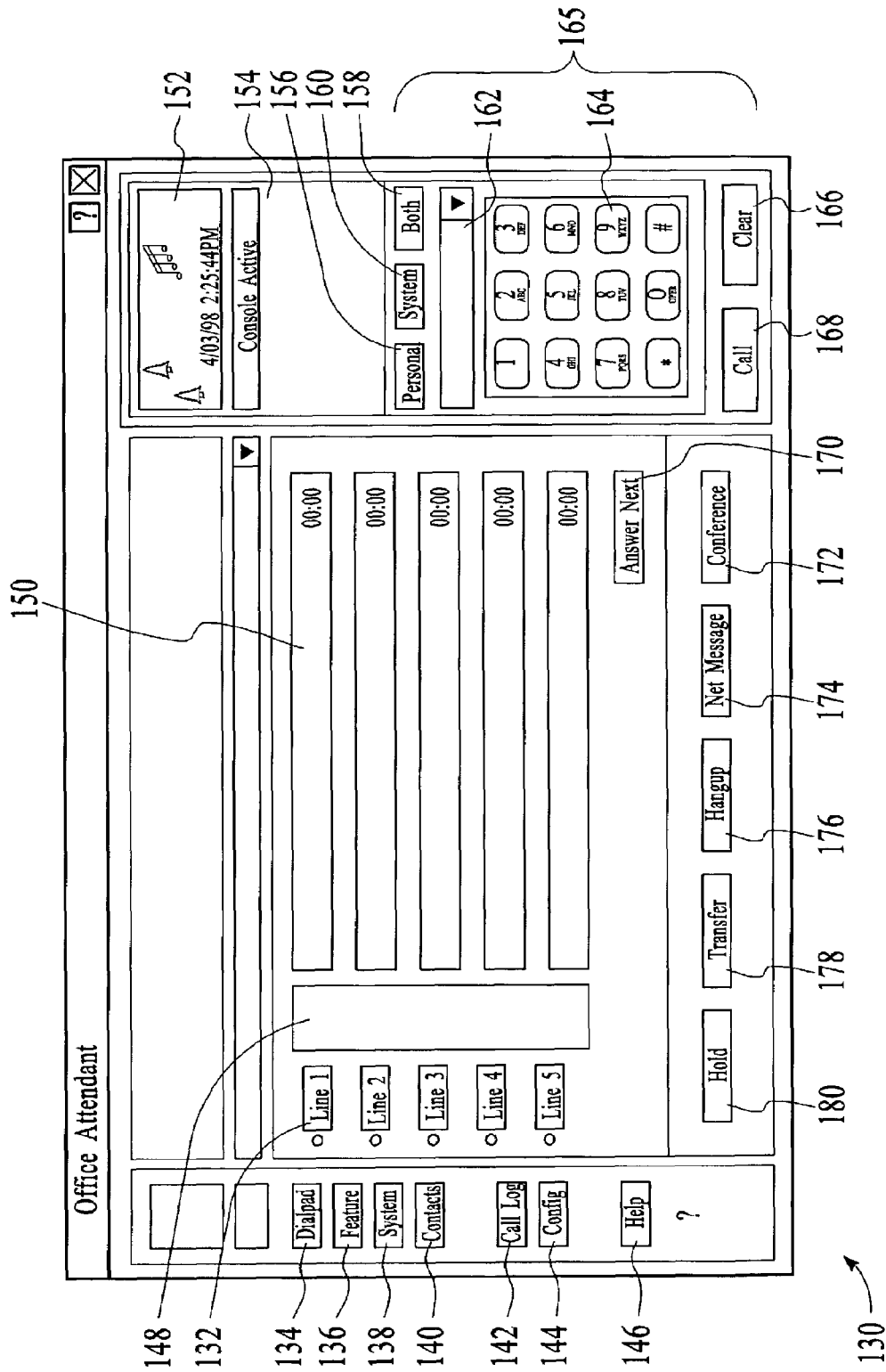
FIGS. 8A to 8D illustrate exemplary windows in accordance with preferred embodiments of the office attendant-type programs in accordance with the present invention.

Referring now to FIGS. 8A to 8D, exemplary windows from illustrative preferred embodiments of office attendant-type programs in accordance with the present invention will now be described. As illustrated in FIG. 8A window 130 includes one or more line displays 132 (five are shown in FIG. 8A for illustrative purposes) for indicating various telephone lines available in the particular application of communications system 50. The number of telephone lines, of course, may be tailored for the particular application. Preferably positioned adjacent to line displays 132 is call/line status display 148 for displaying symbols adjacent to each line indicative of the status of the line, such as idle, phone ringing, active call in progress, call on hold, hold recall alert, etc. Status display 148 provides a ready visual indicator to the user of the office attendant-type program of the status of the various telephone lines that are being monitored. Also adjacent to the line displays (as illustrated adjacent to status display 148) are user identification displays 150, which serves to display the name and/or extension or telephone number of one or both parties to a call. In certain embodiments, caller ID type information may be obtained by communications system 50 from an appropriate interface card (see interface cards 82 of FIG. 3) and also displayed on displays 150. Displays 150 also may display a clock indicating the duration of a call on a particular line.

In preferred embodiments, window 130 also includes calling feature buttons or icons such as dialpad icon 134, feature icon 136, system icon 138 and/or contacts icon 140. Other icons may include call log icon 142 and/or configuration icon 144. Dialpad icon 134 preferably results in the display of a dialpad, such as dialpad window 165 in the lower left corner of window 130. Feature icon 136 preferably results in the display of a set of feature buttons as will be described in connection with FIG. 8B. System icon 138 preferably results in the display of a set of system buttons as will be described in connection with FIG. 8C. Contact icon 140 preferably results in the display of a list of contacts/contact folders as will be described in connection with FIG. 8D. Call log icon 142 preferably results in the display of one or more windows displaying log-type information for incoming or outgoing calls controlled by the office attendant type program. Call log information may be retained on the particular computer running the office attendant type program and/or centrally stored by communications system 50. Configuration icon 144 prompts one or more configuration windows, examples of which have been described elsewhere herein. Help icon 146 also may be provided in order to display help information to the user of the office attendant-type program.

In accordance with preferred embodiments of the present invention, hold icon 180 is provided to enable a caller to be readily put on hold by the office attendant type program user. Transfer icon 178 is provided to enable a caller to be readily transferred by the office attendant type program user (transfer are discussed in more detail in connection with FIGS. 9A through 9C). Hangup icon 176 is provided to enable a caller to be readily disconnected by the office attendant type program user. Net message icon 174 is provided to enable a net message to be sent by the office attendant type program user (net messages are discussed in more detail in connection with FIGS. 10A and 10B). Conference icon 172 is provided to enable conferences to be established by the office attendant type program user (conferences are discussed in more detail in connection with FIGS. 11A through 11E). Answer next icon 170 is provided to enable the office attendant type program user to sequentially answer calls, such as, for example, in a situation in numerous calls have come in a short period of time, and the user wishes to sequentially access such calls. Preferably, the answer next icon prioritizes calls on hold higher than new calls, although in preferred embodiments the priority of hold calls versus new calls may be programmed into communications system 50.

Dialpad window 165, accessed in response to activation of dialpad icon 134, displays a visual keypad, much like a traditional telephony keypad with buttons 164, and also preferably includes other buttons such as call button 168 (for initiating calls), clear button 166 (for clearing number or information, such as subscriber information, displayed on display 162 (display 162 also may used to input numeric or character information such as for a subscriber, and also may have a menu pull-down icon as illustrated to display a menu of, for example, subscriber information)), personal button 156 (which may be used, for example, to make personal contact or PIM information available in display 162), system button 160 (which may be used, for example, to make system contact information available in display 162), or both button 158 (which may be used, for example, to make both personal contact or PIM information and system contact information available in display 162).

Figure 8B:
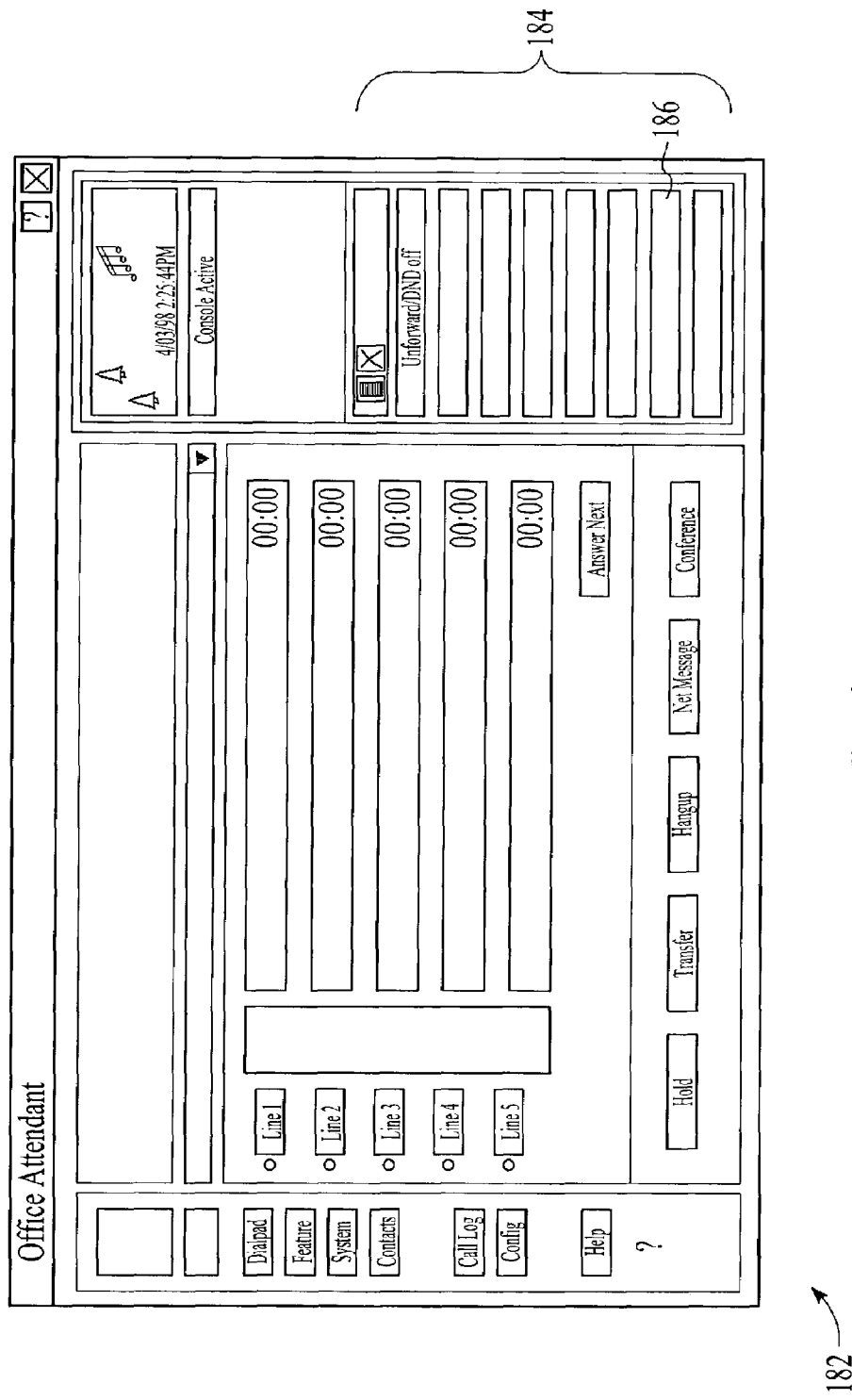

Referring now to FIG. 8B, window 182 is illustrated with feature box 184 shown, which may be displayed through the use of feature icon 136. Feature box 184 includes one or more configurable feature buttons 186. Such feature buttons enable a configurable environment for the office attendant type program user, by enabling particular tasks to be configured for particular feature buttons. As illustrative examples, such task/features may include dialing particular calls, forwarding calls to another extension, transferring calls to another extension, unforwarding calls, setting do not disturb for particular extensions, dialing international or special toll calls or the like, or other tasks that a particular user may find desirable to have accessible with a single or very few clicks of the computer mouse or pointer. The particular feature buttons preferably include textual information descriptive of the particular feature or task associated with the displayed button. In preferred embodiments, feature buttons may be added or deleted as desired by the particular user.

Figure 8C:
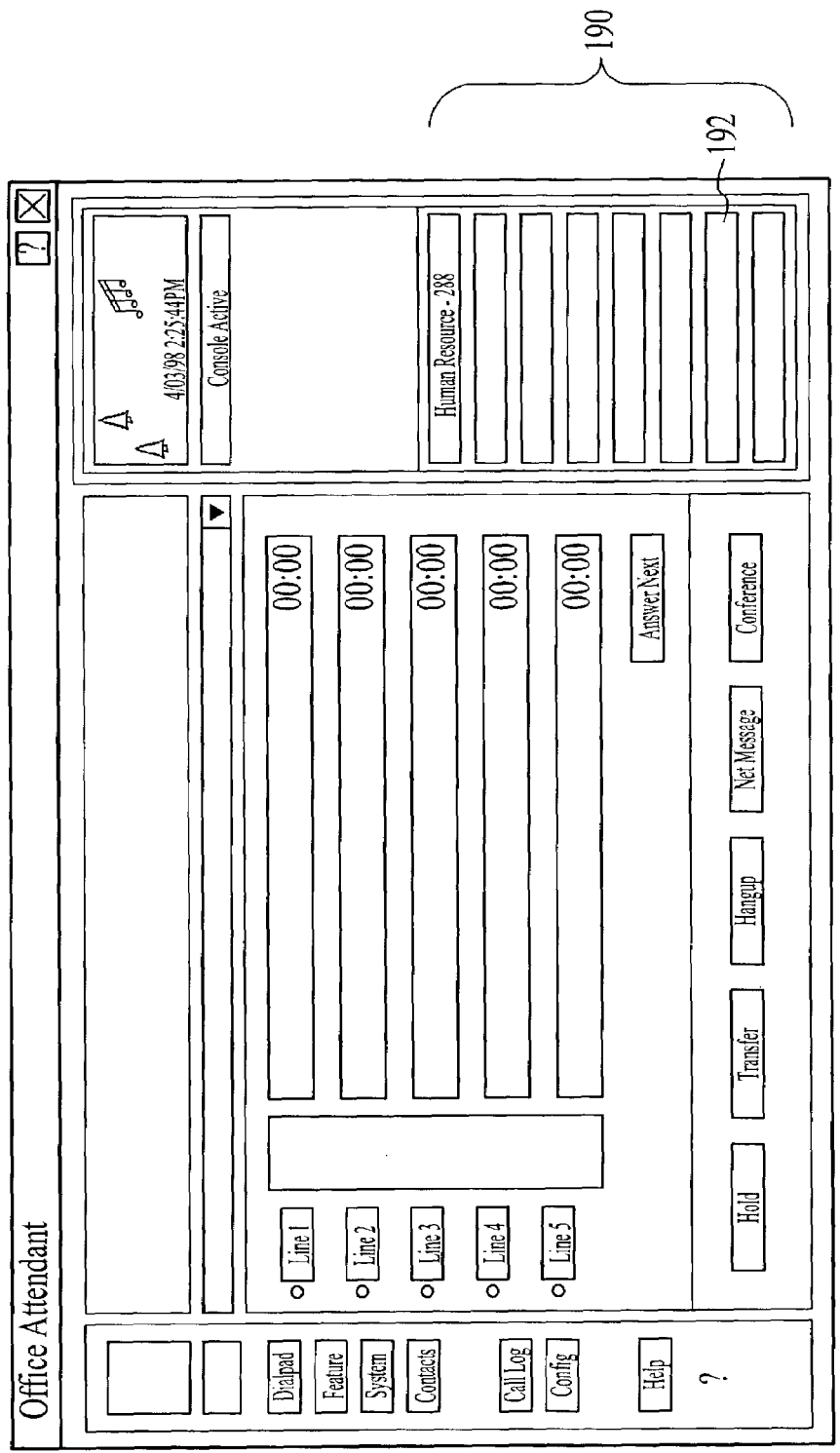

Referring now to FIG. 8C, window 188 is illustrated with system box 190 shown, which may be displayed through the use of system icon 138. In preferred embodiments, system box 190 includes a plurality of system buttons 192, which provide essential contacts, such as emergency numbers (e.g., police or fire or building security), the numbers particular to departments or officers in the particular company, branch office numbers, etc. With the use of system box 190, a user may have readily displayed the numbers of essential or important contacts, which may be connected with a single click of the computer mouse or pointer. The numbers or contacts associated with particular system buttons may be programmed by the user, but more preferably are programmed by the administrator of communications system 50 and downloaded in a manner similar to the subscriber information as previously described.

Figure 8D:
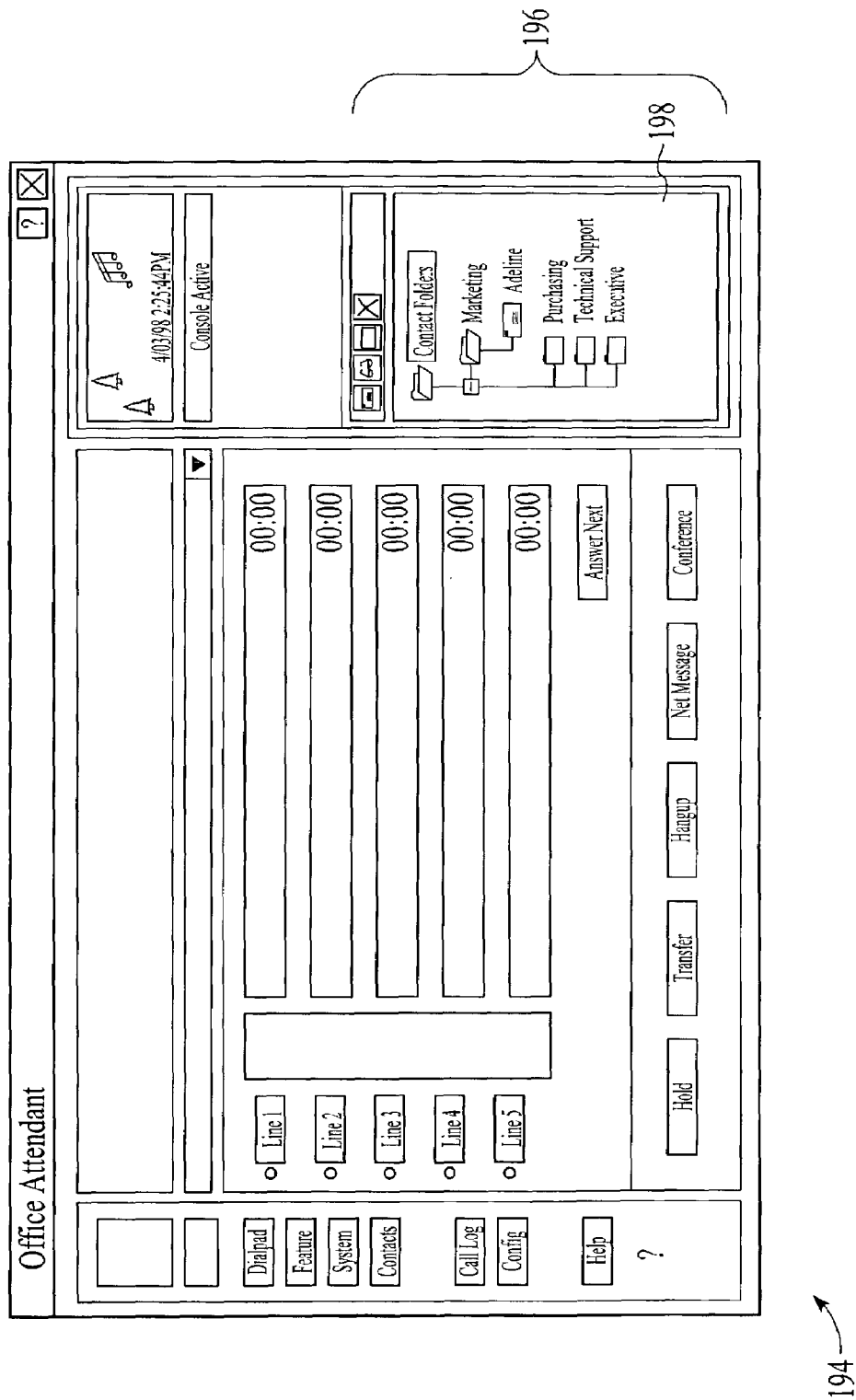

Referring now to FIG. 8D, window 194 is illustrated with contacts box 196 shown, which may be displayed through the use of contacts icon 140. Contact box 196 preferably includes a directory of contacts for the company of the user (illustrated generally as folder and contact tree 198), and also preferably contact or PIM-type information that may be obtained by importing from a PIM-type program or database resident in communications system 50 or on one or more of the computers coupled to communications system 50. Through the use of contacts icon 140 and contact box 196, contact information may be quickly provided to the office attendant type program user with a single or very few clicks of the computer mouse or pointer. In alternative embodiments, caller ID information is available to communications system 50, which may be made available to the office attendant-type program. In such embodiments, the office attendant-type program or a companion program may associate a contact with the caller ID information, and thereafter display contact information to the user.

In preferred embodiments, calls may be directed to the computer running the office attendant type program because a main number has been directed to this computer (and its associated telephone or headset), or because calls have been forwarded to the office attendant type program, or because a called party is on the phone, has indicated the called extension is "do not disturb," etc. In such situations, the office attendant type program user may need to transfer calls to other extensions, either inside the office or outside the office.

Preferably, persons in the office have a computer running a program in companion with the office attendant-type program. Such windows may include, for example, an animated icon, caller ID information, etc., and may include one or more icon the clicking of which causes the call to be answered. In such preferred embodiments, the office attendant type program may cause one or more windows to appear on the computers of particular persons in the office, such as a person to whom a call is being directed. As an illustrative example, a call may come in through WAN services network 58 (see, e.g., FIG. 3) and be directed to a main telephone number, which may be designated to be forwarded to a telephone associated with a person running the office attendant type program on a particular computer 24, and may be so directed by way of TDM bus 78 and switch/multiplexer 74, under control of processor/system resources 70. The computer 24 running the office attendant type program may be used to transfer the incoming call to a particular extension, which may be readily accomplished by way of transfer icon 178 (see FIG. 8A).

Figure 9A:
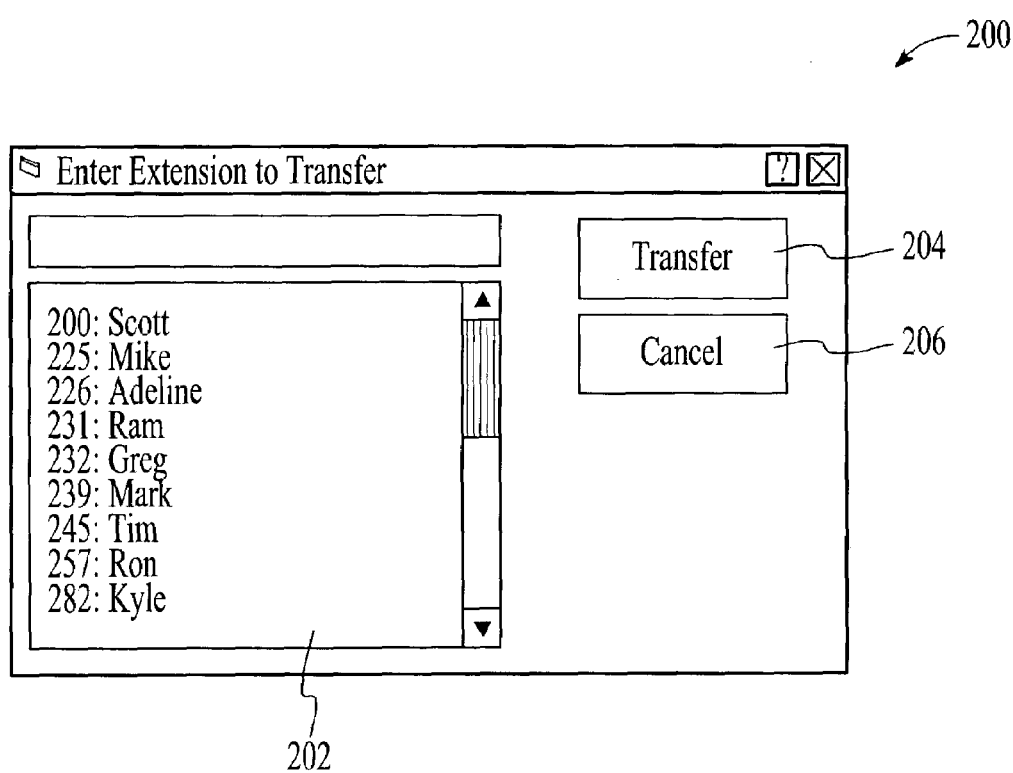
FIGS. 9A to 9C illustrate windows for illustrating additional features/functions in accordance with preferred embodiments of the present invention.

FIG. 9A illustrates window 200, which may provide a list of subscribers and extensions 202. By selecting a particular subscriber with a mouse or pointer, the transfer may be readily completed with a simple click of the mouse or pointer on transfer icon 204. Alternatively, the transfer operation may be canceled by a click of the mouse or pointer on cancel icon 206. It should be noted that, because the current subscriber information has been downloaded by communications systems 50 (as described elsewhere herein), more reliable transfer of calls may be achieved in accordance with the present invention.

Figure 9B:
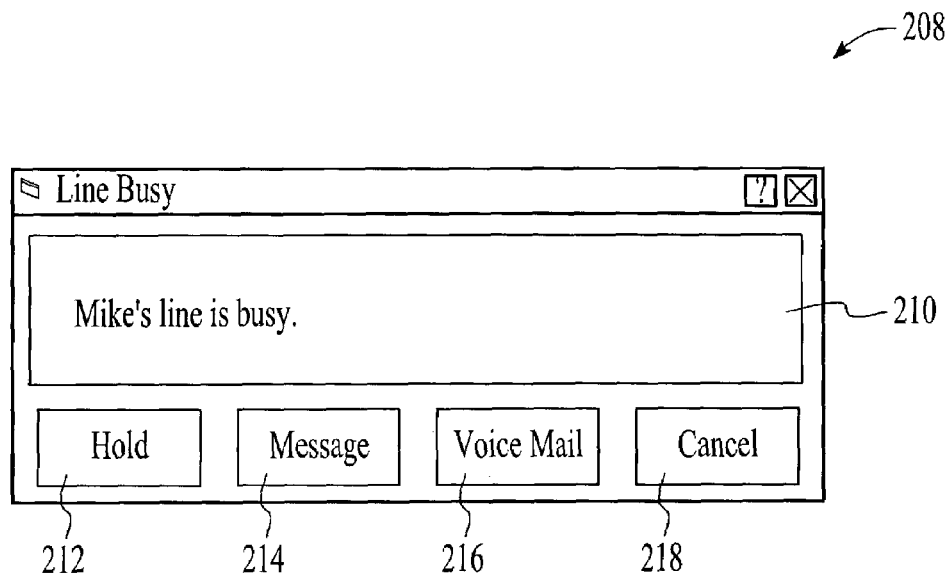

In accordance with preferred embodiments of the present invention, in the event of a failed transfer, for example in case the extension to which the call is being transferred is busy, a window preferably is automatically displayed on the computer running the office attendant type program. An exemplary window 208 is illustrated in FIG. 9B. As illustrated, display 210 may display a descriptive message, such as "line busy," "do not disturb," etc. Preferably, a number of icons also are simultaneously displayed to aid the office attendant type program user in processing this call. Hold icon 212 may be used to place the caller on hold. Message icon 214 may be used to initiate a net message to the party to whom the call is to be transferred. Voice mail icon 216 may be used to direct the call into the voice mail of the party to whom the call was to be transferred. Cancel icon 218 may be used to cancel the transfer operation. With such an automatically generated window 208, the office attendant type program user is presented with options to more quickly process such calls, again preferably with a single or very few clicks of the mouse or pointer.

In certain embodiments, activation of hold icon 212 automatically "parks" the call on the extension of the party to whom the call is to be transferred. In certain embodiments, particular subscribers may have the option to program their extension so that calls parked on their extension may or may not be automatically connected once the called party has completed its current call. In such embodiments, it may be desirable to have the called party informed that a call is being held. Preferably in such embodiments, the office attendant type program may be configured to automatically send a message (over a packet bus, as described earlier) to the computer of the party to whom the call is to be transferred, such as is illustrated by window 220 in FIG. 9C. In such embodiments, window 220 may contain message box 222, which may contain a message such as "call holding" or "call holding from Mike at extension 226," or "call holding; outside caller, number xxx," etc. What is important is that message box 222 display a message that a call is holding, with appropriate information identifying the caller displayed to the extent possible or desired. It should be noted that in certain embodiments caller ID information is displayed, and in some such embodiments a directory or library of names or other identifying information may be contained in communications system 50 and/or one or more of the computers connected to the LAN so that names or other identifying information may be associated with the caller ID information and displayed in message box 222. Preferably, the computer of the called party plays an audible tone or sound.

In such embodiments, the called party may decide to terminate his/her existing call and accept the call from the party being transferred, such as by clicking on accept icon 224. Alternatively, the called party may decide to have the call from the party being transferred wait, such as by clicking on wait icon 226. The particular user being called preferably has the option to configure his extension to accept parked calls or to not accept parked calls. The particular user also preferably has the option to select an allowed parking time before the call is returned to the user running the office attendant type program. Thus, a transferred call may be temporarily parked, with an appropriate message displayed on the computer of the called party, with the parked call either accepted by the called party clicking on accept icon 224, returned to the user running the office attendant type program or forwarded to voice mail after a parking time out time has elapsed, or the call held longer than the allowed parking time by the called party clicking on wait icon 226. In certain embodiments, clicking on wait icon 226 enables the call to be parked indefinitely, while in other embodiments a second, longer and preferably user configurable parking time is enabled (thus preventing a called from being held for an indefinite period of time). If a time out time is exceeded, preferably the call is returned to the user running the office attendant type program or forwarded to voice mail, and still preferably an audible tone or sound is periodically emanated from the computer of the called party while the call is parked, thereby providing a subtle reminder of the existence of the parked call. In certain embodiments, users have the ability to mute or lower the volume of the reminder sound, such as by way of an additional icon in window 220. In all preferred embodiments, users have the ability to configure and select the particular options described herein that the particular users may desire.

It should be noted that a window 208 may be displayed in response to a transferred call being returned to the user running the office attendant type program, or it or a similar window may be displayed in response to the user running the office attendant type program "looking ahead" to the status of the extension to which the call is to be transferred. What is important is that the user running the office attendant type program determine that the transfer may not be accomplished, and then optimally be provided with options for processing the call in an expedient manner, such as described elsewhere herein.

Figure 9C:
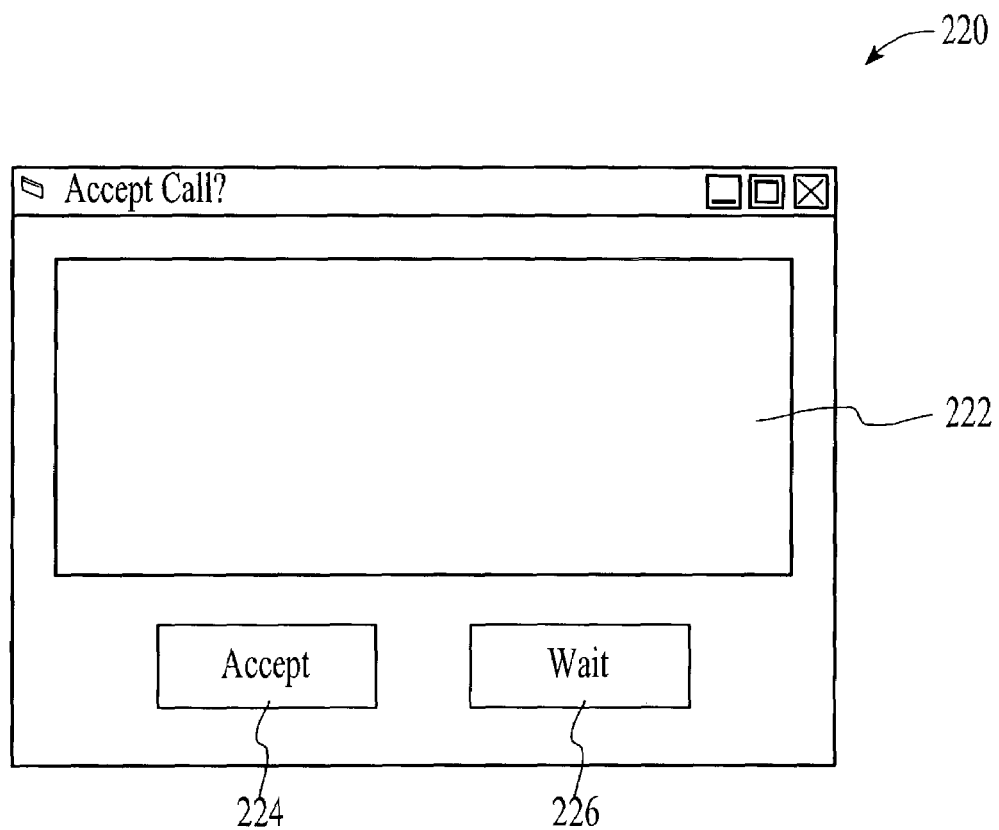

It should also be noted that, in the event of a particular user extension being dialed directly without going through the office attendant type program, a window such as window 220 of FIG. 9C may be displayed on the computer of the called party, either automatically for all calls, or only in the event that the called party has put his telephone on do not disturb, but has configured his extension to receive a message notification of calls, or in the event that the called party is on the line. In such embodiments, communications system 50 may generate such a window by a suitable message sent over by packet bus to the user's computer. In such embodiments, communications system 50 may simultaneously ring a user's extension and notify the user of the call with a net message, with the called being accepted, parked or forwarded to voice mail such as described earlier. Of course, in the event that a user previously configured his extension to be automatically forwarded to another extension or location or to voice mail or the like, then communications system preferably takes the programmed action directly. As an illustrative example, a user may configure his extension so as to route all calls to another extension or to a local or long distance telephone number. Such a user also may configure his extension so as to route all calls as voice over IP ("VoIP") call. In the later situation, processor/system resources 70 and/or DSP 76 may process the incoming voice information (received through the appropriate station card 82 and via TDM bus 78, etc.) into appropriate IP packets, which may then be routed, for example, through an HDLC framer/deframer 73B, through switch/multiplexer 74, over TDM bus 78 and out over a designated IP connection via WAN services 58, etc.

Figure 10A:
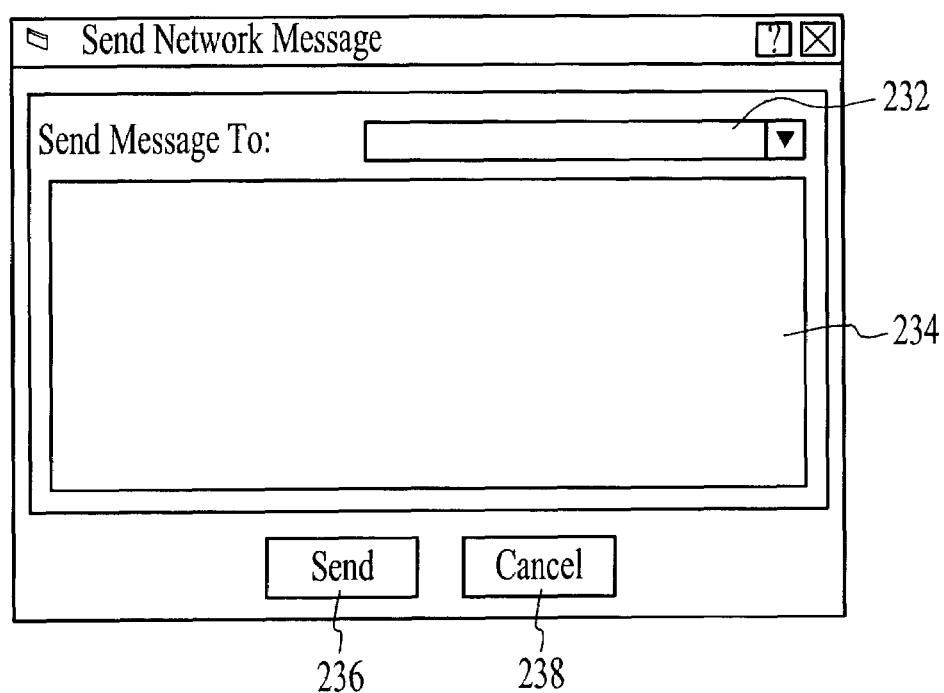
FIGS. 10A to 10B illustrate preferred embodiments of the net message windows in accordance with preferred embodiments of the present invention.

As previously described in connection with FIGS. 8A and 9B, a user running the office attendant type program preferably is presented with icon 174 (FIG. 8A) and icon 214 (FIG. 9B) for generating net messages, such as to send a net message to a user to whom a call is to be transferred, or to otherwise send a net message to a particular user, etc. FIG. 10A illustrates window 230 as an exemplary net message window that may be generated in response to clicking icon 174 or 214. As illustrated, window 230 preferably includes box 232 to identify the recipient of the intended net message, which may be automatically selected by the office attendant type program in the event of a failed call transfer situation. Otherwise, the recipient may be selected by pull-down menu as illustrated, or by direct entry of a name or extension number, etc. In preferred embodiments, as letters of the name is typed, the office attendant type program automatically scrolls through the subscriber directory in order to more arrive at the desired net message recipient.

Box 234 is provided in order for the office attendant type program user to type a desired net message. In alternative embodiments, a list of pre-generated net messages are available via a pull down menu or window opened with an icon or the like (such pre-generated messages may include whole or partial messages, greetings, etc. that are frequency utilized, thereby saving the user from having to type a repetitive message, etc.). The net message may be sent by clicking on send icon 236 or canceled by clicking on cancel icon 238. It should be noted that the net message recipient may be a user physically located in the same office and receive the net message by way of packet bus 80A or 80B (see FIG. 3), or alternatively, the net message may be sent as Internet or other message by way of TCP/IP through modem 75 or through the WAN services network 58 (e.g., a T1 connection) by passing through an HDLC framer 73B, such as was described with reference to FIG. 3. Thus, in the situation in which a particular user is "off-premises," calls may be forwarded off-premises (by appropriate programming of the particular user's extension, as described elsewhere herein), and net messages likewise may be forwarded off-premises.

Figure 10B:
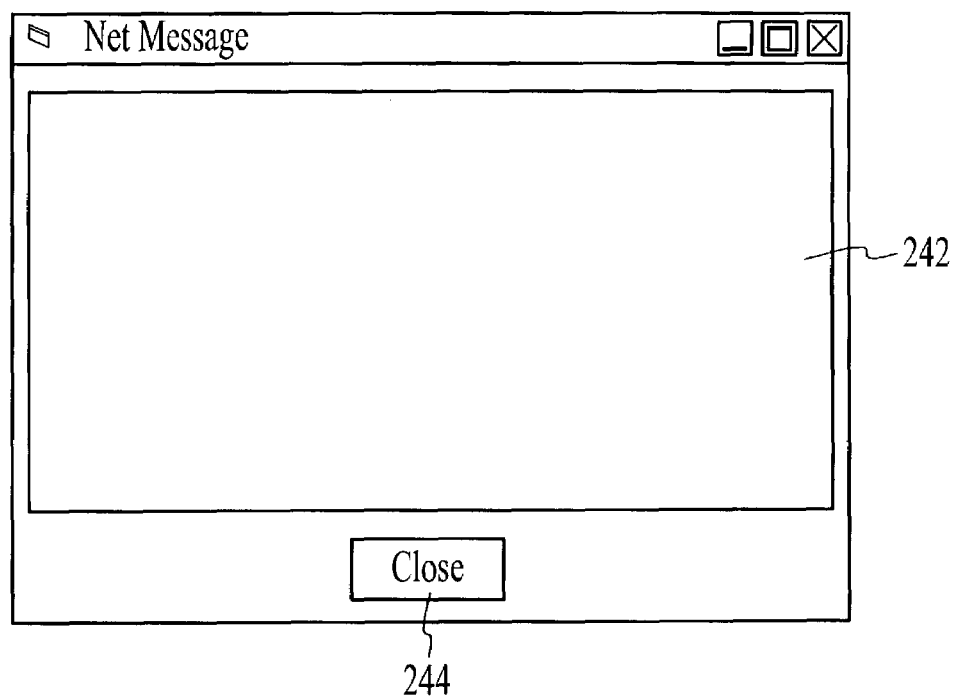

FIG. 10B illustrates net message window 240 that may appear on the computer of the recipient. The recipient is presented with the net message in window 242, and may close the net message by clicking icon 244. Alternatively, net messages may be stored for archival purposes or later viewing, and in alternative embodiments net messages also include a reply icon which may be clicked in order to bring up a window in which a reply message may be typed. In such embodiments, an office attendant type program user may inform the recipient, for example, of a particular caller, and the recipient may inform the office attendant type program user, for example, that the caller should be directed to a particular individual or department or processed in a particular way (directly to voice mail, call terminated, etc.). With such embodiments, packet bus or other messages may be readily exchanged in a manner to more readily facilitate telephony management etc.

In alternate embodiments, net messages may be sent from a computer running an office attendant-type program or a companion program, to any other computer coupled to communications system 50, either by way of the LAN or WAN, etc. In such embodiments, for example, if the user to whom a message is directed is logged onto communications system 50, the net message may be sent (preferably via communications system 50) either as a net message as previously described, or in the form of a visual "pink slip," "yellow sticky note," etc., which preferably appears in a small window on the screen of the user/message recipient. Still preferably, such "pink slip" or "yellow sticky note" messages include icons for options such as reply, delete, file/store, minimize, etc.; preferably, after a reply, delete, and/or file/store command, the message window automatically disappears. In certain embodiments, if a plurality of such messages are received and have not been processed so as to disappear, then such messages automatically stack up, with a visual representation of stacked messages presented to the user (e.g., showing a third dimension of a stack of messages, etc.). In such embodiments, the user preferably sees the most recently received message on top, and also has the option to freeze/hold the updating of the message stack such as by selecting a suitable icon (e.g., if the user is reading a particular message, he/she may command that the message being read is not replaced by a subsequently received message), scroll through the stack of messages, etc. Still preferably, the user may select (again my suitable icon)

that a particular message be forwarded to himself/herself as email, or to another person either as a similar message or email, etc. In preferred embodiments, communications system 50 automatically stores and sends as email all such messages that are not processed in a definitive manner by the user (e.g., if the user logs off without having replied, deleted, stored, etc. such messages, then communications system 50 processes such unclosed messages as emails to the particular user or users, etc.).

It also should be noted that a sender of a net message may be prompted that a particular user to whom a net message is being directed is not logged on. In such embodiments, the sender may then be prompted (such as with a suitable information display and icon) to convert the net message to an email message, etc.

As illustrated in FIG. 8A, conference icon 172 may be utilized to initiate a conference call in accordance with certain preferred embodiments of the present invention. Certain conferencing preferred embodiments of the present invention will be described with reference to FIGS. 11A through 11E.

As indicated, conference icon 172 may be utilized to initiate a conference call in accordance with the present invention. Alternatively, in other preferred embodiments the conference call may be initiated by a click and drag operation. For example, an icon indicating a received call or the status of a received call (such as described earlier) may be clicked and dragged over the opened dialpad (see, e.g., FIG. 8A). The office attendant type program recognizes this click and drag operation as a request to open a suitable conference window, and the office attendant type program thereafter automatically opens the conference window.

Figure 11A:
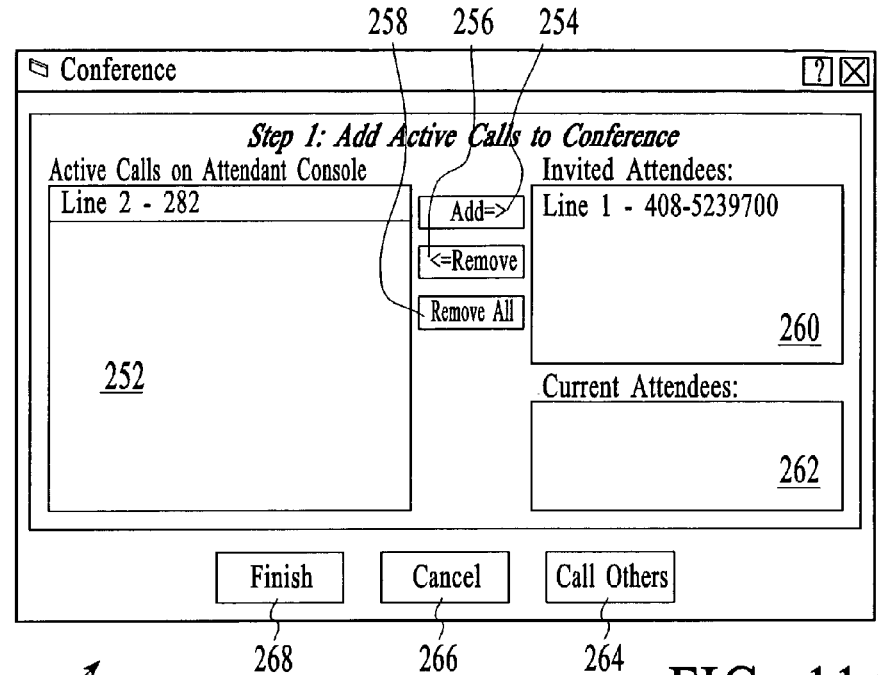
FIGS. 11A to 11E illustrate various embodiments of the conference windows in accordance with preferred embodiments of the present invention.

FIG. 11A illustrates one embodiment of such a conference window 250. As illustrated, conference window may include box 252, which may serve to indicate what calls, if any, are presently displayed on the office attendant type program "console" (e.g., windows 150 of FIG. 8A). In the event that calls are present on the console, such calls may be added to the conference through the use of add icon 254. Attendees invited to join the conference may be displayed in window 260. Through the use of icon 256 one or more particular attendees may be selected with the pointer or mouse and removed from the conference call attendee list, and through the use of icon 258 all attendees may be removed from the conference call attendee list. Window 262 may serve to display attendees current participating in the conference call in the event that window 250 is opened while a conference call is in progress. Icon 264 may be used to call other parties in order to invite such parties to participate in the conference call, and icon 266 may be used to cancel the add conference call attendees operation (i.e., close window 250). Icon 268 may be used to finish the add conference call attendee operation and preferably initiate or continue the conference call; in FIG. 11A icon 268 is illustrated as not active given that multiple invited attendees are not present and no conference call is on-going (and thus the conference cannot be initiated or continued).

Figure 11B:
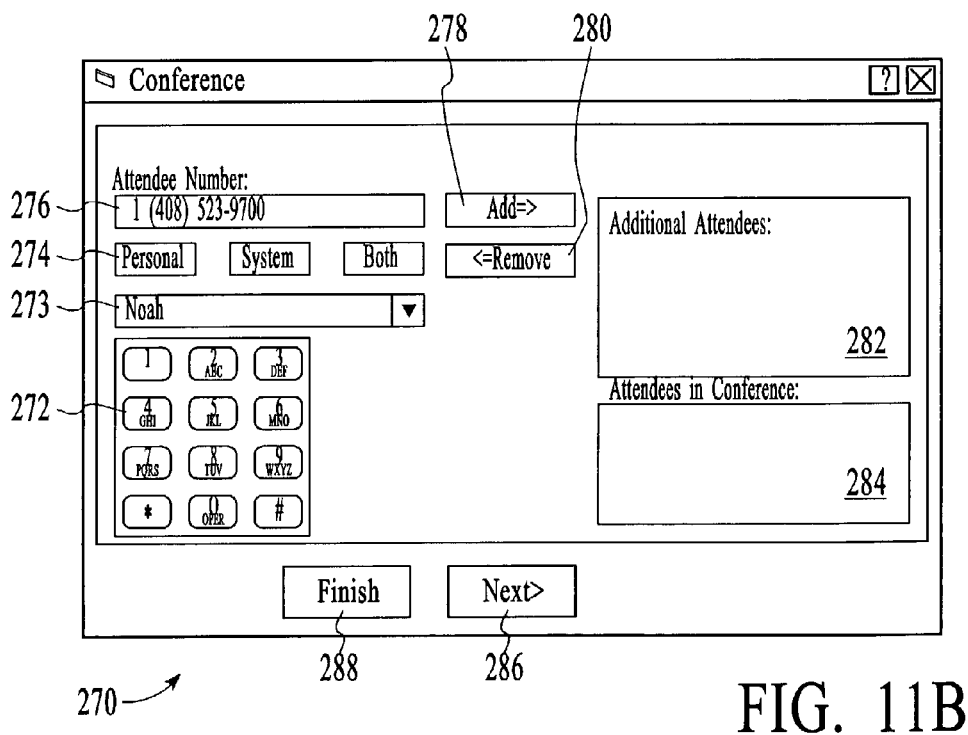

In the event that icon 264 is selected, a call others operation may be initiated. FIG. 11B illustrates one embodiment of window 270 for calling additional attendees. As illustrated, window 270 preferably includes dialpad 272, which may be utilized to dial the extension or telephone number of a party to be added to the conference, which may be a party either on premises or off premises. Window 274 may be used to access either personal or system contact information, or both personal and system contact information, such as previously described. The names of particular subscribers may be entered or displayed in window 273, and the extension or number of a particular party to be added to the conference may be entered or displayed in window 276. Additional attendees may be added with icon 278 or removed with icon 280, with the additional attendees identified in window 282, with attendees in the conference identified in window 284. The next icon 286 preferably may be used to proceed to a dialog box from which the additional attendees may be called to join the conference. Selecting the finish icon 288 preferably results in the conference commencing or continuing without proceeding to a call dialog box.

Figure 11C:
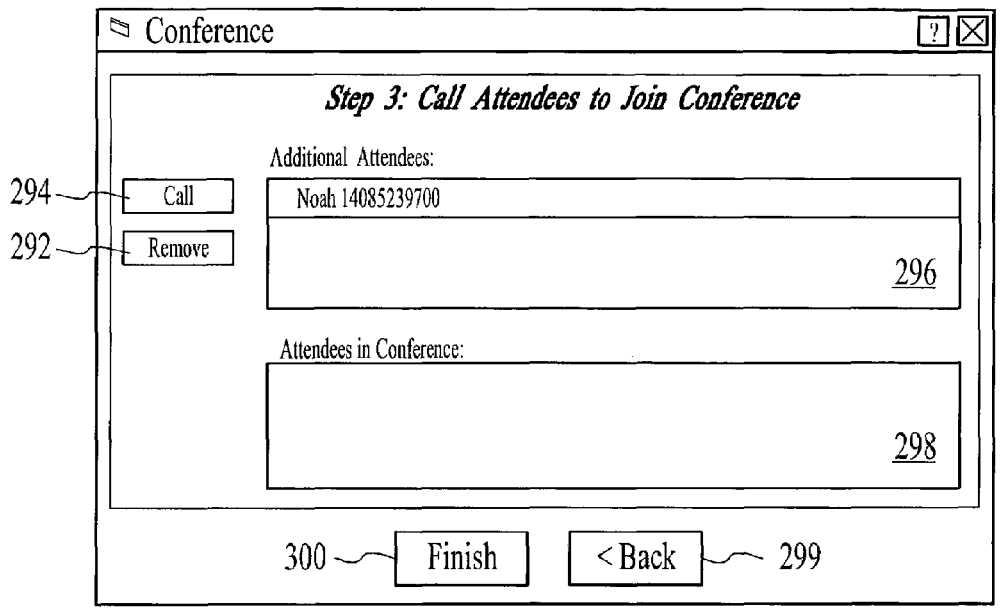

In the event that next icon 286 is selected, a call attendee dialog box preferably appears, with an exemplary dialog box illustrated in FIG. 11C. As illustrated, window 290 includes call icon 294, which may be used to initiate a call to a particular selected additional attendee (who may be selected with the mouse or pointer in a conventional manner). Remove icon 292 may be used to remove additional attendees from window 296. Preferably, each additional attendee is called and informed that they are being added to the conference call; if the additional attendee agrees to be added to the conference call, the call preferably is placed on hold; otherwise the caller may hang up or be processed in some other desired manner. Once all additional attendees have been contacted and placed on hold as desired, finish icon 300 may be selected to initiate or continue the conference with the additional attendees. Back icon 299 may be use to return to the window illustrated in FIG. 11B in order to add additional attendees, etc.

Figure 11D:
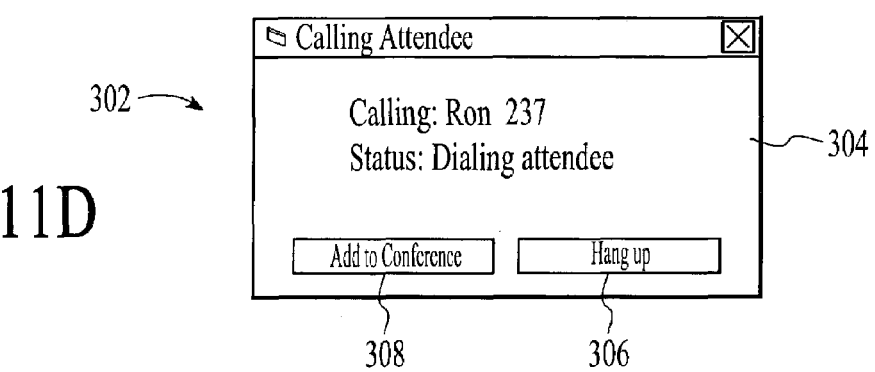

Preferably, as additional attendees are called, window 302 appears as illustrated in FIG. 11D. As illustrated, window 302 includes information display 304, which preferably displays the name and/or number of the additional attendee being called, as well as the status of the call. Icon 306 may be used to hang up or terminate the call, while icon 308 may be used to add the additional attendee to the conference call. Still preferably, an add conference attendee window is invoked, for example, if one call has been added to the conference and no other call is active on the console, etc.

Figure 11E:
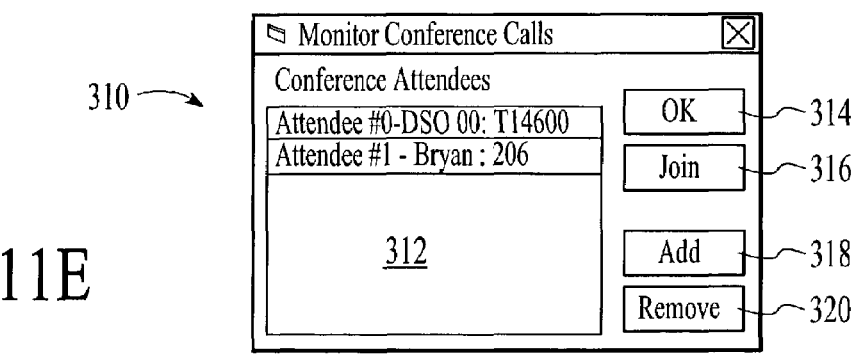

Still preferably, conference call monitor window 310 may be displayed by the office attendant type program, as illustrated in FIG. 11E. As illustrated, window 310 may include window 312 for displaying an identification of all attendees participating in the conference call. From window 310 additional parties may be added to, or removed from, the existing conference call. Icon 314 may be used to confirm that the existing list of conference participants is acceptable. Icon 316 may be used to allow the party running office attendant to join as a party to the conference call. Icon 318 may be used to add additional parties to the conference call, such as a call that is existing on the console as illustrated in FIG. 8A (as an example, a call is received by the office attendant program while the conference is in progress), or by adding an additional attendee. Such operations to add additional attendees preferably may be achieved as described earlier in connection with FIGS. 11A through 11D. Icon 320 may be used to remove attendees from the conference call.

What should be noted is that, in accordance with the present invention, easy to use and intuitive graphical interfaces are provided to initiate, maintain and monitor conference calls in accordance with preferred embodiments of the present invention. Such embodiments preferably are implemented utilizing communications system 50 as illustrated, for example; in FIG. 3, which provides a exceptionally desirable platform for managing voice and data communications while allowing a user to more optimally manage and/or participate in such conference calls.

Figure 12:
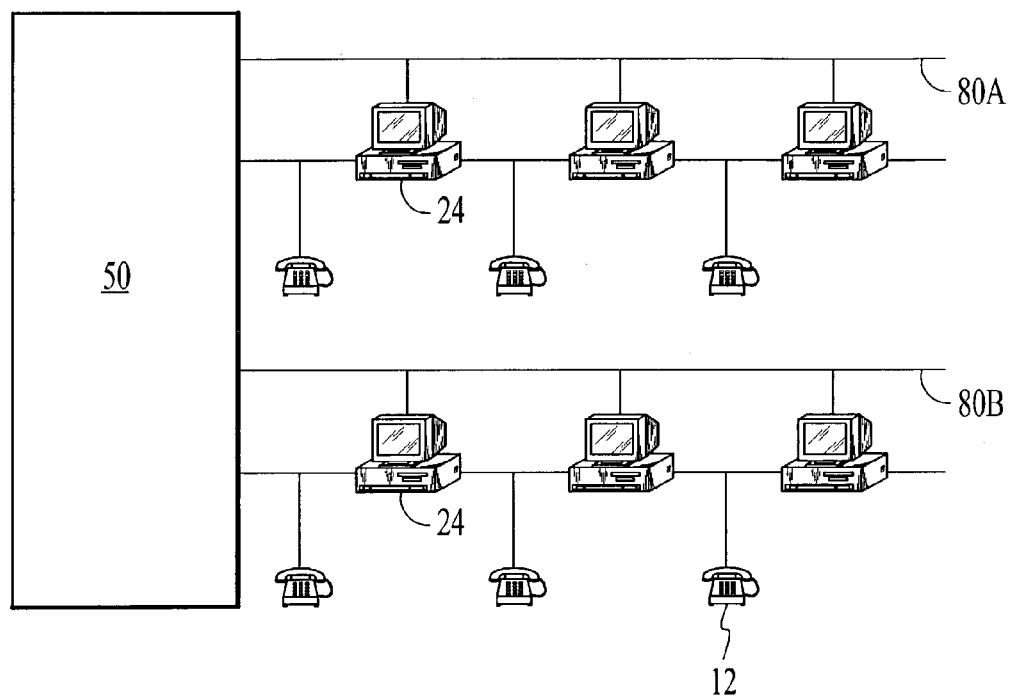
FIG. 12 illustrates another preferred embodiment of the present invention.

Still other features in accordance with preferred embodiments of the present invention will be described with reference to FIG. 12. As illustrated in FIG. 12, communications system 50 (which preferably may be implemented as described in connection with FIG. 3) is coupled to one, two or more packet buses (such as packet buses 80A and 80B), connected to which may be a plurality of computers 24. One or more computers 24 may run an office attendant-type program, or alternatively a companion program to the office attendant-type program, such as described elsewhere herein. As previously described, such computers running an office attendant-type program may be advantageously utilized to manage and control incoming and outgoing calls in the office. In accordance with the present invention, for example, a first computer 24 at a first physical location in the office (e.g., coupled to communications system 50 over a packet bus, for example) may be designated as the telephony control station for managing the incoming and outgoing calls. A second computer 24 at a second physical location in the office (e.g., coupled to communications system 50 over the same or a different packet bus, for example), may be designated as a secondary telephony control station. If the first telephony control station exceeds a designated call capacity (such as described earlier), or the first telephony control station goes off-line such as to due to a local failure or due to the user of the first telephony control station logging off, etc. (such as going to lunch, going home for the day, etc.), the second telephony control station is ready to immediately assume control of managing the incoming and outgoing calls of the office. In accordance with such embodiments, control of the telephony functions of the office may effectively be passed from computer to computer along the same packet bus or from a first computer connected to a first packet bus to a second computer connected to a second packet bus. Thus, telephony control may be efficiently transferred from computer to computer in a flexible and desirable manner, which may include computers at different locations within the office.

It also should be noted that an office attendant-type program also may be run from a location remote from communications system 50, such as on a computer coupled to WAN services network 58 of FIG. 3. In such embodiments, a remote computer coupled to communications system 50 over a WAN network connection may run the office attendant-type program and remotely control the telephony functions of the office, in a manner such as described previously herein. Thus, control of telephony functions may be effectively performed in the office or remotely from the office, with control passed from computer to computer in an efficient and desired manner. Additionally, the user of the remote computer may run an office attendant-type program or a companion program as described elsewhere herein, and from such remote location be coupled to communications system 50 and remotely reconfigure the telephony and/or voice mail settings for the particular user. As an example, the remote user may use the remote computer in order to direct telephone calls to his/her extension to voice mail, or alternatively to have such calls forwarded to another extension or to a remote telephone number. With such embodiments, particular users may remotely access communications system 50 and, for example, control the forwarding of calls to an internal or remote location. As a particular example, a user using a notebook computer or PDA, etc., may couple to the Internet or WAN, etc. from a remote location, and direct that telephone calls to his/her office extension be forwarded in a desired manner (e.g., off-premise call forwarding, etc.). With the user able to access communications system 50 and remotely set and store PBX-type settings remotely, a variety of desired reconfiguration options are presented to the user.

Additional advanced PBX/telephony-type functions in accordance with other embodiments of the present invention will now be described.

In preferred embodiments, communications system 50 may dynamically associate physical telephones 12 with particular user extension numbers. In certain respect, this may be considered like a "DHCP" (described elsewhere herein) for physical telephones. For example, a system administration may run a configuration/administration program (such as described elsewhere herein) and configure an extension number (e.g., 200) for a particular user, including associated parameters for such user, such as telephony and voice mail options (e.g., user forward settings, including off premise call forwarding, busy forward settings, ring-no-answer forward settings, time of day forward settings, display name for telephones displaying caller names, etc., whether the telephone is configured to be a telephone for a user running an office attendant-type program, etc.). At this time, the system administrator may or may not assign a physical telephone to that extension. Thereafter, the system administrator may notify the user that his/her extension number is 200. The system administrator also has the ability to enable and/or assign physical telephones. In the event that the system administrator has not assigned a physical telephone to that user, the user preferably has the ability to assign a physical telephone to his/her extension. For example, the user may pick up a telephone that has been enabled, and preferably does not have an extension assigned to that telephone, and the user enters a special code, e.g., numbers that communications system 50 recognizes as a request to assign a physical telephone. In certain embodiments, communications system 50 audibly informs (such as using DSP 76) the user of the status of that physical telephone (e.g., enabled or disabled, presently assigned to an extension, etc.). Thereafter, the user preferably is prompted audibly to enter his/her extension number. Optionally after a confirmation prompt, communications system 50 then assigns that physical telephone to the particular user. Still optionally, if the particular user extension is already assigned to another physical telephone, then communications system 50 un-assigns the other physical telephone at the time a new physical telephone is assigned to the particular user/user extension.

As will be appreciated, with such embodiments a special code also may be provided to un-assign physical telephones from particular user extensions, which preferably is implemented with password protection for particular users to ensure that the user's extension may not be assigned or re-assigned to physical telephones without the user's authorization or control (e.g., after entry of the extension number, communications system 50 prompts the user for a password associated with that user extension, and only allows assignment of a physical telephone to that extension if the correct password is entered, etc.). Thus, a user may assign his extension to a physical telephone by picking up that telephone and entering appropriate commands via the telephone keypad, and may un-assign his/her extension from that physical telephone by similarly picking up the physical telephone and entering appropriate commands via the telephone keypad (or by assigning the extension to a different physical telephone, as previously described), etc. In accordance with such embodiments, various office telephony arrangements may be implemented, such as an office arrangement in which a plurality of cubicles, offices or other physical spaces are provided with physical telephones but are not assigned to particular users. In accordance with such embodiments, particular users may be assigned an extension, and may occupy an available physical space and assign the physical telephone in that physical space with the user's extension. At the end of time for occupying that physical space, the user may un-assign his/her extension from that physical telephone, and then re-assign the extension to another physical telephone when the user later occupies another physical space, etc.

Additionally, as previously described communications system 50 may serve as an email server or otherwise serve to distribute email to particular computers (such as computers 24) coupled to communications system 50. Thus, communications system 50 can store information indicating that a particular user or users have received email. In such embodiments, communications system 50 preferably provides a visual or audio indication to the user that he/she has email. As illustrative examples, a special dial tone or message may be generated (such as with DSP 76) and presented to the user's telephone so that, when the user picks up his/her telephone, the special dial tone or message alerts the user that he/she has email (which also may include a special tone or message indicating that the user has voice mail). As one example, the tone or message may be a particular sound, but preferably is an audible message such as "you have email," or "have voice mail and email" or "you have voice mail," etc. In the event that communications system 50 is implemented with telephones 12 having message indicator lamps, a particular lamp or blinking sequence may be used to indicate that the user has email, voice mail or both, etc. In all such embodiments, users may be desirably informed that they have email and/or voice mail with their telephony device (e.g., telephone).

As described elsewhere herein, communications system 50 may serve to provide email services to particular users with telephone extensions associated with communications system 50, etc. In addition, communication system 50 also provides a platform (such as with processor/system resources 70) on which various management, administration or other types of applications may be run (exemplary such applications are described elsewhere herein). In one embodiment, various WAN and other information is provided using an what is known as a SNMP-type protocol (as is known in the art, SNMP stands for Signaling Network Management Protocol, which is a protocol/method by which network management applications can query or request information from a management agent (such as are implemented in the present invention with processor/system resources 70 and appropriate software, etc.). A novel aspect of such embodiments of the present invention is that the voice mail system of communications system 50 also is implemented in a manner to provide voice mail related information in an SNMP-type form. Thus, in accordance with such embodiments of the present invention, communications system 50 stores a variety of information relating to voice mail, such as information relating to the status of the voice mail system, failure or alarm-type information, usage statistics, etc. In such embodiments, any tool or application that is SNMP compliant can access and view such voice-mail related information. Exemplary voice-mail-related information that may be made available via SNMP to an SNMP compliant tool or application is set forth in Table 1. With such embodiments, network (WAN and LAN, etc.) and PBX information along with voice mail-related information may be desirably provided using SNMP to a variety of SNMP tools and applications.

TABLE 1

| Label | Where | Description |
| --- | --- | --- |
| InCalls | TUI | Number of incoming calls answered (all types) |
| MsgCreate | MSS | Number of messages created |
| MsgSent | IMDA | Number of messages sent successfully |
| MsgSendFail | IMFSA | Number of message send failures caused by an error in the Msg Subsystem |
| MsgDelete | MSS | Number of message deleted |
| MbxLogon | MSS | Number of times users logged on successfully |
| MbxLogoff | MSS | Number of times users logged off their mailbox (versus abandoned) |
| TooManyErrors | TUI | Number of times callers were dropped because they made too many errors |
| TooShort | TUI | Number of times messages recorded were too short |
| Restart | TUI | Number of times the AA/VMS application was restarted/reloaded |
| MWIOn | MSS | Number of requests to turn MWI On |
| MWIOff | MSS | Number of requests to turn MWI Off |
| MWIFail | MSS | Number of MWI (On/Off) requests that failed |
| TMOOper | TUI | Number of calls transferred to Operator because of TMO |
| ZeroOper | TUI | Number of calls transferred to Operator because caller dialed "0" |
| ErrorOper | TUI | Number of calls transferred to Operator because of too many errors |
| ErrorPassword | TUI | Number of calls dropped because of to many password errors. |
| DiskFull | MSS | Number of times disk was too full to take a message |
| ExtDirInCall | TUI | Number of direct external (trunk) calls into AA/VMS |
| ExtFwdInCall | TUI | Number of external calls forwarding into AA/VMS |
| IntDirInCall | TUI | Number of direct internal (station) calls into AA/VMS |
| IntFwdInCall | TUI | Number of internal calls forwarding into AA/VMS |
| NewMsg | TUI | Number of "new" messages recorded and sent by logged on users |
| FwdMsg | TUI | Number of "forwarded" messages recorded and sent by logged on users |
| ReplyMsg | TUI | Number of "reply" messages recorded and sent by logged on users |
| MultAddress | TUI | Number of messages sent that had more than one address |
| NameRecord | TUI | Number of times a Name message was recorded |
| GreetRecord | TUI | Number of times a Greeting message was recorded |

Video Conferencing Type Applications

In accordance with preferred embodiments of the present invention, advanced video conferencing capability may be readily provided in a variety of office environments. Certain such preferred embodiments will be described with reference to FIGS. 13A through 13C. Such embodiments may also be more readily understood by also referencing previously described figures, such as FIG. 3, etc.

Figure 13A:
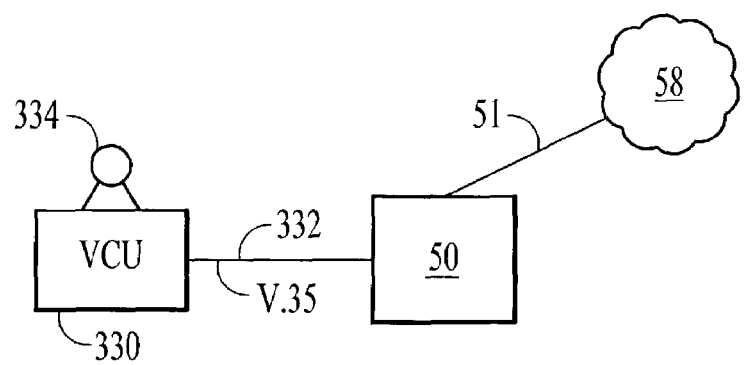
FIGS. 13A to 13C illustrate preferred embodiments of video conferencing in accordance with the present invention.

With reference to FIG. 13A, video conferencing in accordance with a first embodiment will be described. As illustrated in FIG. 13A, communications system 50 is coupled to video conferencing unit or VCU 330. VCU 330 may be a video conferencing system or a higher end computer or the like that preferably includes camera 334 and is coupled to communications system 50 over bus 332, which preferably is a high speed serial or other interface trunk, such as, for example, what is known as a V.35, V.36 or V.37 interface trunk. In such embodiments, cards 82 of communications system 50 include an appropriate interface card for the particular interface trunk and preferably enable a direct and compatible interface with VCU 330. In such embodiments, video information from camera 334, and audio information, as appropriate, from VCU 330, are coupled to communications system 50 over bus 332. Still preferably, the data stream from VCU 330 is in a form compatible with transmission over, for example, a T-1 line. In such preferred embodiments, the data stream from VCU 330 is coupled to TDM bus78 via station cards 82, and then coupled to switch/multiplexer 74, and then redirected via switch/multiplexer 74 to, for example, T-1 line 51 that is coupled to WAN services network 58 (of course, one or more additional compatible VCUs preferably are coupled to WAN services network 58 in order to complete the video conference). In such embodiments, video conferencing may be achieved efficiently with a data stream coupled from VCU 330 to communications system 50 to, for example, a T-1 line via TDM bus 78 and switch/multiplexer 74.

Figure 13B:
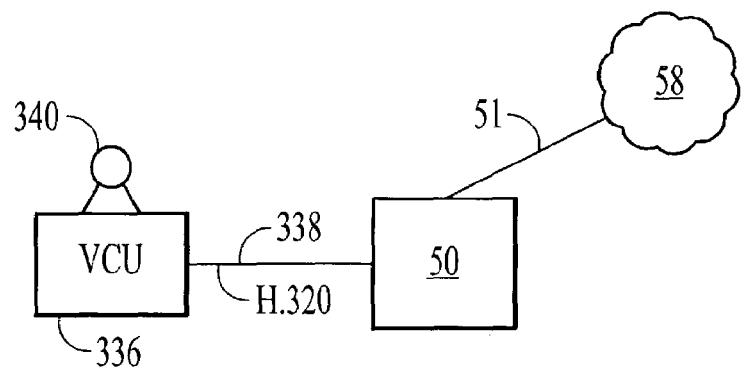

FIG. 13B illustrates VCU 336 with camera 340 (which may be previously described) coupled to communications system 50 over bus 338, which in this embodiment in an ISDN or T-1 type interface that supports, for example, a H.323 video conferencing standard. In such embodiments, a data stream (e.g., video and audio) from VCU 336 is coupled to communications system 50, coupled via an appropriate ISDN/T-1 compliant station card 82 to TDM bus78 and to switch/multiplexer 74. Thereafter, from switch/multiplexer 74 the data stream may be coupled via an appropriate station card 82 to outgoing T-1 line 51 to WAN services network 58.

Figure 13C:
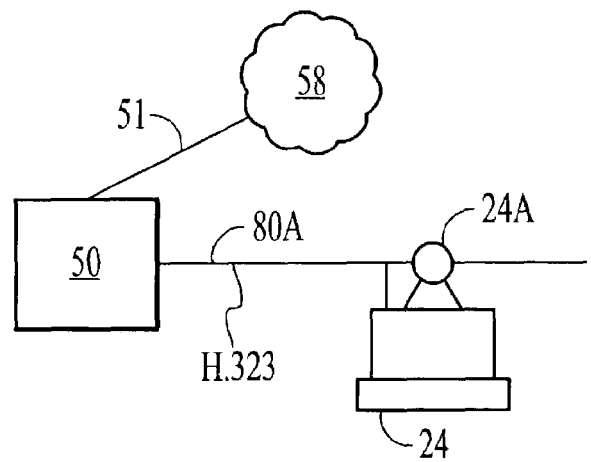

Yet another embodiment of video conferencing in accordance with the present invention is described with reference to FIG. 13C. As illustrated, computer 24 is coupled to communications system 50 over packet bus 80A (see, e.g., FIG. 3). Computer 24 includes camera 24A and preferably a microphone and speaker. Video and audio information preferably are coupled between communications system 50 and computer 24 through an appropriate packet standard, for example what is known as H.323. Referring again to FIG. 3, in such embodiments packetized video information is provided from computer 24 to communications system 50 over packet bus 80A. Processor/system resources 70 processes the packetized data stream (e.g., de-packetizes the data stream), which preferably now is in a suitable form/protocol (such as TCP/IP) for transmission to a remote computer running a compatible video conferencing program. As illustrative examples, the video data stream may be directed by processor/system resources 70 to fax modem 75 and coupled to a remote computer, or the video data stream may be directed by processor/system resources 70 to an HDLC framer/deframer 73B, to switch/multiplexer 74, to TDM bus 78, to an appropriate station card 82 and to WAN services network 58 via trunk 51 to which is coupled one or more remote computers for completing the video conference. It also should be understood that one or more such computers desiring to establish a video conference also may use an Internet connection established with the aid of what is known as an ILS (or Internet locator service) dynamic directory, a real time directory server component, which serves to aid "user to IP mapping" for establishing desired point-to-point connections for video conferencing.

It also should be noted that such video streams from computer 24 may be directed to one or more other computers on the same packet bus 80A (using the hub feature of communications system 50), or to one or more other computers on a different packet bus (using the router feature of communications system 50), such as previously described.

It should be noted that the documentation for particular video, telephony and other standards, such as T-1, ISDN, V.35, H.320, H.323, etc. are publicly available, and such standards documentation is hereby incorporated by reference.

As also described elsewhere herein, in preferred embodiments VoIP communications may be readily enabled. Referring again to FIG. 3, voice from a telephone 12 may be coupled via station cards 82 and TDM bus 78 to switch/multiplexer 74. From switch/multiplexer 74, the voice data stream may be directed to DSP 76, which directly or in conjunction with processor/system resources 70, produce appropriate IP packet data (in effect, DSP 76 and/or processor/system resources 70 serve as, for example, a TCP/IP processor). After IP packeting, the voice data maybe directed to WAN services network 58 via an HDLC framer/deframer 73B (such as described elsewhere herein), or may be directed to one or more packet buses/LANs, also as previously described. It should be noted that, with DSP 76, which may be configured to provide substantial processing resources, voice data may be IP processed effectively with minimal or no consumption of the resources of computer/system resources 70, thereby helping to prevent an undesirable loading of computer/systems resources 70.

It also should be noted that such embodiments have been described with reference to VoIP applications. It should be noted that such embodiments also may be used with other network protocols that may carry voice-type information. Thus, in accordance with the present invention, a network protocol (such as IP) may desirably be used to efficiently carry voice-type information, thereby providing more efficient communications services to office utilizing communications system 50.

It also should be noted that, with communications system 50 implemented such as illustrated in FIG. 3, data, voice and video streams may be converged over a common T-1 trunk. Thus, a user may more readily be able to efficiently use a T-1 type of WAN resource with an integrated system that intelligently manages and, bridges voice, data and video data streams and processes.

While the various windows, buttons and icons illustrated herein are not limitative of any particular aspect of the present invention, such features and combinations of features have been determined to provide advantages to users of such an office attendant-type program, particularly when used with embodiments of the present invention as illustrated in FIG. 3 and the other drawings and related description.

In accordance with the foregoing description and embodiments, a variety of communications systems and data, voice and video processes may be desirably implemented. An exemplary communications system and the features of such an exemplary communications system will now be described.

Communications system 50 delivers comprehensive communications support including PBX voice capability, full LAN/WAN data connectivity, and a suite of communications applications in a unified platform designed for scalability, reliability, and ease of use. Communications system 50 integrates standards based communications hardware and software with switching technology in a single system to meet the needs of different size offices. Unlike other complex central site products that are difficult and expensive to manage, communications system 50 of the present invention is optimized for use by an office of 5 to 100 users.

Communications system 50 increases the efficiency of office communications and provides businesses a competitive edge by integrating the following voice, data, and communications functions into one remotely manageable platform: PBX; Voice mail; Automated attendant; Computer-telephony applications server; Channel bank; Router; CSU/DSU; LAN hub; Remote access server; and Modems.

Communications system 50 architecture allows the user to combine one or more of the above referenced components into a single, easy-to-use, easy-to-manage system. Because the Communications system 50 seamlessly interfaces with legacy voice and data equipments the user can purchase only those capabilities that is needed to create a comprehensive communications solution suited to user's business. As described earlier, an office attendant type program can be utilized assist communication system 50 to perform all of the above mentioned tasks.

Communications system 50 supports today's mission-critical communications applications, while providing a natural migration path for new applications enabled by the convergence of voice and data. At the core of the platform are system resources designed for voice and data integration, including time division multiplexing 78 (TDM) and switching, high-speed packet switching 74, a multiprotocol framing engine 72, LAN/WAN interfaces 82, and digital signal processors 76 (DSPs). These resources are complemented by software services as illustrated in FIGS. 7A to 11E such as advanced call control, messaging services, a database management system, and routing services.

Based on an embedded Windows NT operating system, communications system 50 applications use standard application programming interfaces (APIs) such as NDIS, TAPI, COM, and WinSock. With these APIs and communications system 50 TAPI Service Provider (TSP), applications developed by independent software vendors, including advanced CTI applications, can be easily deployed on the system.

Communications system 50 system also eliminates the complexity inherent in today's multivendor piece-part alternatives. Instead of requiring installation and ongoing management of multiple boxes from multiple vendors that were not designed to work together, this integrated system delivers sophisticated voice and data solutions that are easy to install, administer, and use.

Communications system 50 is a purpose-built, dedicated platform architected to ensure high availability. Some features include the "always-on" software architecture with subsystem isolation, SNMP-based management, fault monitoring, life-line communications, and remote diagnostics and fix capabilities. Also, fault-tolerance options include redundant power supplies and redundant hard disk drives.

With communications system 50, the user can dramatically reduce the cost of acquiring, operating, and managing business communications. Communications system 50 delivers the cost reductions of integrated WAN services and eliminates the need for the additional resources and personnel required by today's multivendor communications alternatives. The unified management console and tools provide a cost-effective method to remotely manage the entire customer premise.

Communication system 50 includes many features and benefits such as being a fully integrated, adaptable, reliable, and high performance system, while being a system that is easy to install, manage and use. By utilizing a fully integrated system, communication system 50 includes, among other features, integrated suite of applications, digital trunks 54, and a unified management console. Integrated suite of applications in communication system 50 provides an ideal platform for deploying future business-transforming Internet/voice applications while at the same time increasing productivity and customer satisfaction by cost-effectively deploying integrated voice and data applications.

Referring back to FIG. 2, digital trunks 54 lowers telecommunications costs by integrating voice and data traffic on the same access trunk. Digital trunks 54 also allows a user to cost-effectively deploy high-bandwidth trunks to the smallest of offices. Finally, communication system 50 significantly reduces cost of deployment and ongoing management associated with legacy technologies, and reduces training time by using a single graphical user interface.

A further benefit of communication system 50 of the present invention is its adaptability to communications needs of the user. Communications system 50 includes a modular architecture that allows an office to pay only for the communications interfaces and options the office presently requires and also provides the flexibility to add hardware interfaces or remotely load software applications as the office needs change.

Communication system 50 in the preferred embodiment is a standards based system. This ensures interoperability with existing communications infrastructure for seamless deployment and provides access to the latest third-party applications and technology. Communications system 50 is also adaptable to new technologies; thus, this protects an office's investment with an architecture designed to accommodate future technologies.

Another feature of communication system 50 of the present invention is its reliability. Some of communication system 50 features that allow it to be reliable are the following: complete integration and extensive testing for hardware and software; embedded Windows NT operating system; redundant, load-sharing power supplies; independent fault monitoring; life-line phone support, and RAID-1 disk mirroring. The benefits of these features are the following: virtually eliminates expensive downtime that results from incompatible hardware and applications; provides a single point of contact for fault isolation; ensures maximum application availability by isolating application subsystems; increases security by preventing unauthorized access; prevents interruption of service due to power supply failure; ensures maximum system availability by providing an independent watchdog service; keeps the user informed of system status through notification of system problems, no matter where the user is; ensures phone service, even during a power failure; and prevents downtime due to hard disk drive failure.

The multiple-bus architecture, application prioritization and isolation, and automatic route selection adds to the performance of communication system 50. These features ensure high-grade voice quality by keeping voice and data in their native environments, allow conversion between the voice and data environments to support services such as voice over IP (VoIP), maximize investment by making community resources, such as DSPs and WAN/LAN interfaces, available to both voice and data applications, keep mission-critical communications systems functioning under heavy load by ensuring they receive required system resources, provide flexibility in routing calls, and least-cost routing saves money by dynamically selecting trunks based on criteria selected.

Communication system 50 is easy to install, manage, and use. Some of the features making communication system 50 easy to install, manage, and use are it is web-based management for remote configuration, diagnostics, and health monitoring, remote software upgrades, rapid installation, customizable management levels, and full SNMP instrumentation for voice and data. These features simplify management tasks by using a single, consistent management interface for your voice and data infrastructure, reduces personnel costs by leveraging centralized technical resources to manage remote offices, minimizes downtime and on-site visits through extensive tools for remote troubleshooting and diagnostics, ensures system integrity by flexibly addressing different access requirements for system administrators, enables a user to reduce support costs by distributing simple, repetitive tasks such as moves, adds, and changes to office personnel, leverages your existing SNMP infrastructure to manage both voice and data capabilities on the communication system 50, allows the user to save money by performing software upgrades from a central location, and saves valuable time and money because the system can be installed and configured quickly.

Next, the specifications for the communications system 50 in the preferred embodiment will now be described. As it will be apparent to one skilled in the art, it is important to note that a different configuration and/or additional or reduced number of components can be used with communication system 50 without altering the scope and spirit of the present invention. In a preferred embodiment of communication system 50 of the present invention, a resource switch card (standard with every chassis) includes the following:12 10Base-T Ethernet hub ports;12 analog phone ports;6 analog trunk ports (including 2 life-line ports); communications switch engine and other system resources;2 internal 56 Kbps fax/modems (V.90 and K56);fault monitor; connectors: RJ-45 (Ethernet), 50-pin RJ-21x (phone), 3.5 mm phono (line-in, line-out), 15-pin VGA; and Indicators: System status; link and activity for each Ethernet port.

The Optional expansion interfaces of communication system 50 includes the following components:(1) Analog trunk modules, with 4 and 8-port versions available; Loop start and ground start; REN: 0.65 B; Impedance: 600 ohms; Compliance: FCC Part 15 Class A, FCC Part 68, UL 1950, DOC, CSA; Connector: 50-pin RJ-21x; and Indicators: System status; (2) T1 trunk modules—1- and 2-port versions available; Line rate: FT1 and T1 (64 Kbps-1.544 Mbps); Framing: ESF, SF/D4; Line code: AMI, B8ZS; Integrated CSU/DSU; Compliance: FCC Part 15 Class A, FCC Part 68, UL, CSA, ANSI T1.101 (MTIE), ANSI T1.403-1995, AT&T TR62411; Connector: RJ-48C, dual bantam (monitor jack); and Indicators: System status; red and yellow alarms for each T1 port. (3) 10Base-T Ethernet hub cards—12- and 24-port versions available; Layer 3 segmentation option: Traffic is routed between cards; Full SNMP instrumentation; Compliance: FCC Part 15 Class A, FCC Part 68, UL, CSA, EEE 802.3, ISO/IEC 8802-3; Connector: RJ-45; and Indicators: System status; link and activity for each Ethernet port. (4) Analog station cards—12- and 24-port versions available; Supports standard and enhanced analog phones with features such as enhanced caller ID display and message-waiting lamp; Operating voltage: Onhook −48V, Offhook −24V; REN: 3 B; On-board ringing power supply; Audio frequency response: 300 to 3500 Hz; Compliance: FCC Part 15 Class A, FCC Part 68, UL, CSA; Connector: 50-pin RJ-21x; and Indicators: System status; (5) Fault-resilient options—Redundant hard drive for disk mirroring (RAID-1); and Redundant power supply.

The following table describes an interface summary according to the present invention.

| | Part Number | Phone Ports | Ethernet Ports | Analog CO POTS | T1 |
|---|---|---|---|---|---|
| Resource Switch Card | Standard | 12 | 12 | 6 | |
| Analog Station Card | IO-12AS-C | 12 | | | |
| | IO-24AS-C | 24 | | | |
| Ethernet Hub Card | IO-12EH-C | | 12 | | |
| | IO-24EH-C | | 24 | | |
| Analog Trunk Module | IO-4AT-M | | | 4 | |
| | IO-8AT-M | | | 8 | |
| T1 Trunk Module | IO-1T1-M | | | | 1 |
| | IO-2T1-M | | | | 2 |
| Chassis (maximum) | | 84 | 84 | 22 | 2 |

Next, the chassis specifications will be described for the preferred embodiment of the present invention. The following are the physical specifications of communication system 50 of the present invention:(1) Height: 23.125 in (58.74 cm);(2) Width: 17.5 in (44.45 cm);(3) Depth: 18 in (45.72 cm);and (4) Weight: 88 lbs (40 kg), maximum configuration. Next, the mounting options will now be described: (1) Rack-mount (standard EIA 19-inch rack)and (2) Stand-alone. The power requirements are as follows:95-132 VAC, 47-63 Hz, 5.0A; 190-264 VAC, 47-63 Hz, 2.5A; Inrush current (one power supply): 40A maximum (115 VAC), 80A maximum (230 VAC); and Optional second hot-swappable and load-sharing power supply. The environmental ranges are as follows: Operating temperature: 32° to 104° F. (0° to 40° C.);Operating humidity: 85% maximum relative humidity, noncondensing; and Operating altitude: Up to 10,000 ft (3,050 m) maximum.

Communications system 50 PBX and office attendant type program CTI Application provide sophisticated call control and handling.

The PBX capabilities will now be described. Communications system 50 PBX provides a full-featured, nonblocking digital PBX with sophisticated call control capabilities. These capabilities are delivered using standard analog telephones connected to your existing phone wiring. In addition, communications system 50 supports advanced call control capabilities over IP-based networks, for applications based on the Microsoft Telephony Application Programming Interface (TAPI) standard. TAPI allows the communication system 50 to optionally provide virtual digital telephones, delivering advanced call control features over inexpensive standard analog phones.

Figure 24:
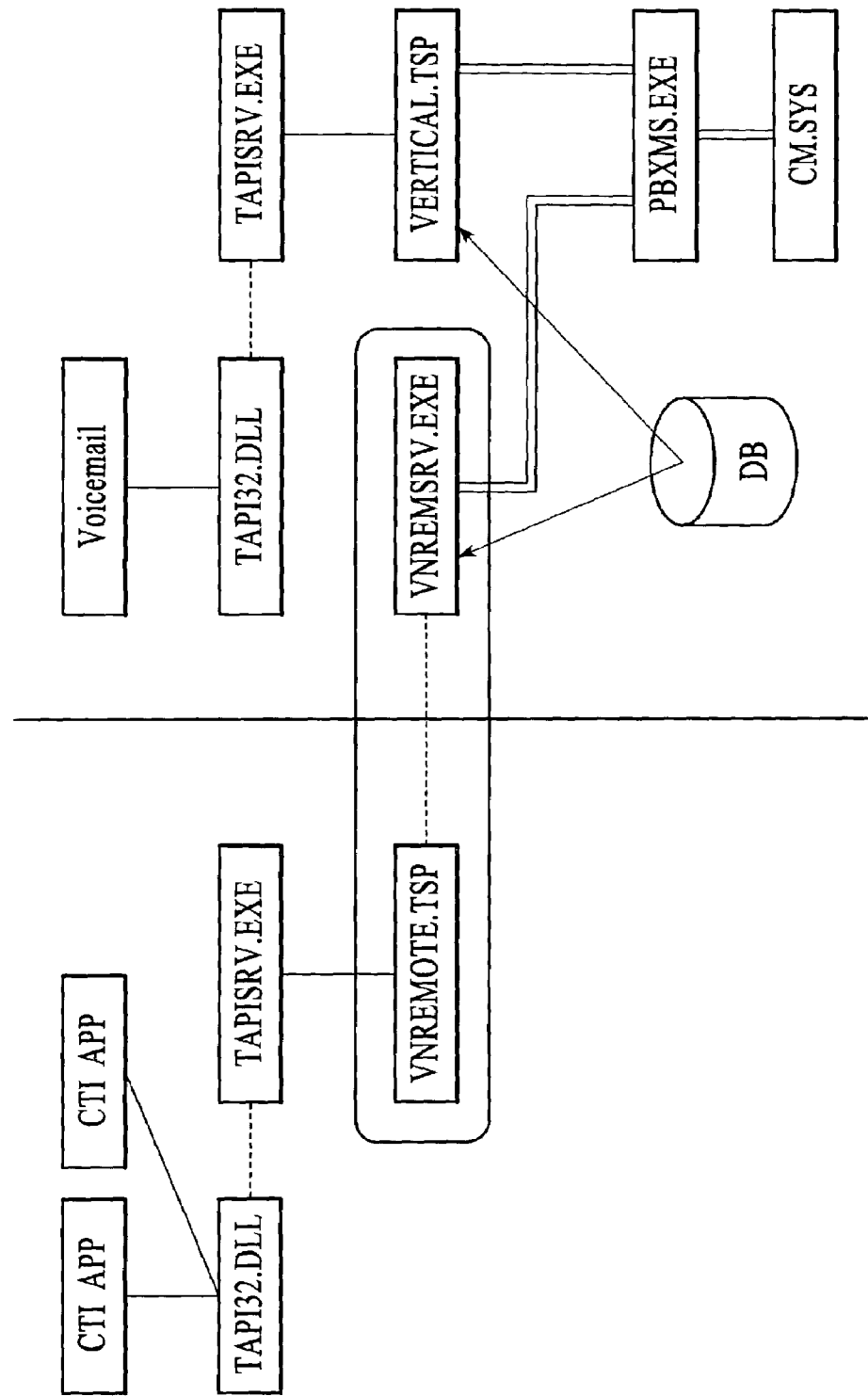
FIG. 24 illustrates additional TAPI functionality in accordance with preferred embodiments of the present invention.

Referring to FIG. 24, additional TAPI related functionality in accordance with additional preferred embodiments will now be described.

One of the main purposes for providing TAPI support is to allow CTI applications to control telephony ports over the network. Although Microsoft provides this functionality via TAPI 2.1 and remote.tsp, this solution has the following limitations: the TAPI Service (TAPISRV) is required to have a user ID and password on the domain, which could be viewed as intrusive on a network and raises unnecessary security concerns. Also, with the Microsoft approach, the configuration application that maps telephony ports to workstations does not have an exposed API. This means that it is not easily possible to configure TAPI clients using a remote administration system.

An improved approach is to use Windows Sockets to communicate between the client and server, and to use a database to do the association of TAPI lines to client machines. By using Windows Sockets we eliminate the requirement for the TAPI service to have a domain account, and by using our database for the TAPI configuration we eliminate the requirement to do configuration through Microsoft's TCMAPP tool, which is only accessible on the server itself. Thus configuration can be done from anywhere in the client/server network.

This TAPI solution consists of two new components. VNREMOTE.TSP is the new TSP that resides in the client and will accept TAPI requests and route them to the server if necessary, and to process messages coming from the server. VNREMSRV.EXE is a service on the server that is the "hands, eyes and ears" for VNREMOTE.TSP inside the server. It will process the requests passed on by VNREMOTE.TSP and send events back to VNREMOTE.TSP. The configuring of Windows Sockets is well-known in the art, and accordingly any suitable variation that accomplishes such functions consistent with the present teachings can be utilized. Office attendant type program computer-telephony application will now be described. Communications system 50 Office attendant type program is an easy-to-use application that places powerful telecommunications capabilities directly on the desktop. It provides comprehensive call handling functionality for operators and administrators, making them more efficient through an intuitive graphical user interface (GUI).

Communications system 50 application expedites routine tasks such as answering and transferring calls. It also simplifies more complex tasks such as setting up and managing conference calls. Office attendant type program leverages advanced Microsoft TAPI over TCP/IP technology that allows communications system 50 to replace the traditionally expensive, immobile, and hard-to-use attendant console.

Communications system 50 PBX and Office attendant type program specifications are now shown below. PBX features for call features include the following: Call forwarding, Off-premise call forwarding, Transfer on busy and no answer, Time-of-day call forwarding, Call hold, Call toggle, Call waiting, Consultation call, Consultation transfer, Blind transfer, Conference call, Call pickup, Public address system support, and Do not disturb. The features for calling and called party identification are as follows: support for enhanced caller ID phones, and Extension-to-extension identification.

The System features and management flexibility are the following: Class of Service profiles, Uniform dialing plan, Time-of-day dialing policy, Digit insertion, Automated route selection (ARS), least-cost routing, Trunk groups, Hunt groups for intelligent call distribution, including linear, circular, and ring all, Direct inward dial (DID), Message notification: lamp and stutter dial tone, Individual user profiles, Call detail recording, Phone set relocation, Music on hold.

The following are the office attendant type program features: (1) System—Standard Windows application; Call control over IP; Software-based console that is easy to relocate; Drag-and-drop dialing and conferencing; Virtual line appearances; Interface indicators signal call status; Caller ID display; Calls in queue display; Company telephone directory; Lookup-as-you-type dialing; Personal call log; Account number entry; Personal information manager; Conference manager; System speed-dial buttons; Programmable feature buttons; Most recently used numbers list; Login security; CTI link test button; Context-sensitive help; and Contact database importing; (2) Call handling—Dial pad; Hang up; Transfer with look-ahead; Hold; Answer next; Call forwarding; Do not disturb; (3) Installation requirements—66-MHz 486 PC with 16 MB of RAM (Pentium recommended); and Windows 95 or Windows NT 4.0.

PBX and the office attendant type program application are an integral part of the communications system 50. Other Communications system 50 software components include the following: Data Communications Services; Voice Mail and AutoAttendant applications; Remote Management System.

With Communications system 50, higher productivity with voice mail and automated attendant services can be achieved. Communications system 50 Voice Mail and AutoAttendant services help an office increase productivity by allowing people to share information without time or distance constraints. Customers can leave messages at any time of day or night, with the assurance that the messages will be delivered. Whether an office personnel is in the office or on the road, any office personnel can access messages instantly from any phone in the world.

In addition, Communications system 50 Voice Mail services allow a user to access the user's voice mail messages via the user's favorite e-mail application. The Communications system 50 Voice Mail application is built with full support for open industry standards—including IMAP4 e-mail application compatibility for remote voice mail retrieval, and WAV sound file format for ubiquitous message playback using the most popular operating systems.

The Communications system 50 AutoAttendant application economically processes inbound calls 24 hours a day—answering each call, providing customized instructions based on the time of day or day of week, and routing callers to the person best able to help them. Callers can use the intelligent call distribution feature to reach a particular person or department, without requiring an operator or direct inward dial (DID) services. For companies that use DID, AutoAttendant is ideally suited for assisting a-live operator by handling common requests for information such as directions and mailing addresses.

The following are the Communications system 50 Voice Mail and AutoAttendant Specifications. Voice Mail features include the following: Up to six concurrent voice mail sessions; Approximately 67 hours of storage; No additional hardware required; Interruptible prompts; and Password protection. The voice message handling feature includes: New message retrieval; Save messages; Listen to deleted messages before you hang up; Hear message time stamp and duration; Forward message; Reply to message; Skip message; Go to end of message; Backup and forward 5 seconds; Pause/resume listening; and Pause/resume recording.

The versatile message notification features include: Stutter dial tone; Lamp indication; and IMAP4 e-mail retrieval. Next, the AutoAttendant features include: Customizable greetings; Time, day-of-week, and holiday scheduling; Automated call routing (individual extensions and hunt groups for departmental routing); Audio-text mailboxes; Dial by name; Multilevel menus; and Single-digit menus.

The Voice Mail and AutoAttendant applications are an integral part of communications system 50. Other communications system 50 software components include: PBX services; office attendant type program computer-telephony application; Data Communications Services; and Remote Management System.

Communications system 50 delivers comprehensive communications support—multiprotocol router, full LAN/WAN connectivity, PBX voice capability, and a suite of communications applications—in a unified platform designed for scalability, reliability, and ease of use.

Communications system 50 Data Communications Services provide built-in services for local area networks, connecting branch offices to headquarters, and providing remote access and Internet connectivity to its employees. In addition, the Data Communications Services allow offices to create virtual private networks (VPNs) to save money on remote access and interoffice connectivity. Further, an office can save significant money by integrating both voice and data traffic over the same T1 access circuit. The built-in multiplexer passes data traffic to the Data Communications Services for processing; the remaining voice traffic is passed directly to the PBX.

Communications system 50 multiprotocol router is based on Microsoft's NT Routing and Remote Access Server (RRAS). An office using communications system 50 may extend the base RRAS elements with value-added services such as frame relay and versatile WAN interfaces, including analog dial-up and integrated digital T1 and/or DDS circuits. Multiprotocol routing (MPR) capabilities provide full-featured, standards-based LAN and WAN routing optimized for small and branch offices. Standards-based features include: IP routing (RIP, RIPv2, OSPFv2); IPX routing (RIP, SAP, IPXWAN); Packet filtering; Frame relay (RFC 1490, Cisco); Point-to-point protocol (PPP), Multilink PPP; Dial-on-demand routing; Classless Inter-Domain Routing (CIDR); PPP authentication protocols (CHAP, PAP); DHCP relay agent; Compression of TCP/IP headers for low-speed serial links; Path MTU discovery; PPP Internet Protocol Control Protocol (IPCP); Compression Control Protocol; and ICMP router discovery messages.

Communications system 50 Data Communications Services include remote access services, allowing your business to extend its networks through phone lines—and keep up with an increasingly mobile work environment. Network managers can use the remote access server capabilities for out-of-band management access, which is especially useful for initial installation and troubleshooting from remote locations. Furthermore, mobile and work-at-home users can seamlessly and securely access the user's corporate network. They can work, print, and run applications remotely using such features as the following: Comprehensive dial-up networking support for all mainstream remote clients; Authentication; RADIUS client support; Token card support; PPP and Multilink PPP; Microsoft Point-to-Point Compression; Restartable file copy; and Idle disconnect.

Virtual private networks lets a user use IP packet networks, such as the Internet, to provide secure connections between remote users and their corporate networks, without the expense of a dedicated private network. Communications system 50 offers a flexible and comprehensive solution, based on the Point-to-Point Tunneling Protocol (PPTP), for creating VPNs.

With PPTP, a user can dial into a local Internet service provider and access the network as easily and securely as if they were at their desks. PPTP technology offers significant advantages such as the following: Full interoperability with Windows 95, Windows 98, Windows NT Workstation, and many other VPN products; PPTP Client-to-Network; PPTP Network-to-Network for interoffice connectivity; Data encryption (RSA RC4); and Compatibility with IP, IPX, and NetBEUI.

Data Communications Services include powerful management software that enables administrators to centralize ongoing network maintenance, diagnostics, and troubleshooting; and easily accomplish remote changes such as setting up a brand new office or making changes to an existing one. Features include the following: Full SNMP instrumentation; MIBs implemented for data and voice services; Performance and capacity monitoring; Display of interface status in real time; Ping; Trace route; NetStat; and WAN protocol trace capability.

Data Communications Services are an integral part of communications system 50. Other communications system 50 software components include: PBX services; Communications system 50 computer-telephony application Voice Mail and AutoAttendant applications; and Remote Management System.

Ongoing management costs make up the majority of operating expenses of a communications infrastructure. This is especially true for remote offices, where technical expertise is rare and trained personnel frequently make on-site visits to perform routine tasks such as moves, adds, and changes. Adding to the problem is the fact that most communications infrastructures consist of multiple boxes from multiple vendors, requiring a variety of specialized personnel to operate and maintain the many components.

Communications system 50 Remote Management System addresses these cost-of-ownership issues by providing integrated remote management capabilities for both voice and data services. Designed for remote management and fault monitoring, the Remote Management System provides a cost-effective method for managing the entire customer premise remotely. Companies with multiple offices or plans to expand can realize significant cost savings by leveraging their expensive technical resources, no matter where they are located. Furthermore, the centralized management capabilities of communications system 50 present a unique managed network service opportunity for both voice and data service providers.

The Remote Management System consists of the following components:

(1) Remote Management Console: This component provides a unified Web interface for managing all aspects of communications system 50. Based on HTML, Java, and push technologies, the Remote Management Console provides a consistent interface that is easy to learn and use.

(2) SNMP: Both the voice and data aspects of communications system 50 have been SNMP instrumented, including key application services such as voice mail and PBX.

(3) Call detail recording: A complete record of all voice and data calls placed or received by communications system 50, this information can be used to analyze call patterns and trunk utilization, and to generate call reports.

(4) Independent fault monitor: A feature typically found only on large central-site systems, the independent fault monitor supervises system operation, and detects and reports faults to the system administrator.

(5) Trace manager: A complete log of all system activity, the trace manager provides useful information such as real-time call progress, WAN protocol traces, frame relay management information, and voice mail activity to facilitate troubleshooting.

Below is the specifications for communications system 50 Remote Management System: Rapid installation: less than 30 minutes; Remote software upgrades; Minimal technical expertise required; Robust, low-maintenance platform; Architected for high availability; Self-diagnostics to ease management burden; Remote management via digital trunks and over embedded 56 Kbps modems; and Centralized password facility. Remote Management Console of the present invention includes the following features. and benefits: Web-based console that manages all voice and data services; Management of any system in your network over any TCP/IP connection; Multiple administrative levels (customizable); Password protection; Support for remote moves, adds, and changes; Monitoring and diagnostic utilities; Chassis view that provides an at-a-glance view of system status, including LED states; Graphical user interface that is easy to learn and use; Extensive online help; and Runs on Windows 95 and Windows NT, using Internet Explorer 4.0 or Netscape 4.0.

The SNMP features include the following: Full SNMP instrumentation for voice and data; Support of standard enterprise network management stations such as HP Open-View and Sun NetManager; SNMP standards: SNMP (RFC 1157), Structure and Identification of Management Information (RFC 1155), Concise MIB Definitions (RFC 1212), MIB-II MIB (RFC 1213), Traps (RFC 1215); Standard MIBs: Frame Relay DTE (RFC 1315), T1/E1 Interfaces (RFC 1406), Repeater (RFC 2108), Microsoft HTTP, Microsoft LAN Manager, Microsoft RIPv2, Microsoft OSPFv2; Private MIBs: T1 extensions, station module, voice mail Call detail recording (CDR); Complete record of all voice and data calls placed or received; Standard file format for import into CDR applications; and Remote analysis of CDR information without a dedicated workstation.

The Independent fault monitor includes the following features and benefits: Embedded processor that provides an independent watchdog service for the overall system; System event log; Dedicated modem for remote access; Pager notification of system faults; System status: fan, power supply, operating system; and System reset.

The Trace manager includes the following features and benefits: Display of all system activity; Graphically based; Enabled on a per-service basis; Multiple trace levels; and, Events color-coded for readability.

The Communications system 50 Remote Management System is an integral part of the communications system 50. Other communications system 50 software components include the following: PBX services; Communications system 50 computer-telephony application; Data Communications Services; and Voice Mail and AutoAttendant applications.

Together, these software components combine to provide you a powerful, easy-to-use communications solution optimized for your remote or small office.

Figure 14:
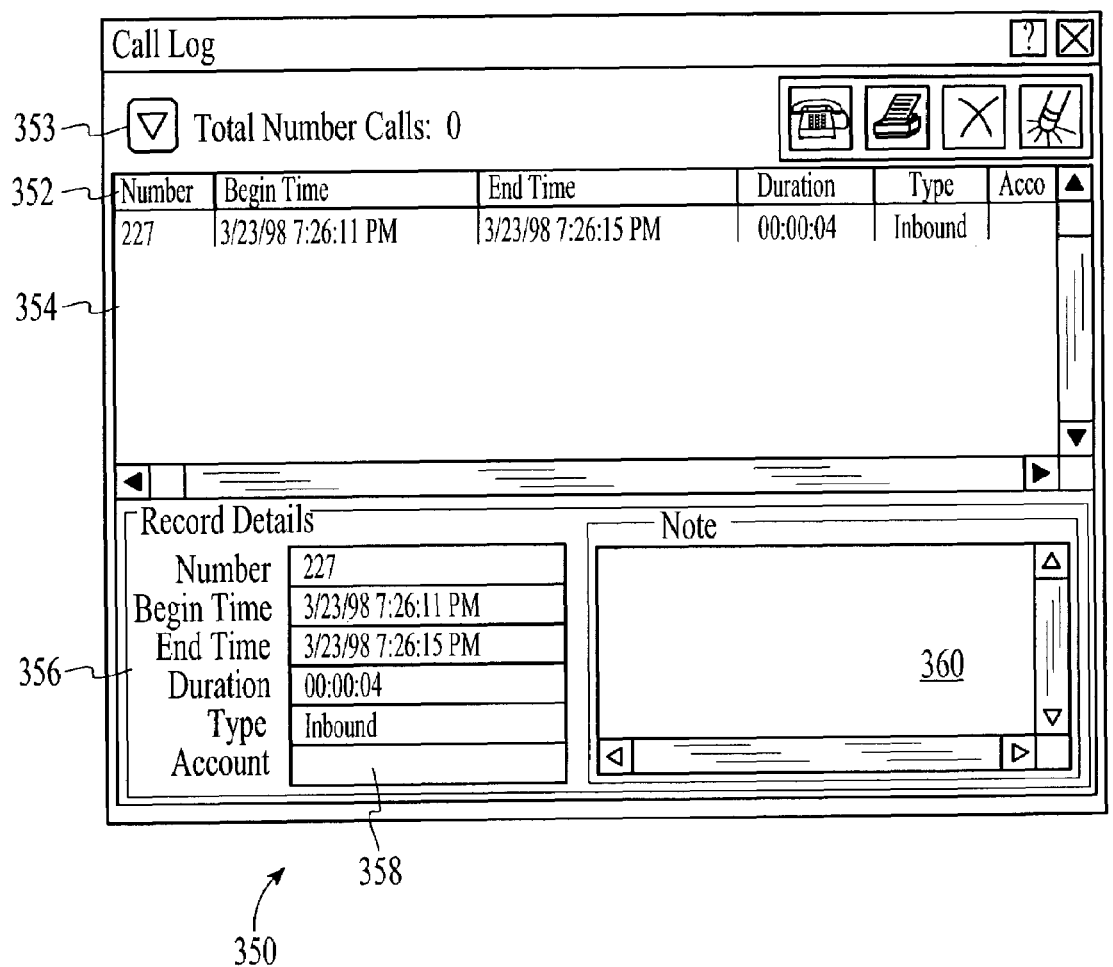
FIG. 14 illustrates additional preferred embodiments of the present invention utilizing advanced call logging features.

Referring now to FIG. 14, additional preferred embodiments utilizing advanced call logging features will now be described. As illustrated in FIG. 14, call logging window 350 may be opened by a user of an office attendant-type program running on a computer in accordance with the present invention (see, e.g., FIG. 8A, call log icon 142). In alternative embodiments, call logging window 350 may be automatically opened upon receipt of an incoming call, or upon initiation of an outgoing call. Window 350 preferably includes display windows 352 and 354, which preferably displays information for calls in the log, such as a call log identification number, begin call time, end call time, duration of call, type of call (either inbound or outbound), account information, etc. In other embodiments, other information desired to be included in a call log record is included in such a window. Window 354 is illustrated with only one call displayed, although it should be understood that a plurality of calls my be displayed in window 354, and in fact the call log can include numerous calls that cannot be displayed simultaneously in window 354. A scroll button or buttons (such as scroll icon 353) preferably are provided to scroll up and/or down the logged calls.

Preferably, window 356 is provided to display details of a particular call, which may be selected from a plurality of logged calls in window 354 by a click of a mouse or pointer. Window 356 preferably includes details of the particular logged call, and also preferably includes account field or window 358 and note window 360. It should be noted that account field window 358 in preferred embodiments may be desirably utilized for purposes of tracking calls by account, and for desirably collecting such logged call information from a plurality of computers and generating reports based on such information. Window 360 may be utilized to display notes entered by the user prior to, during or after the call, and/or may display previously entered information. In certain embodiments, window 360 may display information received from communications systems 50 over a packet bus, or from another computer on the packet bus, such as account status information, payment information, ordering information, etc. In such embodiments, such as based on the account information, particular information corresponding to this account may be desirably retrieved and made available to the user calling the particular account, etc.

In certain embodiments, upon receipt of an incoming call or upon initiation of an outgoing call, a window such as window 350 automatically appears (this may be by way of the office attendant-type program for a user who is managing incoming and outgoing calls of the office, or by way of a companion program for a user not managing incoming and outgoing calls of the office). In preferred embodiments, the user is prompted by a brief message displayed on the screen and/or an audio message played on the user's computer to enter the account number in window/field 358. In still other embodiments, the user must insert an account number in window/field 358 in order to complete the incoming or outgoing call. In such embodiments, processor/system resources 70 and/or the user's computer promptly reads any account number information provided by the user and any accepts or validates the account number (e.g., compares the entered account number to a stored list of valid account numbers, and determines if there is a match). In the event that an invalid account number is detected, a suitable message window and/or audio alert indicating that the account number entered is invalid, unrecognized, etc., preferably is provided to the user. In the event that a valid account number is detected, then the call is completed.

In alternate embodiments, the user is prompted by a brief message displayed on the screen (such as in a suitable window) or audibly, and the call completed but only for a predetermined time. This would enable the call to be completed without account authorization and/or validation, but would require that the account information be promptly input in a predetermined time interval.

In still alternate embodiments, communications system 50 (and/or another computer coupled to communications system 50 via a packet bus, etc.), periodically polls the computers utilizing a program with a call logging such as previously described retrieves the call log information. With automated call log polling, a central resource such as communications system 50 (and/or another computer) may periodically, and preferably automatically, collect call logging information over the packet bus (again, see, e.g., FIG. 3), which may be then made available to a suitable application running on communications system 50 and/or another computer, and compiled, processed, analyzed, printed, etc. In accordance with such embodiments, incoming and outgoing calls may be desirably logged and associated with account information, with such logged information desirably collected from a plurality of computers and made available to a central resource for further processing and/or use.

It should be noted that in preferred embodiments, communications system 50 continuously monitors or knows which particular computers are "logged on" and running an office attendant-type program or a companion or other program. In this manner, communications system 50 may continually be aware of which computers/users are logged on, and may thus send emails, commands, net messages or take other actions based on such information.

Referring now to FIGS. 15 through 17H, various aspects of remote administration/configuration and remote diagnostics of a system such as communications system 50 in accordance with certain preferred embodiments of the present invention will now be described.

Figure 15:
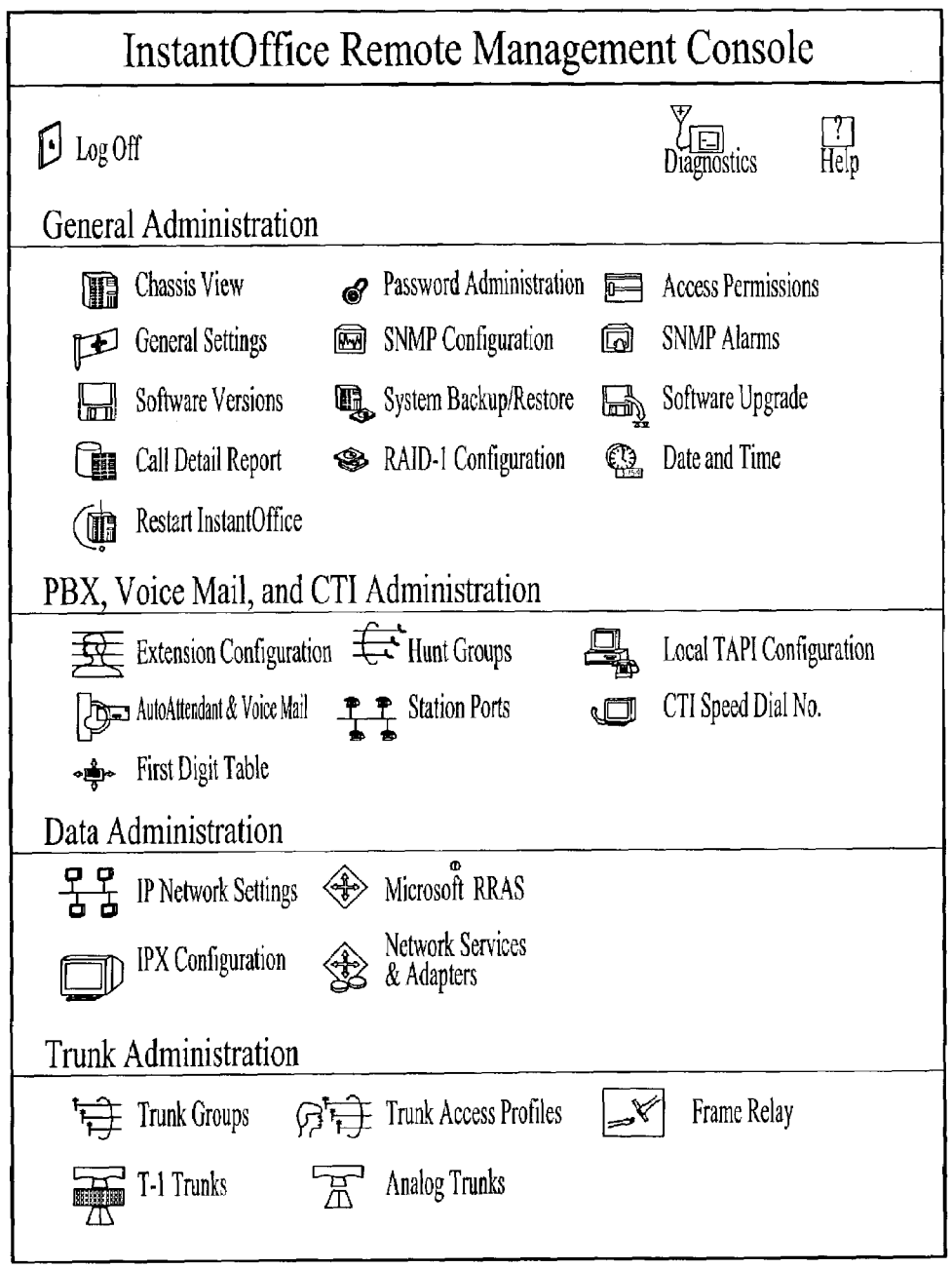
FIG. 15 illustrates a window from a remote administration/configuration application/applet in accordance with preferred embodiments of the present invention.

FIG. 15 illustrates a window from a remote-administration/configuration application/applet (preferably what is known as a Java applet, etc.) that preferably utilizes a desirable browser-type application interface. With a browser type interface, a person desiring to remotely configure or administer communications system 50 desirably uses a browser and preferably establishes an IP or similar connection with communications system 50. In preferred embodiments, the IP-type connection may be established via WAN connection (via WAN network services 58; see, e.g., FIG. 3), via a LAN connection, via a serial port connection (via, for example, a serial port to processor/system resources 70), via a modem connection (via modem 75 of FIG. 3), etc.

What is important to note is that administration/configuration of communications system 50 may be remotely performed via an IP or similar connection, preferably with a browser-type application, and preferably using the HyperText Transfer Protocol ("HTTP") or similar protocol. In such preferred embodiments, HTTP commands may be used to remotely administer, configure and diagnose communications system 50 in a desirable and flexible manner. It should also be noted that the use of HTTP commands in such a manner to administer, configure, etc., WAN resources (e.g., T-1 cards or resources), PBX and telephony resources (e.g., station cards, voice mail), and LAN resources (e.g., Ethernet or other network cards/resources) enables remote control and monitoring of communications system 50 in a flexible and desirable manner. In particular, if a security arrangement known as a "firewall" is implemented in conjunction with communications system 50, the use of such HTTP commands to configure a WAN service (for example) may be more readily accomplished in that most firewall systems utilize ports that allow HTTP communications/traffic, which thereby reduces conflicts with the firewall security system. In effect, remote processing may be accomplished by HTTP "tunneling" into communications system 50 with an IP-type connection, etc.

It also should be noted that password/user identification security arrangements are preferably utilized in such embodiments in order to maintain security over the configuration and operation of communications system 50. Encryption techniques also may be utilized in order to improve such security if desired for the particular application.

It also should be noted that such embodiments preferably operate on the basis of "transactions." Preferably, the remote computer or client coupled to communications system 50 using a session implemented with HTTP "tunneling" establish a transaction-based interaction. In accordance with such embodiments, the client initiates a transaction using, for example, Java programming remotely, such as over the Internet, preferably using what is known as a private virtual network or private virtual channel connection. The particular transaction or operation (such as described elsewhere herein) are initiated by client and proceed until completion, at which time the results of the transaction are made known to the client, or else the client has the option prior to completion of the transaction of "rolling back" or canceling the transaction in the event that the client user determines that something is wrong or incorrect with the transaction, etc. Preferably, the software on the communications system "server" prompts the client with an option to accept, modify or roll-back the transaction. In preferred embodiments, the client-server session may process one or a series of such transactions. With such a transaction-based system, remote commands and operations may be performed in a more secure manner between the preferably Java client and server, all of which is preferably achieved using HTTP tunneling as previously described.

Referring again to FIG. 15, various icons are illustrated for remote access by a user desiring to remotely administer/configure communications system 50. By clicking appropriate icons, various system administration/configuration functions may be implemented. As illustrated, general administration functions may include or relate to: log off, diagnostics, help, chassis view (described in greater detail later), general settings, software versions (enabling a viewing of a registry of software modules and releases, etc., installed on the particular communication system 50), call detail report, restart/reboot, password administration, SNMP configuration, system backup/restore, disk array configuration, access permissions, SNMP alarms, software upgrade, date and time, etc. As illustrated, PBX and voice mail administration functions may include or relate to: extension configuration, auto attendant and voice mail, first digit table, hunt groups, station ports, local TAPI configuration, CTI speed dial numbers, etc. As illustrated, data administration functions may include or relate to: IP network settings, IPX configuration, RRAS routing (routing and remote access service), network services and adapters, etc. As illustrated, trunk administration functions may include or relate to: trunk groups, T-1 trunks, trunk access profiles, analog trunks, frame relay, etc.

What is important to note is that, in such preferred embodiments, various icons are presented so that a remote person may conveniently select via an appropriate and intuitive icon an applet to achieve the desired function or operation, and which may conveniently be used to configure and administer the communications system and configure PBX, voice mail, LAN and IP network connections, trunk groups, T-1 trunks, frame relay, etc. In accordance with such embodiments, a single user interface, remotely viewable, may be used to access and administer, etc., voice, data, LAN, WAN services and applications, etc.

FIGS. 16A through 16F will be used to further describe various aspects of such remote administration/configuration in accordance with preferred embodiments of the present invention.

Figure 16A:
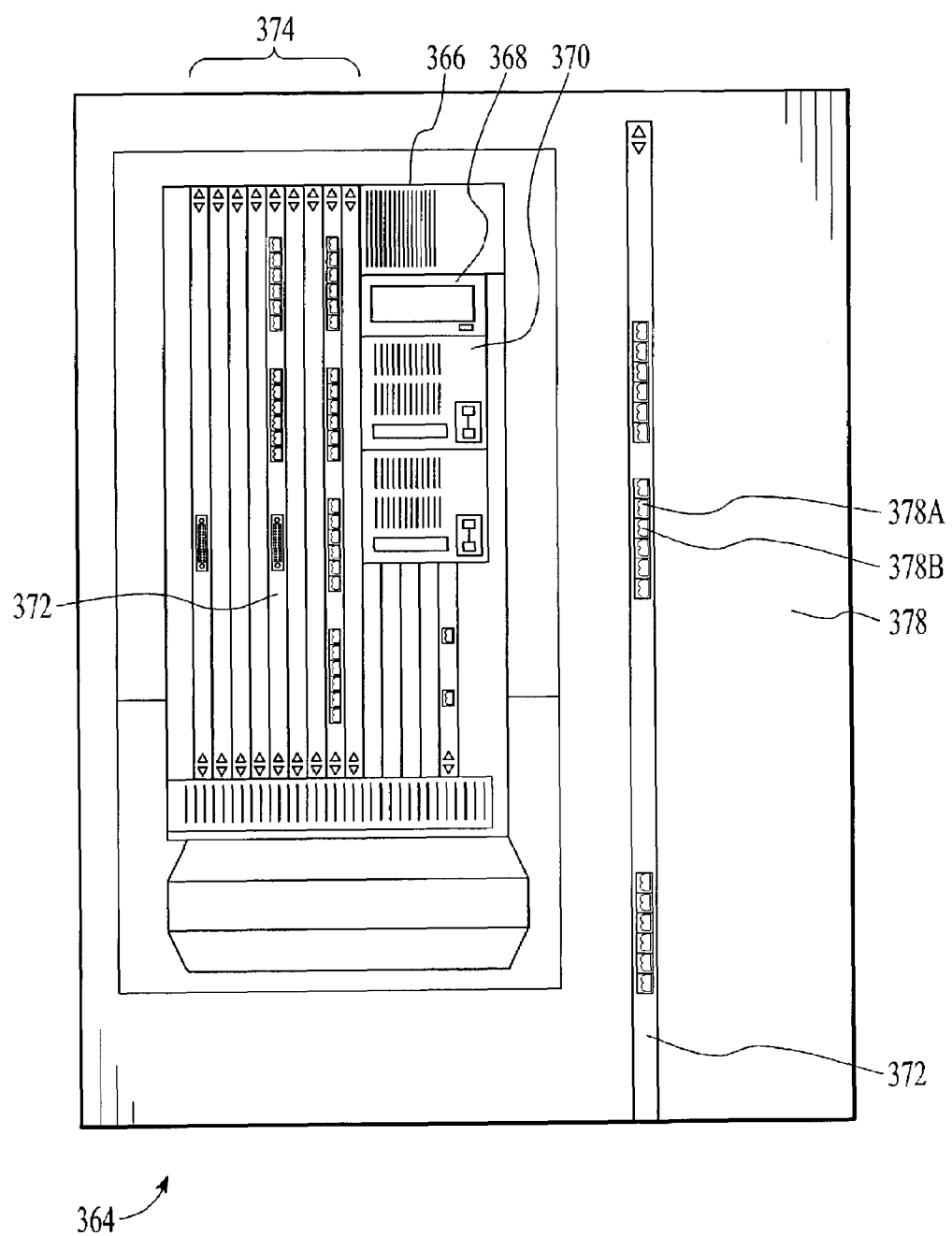
FIG. 16A illustrates a preferred exemplary embodiment of a chassis view window in accordance with preferred embodiments of the present invention.

FIG. 16A illustrates a preferred exemplary embodiment of "chassis view" window 364, which, for example, may be displayed in response to selecting of the chassis view icon of FIG. 15. Window 364 preferably includes a visual representation of chassis 366 of communications system 50, and preferably includes a visual representation of various station cards, resources cards, power supplies, drives, etc. Such a visual representation may include station/resource cards 374, included particular card 372 indicated with a pointer arrow, power supply(ies) 370, drive 368, etc. What is important is that an intuitive visual representation of the overall system be desirably displayed in a manner to facilitate an understanding of the configuration of the particular communications system 50 that is being remotely monitored, administered, configured, etc.

In preferred embodiments, pointing to a particular card or resource results in an enlarged visual representation of that card or resource, as illustrated by the pointer being directed to card 372, resulting in an enlarged representation of card 372 appearing adjacent to the chassis view. In the illustrated example, card 372 includes network connection ports in circle 378, and as examples shows empty port 378A and occupied port 378B. Thus, in accordance with such embodiments, an enlarged view of a card or resource may be visually displayed and remotely viewed, and a visual representation of whether particular ports or resources are utilized (such as, for example, by having an Ethernet or other network cable attached) also may conveniently be provided.

In accordance with preferred embodiments, various functions and/or operations are provided for remote administration/configuration, such as previously described. Windows to provide such functions and operations preferably are displayed in a manner to intuitively lead the remote person through the desired operation, etc. Such windows may be accessed by selecting an appropriate icon such as are illustrated in FIG. 15 (the icons of FIG. 15 are © 1998, Vertical Networks, Inc. (assignee of the present application)), or they may be accessed by way of clicking on a particular station or resource card in the chassis view of FIG. 16A. Various remote administration/configuration windows will now be further described.

Figure 16B:
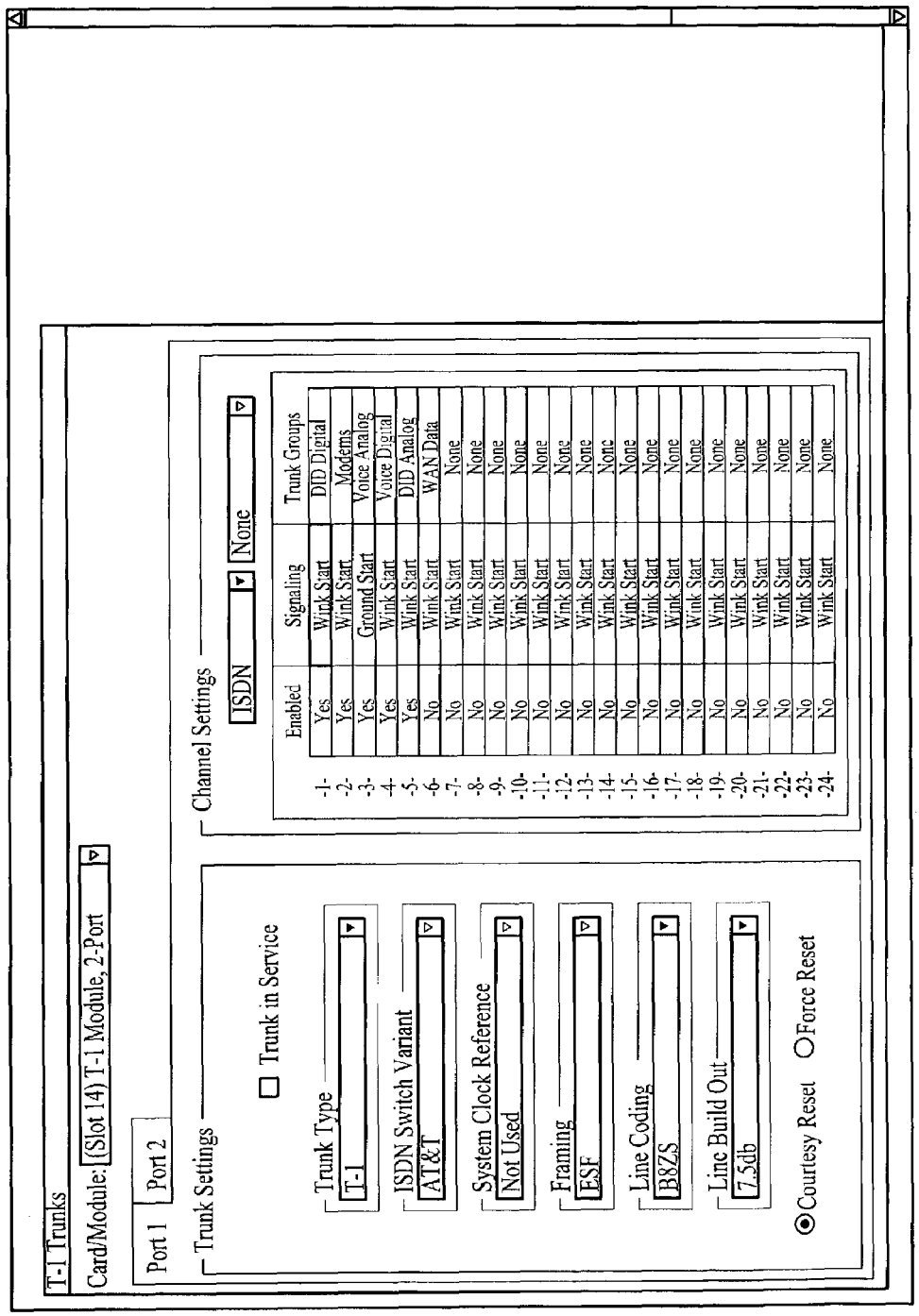
FIG. 16B illustrates a window for configuration of T-1 channels of a particular communications system in accordance with preferred embodiments of the present invention.

Referring to FIG. 16B, window 380 is provided for configuration of T-1 channels of a particular communications system 50. As previously described, window 380 may be presented in response to clicking on the T-1 trunks icon of FIG. 15, or alternatively window 380 may be presented in response to clicking on a T-1 resource/station card of the chassis view of FIG. 16A. As illustrated, with a point and click operation on window 380, the remote person may enable/disable T-1 channels, set or reset signaling (e.g., wink start, ground start, etc.), configure trunk groups (e.g., WAN data (which may be used to direct clear channel data trunk traffic to an RRAS interface, thereby enabling the LAN to transmit/receive data to/from the WAN), voice analog (e.g., to direct incoming analog voice trunk traffic to a default destination), voice digital (e.g., to direct incoming digital voice traffic to a default destination), DID analog (e.g., to direct incoming direct inward dial analog voice trunk traffic to a default destination), DID digital (e.g., to direct incoming DID digital trunk traffic to a default destination), and modem (e.g., to direct either T-1 trunks or analog trunks to one or more modems included as part of communications system 50).

In accordance with such embodiments, T-1 trunks may be configured in an intuitive point and click manner, thereby facilitating remote administration and configuration of such resources. As a particular example, multiple T-1 channels may be selected in FIG. 16B as a block with the mouse or pointer, and such block-selected T-1 channels may then be simultaneously configured (e.g., configure to be enabled/disabled, configure signaling, configure trunk groups, etc.). With such a click and block select operation, multiple T-1 channels may be configured in a group.

Figure 16C:
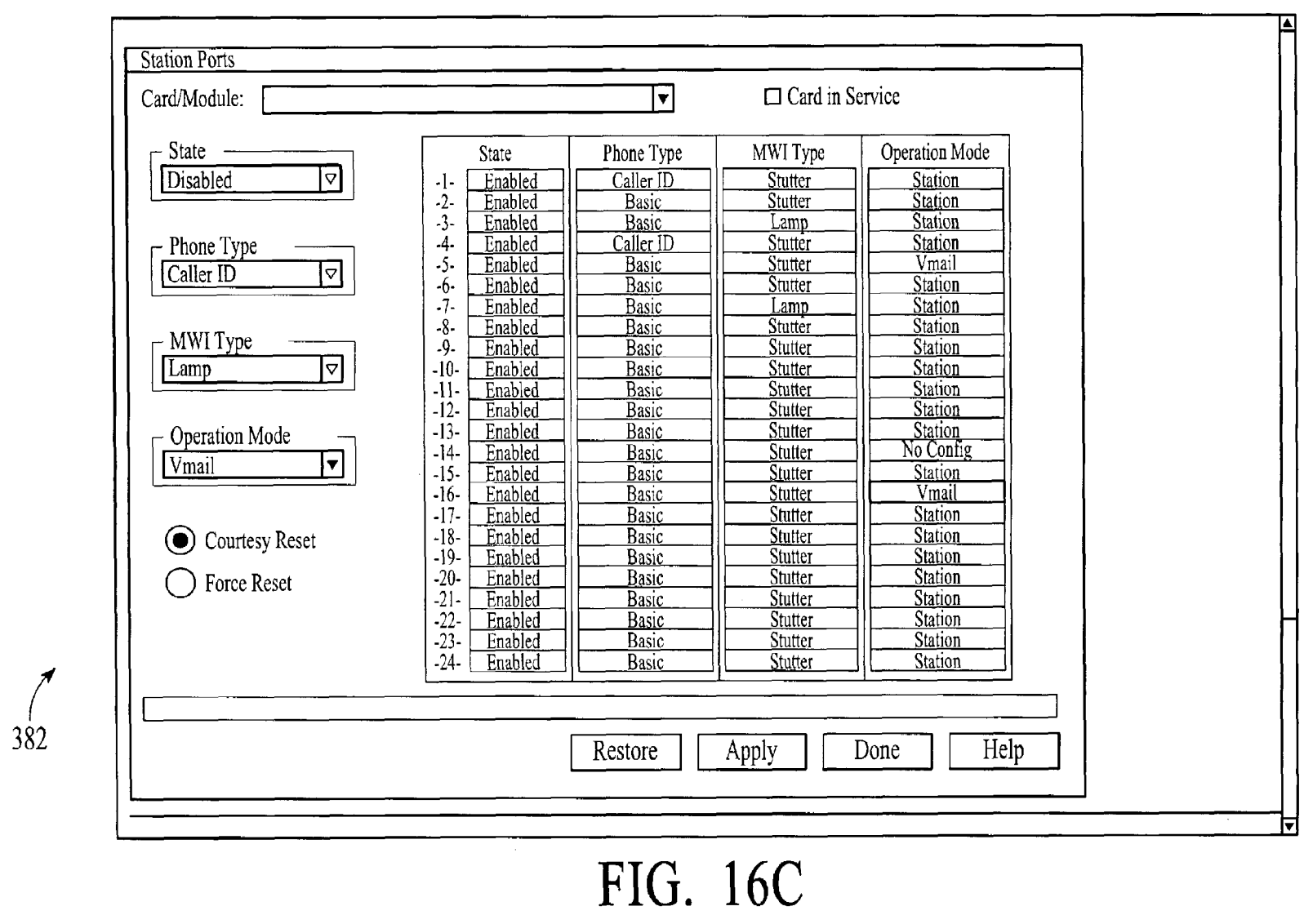

As illustrated in FIG. 16C, window 382 may be presented in order to configure station ports of a station card (again, either by icon selection or selecting a station card in chassis view, etc.). Also as illustrated, the state of particular stations (e.g., enabled or disabled), phone type (e.g., caller ID, basic, etc.), mail waiting indicator (MWI) (e.g., stutter the dial tone, light a lamp on the phone, etc.), operation mode (e.g., operate as a station, direct to voice mail, etc.). As described earlier with respect to FIG. 16B, with intuitive point and click type operations, various station cards may be selected (including multiple stations that may be selected as a block, etc.) and configured remotely and in an intuitive manner.

Figure 16D:
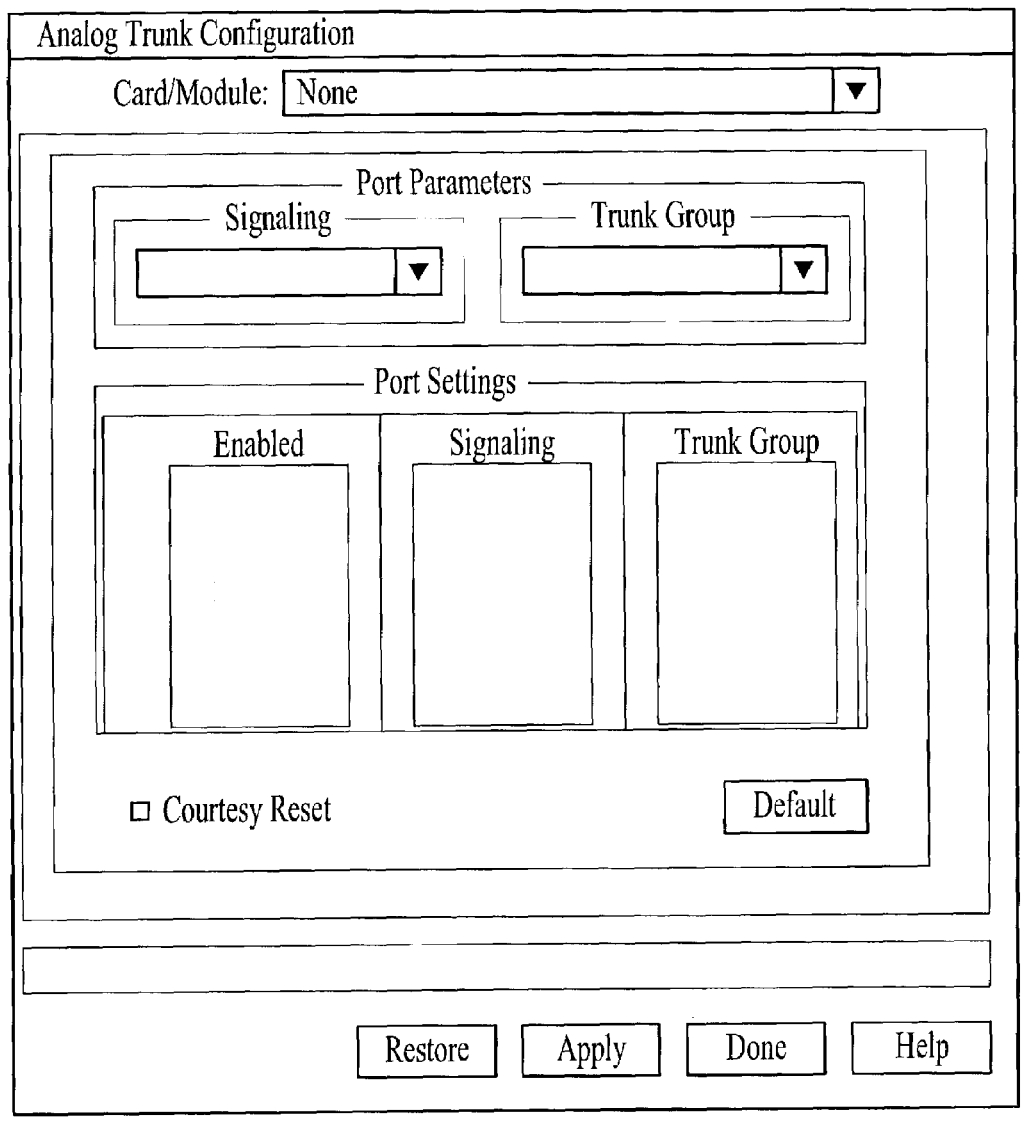
FIG. 16D illustrates a window for configuration of analog trunks in accordance with preferred embodiments of the present invention.
Figure 16F:
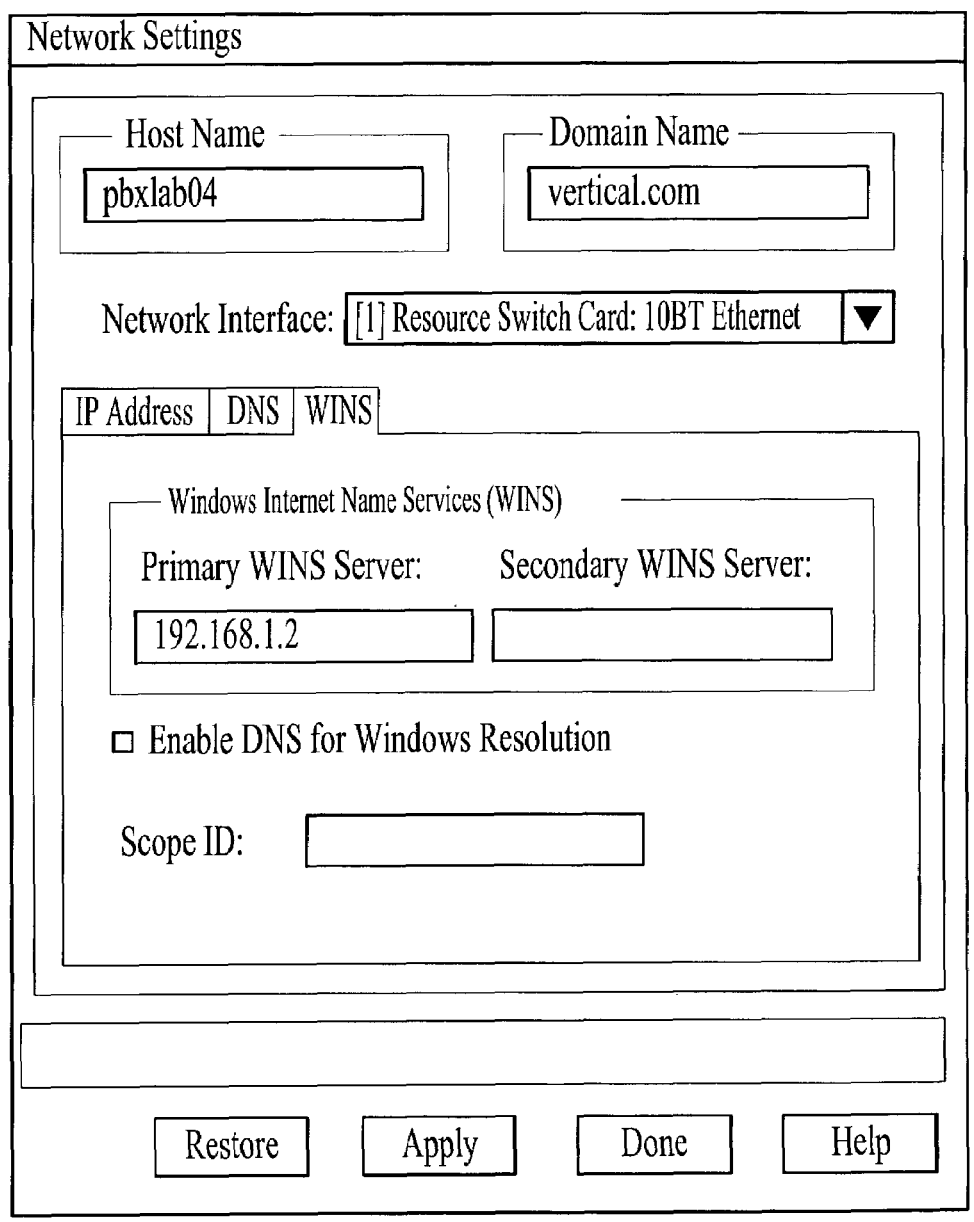
FIG. 16F illustrates a window for configuration of network settings in accordance with preferred embodiments of the present invention.

FIG. 16D illustrates window 384, which may be used to configure analog trunks in accordance with preferred embodiments of the present invention. FIG. 16E illustrates window 386, which may be used to configure frame relay type WAN resources in accordance with preferred embodiments of the present invention. FIG. 16F illustrates window 388, which may be used to configure network (e.g., IP network) settings in accordance with preferred embodiments of the present invention.

As will be appreciated from these illustrative examples, various administration/configuration operations may be carried out remotely, preferably using an intuitive browser-type interface, and preferably using HTTP type commands in an applet environment such as with Java, in a desirable and much improved manner.

As illustrated in FIGS. 17A through 17H, such remote processing concepts are extended to remote diagnostic operations in accordance with yet other preferred embodiments of the present invention.

Figure 17A:
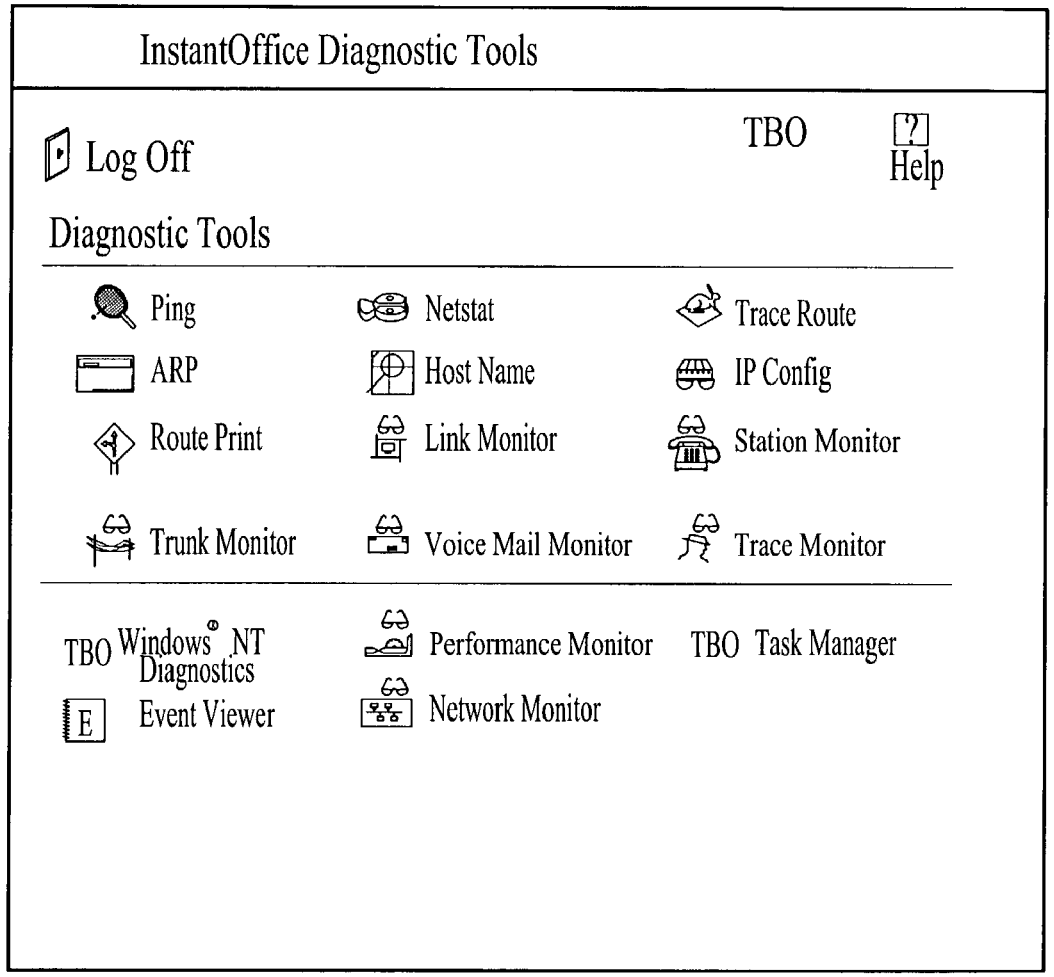
FIG. 17A illustrates various icons that may be presented to a remote user to perform remote diagnostics on the communication system in accordance with preferred embodiments of the present invention.

As illustrated in FIG. 17A, various icons may be presented in order for a remote user to perform remote diagnostics on communications system 50. Such icons may be used to present, for example, various "DOS prompt" type commands (e.g., Ping, ARP, route print, net stat, host name, trace route and IP config). Icons also may be presented for more advanced diagnostic-type operations, such as trunk monitor, link monitor, voice mail monitor, station monitor and trace monitor. Various of these diagnostic operations will now be more fully described.

Figure 17D:
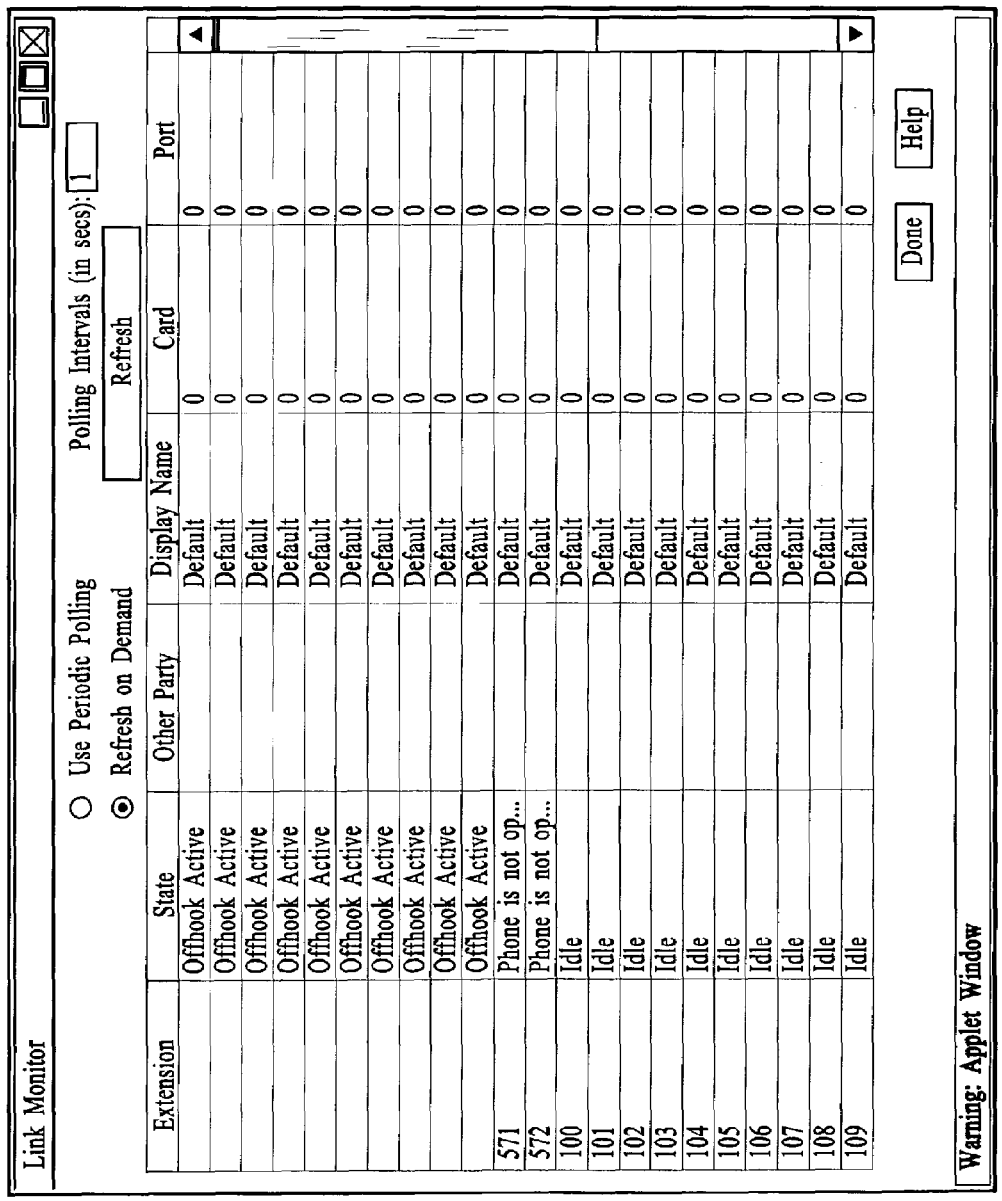
FIG. 17D illustrates a window for providing a station monitoring function in accordance with preferred embodiments of the present invention.

As illustrated in FIG. 17B, window 390 may be presented in order to provide a trunk monitoring function. As illustrated, window 390 may be used to readily provide information regarding the slot, board, port, state, and called and calling party information of various trunks. As illustrated in FIG. 17C, window 392 may be presented in order to provide a link monitoring function. As illustrated, window 392 may be used to readily provide information regarding links that may be established within communications system 50, such as which cards are connected to which port, etc. As illustrated in FIG. 17D, window 394 may be presented in order to provide a station monitoring function. As illustrated, window 394 may be used to readily provide information regarding the status of various stations/extension in communications system 50. As will be appreciated, such windows may be used to readily present desired status and other diagnostic type information to a remote person.

Figure 17E:
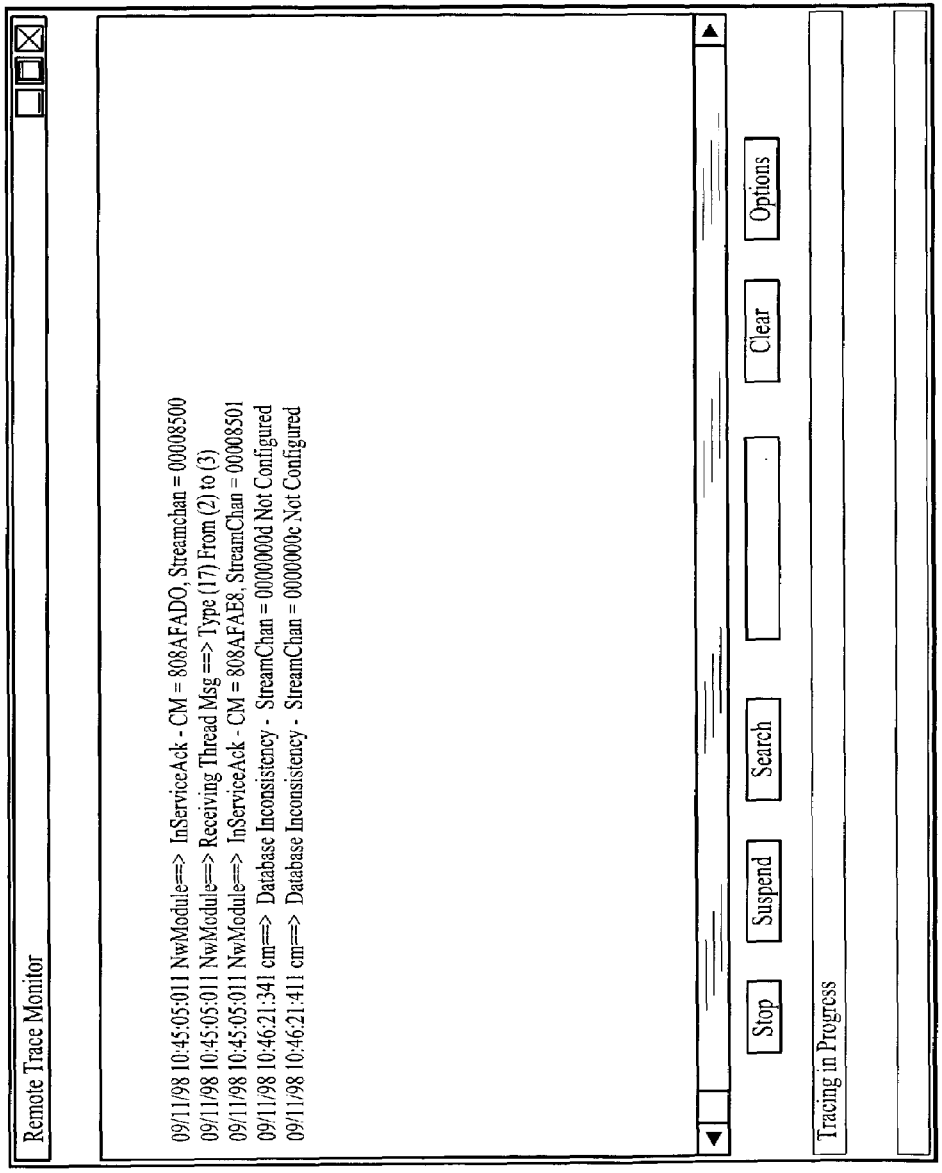
FIG. 17E illustrates a window for displaying trace information from various software components, driver, etc. in communications system in accordance with preferred embodiments of the present invention.
Figure 17F:
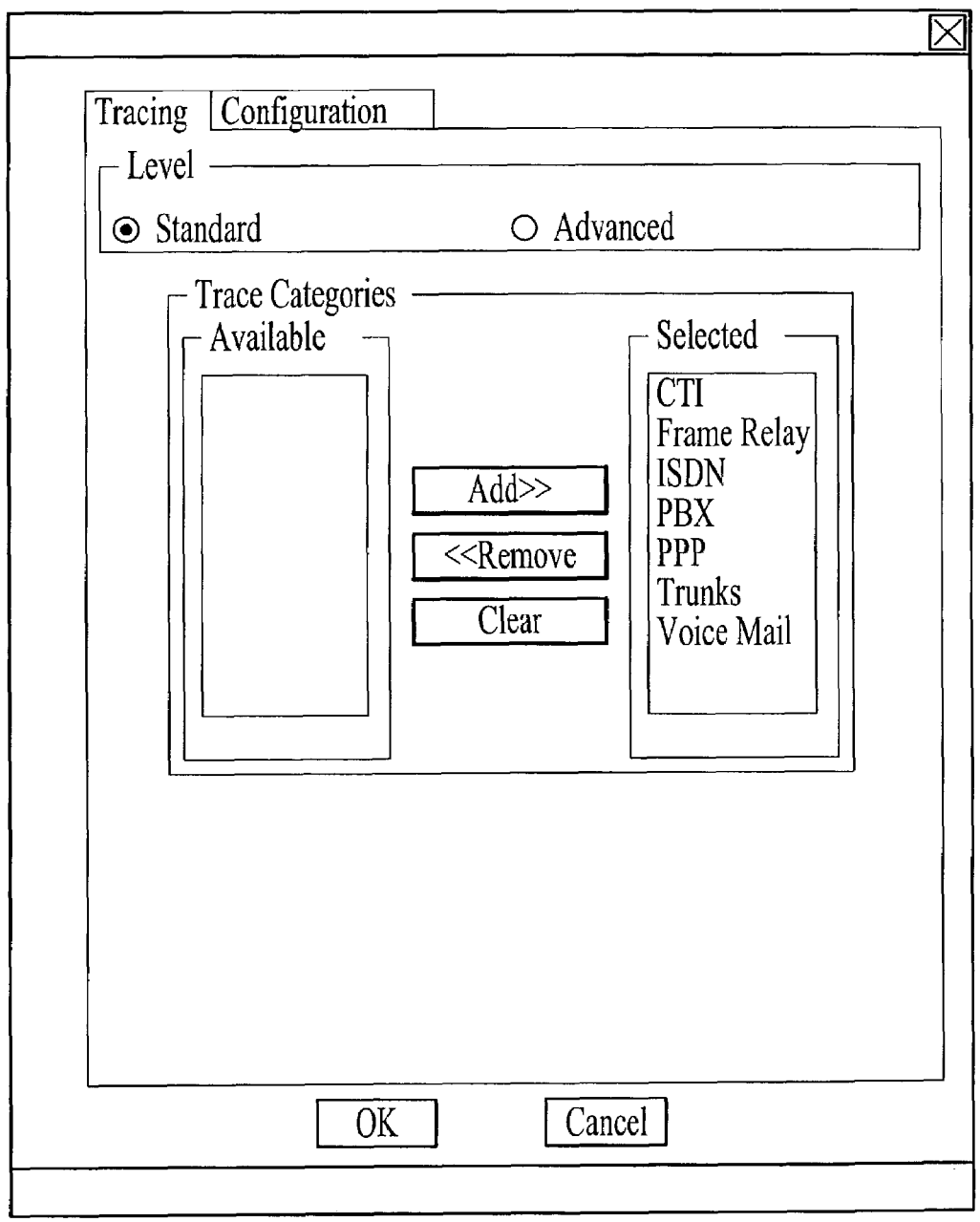
FIG. 17F illustrates a window for providing a first level of tracing information in accordance with preferred embodiments of the present invention.
Figure 17G:
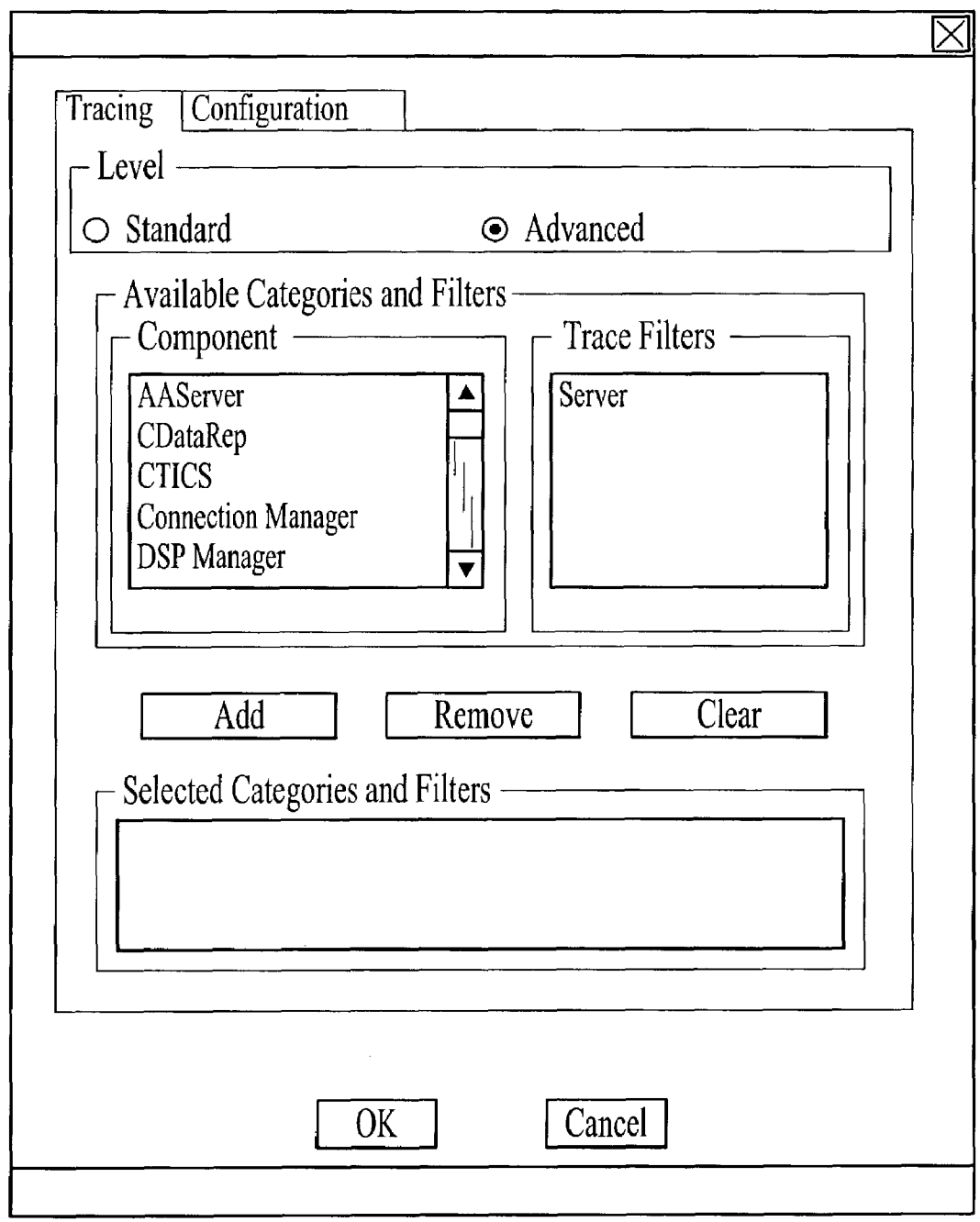
FIG. 17G illustrates a window for providing a second, higher level of tracing information in accordance with preferred embodiments of the present invention.
Figure 17H:
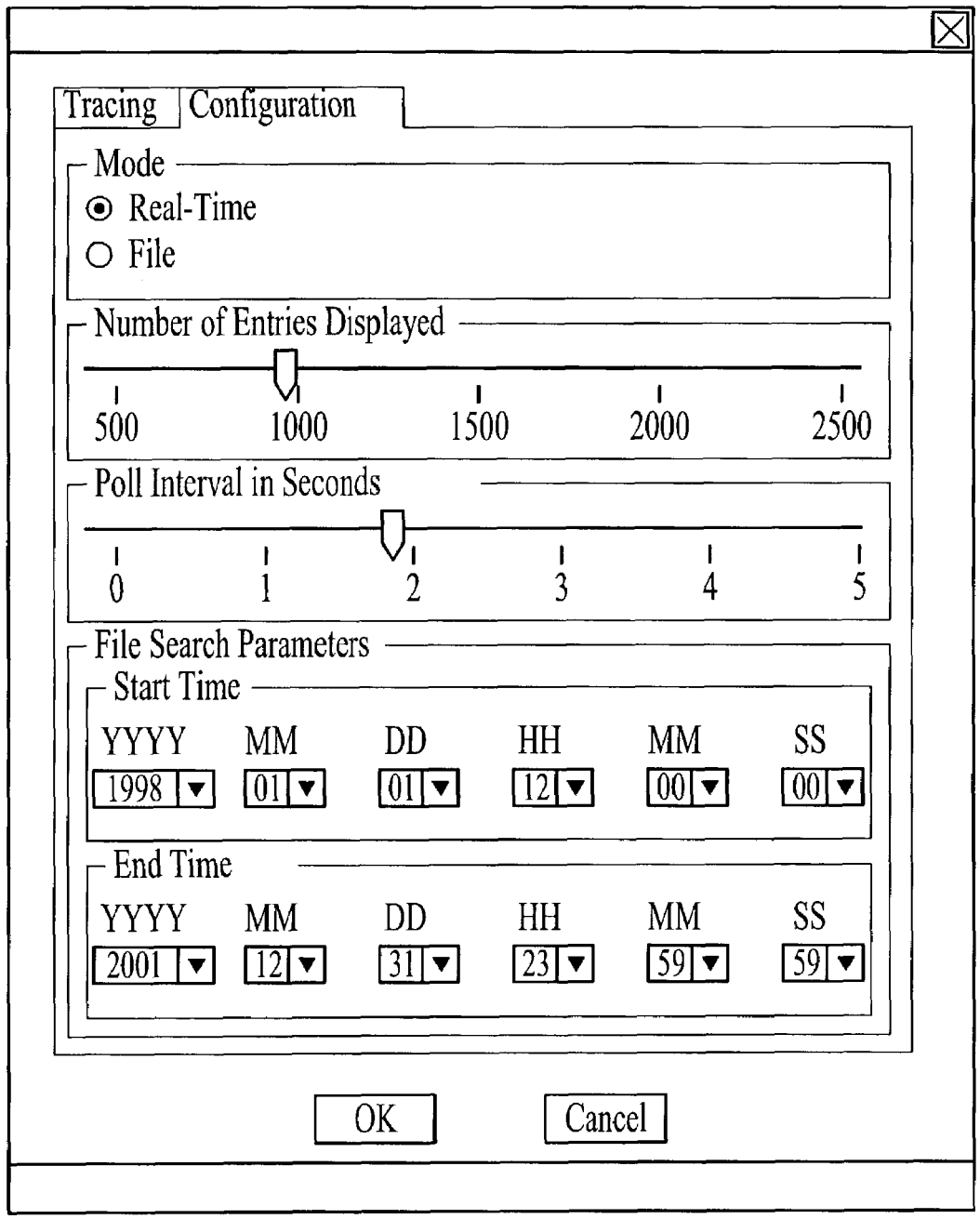
FIG. 17H illustrates a window for selecting certain timing and mode information in accordance with preferred embodiments of the present invention.

In accordance with preferred embodiments, advanced remote trace monitoring also may be provided. FIG. 17E illustrates window 396, which may be used to display trace information from various software components, drivers, etc. in communications system 50. The level and type of trace information that is remotely provided may be desired controlled in accordance with preferred embodiments of the present invention. FIG. 17F illustrates window 397, in which a first level of tracing information (e.g., "standard") that may be provided is selected. As illustrated, the remote user may select various components to have trace information provided in the trace monitor window. FIG. 17G illustrates window 398, in which a second, higher level of tracing information (e.g., "advanced") that may be provided is selected. As illustrated, the remote user may select various software components, such as those related to automated attendant, voice mail, connection manager, DSP manager, T-1 drivers, LAN drivers, frame relay drivers, etc., and may also select various trace filters to more precisely control the trace information that is provided. FIG. 17H illustrates window 399, in which certain timing and mode information may be selected. As illustrated, window 399 may be used to provide that tracing information is presented in real time or stored to a file, with control preferably provided for the number of entries that are displayed, poll interval, etc. For trace entries stored in a file, start and end time search parameters also may be selected.

Figure 18:
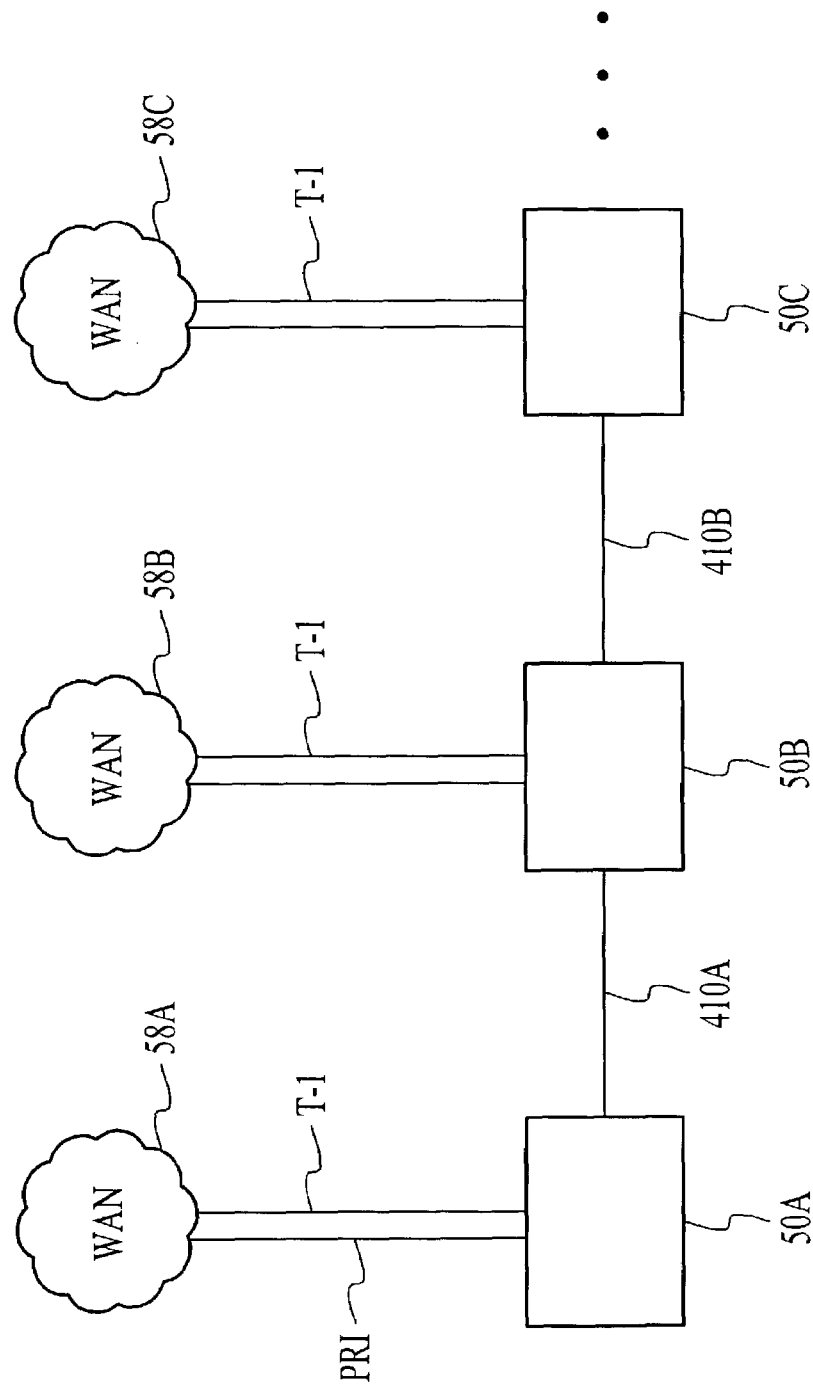
FIG. 18 illustrates a communication system in accordance with another preferred embodiment of the present invention.

Referring now to FIG. 18, additional aspects of preferred embodiments of the present invention will now be described.

Based on the description provided elsewhere, it will be apparent that communications system 50 may be coupled to other such communications systems in a manner desirable for the particular application. FIG. 18 illustrates three such communications systems 50A, 50B and 50C (in other embodiments other numbers of such communications systems 50 may be provided). The various communications systems are coupled to various desired WAN services (WAN services 58A, 58B and 58C being illustrated), and also may be coupled to each other, such as through connections 410A and 410B, etc. Connections 410A and 410B may be, for example, an Ethernet or other LAN-type connection (e.g., for multiple communications systems 50 in the same general locations or physical proximity), or alternatively may be a remote connection such as a connection established over the Internet (e.g., an IP connection), such as for communications system 50 geographically remote from each other (e.g., a head office and one or more remote satellite-type offices, etc.). FIG. 3 illustrates the various paths that may be utilized to establish such a connection. What is important is that information may be coupled between the various communications systems in a manner suitable for the particular physical configuration.

Preferably, communications system 50A includes a PRI or primary rate interface or ISDN circuit that includes what a number of B (or "bearer") channels and at least one D (or "data") channel used to carry, for example, control signal signals and customer call data such as in a packet switched mode. As is known in the art, a D or similar control signaling channel typically is used to provide appropriate signaling information for the voice or. B channels. The D channel typically and preferably carries such control signaling information in the form of a serial data stream. The control signaling over such a D-type channel is sometimes referred to as NFAS, or Network Facility Associated Signaling.

As illustrated, communications system 50A also preferably has coupled thereto one or more T-1 or similar digital transmission or other links, and communications system 50B and 50C also preferably have coupled thereto one or more T-1 or similar digital transmission or other links. With the various communications systems coupled together as previously described (e.g., Ethernet/LAN connection, IP connection, etc.), the D channel coupled to communications system 50A may be used to provide signaling-type information for one or more T-1 links coupled to communications systems 50A, 50B and/or 50C. As in many applications the D-type signaling channel may have sufficient bandwidth to provide signaling information for a plurality of communication links, with communications systems implemented and/or connected together as described herein, a common D-type signaling channel may be used to efficient provide signaling information for a plurality of T-1 or similar links coupled to a plurality of such communications systems, etc. Thus, in accordance with such embodiments, a distributed-type NFAS signaling arrangement may be implemented for a plurality of communications systems.

Figure 19:
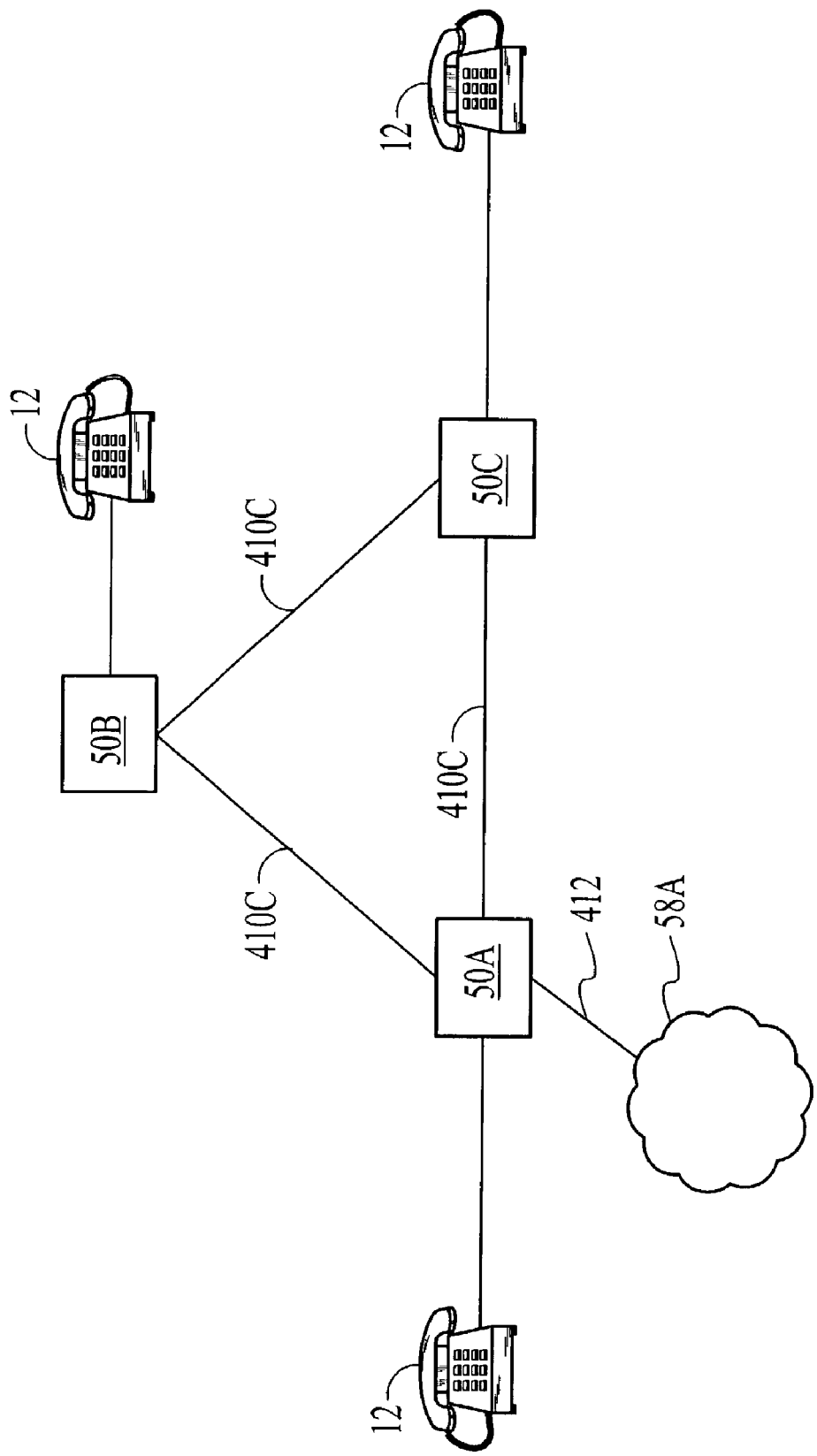
FIG. 19 illustrates a communication system in accordance with another preferred embodiment of the present invention.

FIG. 19 illustrates another configuration of a plurality of communications systems 50 (this type of configuration may be substituted for the configuration illustrated in FIG. 18, or vice versa, or some combination of these configurations). While three communications systems are illustrated (50A, 50B and 50C), other numbers of communications systems are utilized in other embodiments.

As illustrated, communications system 50A is coupled to WAN services 58A over connection 412 (the other communications systems may be similarly coupled to WAN services, etc.), which may be any suitable connection/link such as described elsewhere herein. As described elsewhere herein, VoIP (or other packetized voice/data communications) may be coupled to/from WAN services 58A and communications system 50A. As previously described, communications systems in accordance with the present invention include suitable HDLC or other data framing/deframing engines, DSPs (such as for decompression or other processing), PBX and LAN router types of functions. With an arrangement such as illustrated in FIG. 19, a VoIP or similar or other packetized data may be received, for example, by communications system 50A. This data stream conventionally might be de-packetized and processed upon receipt by the receiving system. Communications systems in accordance with embodiments of the present invention, however, have the ability to route the data stream to other communications systems (e.g., 50B or 50C) over a suitable connection 410C. As previously described, such systems may be coupled via an Ethernet or LAN type connection, an IP or other connection, which preferably supports packetized transmissions. Thus, a packetized communication/data stream may be received by a first communications system, which may depacketize and process the communication/data stream, or forward without depacketizing to a second communications system, which may depacketize and process the communication/data stream, or forward without depacketizing to a third communications system, and so on. In this manner VoIP other communications may be achieved with a plurality of communications systems, with a reduced latency over systems that, for example, must depacketize, decompress, etc. the data stream before it is provided to another computer or system. Thus, a data stream may be routed by one communications system to another without such additional processing.

It should be noted that communications systems 50 illustrated in FIGS. 18 and 19, for example, also have coupled thereto a plurality of computers, telephones, etc., as previously described for purposes of generating, receiving various data streams, etc., although such details have not been shown for ease of description.

As described elsewhere herein, various voice mail type options may be presented to users of such communications systems in accordance with the present invention. One such advantageous voice mail option provided in accordance with preferred embodiments of the present invention include advanced email or voice mail-type broadcasts of desired messages. A user may decide to send a voice mail or email to some or all users of the communication system. With a suitable office attendant-type or companion-type program, for example, a user may select from a group list, etc., a desired group of persons to receive the communication. A broadcast voice mail, for example, could be input through the user's telephone in a conventional manner, and routed (see FIG. 3) through, for example, DSP 78 (via TDM bus 78, switch/multiplexer 74, etc.) which converts the voice mail message into an suitable data format, such as what is known as a WAV file, etc., and then sent via (for example) packet bus 80A and/or 80B to a plurality of computers. Communications system 50 also, for example, can record which users have received or not received the communication so that users may later receive the communication (such as when they log on at a later time). In addition, communications system 50 also has the capability to parallely process the communication as a message that is to be sent to persons via, for example the Internet. Using an HDLC framer/deframer as is provided in accordance with the present invention, a user may generate a voice mail or email communication that the communications system sends as packetized data over the LAN to recipients recognized to be users having a computer on the LAN, while generating a suitable HDLC, ATM framed communication to recipients who are reachable over the WAN, such as over the Internet or other IP connection, etc.

Described elsewhere herein are embodiments in which visual representations of pink slips or yellow stick-ons are generated to represent net messages, etc. This concept, in other embodiments, is extended also to voice mail and email messages. While not expressly illustrated, it should be understood that the present invention includes the ability to convert voice information (including voice mail type messages) into a suitable data format so that it may be delivered over the WAN or LAN to various computers coupled to communications system 50. Similarly, communications system 50 has the capability also to serve as an email server (in addition to other functions, as described elsewhere herein). Thus, in conjunction with a suitable program running on particular computers coupled to communications system 50, voice mails may be presented as data files to the various particular computers, and emails and net messages may similarly be presented to the various particular computers (such as described elsewhere herein). In certain alternate embodiments one, two or three visual "stacks" may be presented, for example, with one stack constituting a visual representation of a stack of voice mails (with suitable icons for play, pause, backward, forward, delete, file, freeze/hold, etc., as well as other icons analogous to those described for net messages), with a second stack constituting a visual representation of a stack or net messages (such as described elsewhere herein), and/or with a third stack constituting a visual representation of a stack of email messages (with icons similar to those described for net messages, etc.). Such stack preferably may be minimized or expanded, and desirably provide a unified visual interface for a variety of communications, etc.

It also should be noted that DSP 76 is desirably utilized in accordance with various embodiments of the present invention. Data streams may be desirably coupled to a resource such as DSP 76 in order to have, for example, processes such speech/voice recognition, text to speech conversion, speech to text conversion, compression, translation, etc. Thus, data streams from the LAN, WAN, modem, etc. may be desirably coupled to resources such as DSP 76 to provide such processes.

It also should be noted that, in preferred embodiments, DSP 76 is coupled to switch/multiplexer 74 in a manner so that it may "tap" into the various TDM data streams. This provides a significant improvement over systems in which data streams must be directed into a resource such as DSP 76, and then sent from DSP 76 over a separate channel, etc. (thereby utilized two channels, etc.). In such embodiments, DSP 76 can tap into or monitor data streams on particular TDM channels and provide, for example, processing to accomplish recognition (voice or speech, etc.), detection (such as of a fax or modem call, etc.), compression (including compression, transcoding, streaming and storing, etc.), packetizing (such as to prepare a data format such as for an email, etc.). In one illustrative example of such embodiments, communications system 50 may be programmed so that particular users (e.g., president, technical support, warranty claims line, etc.) automatically have voice mails stored as voice mails and also as an email or other data form. Thus, a voice call may be directed into voice mail, while DSP 76 concurrently processes the voice data stream into another form (e.g., email, data file, etc.), which may be stored, send over the WAN or LAN, etc. Having DSP 76, and particularly configured (such as with switch/multiplexer 74) so as to tap into the various channels, provides significant advantages in a variety of applications.

Figure 20:
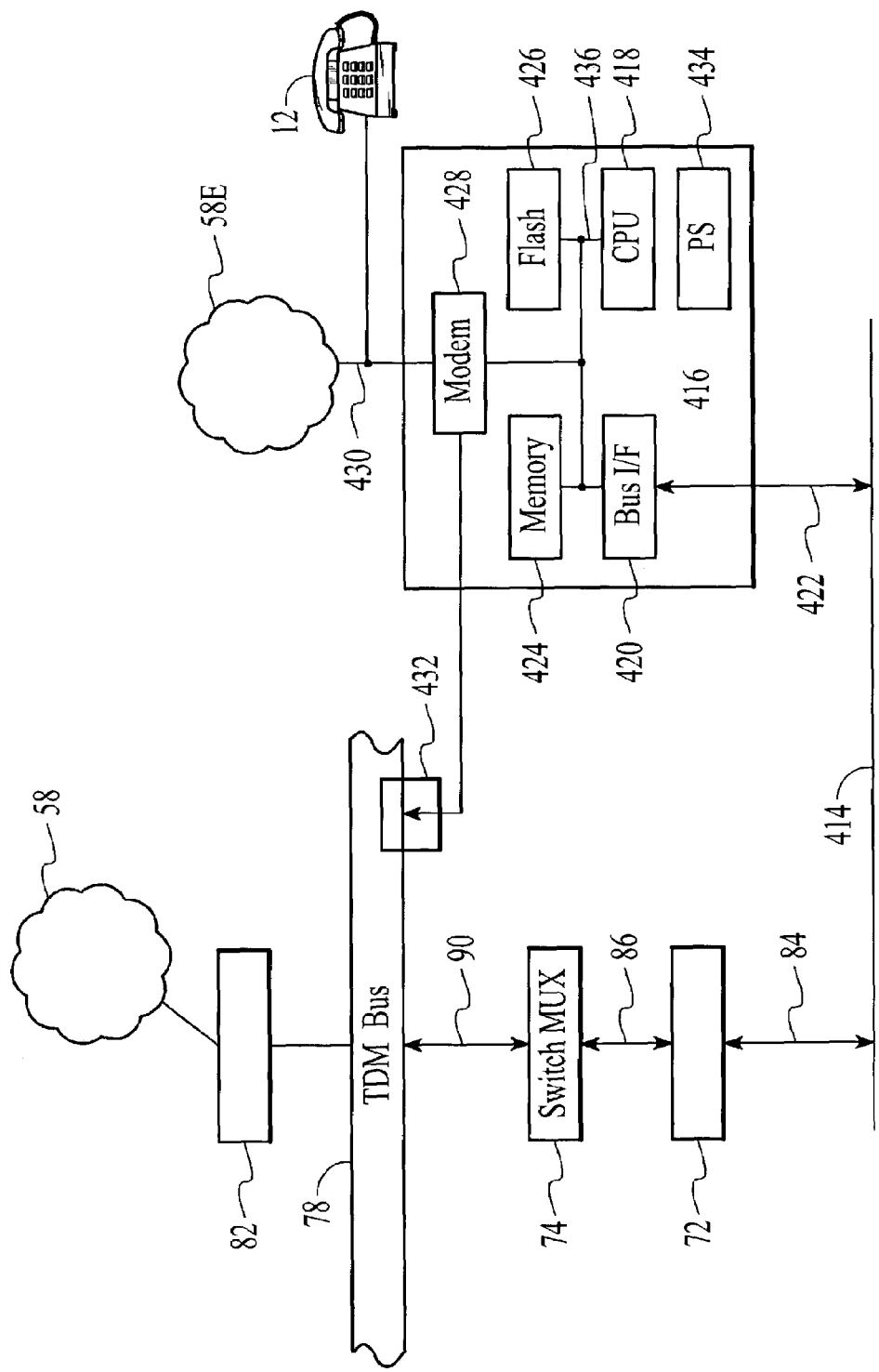
FIG. 20 illustrates a backup communication module in accordance with preferred embodiments of the present invention.

Referring now to FIG. 20, an embodiment of the present invention including a backup communications capability will now be described.

As illustrated in FIG. 20, backup communication module 416 preferably is provided in communications system 50. In the illustrated embodiment, backup communication module 416 is coupled to bus 414, which may be a part of processor/system resources 70 (such as, for example, bus 408 of FIG. 3A, etc.), and may be a ISA or PCI-type of bus, etc. Coupled to bus 414 are other components of communications system 50, such as bus 84, buffer/framer 72, switch/multiplexer 74, buses 86, 90 and 78, cards 82, WAN services 58, etc. In general, the various components discussed in connection with FIG. 3 are applicable with embodiments incorporating backup communication module 416, although such components are not illustrated in FIG. 20.

Backup communications module 416 preferably includes bus interface 420 for coupling information to/from bus 414, memory 424 for storing various information, as will described hereinafter, CPU 418, FLASH or other programmable memory 426, and modem or other communication unit 428. Module 416 preferably includes a standby or backup power supply 434, although in certain alternate embodiments communication unit 428 is coupled to, for example, link 430 of WAN services 58E, which may be a dedicated telephone line, POTS line, etc., which provides sufficient power to module 416 so that power supply 434 is not required. In such alternate embodiments, the various components of module 416 are implemented in low power CMOS technology or the like, and consume sufficiently low amounts of power so that module 434 may operate at a suitable speed in order to provide backup communications using only the power provided by link 430, such as, for example, in the event of a power failure in communications system 50 or the office in which communications system 50 is located, etc.

Preferably, memory 424 receives and stores via bus interface 420 a variety of information regarding the status and operation of communications system 50. For example, memory 424 may store power-on self test data (i.e., status, trace or other information generated during power-on, boot-up, etc.), SNMP data for the PBX, WAN resources, voice mail, LAN resources, etc.), monitor or trace data (such as described elsewhere herein). Preferably, module 416 receives periodic updates from communications system 50, including information sufficient to debug, reboot, etc., communications system 50. Various trace, monitoring, diagnostic or other information may be made available to module 416 for storage in memory 424.

The data in memory 424 preferably is organized in a hierarchical manner, with, for example, various levels of information. Certain information may be so critical that it is retained in memory 424 until deleted (e.g., a level 1 category of information, such as critical fault data, etc.). Other information may be retained for a predetermined period of time and then purged, unless, for example, a level 1 event has occurred (e.g., a level 2 category of information). Still other information may be retained for a predetermined period of time (the same as or different from the level 2 period) and then purged, etc. What is important is that a variety of information be provided to memory 424 and hierarchically retained, which less critical information periodically purged in order to make room for additional information in memory 424, etc.

Still preferably, CPU 418 executes what is know as a watch dog timer (WDT) function. In preferred embodiments, a fault monitoring subsystem of communications system 50 periodically provides a signal/update indicative of the status of communications system 50 (e.g., normal, active, ok, etc.). In the event that such a signal or information is not provided in a predetermined interval of time, CPU 418 may recognize this event as an abnormality and begin a process to communication with communications system 50, and/or initiate a remote communication such as over communications unit 428 in order to alert a remote user or system of the abnormality, etc.

Preferably, FLASH or other programmable memory 426 is provided in module 416. Memory 426 preferably stores operational programs for module 416, including, for example, diagnostic, debug, monitor or other routines in order to facilitate a debug, reboot, etc. of communications system 50. Preferably, the algorithms and/or programs in memory 426 may be periodically updated, either over bus 422, but preferably through link 430 and communications unit 428. Programming of memory 426 remotely, such as over communications unit 428, enables a remote technician, for example, more flexibility in remotely monitoring, debugging, rebooting, etc. communications system 50.

As previously described, module 416 preferably has a dedicate line (e.g., a POTS line) for such backup communications, and telephone 12 optionally may be coupled to such line for emergency voice calls or the like, etc. In alternate embodiments, however, communications unit is also (or alternatively) coupled to channels of TDM bus 78. In certain embodiments, a predetermined channel or channels of TDM bus 78 are dedicated for such backup communications. In other embodiments, communication unit 428 is coupled to TDM bus 78 through switch 432, and in such embodiments dedicated TDM channels are not required.

As will be appreciated, information contained in memory 424 may be remotely viewed, either through communications unit 428 or through a connection established through buses 422 and 414, etc. Bus interface 420 enables data transmissions to/from module 416 when communications system 50 is operating in a normal manner, while also having the ability to isolate module 416 from bus 414 in the event of a serious abnormality in communications system 50. It also should be noted that communications unit 428 preferably is a modem, but communications unit 428 also could consist of a signaling device to a pager or other wireless communication device, or could be a unit for establishing IP or other packet communications, etc. What is important is that communications unit 428 have capability to transmit desired information over the choice medium for link 430 in order to provide desirable backup communications and monitoring of communications system. 50 in accordance with the present invention.

In accordance with such embodiments, the remote user may configure tracing in desirable and flexible manner. Through the use of trace filters, various software components and drivers in effect may be told what trace information to provide, which information is preferably provided to a central storage location in communications system 50 and made available in real time or by file access to such a remote user.

Referring now to FIGS. 25 to 35, exemplary embodiments of programmable digital telephones coupled to communications system 50 and an accompanying GUI configuration will be described.

Figure 25:
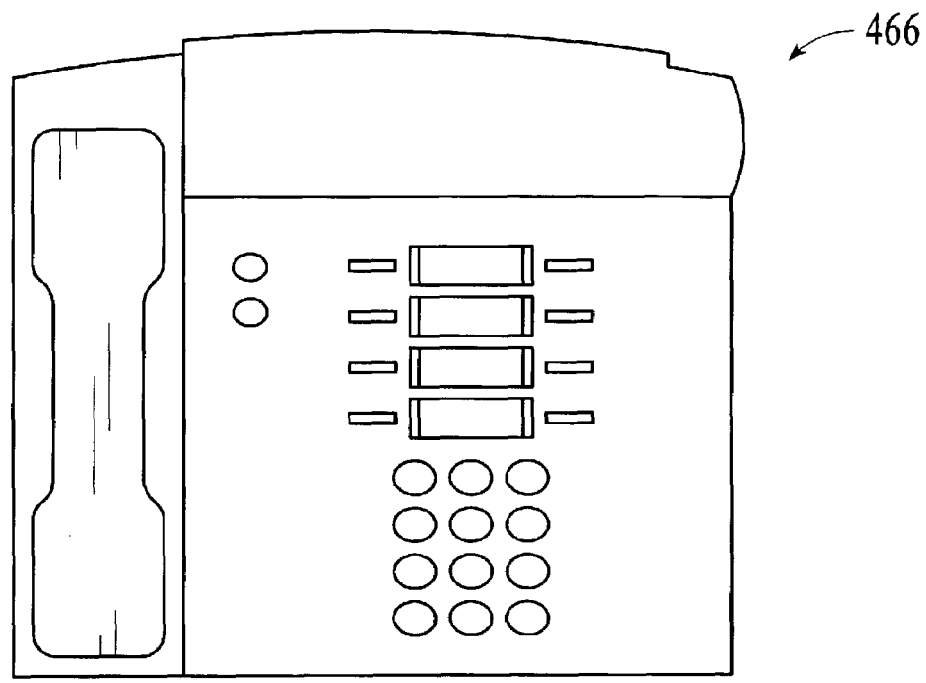
FIGS. 25-36 illustrate digital phone features and programming features of digital phones in accordance with preferred embodiments of the present invention.
Figure 26:
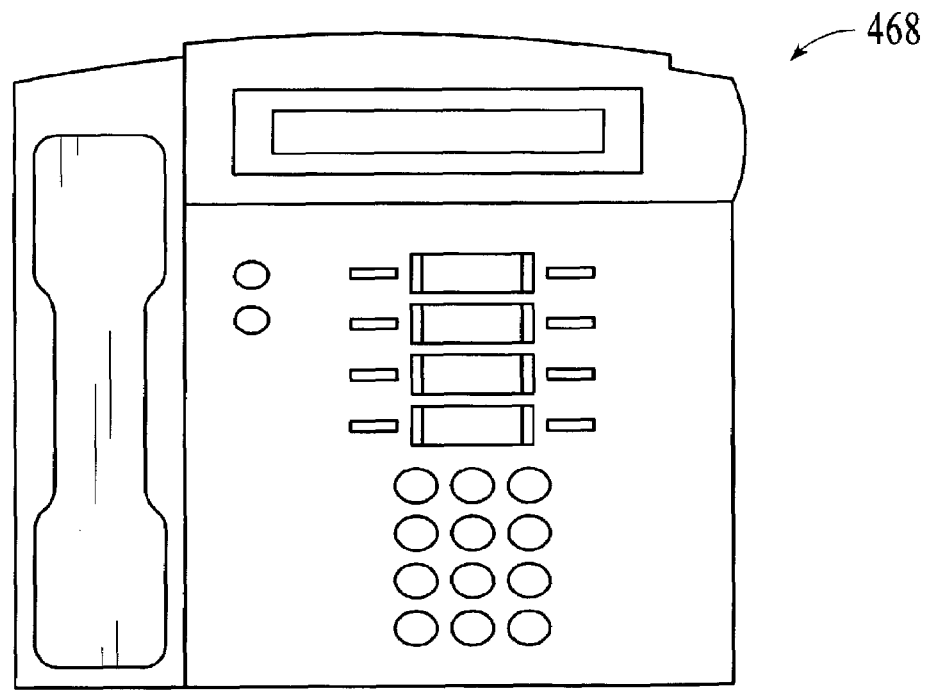
Figure 27:
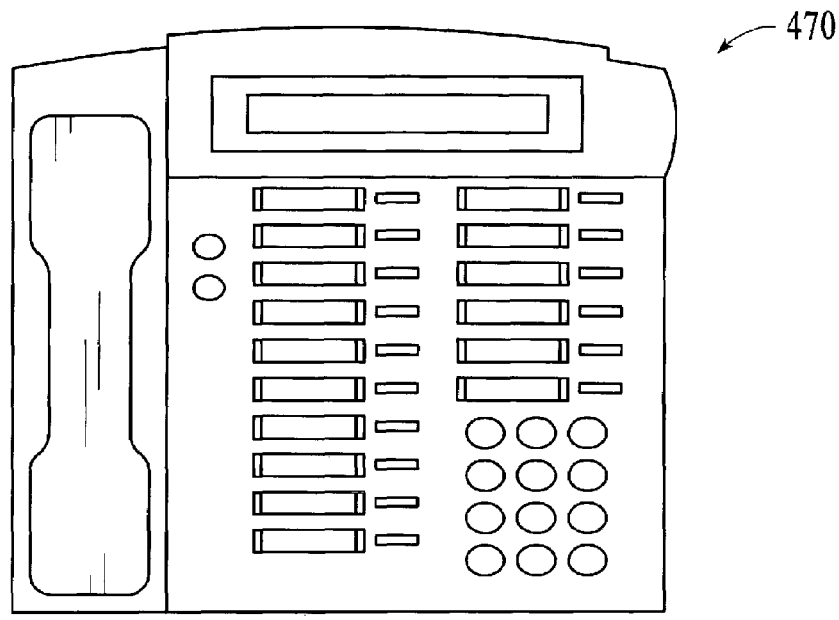
Figure 28:
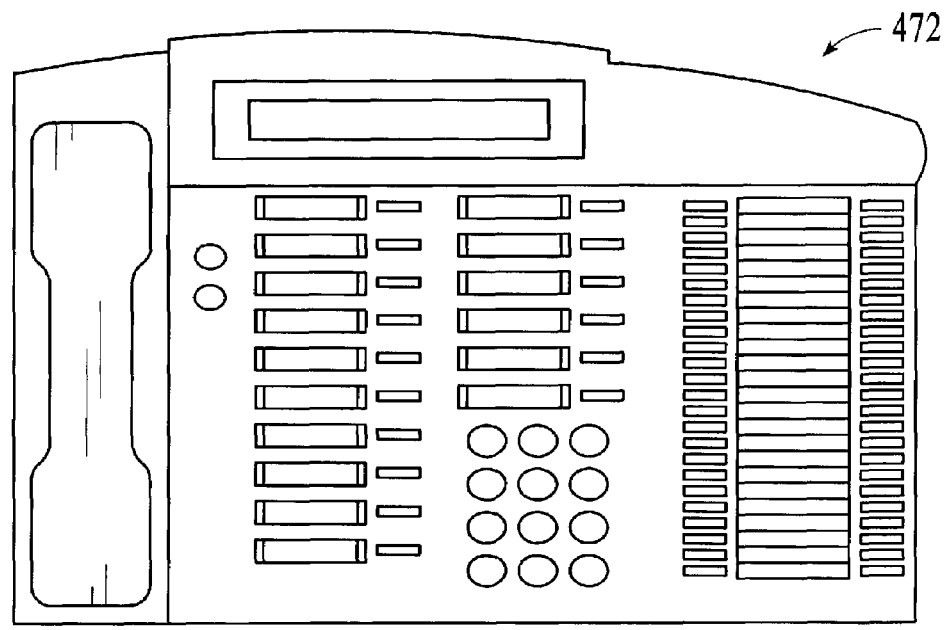

FIGS. 25 to 29 illustrate preferred embodiments of the physical design of four programmable digital telephones. FIG. 25 illustrates 8-button telephone 466. FIG. 19 illustrates 8-button telephone 468 with display. FIG. 20 illustrates 16-button telephone 470 and FIG. 21 illustrates 64-button telephone 472. Preferably each digital telephone can be programmed individually through a series of GUI windows in the user configuration module, which will be described below.

Figure 29:
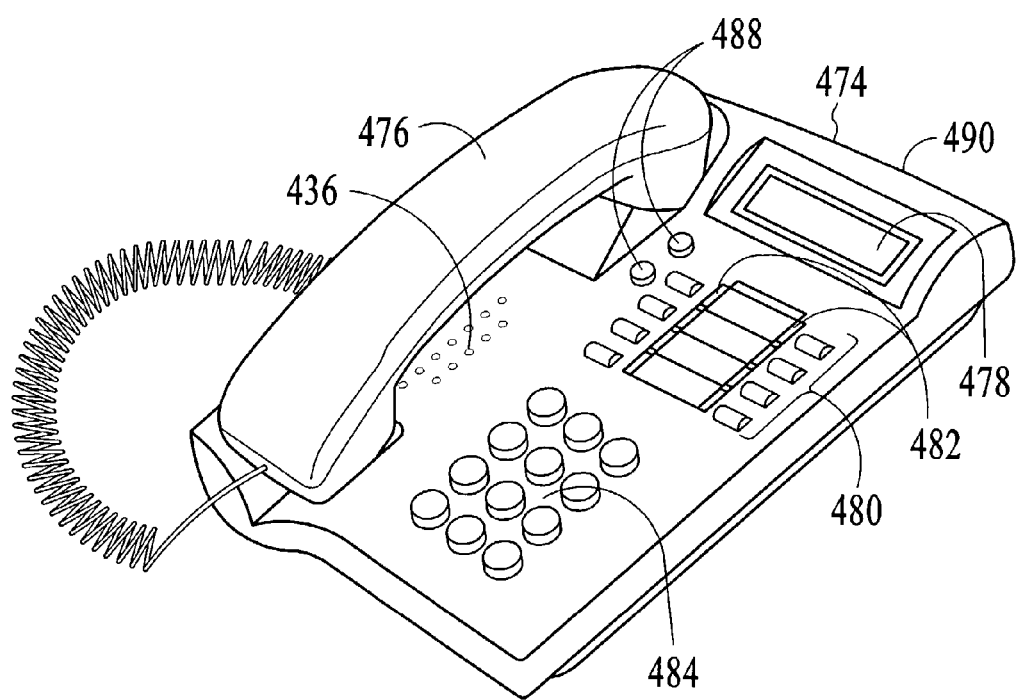

FIG. 29 depicts exemplary embodiments of the digital telephones in further detail, illustrating the physical features that preferably accompany each telephone set. Preferably each telephone consists of telephone chassis 474, handset 476, display 478, feature keys 480, feature key LEDs 482, dial pad 484, speaker 486, volume control keys 488, and microphone jack 490. In preferred embodiments of the digital telephones, the features include tri-colored LEDs, wherein each color corresponds to one of three states (on, off, or flash) and indicates the state of each line key, such as idle, dial, ring, connect, block, hold, bypass, etc. It should be appreciated that in alternate embodiments, the physical features may include additional LEDs, buttons, speakers, microphones, switches, jacks, ports, antennas, card slots, and cardbuses, etc.

The digital telephones preferably provide the following pre-programmed features:

(1) Idle: When two telephones are connected, and the user disconnects and returns to idle, the second telephone also returns to idle, so that it is unnecessary for the user to hang up the handset or press release.

(2) Hold: To place the current call on hold and answer the call waiting call, the user may press the call waiting button. The primary line LED may flash (e.g.: red) and the call waiting LED may be lit and connected (e.g.: green). To place the call waiting on hold and switch back to the original call, the user presses the primary line key. This feature of toggling back and forth between the two calls can continue as many times as desired.

(3) Hot dial pad: While the telephone is idle, the user may press a digit to automatically place the telephone in handsfree mode and initiate a dialing sequence. When the last digit is dialed, then the call is placed. The call may be switched to the handset at any time by lifting the handset.

(4) Autodial: Pressing the 1 key while the telephone is idle automatically puts the telephone in handsfree mode and dials the number programmed into the autodial button, thus placing the call. The call progress tones are audible through the speaker. The call may be switched to the handset at any time by lifting the handset.

(5) Message waiting: The message waiting indicator doubles as an easily accessible way to call and access voicemail. The user presses the MWI key while telephone is idle, which automatically places the telephone in the handsfree mode and accesses voicemail.

(6) Conference call: For a conference call, the user establishes a connection with the first party, either by receiving or making a call, then presses the conference button and dials the second party. After the call is answered, the user presses the conference button again. The display updates on the telephone on each connected party to show there are three members in the conference. To add a fourth party, the user may repeat these steps, starting with pressing the conference button.

(7) Transfer: To transfer a call that is presently connected, the user preferably presses transfer and dial the target extension, waits for the answer, then presses the transfer button again. If the user wishes to perform a blind transfer, then the user presses the transfer button again while the call is still ringing.

(8) Blind transfer: If the user frequently does blind transfers, the transfer button may be programmed to always perform a blind transfer. In this case, the second push of the transfer button is unnecessary.

(9) Call waiting: For call waiting, a call to an extension while connected in another call will show as ringing on the call waiting button. The call waiting button is then treated as a pseudo-line key.

Figure 30:
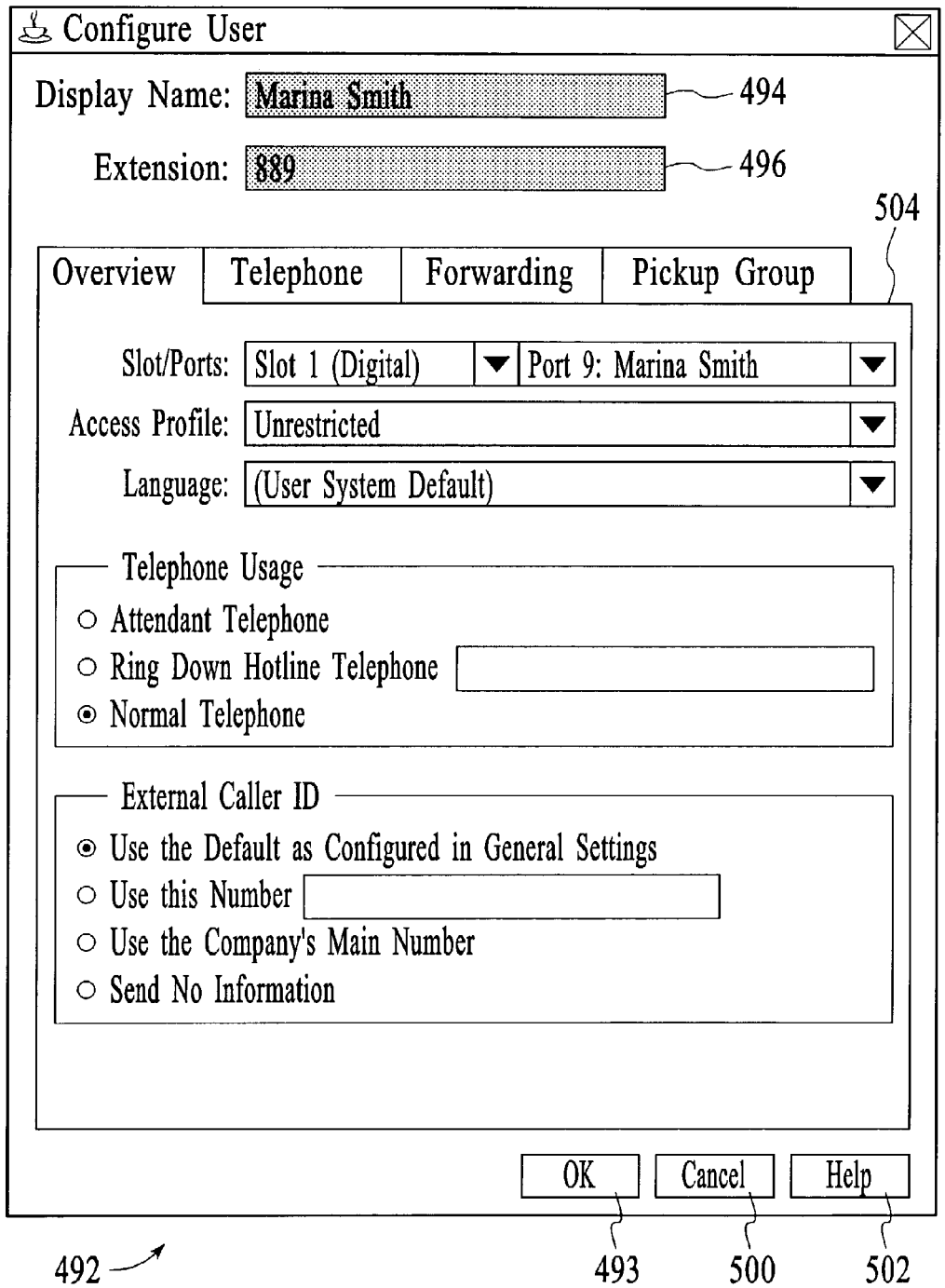

Referring to FIG. 30, preferred embodiments of the GUI configuration of the programmable digital telephones will now be described. It should be understood that such a configuration application may be run any computer connected to communication system 50, similar to the configuration windows described elsewhere herein. Thus, in addition to programming features and buttons of such digital phones with telephone keypad depressions (with the digital phone put in a program mode that conveys phone configuration information to communication system 50 such as by commands sent via the telephone), such a graphical interface may more desirably guide a user through the steps of programming the digital phones, with the configuration data resulting from the configuration send to communication system 50 such as over a packet bus as previously described.

As illustrated in FIG. 30, configure user window 492 is provided to configure feature keys 480 of digital telephones 466 to 472. Configure user window 492 may be opened by a user or administration of an office attendant-type program or remote configuration-type program running on a computer coupled to communication system 50. Window 492 preferably includes user name display 494, extension display 496, OK button 498, cancel button 500, help button 502, and tabbed windows 504, such as overview, telephone, forwarding, pickup group, etc. To program the digital telephones, the user preferably selects the tabbed window labeled telephone, whereupon telephone window 506 will appear.

Figure 31:
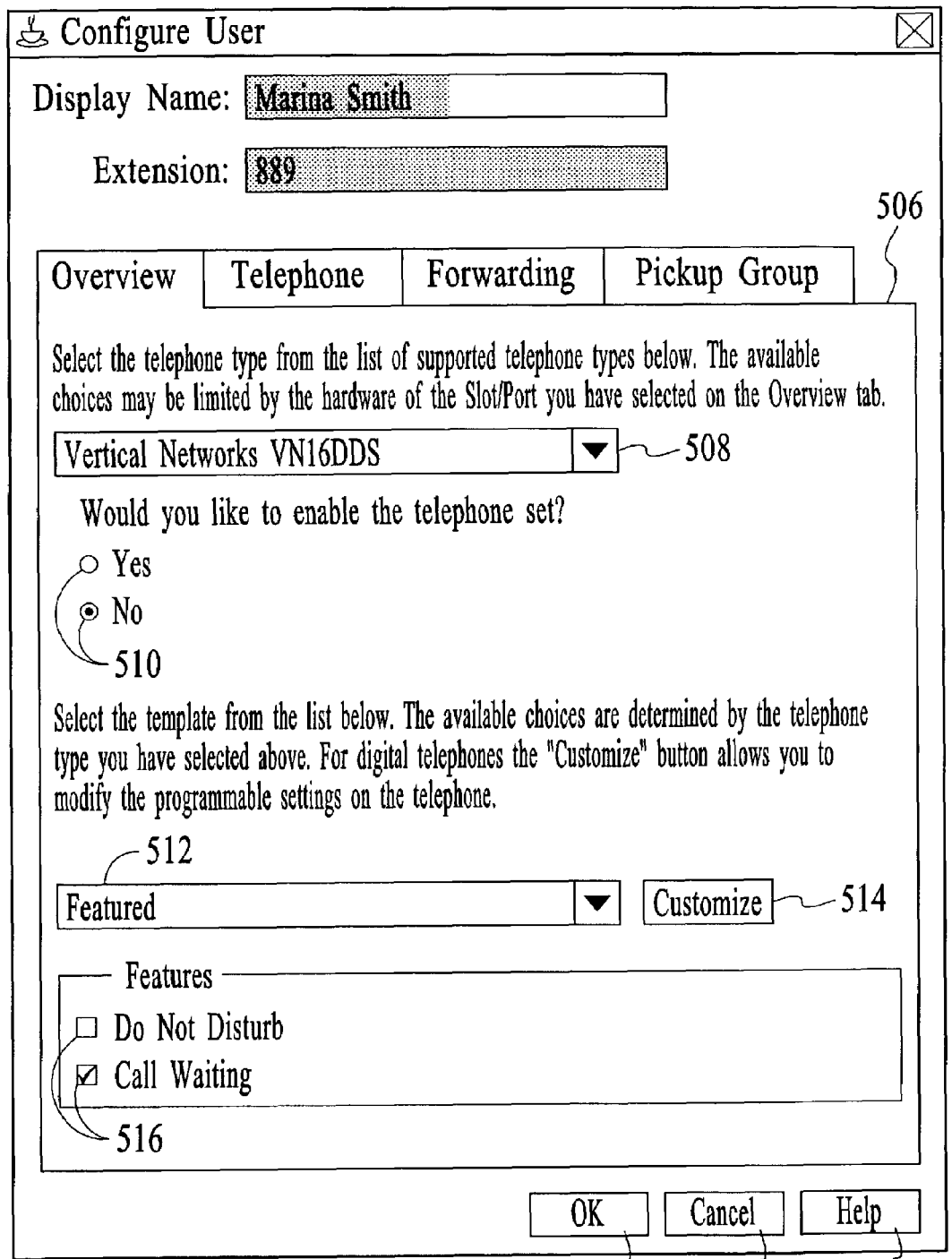
Figure 32:
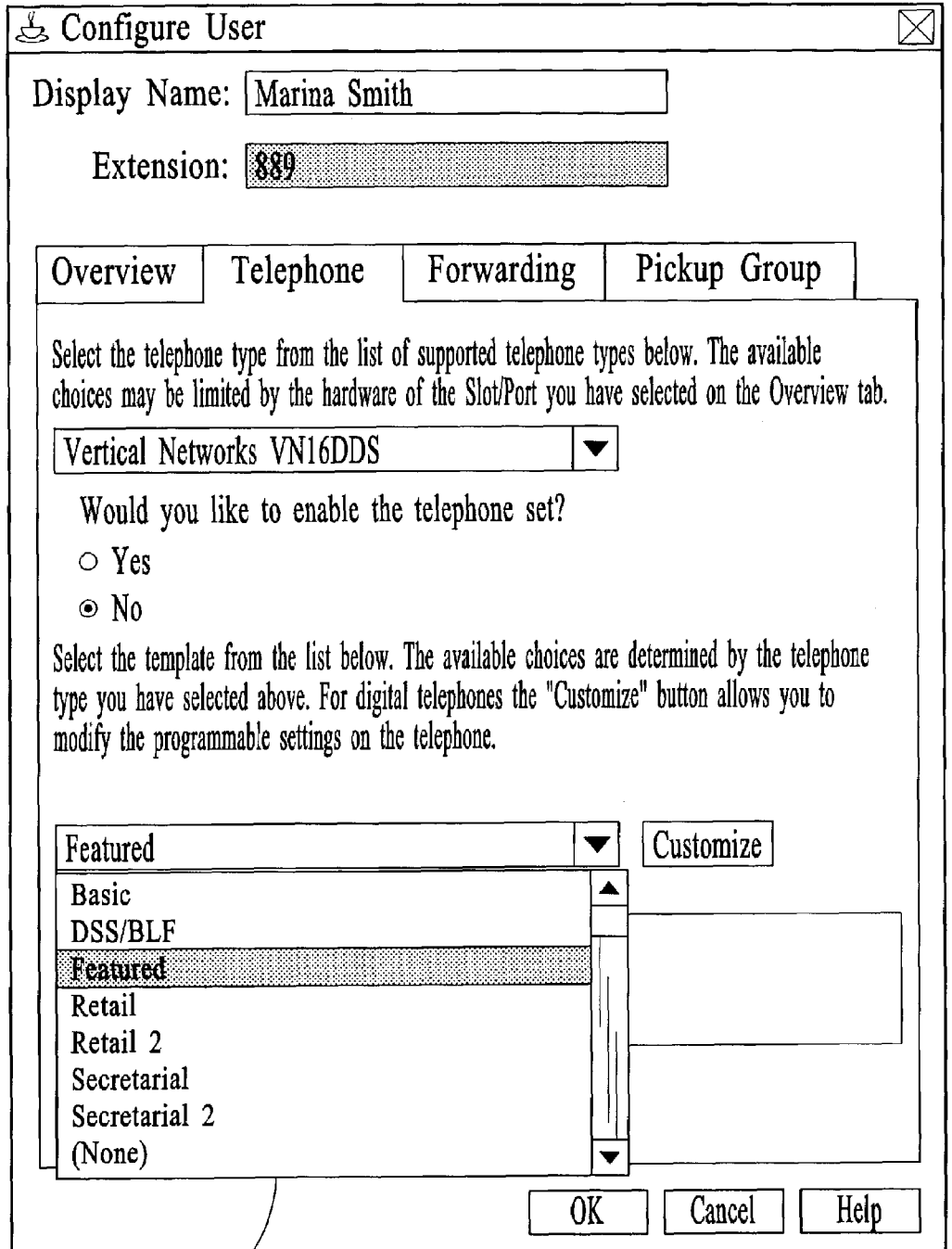

FIG. 31 illustrates telephone window 506, which is provided for identifying the features of digital telephones 466 to 472. As noted in telephone window 506, the user is instructed to select the telephone type from a predetermined list of telephone types, which may be limited by the hardware of the slot or port. The list of telephone types appears in pulldown menu 508. The user preferably selects radial button 510 to enable or disable the supported digital telephone. The user may also select the types of features from a predetermined list of templates in pulldown menu 512, which are determined by the type of digital telephone selected by the user. After the user selects a feature from pulldown menu 512, the user may select customize button 514 to modify the programmable fields for the feature key settings on the selected digital telephone. Additional features, such as call waiting and do not disturb, are noted with checkboxes 516, in the features section of telephone window 506. FIG. 32 further illustrates pulldown menu 512, which preferably includes a plurality of features, such as basic, DSS/BLF, retail, secretarial, etc. In accordance with the present invention, data for configuring digital telephones 466-472, which has been selected and/or entered by the user, is saved in communication system 50. Communication system 50 stores configuration data for the particular programmed digital phone, which is then later accessed as the phone is utilized in order for communication system 50 to decode the button depressions on the digital phone and to take appropriate action in response thereto.

Figure 33:
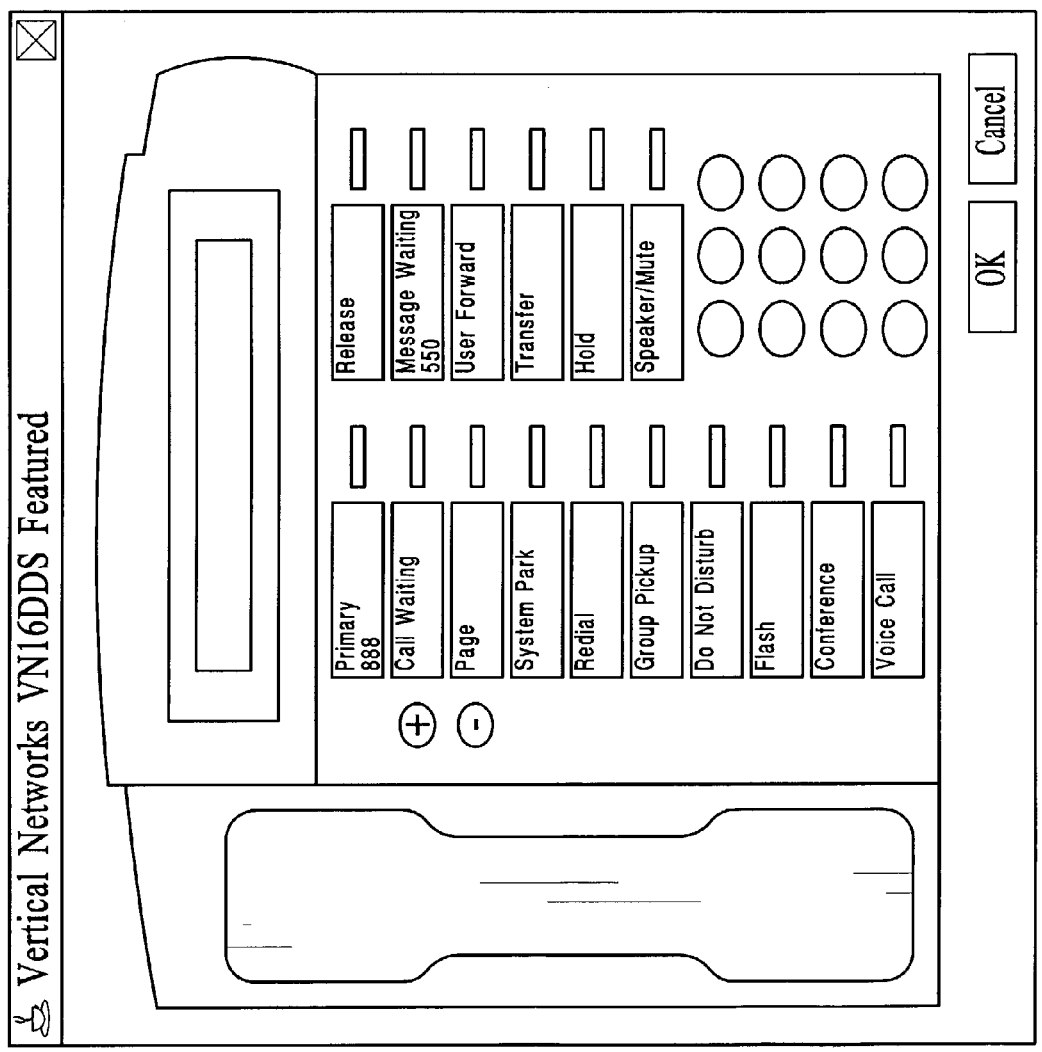

With reference to FIG. 33, after customize button 514 is selected by the user, telephone button window 516 appears, displaying a digital image of the selected telephone, such as 16-button telephone 470. (The selected telephone will correspond to the type of telephone chosen by the user in pulldown menu 508 as illustrated in FIG. 31.) Telephone button window 516 provides programmable fields for each feature key of digital telephones 466-472. By selecting a key in the GUI, the user may choose from a predetermined list of features provided in telephone button window 518. Accordingly, data for configuring digital telephones 466-472, which has been selected and/or entered by the user, is accordingly saved in communication system 50.

Figure 34:
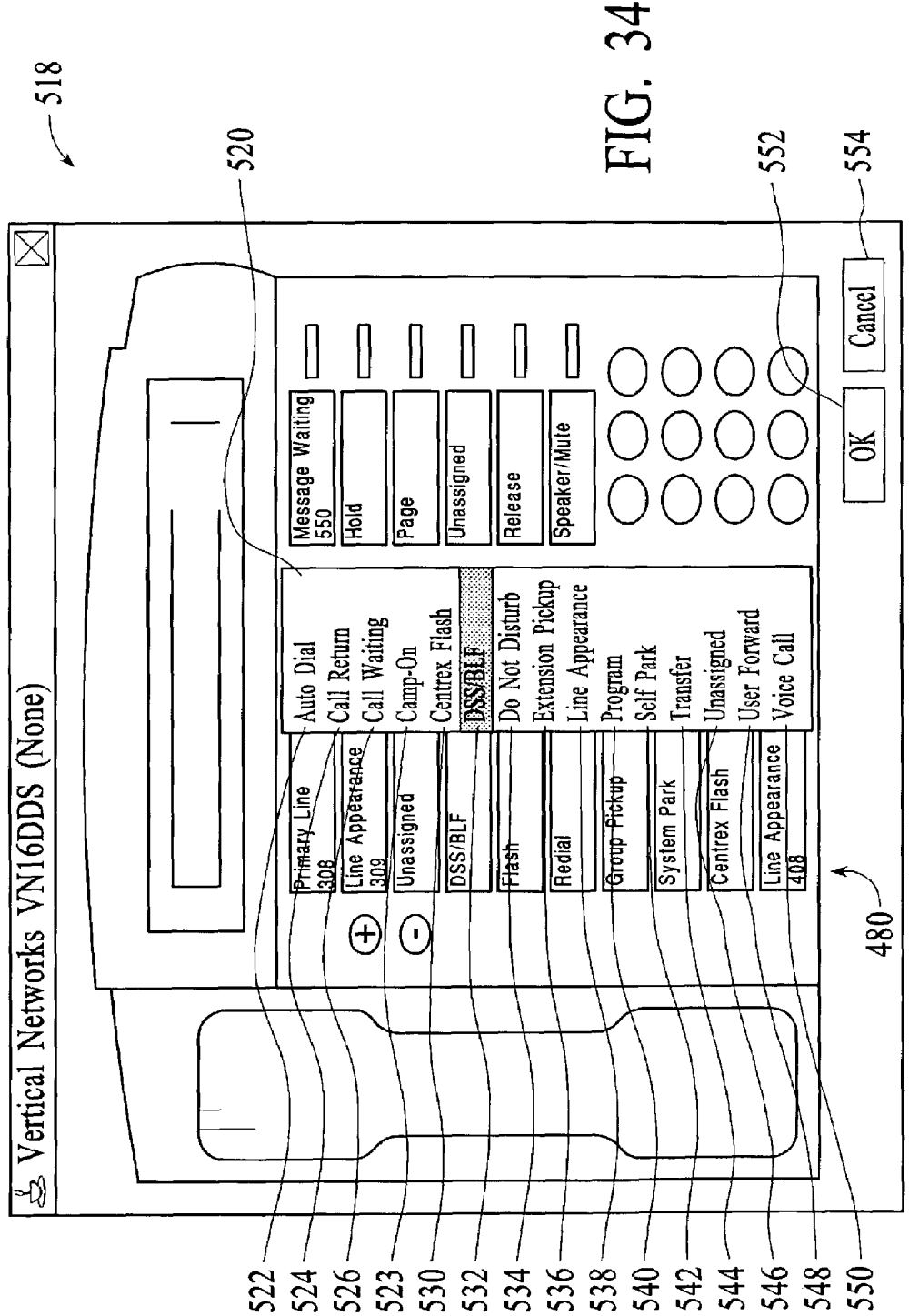

As illustrated in FIG. 34, telephone button window 518 preferably includes customizable pop-up menu 520, which indicates the various programmable features available for the digital telephones. Preferably pop-up menu 520 is positioned adjacent to feature keys 480. The programmable features, for example, may include auto dial 522, call return 524, call waiting 526, camp-on 528, Centrex flash 530, Designated station select/busy lamp field 532, do not disturb 534, extension pickup 536, line appearance 538, program 540, self park 542, transfer 544, unassigned 546, user forward 548, and voice call 550.

In accordance with preferred embodiments of the present invention, auto dial 522 is provided to automatically dial a pre-configured telephone number. Call return 524 rings back the extension of the last inbound call, if the call originated within the office attendant-type system. Call waiting 526 places an existing call on hold in order to connect to an incoming call. Camp-on 528 is similar to call return 526, but provides the option of ringing back an extension as soon as the extension becomes available. Centrex flash 530 accesses call transfer features provided by Centrex telephone services, which is available through most TSPs. Designated station select/busy lamp field (or DSS/BLF) 532 monitors the status of specified extensions and transfers calls to those extensions. Do not disturb 534 prevents a telephone from ringing. Extension pickup 536 answers a specific ringing extension within a call pickup group. Line appearance 538 is a secondary line for extensions without a designated station port or a physical telephone; it provides a voicemail rollover function for either primary or virtual extensions. Program 540 enables programmable features, such as auto dial, forward, and voicecall keys. Self park 542 places a call in a parked state on the user telephone for retrieval from another telephone. Transfer 544 transfers calls to another extension. Unassigned 546 provides the option of leaving the extension unassigned. User forward 548 dispatches calls to another extension or telephone number. Voicecall 550 enables an intercom to page a specific extension. It is important to note that some of these programmable features may be selected and used simultaneously, depending upon which features are enabled and disabled.

Figure 35:
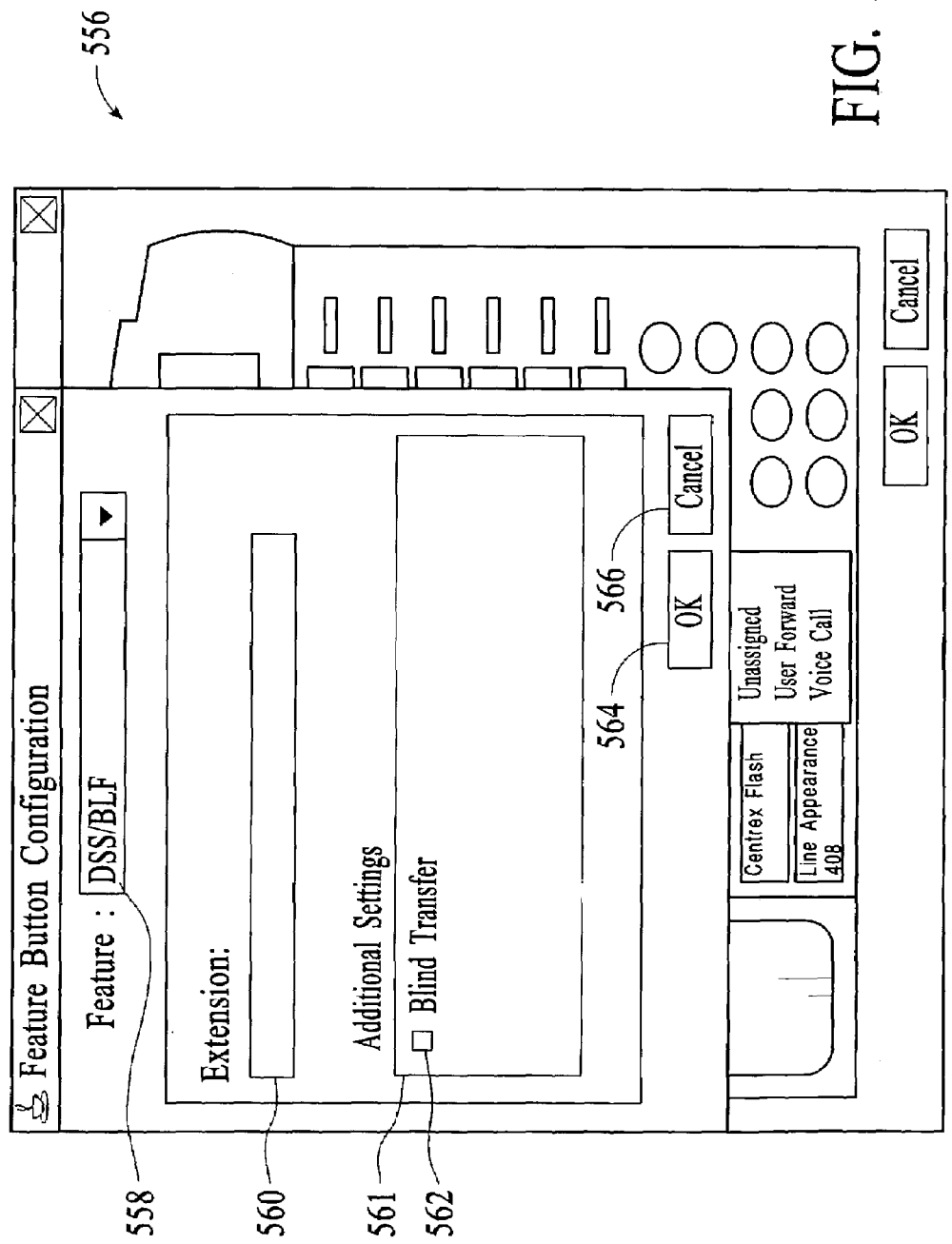

As further illustrated in FIG. 34, if a feature is selected in telephone button window 518, then the feature preferably is highlighted as exemplified by DSS/BLF 532. The user then preferably presses OK button 552 to make the selection or cancel button 554 to cancel the selection. However, if a feature is selected, then configuration window 556 appears as illustrated in FIG. 35. Accordingly, data for configuring digital telephones 466-472, which has been selected and/or entered by the user, is accordingly saved in communication system 50.

FIG. 35 illustrates preferred embodiments of the GUI for configuration window 556. Each configuration window for feature buttons preferably contains name display 558, extension display 560, and additional settings in the form of check boxes or radial buttons, such as check box 562. After determining the features in configuration window 556, the user must select OK button 564, which sets the features, or cancel button 566, which resets the features to the default mode. Although additional settings window 561 is illustrated with one feature setting, it should be understood that a plurality of feature settings may be programmed into the office attendant-type system and displayed in configuration window 556.

Figure 36:
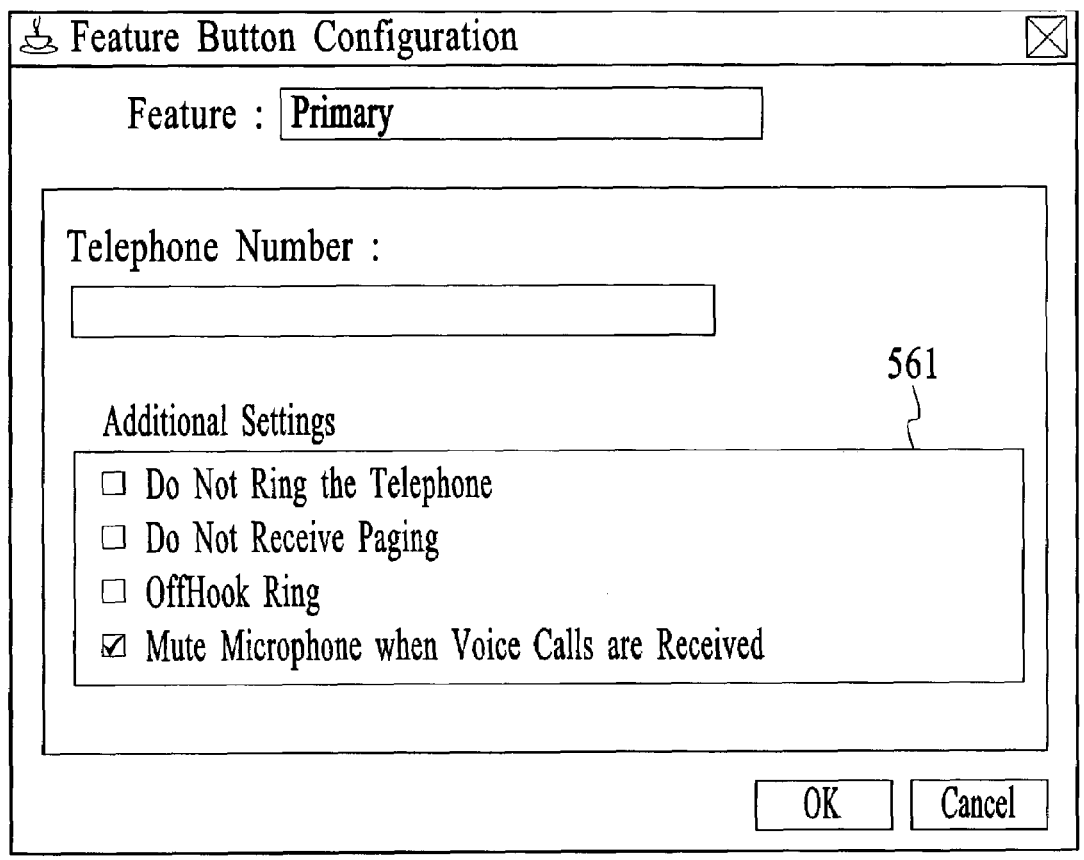

As illustrated in FIG. 36, additional settings window 561 preferably includes one or a plurality of check boxes for optional features, such as do not ring telephone, do not receive paging, use offhook ring, mute microphone when voice calls are received, etc. In accordance with the present invention, data for configuring digital telephones 466-472, which has been selected and/or entered by the user, is accordingly saved in communication system 50.

In addition, similar GUI configuration windows preferably are provided in order to facilitate production of labels that are typically applied to the digital phone in order to provide a visual indication of the particular functions that have been programmed for the particular buttons of the phone, etc. Preferably, an application runs in conjunction with the phone configuration application, which automatically prints labels for the feature keys in accordance with the programmable fields selected for a specified digital telephone. In a preferred embodiment of the present invention, data about programmable fields generated as part of the phone configuration process are stored in one or more files that are accessible by the label generation application. Such files preferably extract the configuration data, associate it with particular buttons of the particular phone that was configured, with the application preparing a label that corresponds to the particular programmed features for the particular programmed phone. Thus, the label generation application may use this data to print programmable field information (e.g. redial, hold, voice call, etc.) on preferably pre-formatted labels which correspond to the type of digital telephone and the selected feature keys of feature keys 480. Labels may be printed in a plurality of formats of generic telephone labels and in accordance with the programmable features and types of digital telephones. For example, a user may print pre-formatted labels for 16-button telephone 470, so that the pre-formatted labels correspond to feature keys 480 on 16-button telephone 470. Label generation window preferably provides the user with step-by-step instructions for printing labels via a series of linked windows. It is important to note that the label generation window also preferably provides a one-click button for printing labels, so that a button in the label generation window may be pressed by the user to print the feature key label. Thus, a computer, such as computer 24 in FIG. 3, when coupled to communication system 50, may print digital telephone labels via a printer, such as printer 22 in FIG. 3. In accordance with the present invention, data for configuring digital telephones 466-472, which has been selected and/or entered by the user, is accordingly saved by communication system 50.

It should be understood that, digital phones as described herein, may connect to appropriate digital phone interface circuitry and be used to provide traditional telephony communications, VoIP telephony communications, and may be used in conjunction with other aspects of communication system 50 as described elsewhere herein.

In accordance with embodiments of the present invention, a variety of highly integrated voice, data, and video communications systems may also be employed. In accordance with additional aspects of the present invention, highly advantageous methods for administering call control and management also are provided, including for Voice over Internet Protocol ("VoIP") type telephone calls.

In accordance with the present invention, an administrator may more optimally control calls made by or to the system in accordance with what herein is referred to as a dialing plan. In particular, the dialing plan in accordance with preferred embodiments of the present invention will provide for improved control over routing of outbound calls. In accordance with preferred embodiments, the dialing plan will provide VoIP call support; global permission and restrictions via a global access profile; area code tables with support for office code ranges; multifunctional route tables, including destination routing, time of day routing; multiple trunk group queuing; trunk overflow; digit Translation; and unified dialing for off-premise extensions (Off-Premise Extension Table).

In accordance with such embodiments, every extension for phones connected to the system is assigned to an access profile. In preferred embodiments, a plurality of access profiles are provided, such as 5 or 10 or 15 or 20, etc., access profiles. Preferably, one or more data profiles are provided for data calls, and an UNRESTRICTED profile is provided for calls to numbers such as 911, 411, etc. The purpose of the access profile is to route the number dialed by the extension to the appropriate trunk group and to control or restrict the calling area of the extension.

In preferred embodiments, the access profile (or trunk access profile) may be administered through an administration screen, which preferably is accessed through an Automatic Route Selection ("ARS") screen. In preferred embodiments, access profiles may be edited, created, deleted or copied to other profiles, and extensions are assigned an access profile to specify dialing capabilities for the extensions. Instead of routing to a specific trunk group based on the initial check of the access profile, in accordance with such embodiments system administrators will now be about to direct an outgoing call through various filters. Once the filtering has been completed, the call can be either sent to a single trunk group or sent to a specific routing table with a number of possible steps to be executed.

In such preferred embodiments, there are a number of dialing area tables for dialing area control. In certain embodiments, three dialing area tables are provided, namely an area code table(s), international country code table, and a trunk group access codes table. Such tables are implemented to give the administrator-type person the ability to control where a user may or may not call. In such embodiments, routing tables are used to control access to trunk resources. A call which is being routed via a specific route table prevents the caller from using resources not accessed via the access profile. In preferred embodiments, such routing tables contain the same redundant profile field, but the purpose here is different. In a routing table, a customer uses the trunk access profile to control resources. For example, a user may be allowed to dial a distant area as defined in the area code table, but is restricted to only using the least expensive trunk group in the routing table. Such use of trunk access profiles may be utilized to desirably control access to and use of various telecommunications resources.

Preferably, a screen is provided for "Local Area Codes". Such a local area code table preferably contains: a Home Area Code—7-digit local calls are routed as if this area code was dialed; and a Local Area Code List—Area codes that are treated as local calls. Preferably such local area codes include area codes not requiring 1+ dialing and area codes requiring 1+ dialing. Thus, in accordance with the present invention the local area codes table may be accessed so that calls may be more intelligently controlled and managed (e.g., in order to avoid treating non-toll local calls as long distance calls, even though the local calls are dialed with 1+ 10 digit dialing like traditional long distance calls).

Further aspects of dialing plan tables used in accordance with preferred embodiments of the present invention will now be described. Such dialing plan tables are desirably accessed by the system when a call is initiated with the system. Such dialing plan tables desirably are used to route (or block) a call to an external destination. Such tables provide the system administrator with an improved range of routing choices without being overly complicated.

Figure 37:
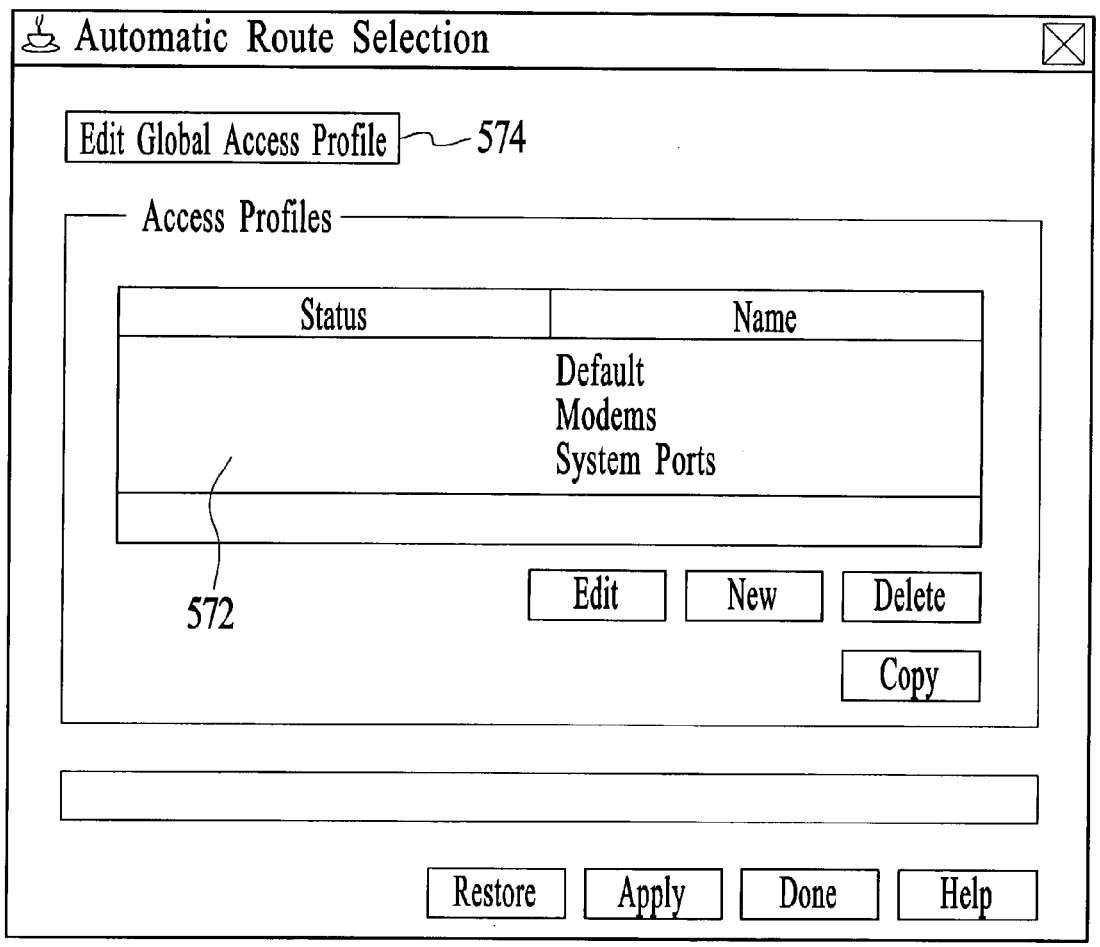

FIG. 37 illustrates Automatic Route Selection ("ARS") window 570 used in preferred embodiments of the present invention. As illustrated, ARS window 570 preferably includes display 572, which displays for the administrator a list of current access profiles in the system. The use of such access profiles is described in greater detail elsewhere herein. ARS window 570 also preferably provides button 574 (selectable with a mouse or pointer, etc.) that may be selected to edit global access profiles. Button 574 is used to add, modify or edit global access settings that preferably are applied to all stations/incoming trunks when an outgoing/tandem (ARS) call is made. As illustrated, window 570 also may include buttons to edit access profiles, add new access profiles, delete access profiles, copy an access profile to another access profile, restore (i.e., ignore changes), apply changes, complete (done) the access to window 570 or to access on-line help information.

Figure 38A:
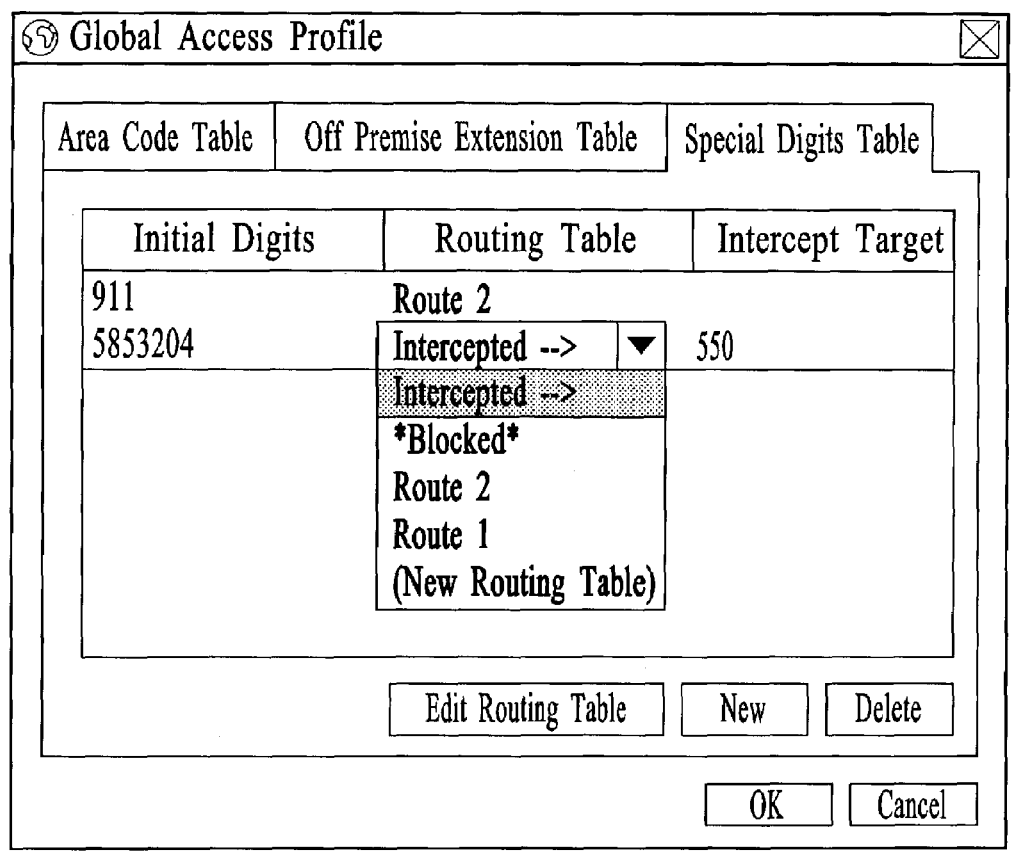
Figure 38C:
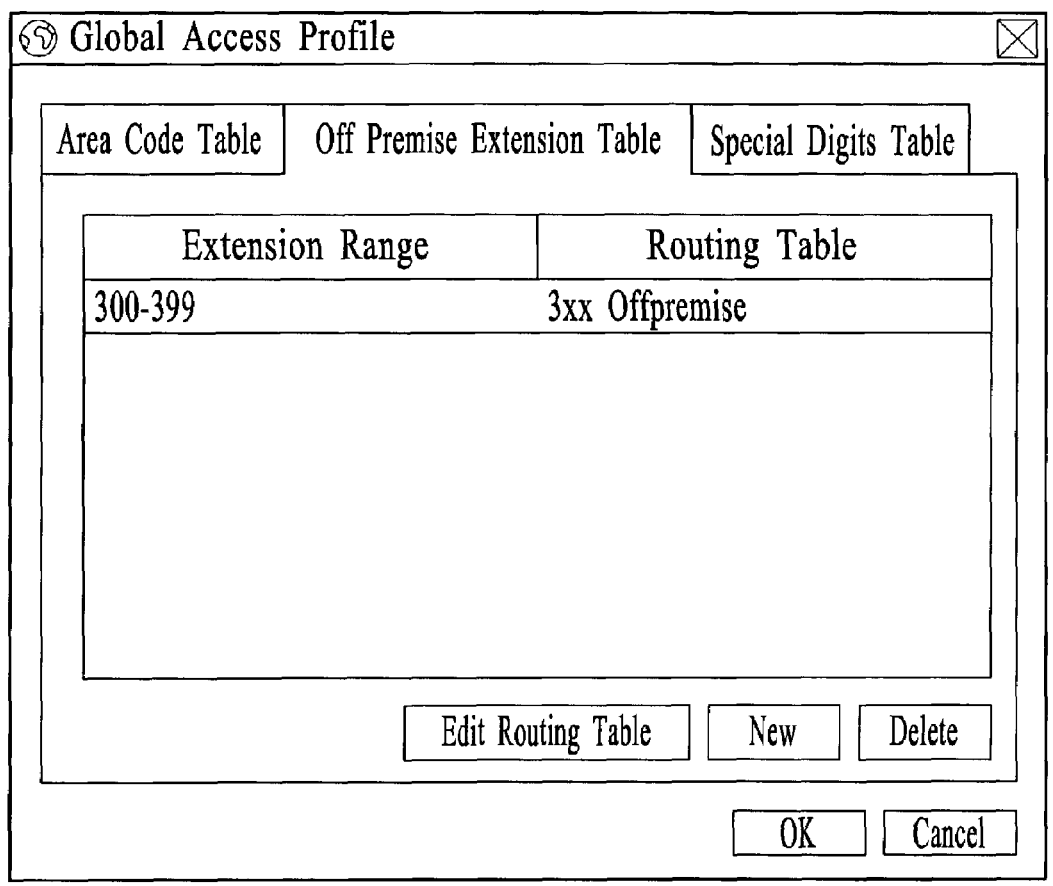

Further aspects of global access profiles will now be described. Global access profiles in accordance with the present invention may be considered an enhancement of an emergency trunk access profile. Entries in the global access profile, in effect, override the dialing extension's configured access profile. In preferred embodiment, the global access table contains three tabs (FIGS. 38A-C). The special digits table (FIG. 38A), in preferred embodiments, is the first table checked for outgoing ARS calls. The special digits table allows the administrator to route or block a call based on the initial sequence of digits. The area code table (FIG. 38B), in preferred embodiments, is the second table checked for outgoing ARS calls. The area code table is more specialized than the special digits table (need more description). The off-premise extension table (FIG. 38C) preferably contains routing information for-extensions located in another PBX/system connected to the extension (e.g., two such systems connected together, either in the same office or location or in geographically removed offices or locations. The extension range in the off-premise extension table preferably conforms to the first digit table in the particular system. Such tables will now be further described.

The special digits table (FIG. 38A) preferably includes an Initial Digits field. The Initial Digits field typically is used to determine if there is a match between a number (minus any trunk access code) dialed by the user with the listed initial digits. Preferably, the special digits table only needs to match the initial digits of the dialed number to consider the number a match. The Routing Table field is preferably used to indicate a route table to be used to send the dialed number out on a trunk in the case of a match. If a route table is not specified, other selections include "Blocked", in which the dialed number is not allowed (preferably the calling person would be supplied with a fast busy signal or other audible or other indication that the call has been blocked; as an example, a net message may be sent to a computer corresponding to the user over a packet bus that indicates that the call has been blocked, perhaps-with additional information such as instructions to contact a system administrator, etc., such as in a manner described previously), or "Intercepted," in which the call is sent to the intercept target. In preferred embodiments, the system initially accesses the special digits table, and may thus have particular dialed numbers intercepted and retargeted to particular extension or other numbers.

An exemplary area code table is shown in FIG. 38B. The area code tables preferably are expandable tables for handling North American Numbering Plan (NANP) numbers. An area code table is preferably accessed via an access profile screen. Every specific profile preferably has an associated area code table. The area code field preferably is a list field. All NANP area codes can be listed here, including an entry for unspecified (default) area codes (i.e., area codes added to the NANP, which were not known when the area code table was created). As for the office code range field, if the dialed number needs to have a more granular examination, then the office code range should be entered in this field. The routing table field specifies the routing table used to send the dialed number out on a trunk. If set to blocked, then the area code is not allowed for the specific profile and the user preferably will hear fast busy.

The off-premise extension table (FIG. 38C) preferably is used to facilitate a unified dialing plan among various systems/PBX's within a single company. The systems/PBX's may be either located in the same building or general geographical location, or they may be located quite some distance apart. In accordance with the present invention, the systems are implemented such that a user to dial another user using the same extension number no matter if the caller is dialing from the same system/PBX or a distant or other system/PBX. With such embodiments, each extension is unique over all of the systems/PBXs within the dialing plan. In accordance with such embodiments, calls may be routed among the systems/PBXs without the caller having to take into consideration location he/she is dialing from and at which location the destination extension resides. Via an off-premise extension table as illustrated in FIG. 38C, the user may simply enter an extension, and via system access to the off-premise extension table, the appropriate routing table may then be accessed to route the call to desired destination in the desired manner (e.g., least cost, etc.). As illustrated in FIG. 38C, an extension range is provided. The extension range preferably provides a single extension or a preferably continues range of extensions which are off-premise extensions. The extensions should conform to extensions as defined in the first digits table discussed elsewhere herein. Preferably, extension Ranges may not overlap. The route table field indicates the route table that will be used to send the dialed number out on a trunk.

Figure 39B:
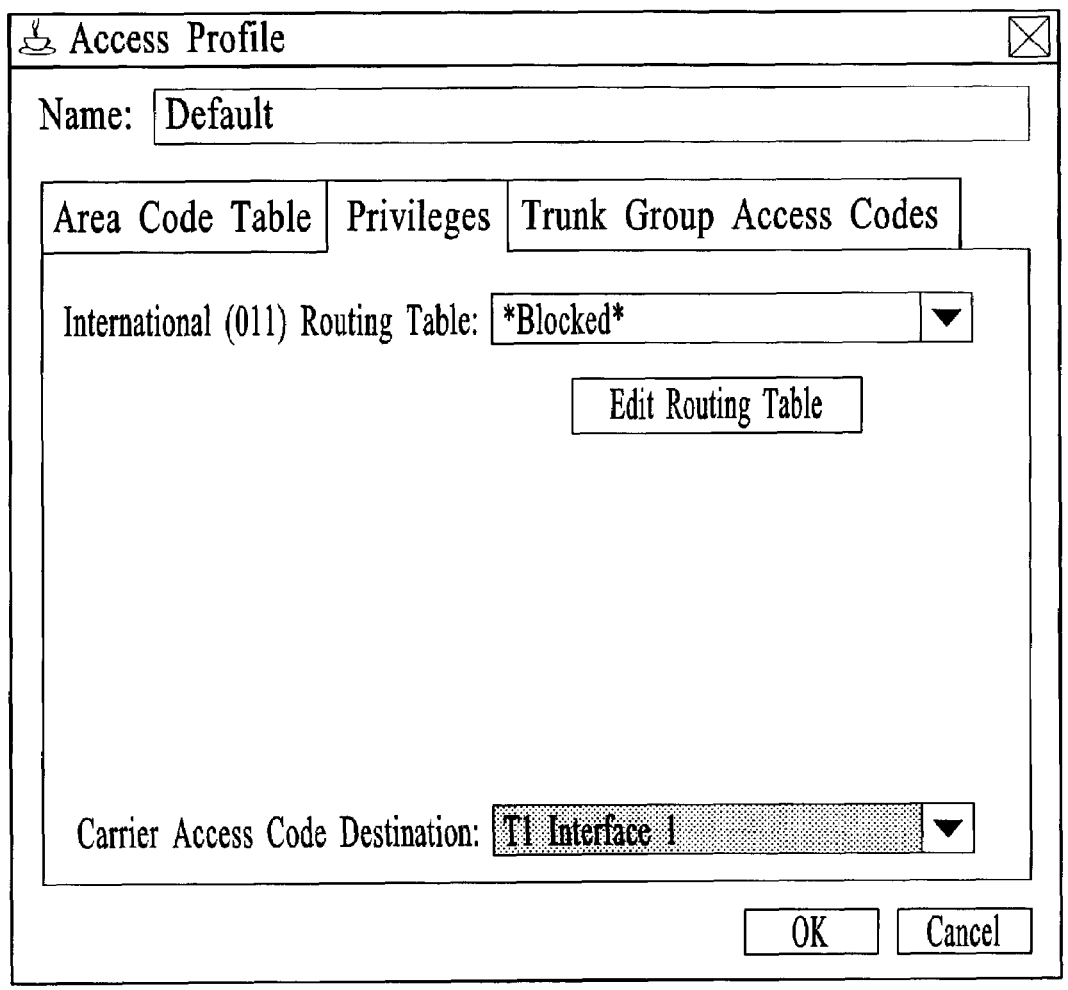
Figure 39C:
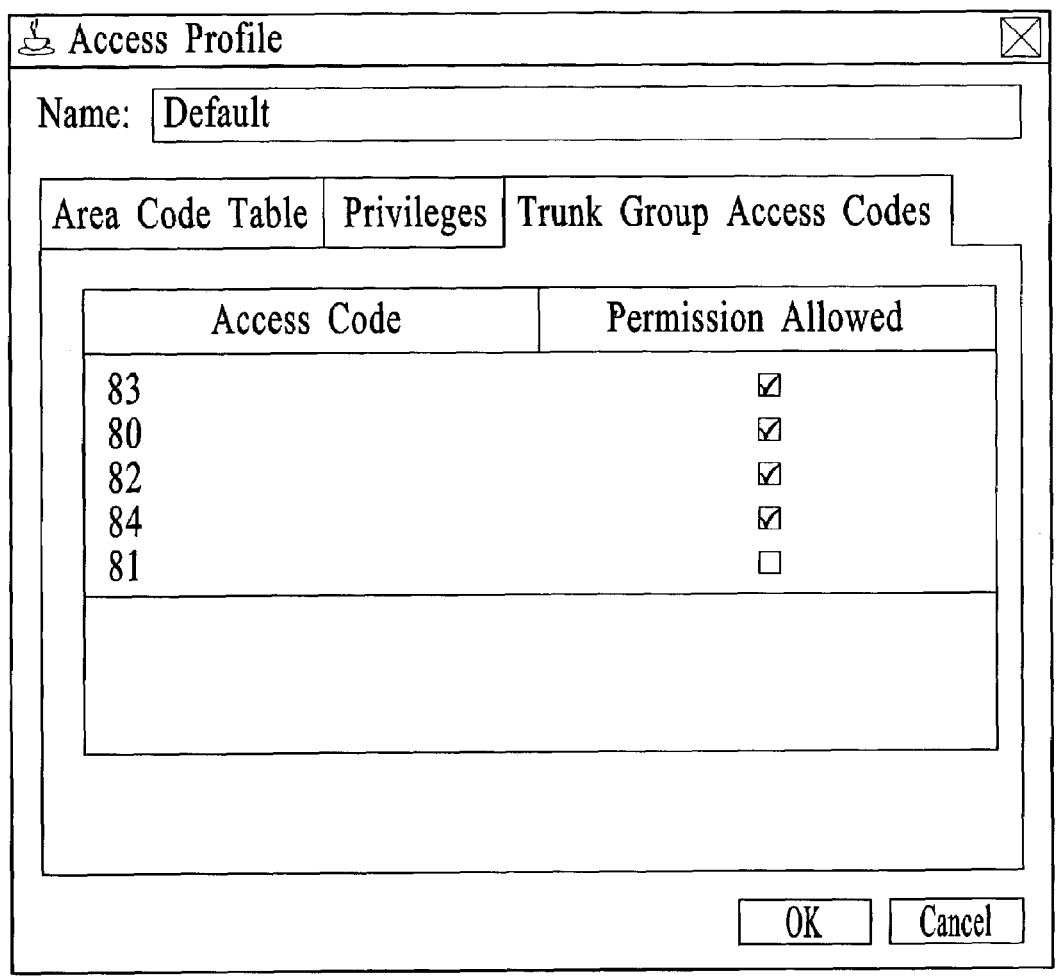

As previously described, preferred embodiments utilize an access profile to desirably assist in controlling/managing calls in the system. FIGS. 39A-C illustrate windows that preferably are used to manage access profiles. The preferred access profile screen desirably allows the administrator to configure permissions/restrictions for users assigned to the particular access profile. The access profile is used for calls which do not match any of the settings in the global access profile (a match in the global access profile results in the call being routed, intercepted, blocked, etc., as directed by the global access profile table). As illustrated in FIGS. 39A-C, the preferred access profile window contains three tabs: an area code table (all ARS calls preferably are checked in this table); a privileges table (such as international and carrier access calls, which typically include predetermined initial digits for specifying a particular carrier, such 1010xxx-type carrier access calls); and a trunk group access codes table (which preferably is a permission table for using non-ARS trunk group access codes). These access profile windows/tables will now be further described.

FIG. 39A illustrates a preferred area code table for access profiles in accordance with the present invention. The area code tables preferably are expandable tables for handling North American Numbering Plan (NANP) numbers. An area code table is accessed via the access profile screen by selection of the appropriate tab. Every profile has an associated area code table. In preferred embodiments, area code tables are not shared by profiles.

As illustrated in FIG. 39A, an area code field is provided. The area code field is a list field. All NANP area codes may be listed here, and it may include an entry for unspecified (default) area codes (i.e. area codes added to the NANP, which were not known when the area code table was created.) An office code range also is preferably provided. If the dialed number needs to have a more granular examination than just the area code, then an office code or code range may be entered in this field. A routing table also is provided. The route table field preferably specifies the route table that will be used to send the dialed number out on a trunk. If set to blocked, then the area code is not allowed for the profile and the user will hear fast busy (or be provided some other indicia that the call is blocked, such as described elsewhere herein).

As illustrated in FIG. 39B, a privileges access profile window is provided in preferred embodiments of the present invention. Each access profile preferably allows the administrator to define a group of privileges for the users assigned to that particular profile. These privileges include, for example, international calling and use of carrier access codes. With respect to international (011) calls, the access profile may specify that international calls are blocked, in which case international (011) calls are not allowed for this access profile. International calls attempted with this access profile may result in the user hearing a fast busy or otherwise being provided with an indication that the call is blocked. Alternatively, international calls may be directed to a specified route table (the routing table field may conveniently allow a specified route table or blocked to be selected for that access profile, etc.). The CAC destination field allows the administrator to take specific action when a caller makes a call containing a carrier access code. This table is checked, for example, whenever a user dials '101' followed by a 4-digit carrier access code, which is not specified in the special digits table. The CAC destination field may, for example, be set to blocked, indicating that CAC calls are not allowed (the user will hear fast busy or another indication that the call is blocked, such as a net message), or be set to ignored, indicating that CAC calls are routed as if the CAC was not dialed, or be set to a route table, indicating that CAC calls are to be directed to the specified route table. Other methods of specifying handling of attempted CAC calls are utilized in alternative embodiments of the present invention.

As illustrated in FIG. 39C, the trunk group access codes screen provides the administrator with the ability to control user access to access codes not using Outbound Routing (ARS). Only trunk group access codes not designated as Outbound Routing are displayed here. In such embodiments, the system may be provided with, for example, dedicated trunks or other resources for completing outbound calls, which are not placed through Outbound Routing (ARS). User access to such dedicated trunks or other resources may desirably be controlled through selection of permitted or not permitted for each of the dedicated trunks/resources and for each access profile.

Also in accordance with such embodiments, one or more route table are provided in a graphical, intuitive and easy to use manner, such as is illustrated in FIG. 40. Such a route table preferably is used to place outgoing calls on the best available trunk (as determined, for example, by the system administrator). In accordance with preferred embodiments of the present invention, the system preferably goes through the steps one by one attempting to place the call out on a trunk group. In such embodiments, each step is capable of manipulating the dialed digits in order to fit the destination trunk group requirements.

As illustrated in FIG. 40, a name field is provided. The name field specifies the name of the particular routing table, e.g., Local Calls. The step field indicates the step within the routing table in which the call is executing. Preferred embodiments support a desired number of steps, such as up to 10 steps. Also in accordance with preferred embodiments, steps may be reordered to insert new steps and/or to more easily make changes in the routing table. A "strip first n digits" field is provided to specify the removal of "n" number of beginning digits from the original dialed digits. In preferred embodiments, this does not include the trunk access code, and the "strip first n digits" and "keep last n digits" are mutually exclusive. The "keep last n digits" field is provided to specify that the last 'n' digits of the originally dialed number be kept and the rest removed. The "prepend digits" field adds the listed digits to the beginning of the digits to be dialed. The "postpend digits" field adds the listed digits to the end of the digits to be dialed. The destination field specifies the trunk group that the call is sent to for this step. The service code field is an optional field to be used for this call. In preferred embodiments, this filed is only applicable to ISDN calls; for all other trunk group calls, the service code is N/A. The Up (Down) buttons are used to move the selected step up (or down) within the route table.

Also in accordance with such embodiments, a first digit table is provided to facilitate desirable call control and management in accordance with the present invention. As is known in the art, first digit tables are utilized to process and control calls by way of analyzing first digits dialed, for example, by a user depressing keys on a telephone. In accordance with such embodiments of the present invention, the first digit table is improved in order to more desirably support unified dialing plans and an increased number of trunk access codes as described herein. In addition, since the extension range of the off-premise extension table will follow the first digit table and reflect the extension range of the distant system/PBX, the first digit table preferably supports multiple extension lengths; e.g., first digit 3 may have an extension length of three, while first digit 4 may have an extension length of five, etc. Also in accordance with such embodiments, first digits preferably do not serve to designate as "off-premise."

In accordance with such embodiments, a first digit table is provided that allows more than one prefix to be designated as "external," and an external first digit allows a user to define either a single or two digit trunk access code. Also in accordance with such embodiments, a second field allows additional settings to be configured when a first digit is designated as "external."

As illustrated in FIG. 41, the first digit table may include, for example, a first digit tab, which may include first digit/types for attendant, extension, external, or not configured, etc., as illustrated. The attendant first digit/type preferably directs calls to the operator or attendant, whether automated or in person. The extension first digit/type are configured as extensions, which digits collected in accordance with the extension dialing rules, and then appropriately routed. An external digit/type designates a trunk access/NANP digit. Other fields applicable for external calls include the access code, which in preferred embodiments may be a one or two digit access code. The routing field, may include a <Trunk Group> (such as T1, voice digital, voice analog, etc.) designation, where the call will be routed to the specified trunk group. The routing filed may state "not configured," indicating that the access code is not defined (a user dialing this access code preferably will hear fast busy or otherwise be provided with some indication that the access code is not defined, as discussed elsewhere herein). If the trunk field is designated "outbound routing," the call will be routed through an ARS process as discussed elsewhere herein. If the trunk field is designated "outbound routing, the collect digits field is automatically set to NANP. The collect digits field specifies the maximum number of digits to collect after the access code has been entered. If this field is set to NANP, then the North American Numbering Plan is used to determine the number of digits to collect. In preferred embodiments, entering a number in this field allows the caller to indicate he/she has finished dialing using the '#' key or letting interdigit-timing to expire. The dialtone field indicates whether or not dialtone is sent after the access code is received. In preferred embodiments, dialtone will remain until the next digit is received; if expected digits is set to the same length as the length of the access code, dial tone will not be sent.

Figure 42:
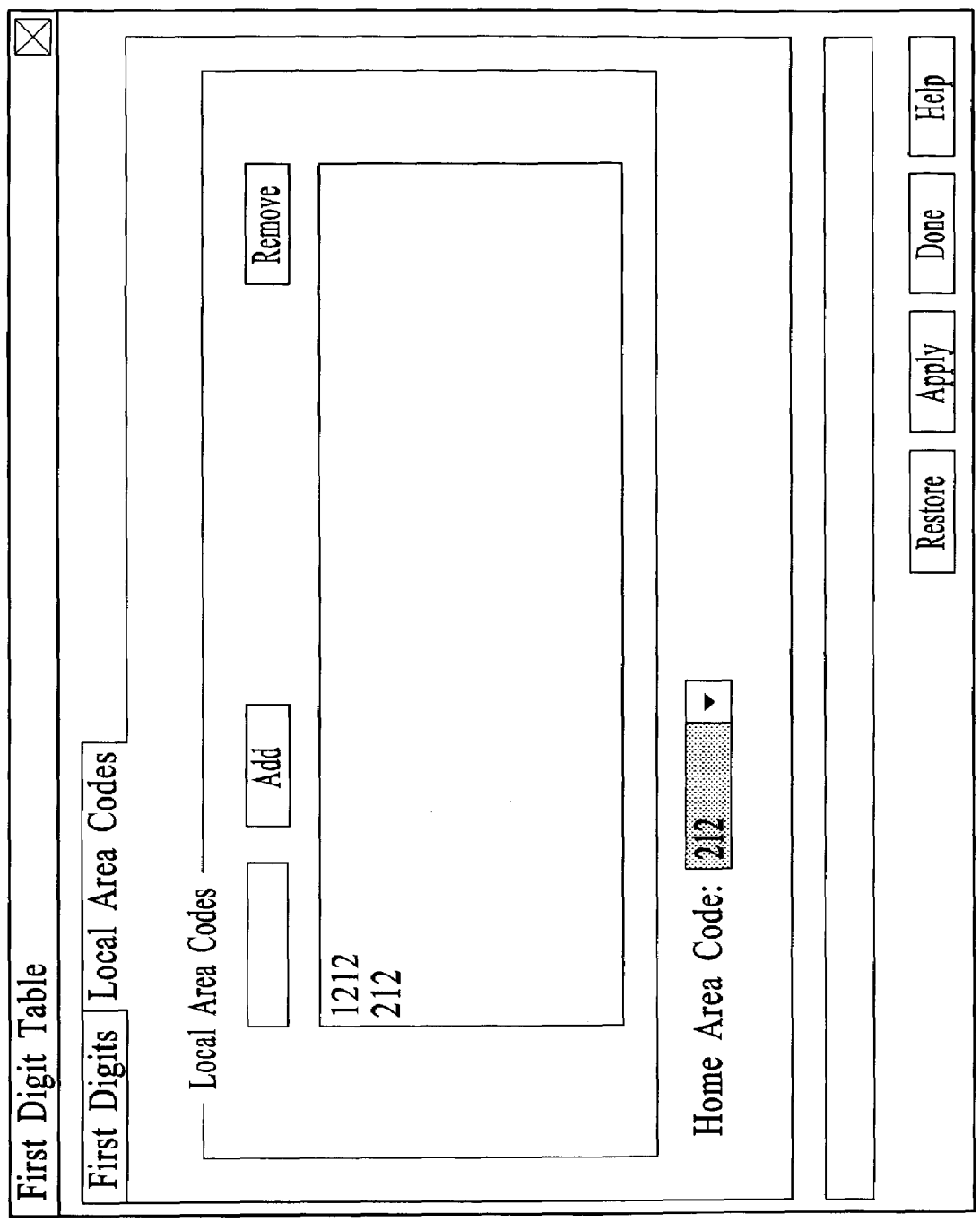

FIG. 42 illustrates a local area codes screen that may be accessed with a tab from the first digit table window. The local area codes screen preferably is used for setting the home area code and dialable local area codes. In accordance with preferred embodiments, area codes may be listed as "1+Area Code" or "Area Code Only." An "Area Code Only" designation allows a user to dial the specified area code in a 10-digit number without requiring the user to dial "1" first. A "1+Area Code" causes 11-digit calls with the specified area code to be designated as local calls. In accordance with such embodiments, an administrator periodically checks local requirements to determine which format is appropriate for the particular dialing area. Preferably, both formats are possible within the same system/PBX.

Also in accordance with the present invention, improved caller ID functionality is provided. As will be appreciated, the present invention provides a system that may desirable interface to a variety of different types of trunks and calling channels, etc. As various trunks and WAN services may support different levels of caller ID information, a problem arises as to how to implement caller ID intelligently in such an environment. In accordance with the present invention, various levels of caller ID information may be presented to various trunks, in a manner consistent with the particular trunks and user and system administrator preferences. As will be appreciated based on discussion elsewhere herein, such caller ID information may be specified, administered and controlled remotely via a web browser type interface.

In accordance with such embodiments, the caller ID configuration interface is enhanced to allow better control of the calling party ID which is sent to the called party. In accordance with such embodiments, there may be provided up to three areas where caller ID options may be configured. These include a general settings window; as illustrated in FIG. 31A, company name and number, direct inward dialing ("DID") prefix and "general settings" default may be configured here. As illustrated, the general settings for external caller ID preferably is configured under the PBX tab. The company name and number may be configured by accessing a window under the system tab (in accordance with this aspect of the present invention, the particular window for enabling a company name and number to be added as part of a general settings is not important; what is important is that such a company name and number be entered in an appropriate manner for caller ID purposes as described herein). The prefix digits field may be used to designate digits that are to be prepended to the extension number to create the external caller ID. In accordance with such embodiments, trailing Xs are replaced by the corresponding extension digits; if Xs are not used, then prefix digits preferably are simply prepended to the extension number. If the company name and main number is selected, then the general settings option is to send the company name and number. If the station name and prefix digits+extension number is selected, then the general settings option is to send the configured user name and a number created using the prefix digits and extension number. In accordance with preferred embodiments, if the prefix digits field is blank, selecting station name and prefix digits+extension number is the same as sending only the extension number. If none is selected, then the general settings option is to not send external caller ID.

Figure 43A:
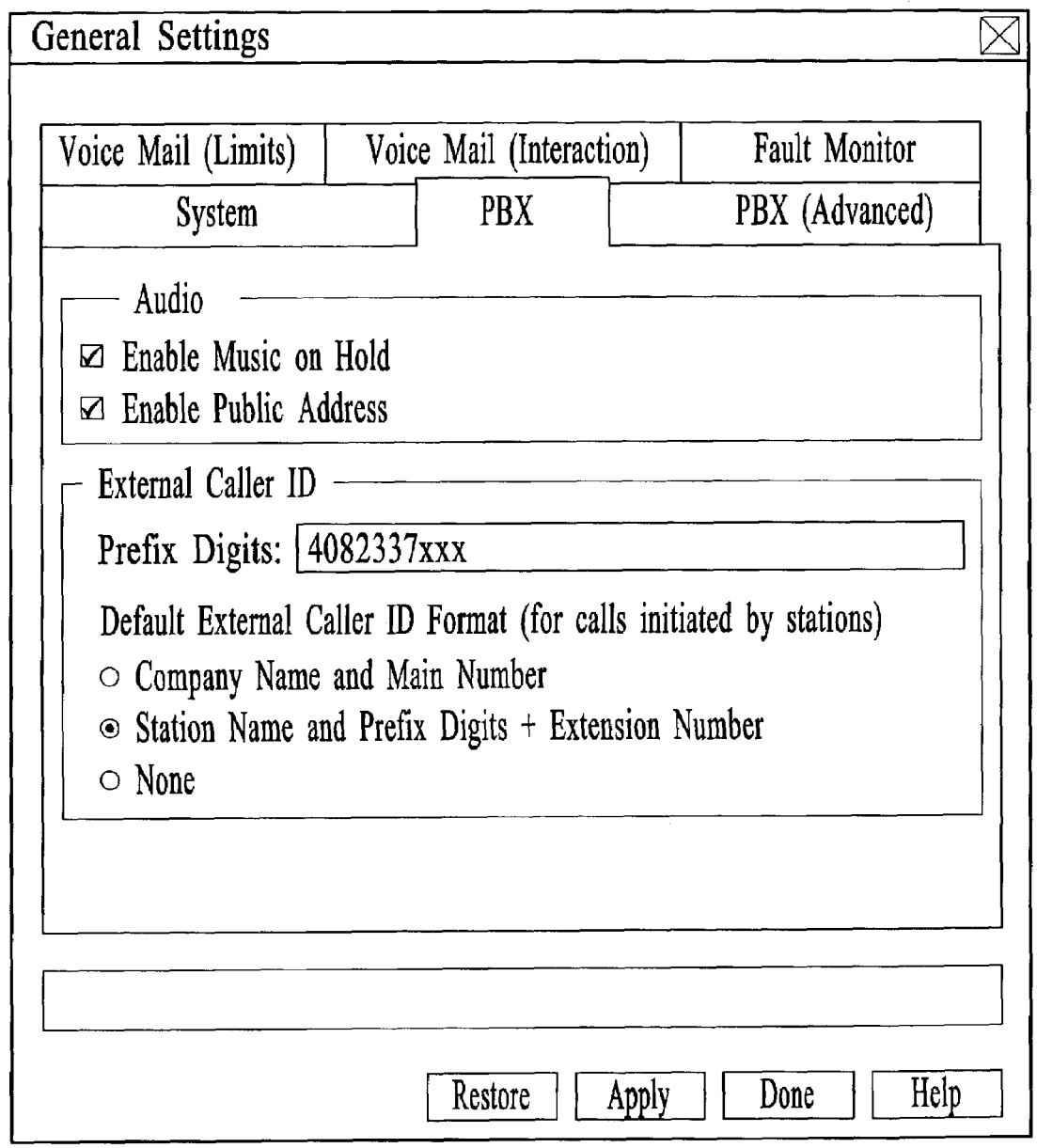
Figure 43B:
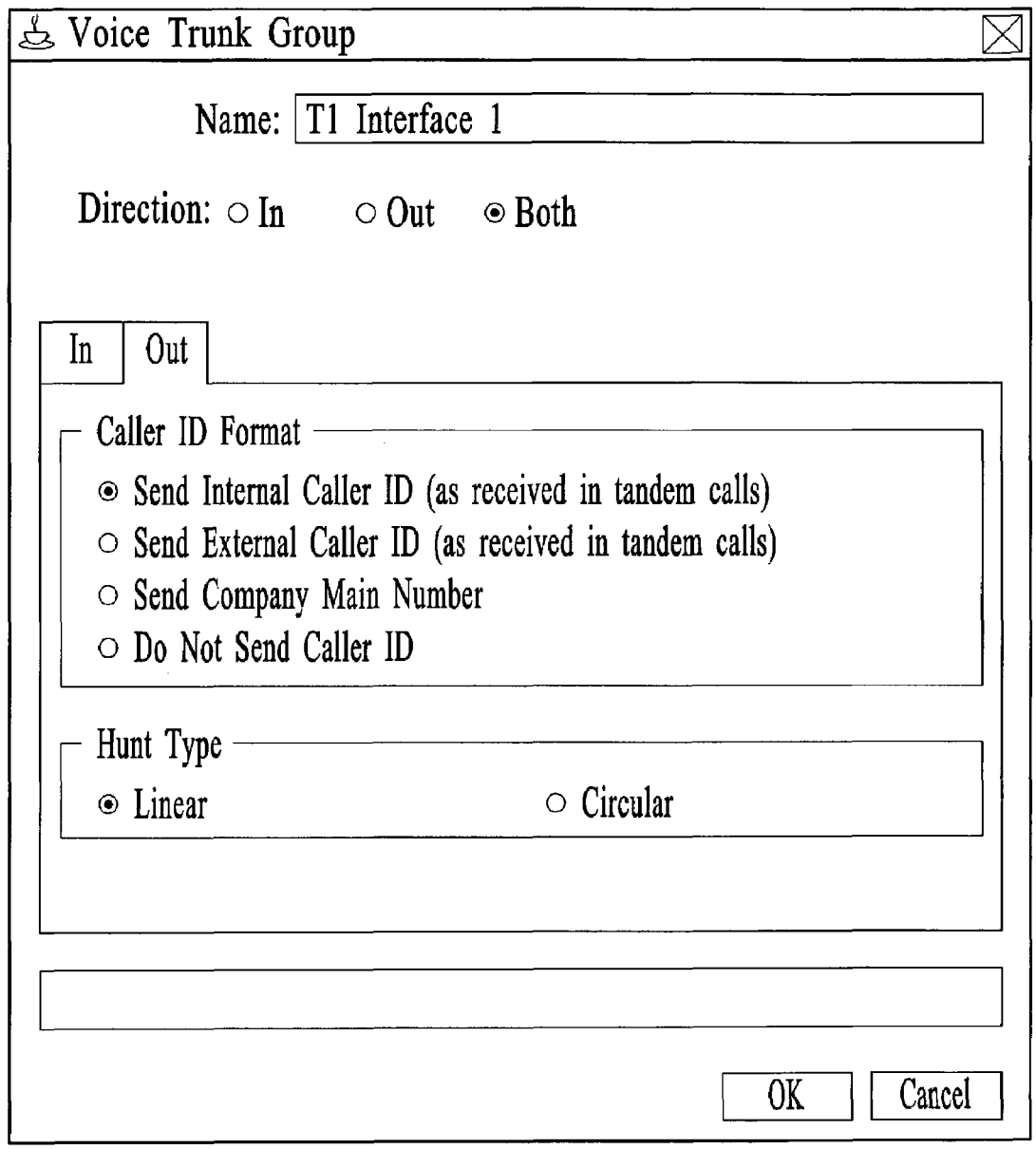

FIG. 43B illustrates an exemplary window that may desirably be used to select caller ID information options, for inbound or outbound calls for particular trunk groups in such embodiments. The name field may be used to designate particular trunks (e.g., voice trunk groups) that are supported by the system. For each such trunk group, a user may select which caller ID to use on outgoing calls in a convenient manner consistent with the level of caller ID support available for the particular trunk groups. As illustrative options, a user may select the internal caller ID information, external caller ID information, company name and company main number or no caller ID information as options. In accordance with the ability to set general caller ID settings as discussed in connection with FIG. 43A, administrators may desirably control the level of caller ID information provided to particular trunks, consistent with the desires of the administrator and with the level of caller ID information supported by the particular trunks.

Figure 43C:
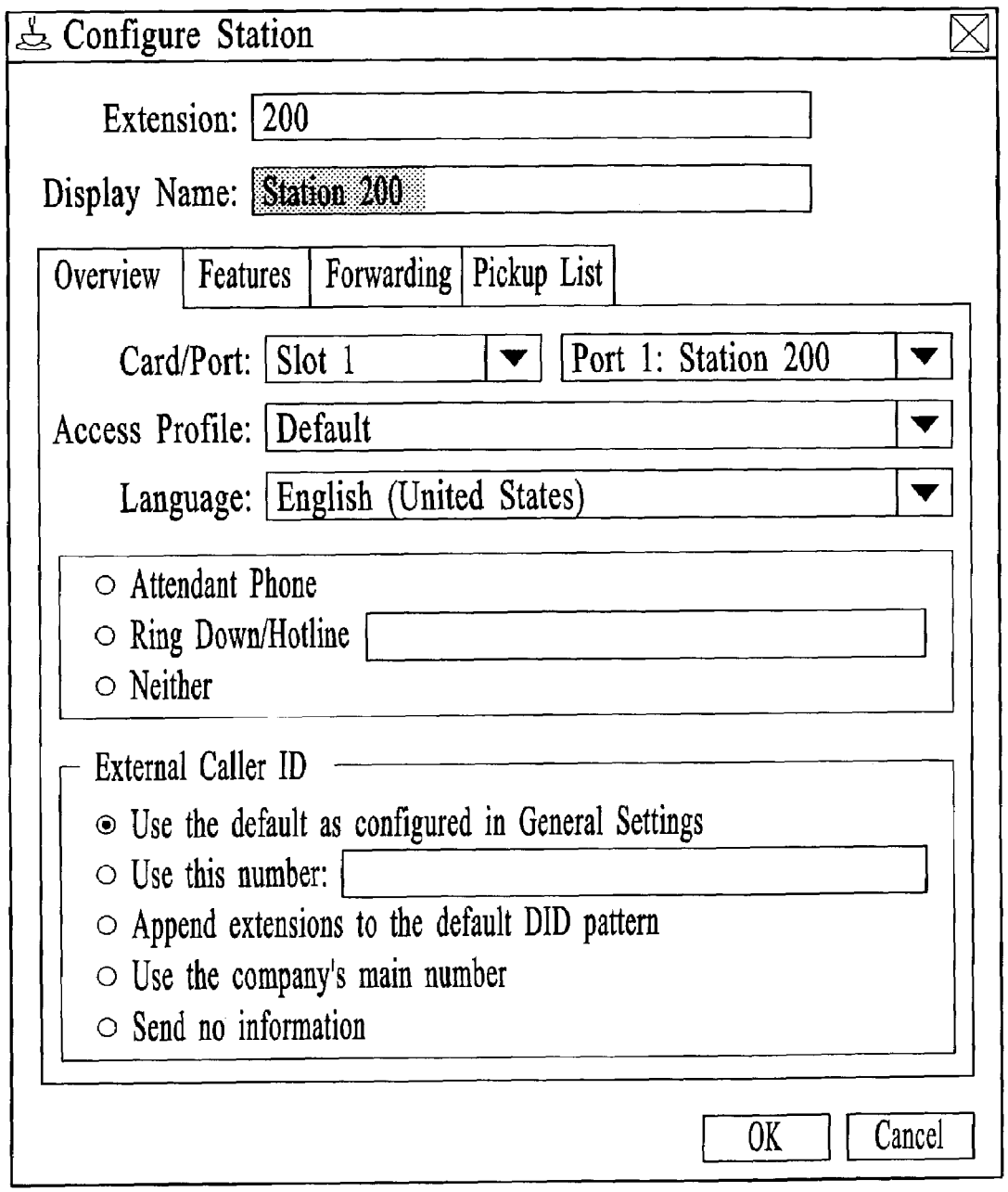

FIG. 43C illustrates an exemplary extension configuration window that may desirably be used to select caller ID information options for particular extensions. As illustrated, in accordance with such a window, an extension may be designated in an extension window, which may include a display name for the particular extension (such as for internal caller ID, etc.). As part of the configuration options for a selected extension are, for example, use a default setting as in the general settings, use a number specified for the extension (which may be entered in a field for this purpose, as illustrated), append extensions to a default DID pattern, use the company's main number (or name and number, etc.), or send no information (e.g., block caller ID information). Other may be provided in accordance with the present invention.

Other aspects of caller ID functionality that are included in certain embodiments of the invention include the following. For automatic call distribution ("ACD") applications, such as a software application that runs on the system (such as described elsewhere herein) that processes calls in a manner to distribute/forward the calls based on caller inputs, such as digits selecting particular departments, caller account number or identifying numbers, etc., voice mail or pager applications, such are preferably mapped to connected to system ports (like a system extension). As system ports, ACD, voice mail, and pager numbers/applications preferably also have caller IDs associated with them. In preferred embodiments, for internal calls, the caller ID for such system ports preferably is the name and number associated with the group in which they belong; for external calls, the caller ID preferably is the company name and number. In addition, function codes may be entered to, for example, activate or block caller ID for particular calls (such as by dialing *67). In preferred embodiments, regardless of settings, calls to 911 or similar emergency type or special calls (e.g., operator) are not blocked, regardless of system settings.

In accordance with preferred embodiments of the present invention, native multiprotocol Voice over IP (VoIP) gateway functionality is provided with a system that provides an integrated communications platform, such as described elsewhere herein. In accordance with such preferred embodiments, packet switching circuit switching, IP voice, traditional voice, secure Internet connectivity, and open applications support may be provided in a single integrated solution. Such embodiments may be desirably utilized to provide, for example, branch offices and small businesses a desirable platform for a variety of evolving communications needs, and provides enduring support for their converged network plans of the future. An integrated VoIP gateway in accordance with such embodiments allows branch offices to create "virtual tie line" IP voice connectivity between sites to lower the cost of interoffice calling and to conserve bandwidth for other applications. In preferred embodiments, and as described elsewhere herein, a variety of WAN access types, such as T1, Frame Relay, ISDN Primary Line Interface (PRI), Digital Subscriber Line (DSL), and analog, are supported, and thus a preferred virtual tie-line application provides much more flexibility than conventional private network tie-line services that are limited to point-to-point connections. With its virtual tie-line capability, such embodiments may provide branch offices a lower-cost, lower-complexity, and lower-risk solution for integrating VoIP into their communication networks. For example, users of systems in accordance with such embodiments may take advantage of the cost savings of IP voice for virtual tie-line connectivity while keeping circuit-switched voice for business-critical calls.

As previously described, systems in accordance with the present invention may be remotely administered and managed. Thus, remote software upgrades may be provided, for example, to add VoIP capability to existing systems without disrupting the day-to-day business operations of the users of such systems. Also in accordance with such embodiments, carriers can implement new voice and data services on a common infrastructure via remote administration, management and software upgrade, without the expense or delay of a physical delivery. Thus, for example, branch offices may obtain the latest communications functionality without the complexity of managing multiple networks.

VoIP functionality in accordance with such embodiments preferably provide a predetermined number of IP voice channels, for example up to eight or more channels of IP voice. Preferably, such embodiments provide dynamic support for both H.323 and Media Gateway Control Protocol (MGCP) call-control signaling. Unlike systems with an external gateway between a PBX and a data router, the integrated solution of preferred embodiments of the present invention provide direct conversions between attached telephones and IP trunks without requiring a configuration of several devices. To further enhance voice quality, embodiments of the present invention also preferably include dynamically adjustable jitter buffers, packet-loss correction, and noise-level matching. For greater reliability, traffic can be rerouted over alternative networks if there is a failure to connect over the primary route.

In accordance with such embodiments, and as discussed more fully elsewhere herein, a more consistent user experience is provided with a single, integrated dialing plan for both circuit- and packet-switched voice calls. For example, employees at a branch office may contact co-workers at any other location by simply dialing their extension. The uniform dialing plan simplifies a company's migration to VoIP, since administrators can easily configure calls over any type of connection. With uniform dialing, such embodiments may utilize VoIP calling, when available, in a manner that is transparent to end users. Thus, in accordance with such embodiments, in a headquarters-branch office(s) arrangement, separate access trunks for voice and data do not need to be deployed at each site. Low-cost VoIP calling between, for example, a headquarters site and a branch office, and employees may use the same phones and dialing plans they are accustomed to, and the system automatically converts interoffice calls to VoIP calls if available, and if not can route the calls in a manner transparent to end users through alternative routing. Such systems may support simultaneous interfaces to both packet- and circuit-switched networks for voice calling, and least-cost routing may be automatically enabled for both IP and traditional voice trunks. In accordance with the present invention, using a packet-optimized WAN for telephony transport may significantly reduce costs by sharing expensive WAN bandwidth with data transmissions. Also in accordance with such embodiments, low-bandwidth coder-decoders (CODECs) and silence suppressors can be used to yield, for example, an 8:1 bandwidth savings over standard circuit-switched voice calls.

As discussed elsewhere herein, such embodiments may advantageously provide a common management and configuration interface for multiprotocol routing, packet- and circuit-switched voice, and voice/data applications and services. By consolidating the network into one infrastructure, administrators also can streamline management resources, reduce costs, and quickly deploy new functionality. The remote administration and management capabilities discussed elsewhere herein enable network managers and carriers to tune voice and data capabilities to specific customer needs, while enabling Web-based diagnostic tools for real-time system monitoring and troubleshooting. Additional aspects of VoIP telephony aspects of such preferred embodiments will be described hereinafter.

As will be appreciated by those of skill in the art, VoIP telephony generally presents a number of concerns regarding how to desirably employ voice capability over data networks, both from cost effectiveness considerations and quality of service (QoS) considerations, while also having the a system that can be efficiently and readily configured and managed.

VoIP communications attempts to provide reasonable voice communications over data/packet networks by allowing voice and signaling information to be transported over the data/packet network. An IP network typically is used to transport the calls, which generally may be over an intranet or over the Internet. In accordance with the present invention, users may make calls from a PC to another PC, from a PC to a phone or from a phone to a phone, while also providing a system that adapts traditional telephony to the Internet.

In accordance with the present invention, standard (or other) communication protocols to deploy IP telephony. One such standard communication protocol that is used in preferred embodiments is the H.323 standard from the International Telecommunications Union, which serves as an overall set of standards defining real-time multimedia communications for packet-based networks. Such H.323 standards define how audiovisual conferencing data is transmitted across such networks, and provides a foundation for audio, video and data communications across IP networks, including the Internet. H.323-compliant multimedia products and applications can interoperate, allowing users to communicate without concern for compatibility. Also in accordance with the present invention, multiple such standard communication protocols are supporting, including, for example, the Media Gateway Control Protocol (MGCP) standard. The presently available standards-related documents for H.323 (including version 2) and MGCP are hereby incorporated by reference.

Other standards-based VoIP components used in accordance with preferred embodiments also include the "G. standards," or the G.711, G.723 and G.729 (including, but not limited to, G.723.1 and G.729.a) standards, which specify analog-to-digital, coder/decoder and compression algorithms (herein "codecs"). Desirably, a protocol also is utilized that manages end-to-end connections between devices coupled over the Internet or similar network; in preferred embodiments, the Realtime Transport Protocol (RTP) desirably is so utilized to manage end-to-end connections to minimize the effect of packets lost or delayed in transit. In addition, a protocol desirably is utilized that specifies the routing of packets on the network, which in the preferred embodiments is the Internet Protocol (IP). As will be appreciated, in accordance herewith the G. standard codecs specify analog-to-digital conversion, the H.323 and/or MGCP standards (both standards are preferably supported in the present invention) specify call setup and interoperability between devices and applications, the RTP protocol manages end-to-end connections, and the IP protocol is responsible for routing packets over the network.

The H.323 standard, in general, specifies four types of components that may be networked together to provide point-to-point and point-to-multipoint multimedia-communications services—terminals, gateways, gatekeepers and multipoint control units. H.323 terminals generally are used for real-time bi-directional multimedia communications. An H.323 terminal can either be a PC or a standalone device (which could be conference or other telephone or video conferencing unit, such as described elsewhere herein), which is running an H.323 application and the multimedia/communication application(s). In accordance with preferred embodiments, the H.323 terminal provides audio communications while optionally supporting video or data communications. An H.323 gateway provides connectivity between an H.323 network and a non-H.323 network. For example, such a gateway can connect and provide communication between an H.323 terminal and the PSTN. This connectivity of dissimilar networks is achieved by translating protocols for call setup and release, converting media formats between different networks, and transferring information between the networks connected by the gateway. While a gateway is not required, however, for communication between two terminals on an H.323 network, systems in accordance with preferred embodiments provide software/hardware resources to enable the system to serve as an H.323 gateway. A gatekeeper can be considered the brain or intelligence of an H.323 network. Although not required, gatekeepers provide desirable services such as addressing, authorization and authentication of terminals and gateways, bandwidth management, accounting, billing, charging and call routing-type services. Preferred embodiments of the present invention desirably work with an external H.323 gatekeeper, or in alternative embodiments also integrate/provide software/hardware resources to enable the system to serve as an H.323 gatekeeper. Multipoint control units (MCUs) provide support for conferences of three or more H.323 terminals. All terminals participating in the conference preferably establish a connection with the MCU, and the MCU manages conference resources, negotiates between terminals for the purpose of determining the audio or video CODEC that will be used, and may handle the media stream. While gatekeepers, gateways and MCUs typically are considered logically separate components of the H.323 standard, in preferred embodiments various of these components are integrated or tightly coupled to a preferred system as a single physical device.

The MGCP standard, in general, is an control and signal-type standard that may be used as an alternative to the H.323 standard for the conversion of audio signals carried on the PSTN to data packets carried over the Internet or other packet networks. As regular telephony devices are desirably low cost, the were designed not to be complex; they are fixed to a specific switch at a central switching location. IP phones and devices, however, are not fixed to a specific switch, so they must contain processors that enable them to function and be intelligent on their own, independent from a central switching location. This tends to make the terminal (phone or device) more complex, and therefore more expensive. The MGCP standard, generally, may provide a simpler standard by eliminating the need for complex, processor-intensive IP telephony devices, thus simplifying and lowering the cost of these terminals.

As previously described elsewhere herein, systems in accordance with preferred embodiments of the present invention include a central or distributed pool of DSP resources, preferably providing a plurality of DSPs, which are desirably utilized herein to adapt traditional voice telephony to the Internet. DSP resources herein preferably may be utilized to provide voice compression, tone detection and generation, echo cancellation, and silence suppression, and optionally may provide voicemail prompts and music on hold queues and the like. In alternative embodiments, DSP resources may also (or alternatively) be provided on additional cards/circuits (over what has been previously described), and also may be included internal to particular terminals, as will be appreciated.

Using such DSP resources (and other hardware/software resources), an analog voice signal is received or generated by the system (such as by a person speaking into a telephone, which creates an analog voice signal as they speak). The analog voice preferably is converted to a Pulse Code Modulation (PCM) digital stream. (As is known in the art, PCM is a sampling technique for digitizing analog signals, especially audio signals. PCM samples the signal 8000 times a second, and each sample is represented by 8 bits for a total of 64 Kbps. There are two standards for coding the sample level; the Mu-Law standard generally is used in North America and Japan, while the A-Law standard is used in most other countries.) Preferably, hardware/software of the system analyzes the PCM stream, and preferably echo is removed, voice activity detection (VAD) is performed, and tone detection is performed; remaining PCM samples are provided to the codec for processing. The voice codec (which may largely be implemented in software running on a processor) generally is used as part of the process of converting the originally analog signal to digital data packets suitable for transmission over a data network. In accordance with preferred embodiments of the present invention, different software codecs may be used in the process to convert analog signals to digital data in frames (also providing various levels of data compression; e.g., a G.729a frame may be 10 ms long and contain 10 bytes of speech), and then convert digital data back to analog signals. The goal when selecting a codec is to maintain high voice quality and low latency. Generally speaking, lower bit rate codecs offer higher complexity and, therefore, introduce higher latency. As a result, tradeoffs are made between the goals of low bit rate, high quality, low complexity and low latency. The actual choice will depend on the particular application and quality and bandwidth concerns. The various codec standards (i.e., the G. standards discussed earlier, publicly available standards data for which is hereby incorporated by reference, as with the other standards-related information for standards referenced herein), generally may be evaluated and selected on the basis of criteria such as bit rate, quality, complexity, bandwidth usage or frame size and latency. In preferred embodiments, a G.723.1 codec often is utilized. Packet assembler software preferably running on one of the DSP (within the provided DSP resources) receives frames from the codec and creates packets. Several frames may be combined in a single packet. In preferred embodiments, a 12 byte RTP header is added to each packet, which provides a sequence number and time stamp, and the packet thereafter is forwarded, preferably to a host or other processor for further processing.

Addressing in VoIP is provided in a manner to determine from the dialed digits, preferably identified in the DSP, the destination IP address (e.g., 301-236-1895→193.148.100.2). Such as from a lookup table under control of a processor (as part of the software/hardware resources of the system), a preferably 20 byte IP header is added to the packet, which contains (1) the IP address of the source system/gateway, and (2) the IP address of the destination system/gateway. An 8 byte UDP header containing source and destination sockets also is added. Systems (such as described herein or otherwise) on the network may then examine the IP address to identify the route to the destination. It should be noted that several systems as described in the preferred embodiments herein may be in the path that the packets take to their destination.

Figure 44:
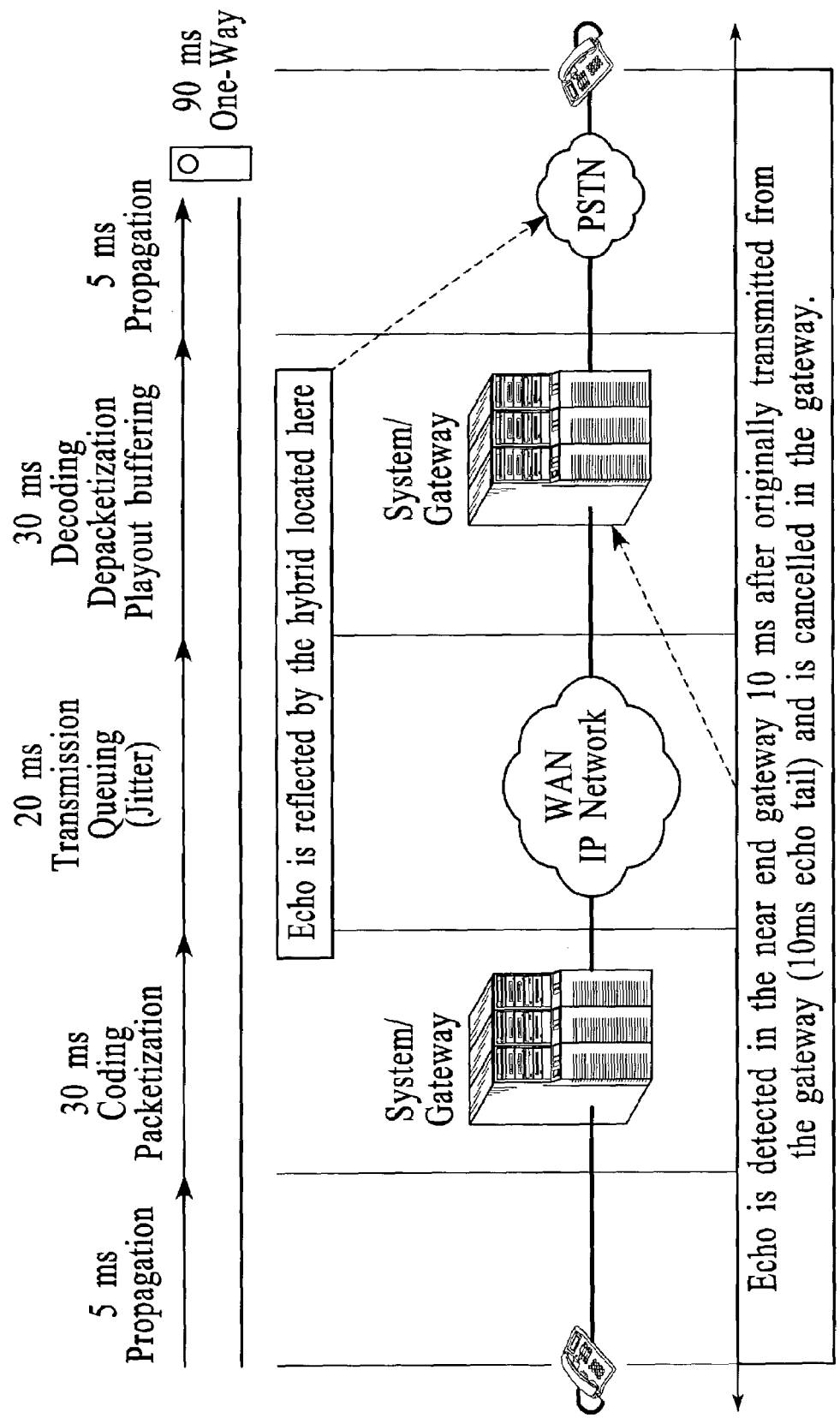
FIGS. 44-47B illustrate IP telephony features in accordance with preferred embodiments of the present invention.

Among the problems encountered in VoIP communications are delay and echo. Delay causes problems such as echo and talker overlap. This problem is illustrated in FIG. 44. Echo typically is caused by signal reflections of the speaker's voice at the far end telephone equipment back into the speaker's ear. This echo is caused by a device called a hybrid, which typically is a 4 wire to 2 wire converter. The telephone handset has 2 wires going to the ear piece and 2 wires going to the mouth piece, and inside the telephone those 4 wires need to be converted to only 2 wires, which is what the telephone network typically uses (i.e., tip and ring). Echo generally becomes a significant problem when the round trip delay becomes greater than 50 milliseconds. Since echo is perceived as a significant quality problem, voice over data systems desirably will address the need for echo control and implement echo cancellation. Talker overlap, or the problem of one talker "stepping" on the other talker's speech, becomes significant if the one-way delay becomes greater than 250 ms. The end-to-end delay budget is therefore a significant consideration, and delay must be reduced through a packet network, which the present invention attempts to achieve.

As a user speaks, generally voice packets are generated at a constant rate; in essence, there is no gap between packets. The packets, however, are delivered to their destination over one or more networks that tend to cause unpredictable amounts of delay between received packets. This inter-packet timing variation is known as jitter, and is caused by the network(s) that the packets traverse. If quality speech is to be reproduced at the receiving end, these gaps or jitter must be removed by the receiving system/gateway in order to more accurately reproduce the original speech. Removing jitter is performed by collecting packets in what is referred to as a jitter buffer (basically, a memory/software implemented buffer, typically coupled to the processing DSP resources, which attempts to hold the packets long enough to allow the slowest packets to arrive in time to be played in the correct sequence. This causes additional delay. Desirably, the system and network work to minimize the size and delay of the jitter buffer while preventing buffer underflow caused by jitter.

Figure 45:
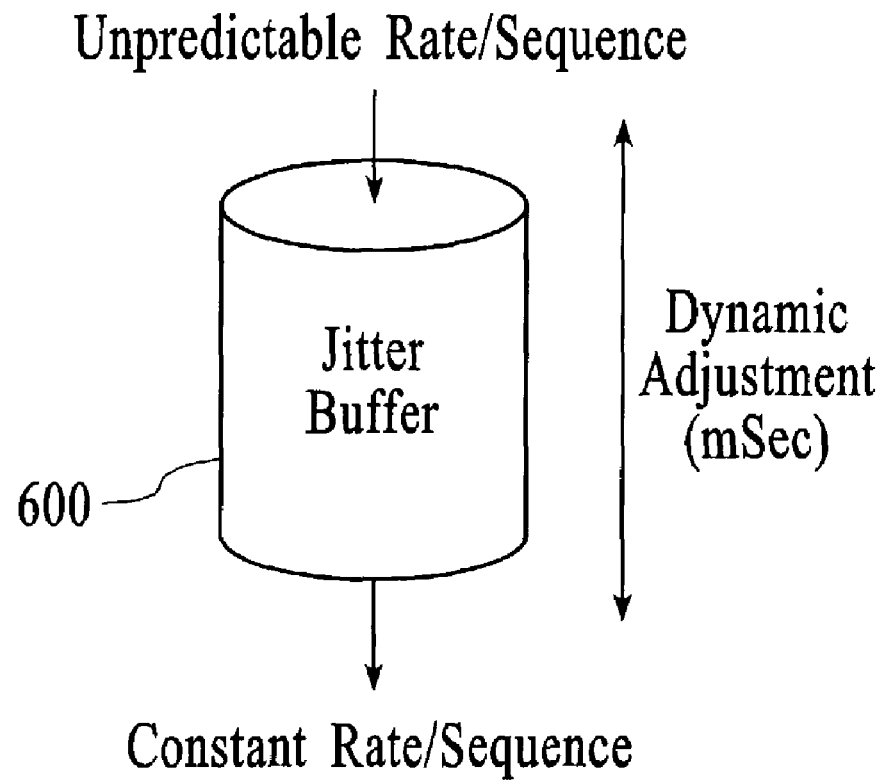

FIG. 45 schematically illustrates jitter buffer 600, which receives packets from the network at an unpredictable rate/sequence. Jitter buffer 600 in essence is a buffer or bucket in which received packets are temporarily stored, which can then be read out in at a desired constant rate/sequence in order to reproduce as accurately as possible the original speech. Jitter buffer 600 could be sized as large as possible for the expected ranger of operating conditions of the various codec/codec parameters and packet networks that packets could traverse. A large jitter buffer, unfortunately, carries a significant penalty in terms of latency/delay. Sizing of the jitter buffer, accordingly, can significantly impact the quality of the VoIP communications.

In accordance with preferred embodiments, as a VoIP call is being set, codec parameters (e.g., type of codec, packet time for transmission (Tx) and receipt (Rx), silence suppression, etc., such as described elsewhere herein) are negotiated between the two systems/gateways. Based on the negotiated codec parameters, which occur on a call-by-call basis, the size of jitter buffer 600 is established. In preferred embodiments, the jitter buffer is sized based on the negotiated Rx packet time (in general, the Tx packet time and the Rx packet time may be different), and in preferred embodiments is set as a multiple of negotiated Rx packet time (such as 3 times the packet time); in other embodiments, a range is set as a multiple of the negotiated Rx packet time (such as a minimum of 2 times the packet time and a maximum of four times the packet time, etc.). The multiple of the negotiated Rx packet time (or multiples for ranges, etc.) may be set, such as by a remote configuration applet/interface such as previously described.

As an example, if a particular system/gateway negotiates a Rx packet time of 10 mSec with a remote system/gateway, in preferred embodiments the jitter buffer is automatically set to be in effect 30 mSec. Thus, without requiring an administrator to optimally set the jitter buffer size on a call-by-call basis, and without setting the jitter buffer size (or range) to be undesirably large to accommodate the largest possible desired size, in preferred embodiments the jitter buffer size/range is set automatically upon negotiation of the codec parameters, etc. Thus, codecs may be changed (such as automatically and on a preferably call-by-call or destination by destination basis), and a more optimal jitter buffer is automatically determined. More generally, as a VoIP call is set up (again, preferably on a call-by-call basis), which includes multiple protocols such as H.323 or MGCP, the particular codecs and codec parameters (which may be set by preferences on a destination by destination basis), a more optimal jitter buffer setting is automatically determined without further administrator intervention. Thus, protocol and code preferences may be determined such as by particular location/destination, and as calls are initiated by ordinary users, VoIP parameters are automatically retrieved (such as prioritized codec settings) and determined (such an automatically sized jitter buffer).

Thus, in accordance with the present invention, speech encoder algorithms may more optimally implement rules concerning packet delivery and disposition management (i.e., jitter buffer management). The decoding algorithm must decompress and sequence data and make "smoothing" decisions (e.g., when to discard packets versus waiting for an out-of-sequence packet to arrive). The first jitter buffer size may often be a larger amount, such as 250 mSec (i.e., large enough to be a piece of a word or a short word). Thereafter, the jitter buffer may be sized more optimally (as described above), and still thereafter may be also may be implemented to be adaptive (i.e., adjust its size consistent with the parameter settings established for the jitter buffer, such as the range described above). Such a jitter buffer may more optimally be implemented by the DSP to smooth the playback of packets arriving from a jittery network.

In addition, as congestion in the network may cause some packets to be dropped, left untreated the listener hears undesirable pops and clicks, etc. This is because IP networks do not guarantee service, lost packets can frequently occur. Under peak loads and congestion in the network, voice frames may be dropped equally with data frames (data frames, however, are not time sensitive and dropped packets may be corrected through the process of retransmission, etc.). In accordance with the present invention, to compensate for lost packets the system preferably replays the last packet received during the interval when the lost packet was supposed to be played out, which in a relatively simple manner fills the time between non-contiguous speech frames. Desirably, the DSP in preferred embodiments plays the last successfully received packet at a decreased volume (e.g., around a 3 dB reduction, or ½ volume) in order to fill the gap. For multiple lost packets, the previously received packet may be replayed over and over at a more decreased volume to silence, which has been determined to be much more desirable than a sudden drop. Out of order packets also may result, given that the packets may take diverse routes through a network and may arrive out of order. In accordance with the present invention, out of order packets are not played in the order that they are received; if an out of order packet condition is detected, the missing packet is replaced, preferably, but its predecessor as if it is lost. When the late packet finally arrives, it generally is discarded. With such replacement algorithms for lost/out of sequence packets, and with automatic sizing of the jitter buffer, more optimum VoIP communications may be produced.

Also in accordance with the present invention, various IP telephony settings may be configured with a graphical user interface, which may be conducted remotely with any computer coupled to the system (as described earlier herein). In accordance with such a configuration graphical interface, an administrator may configure the dialing plan (e.g., trunk groups, routing tables for particular users/callers, destinations, etc.), and configure the IP network resources. The system may then be configured for VoIP or other IP telephony such as described herein.

In accordance with a first configuration step, resources within the system, such as DSP resources, may be allocated to IP telephony or ordinary telephony (often referred to as TAPI ports); thus, DSP resources may be allocated more optimally for the particular operating environment and conditions. For example, if there are 5 (or other number) of DSPs available in the DSP resources of the system, under software control the administrator may allocate the DSP resources to IP telephony ports or to traditional phone ports. For example, an administrator may allocate resources such that there are 0 IP telephony ports and 34 TAPI ports, or 4 IP telephony ports and 22 TAPI ports, or 8 IP telephony ports and 10 TAPI ports. What is important is that the DSP resources may be reconfigured (graphically and remotely) to support various levels of IP and TAPI telephony ports.

Also, preferably an administrator may enable the system for H.323 and/or MGCP IP telephony (also preferably graphically and remotely). Also, preferably an administrator enables the system to use preferred codecs (such as G.711 Mu-Law and A-Law, G.729a, G.723.1, applicable parameters such as packet time, jitter buffer size or range (if adaptive), which also may selected to be set based on determined a negotiated Rx packet time, tone detection and generation codec settings, echo cancellation settings, silence suppression settings, etc.), which preferably are set forth in a prioritized list. Also preferably, a setting is providing for allocating resources to affect the IP WAN QoS; for example, an administrator may enable a setting that controls n voice packets be sent for every m data packets (n and m may be the same or different numbers), or may enable a setting that controls that all voice packets be send before any data packets, or may enable a setting that there is no priority queuing for packet transmission. In addition to other configuration settings as described herein, more optimal IP telephony communications may be achieved.

In addition, as the present invention preferably provides multiple paths for establishing a voice communication (see, the various discussion herein regarding configuring lines, trunks, routing tables, etc.), VoIP telephony settings also may be desirably set by an administrator (again preferably graphically and remotely). For example, an inbound routing table may be configured, much in the same manner as with voice calls. An administrator may set parameters to specify from where IP voice calls will be originating (IP source settings), or to specify the destinations that the system may call using IP telephony.

Further aspects of IP telephony call configuration in accordance with the present invention will now be described. IP telephony configuration preferably is compatible with dialing, routing, etc., as without traditional telephony, although IP telephony has characteristics that are unique to VOIP calls. Prior discussion elsewhere herein regarding traditional Voice Trunk Groups and outbound routing through routing table steps, etc. is relevant to this discussion.

Embedded in a traditional outbound Voice Trunk Group is the physical destination. The physical trunks that are associated with the Trunk Group define this destination. Also, routing information for the calls that travel through the trunks that are associated with a Trunk Group is either included in the Trunk Group (for inbound) or point to the Trunk Group (outbound). Since the physical destination is embedded in the outbound Trunk Group, an association is defined between destination and routing information through the Trunk Group. Routing based on the destination is made possible by this association. A similar concept applies for inbound Voice Trunk Groups. The physical trunks that are associated with the Trunk Group define the call source, and Trunk Group settings include the routing information. The Trunk Group itself, creates the association between the source and the routing information.

Traditional Trunk Groups cannot be used for IP telephony call routing configuration since for IP Telephony calls, source and destination can be anywhere on the IP network (internet or intranet). In other words, the physical trunks that carry the voice data do not define the source and destination of the call. Voice data is traveling over a data network inside TCP or UDP packets and the addressing for source and destination is inside the packets and is not based on the trunks that data is traveling on.

One way to deal with this problem is to have one set of routing settings for all IP Telephony calls no matter where the call is going or coming from. This option is very limiting and undesirable. The other option is to define a way to specify source and destination information for IP telephony calls. After defining source and destination, routing parameters may be associated with those defined sources and destinations. In other words, logical addressing of IP telephony calls will define the source and destination of the call and not the physical trunk that carries the voice data. This logical addressing is obviously the IP address or anything that resolve into the IP address of the source or destination of the IP telephony call.

An IP Call Destination contains the IP address or a range of IP addresses of the end point's IP telephony gateway. It also contains all the IP telephony call specific settings that the IP telephony manager software needs to use in order to make a successful call to that destination gateway, for example, codec preference order. This destination can be used instead of an outbound Voice Trunk Group anywhere a Trunk Group is used in the outbound routing algorithm settings. Specifically, in First Digit Table an IP Call Destination can be selected instead of a Trunk Group for the call to be routed to. Also IP Call Destination can be selected instead of an outbound Voice Trunk Group in outbound routing table steps.

An IP Telephony Source contains the IP address or a range of IP addresses of the source gateway (where the call is coming from). It also contains the settings that inbound routing algorithm needs to know to successfully route the call. These settings are similar to information that is stored in an inbound Voice Trunk Group for a traditional call. To make it easier for the administrator of the system to reuse these settings, the IP telephony Source configuration section preferably is divided into IP Source settings and Source IP Address sections. This way the administrator can have reusable set of settings that can be associated with several source IP addresses. Preferably, in accordance with the present invention this is similar to what Trunk Groups do for trunks. One of the main parameters in these settings is the Inbound Routing Table which is exactly the same as defined for traditional telephony.

Figure 46A:
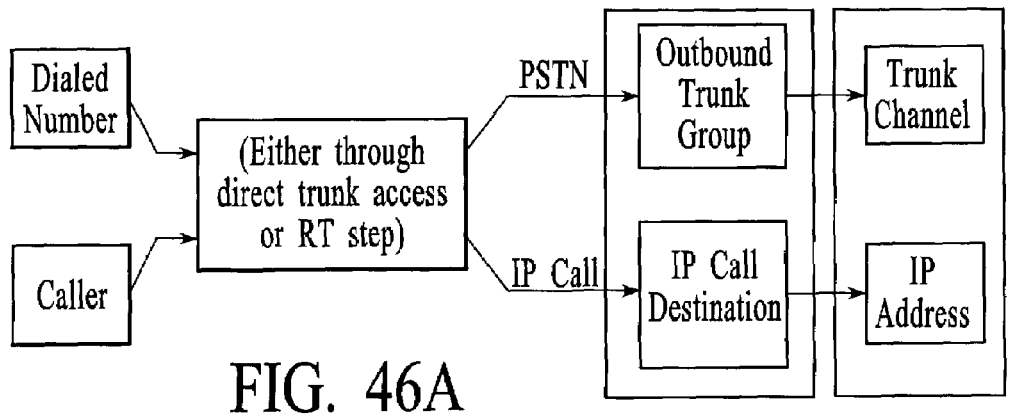
Figure 46B:
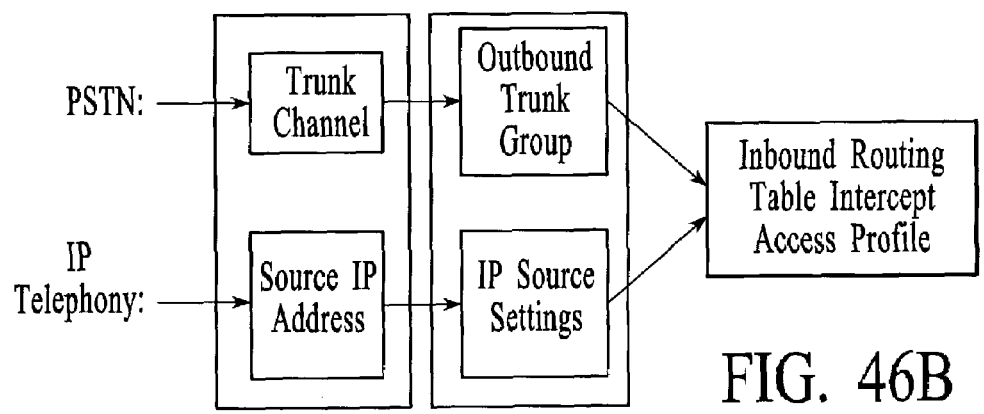

A high level explanation of one embodiment of outbound call routing is as follows (reference is made to FIG. 46A). Based on the number dialed and the particular caller (routing may be caller specific, etc.), the system may end up either with a Routing Table step or a direct trunk access through First Digit Table that will decide how the call should be routed. In case of the Routing Table step, if the IP Call Destination is set as its destination (instead of a Trunk Group), the routing algorithm passes information for a telephony Trunk Group along with the IP Call Destination index to the connection manager software. The information for the IP Telephony Trunk Group contains all the internal DSP trunks (stream channels) that are available to IP Telephony. These stream channels are allocated through the DSP resource manager which allocates DSP resources for use by Voice Mail, TAPI and IP Telephony, the configuration of which was described earlier.

The connection manager in turn may send a Call Setup Request to the IP telephony manager with the number to dial and the IP Call Destination index. The IP telephony manager may use the IP Call Destination index to get all the destination settings from the database (or more accurately the cached database data) and initiates the call. In case of the direct trunk access through First Digit Table routing algorithm, a similar process may be followed using the IP Call Destination stored in First Digit Table.

Inbound call routing for IP Telephony calls preferably uses the IP address of the source gateway to determine which IP Source Settings to use. This is very similar to a traditional call in which case the trunk that the call is coming from determines which inbound Voice Trunk Group to be used for inbound call routing. After this step everything is the same for IP Telephony inbound call routing and the traditional inbound call routing.

Outbound IP telephony call configuration includes all the parameters that need to be set to have an outbound call routed through IP telephony. Outbound Routing Table, First Digit Table and Carrier Access are the three paths that a traditional outbound call can go through to get to a trunk. For IP Telephony outbound calls, only the first two paths, i.e. Outbound Routing Table and First Digit Table paths, preferably are used. Accordingly, if the administrator wants to direct that a call go over IP telephony using either of the mentioned paths, the administrator should select an IP Call Destination instead of an outbound Voice Trunk Group in FDT or in outbound Routing Table step. Thus, the first step in configuring an outbound call to go over IP Telephony path is to define an IP Call Destination and the second step and final step is to select the destination in either First Digit Table or Outbound Routing Table step.

A database table preferably is provided for the IP Call Destination. Each record in this table preferably defines a destination. Each IP Call Destination preferably has an ordered list of codec preferences, and preferably includes fields such as destination ID and/name, destination IP address, caller ID format, protocol (e.g., H.323 or MGCP), jitter buffer size parameters (see also the discussion elsewhere herein regarding jitter buffer sizing), send/receive volume settings, echo cancellation settings (e.g., filter size), silence suppression settings, voice activity detection settings (e.g., threshold) and the like.

Figure 46C:
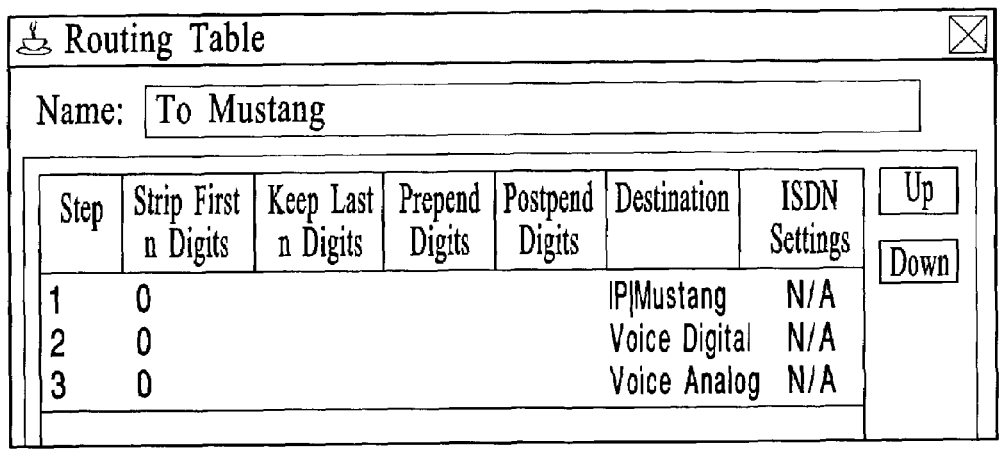

As it was mentioned before, there are two main paths that are preferably used to configure an outbound call to go over IP telephony. These two paths are: through an outbound routing table step or through First Digit Table. The preferably graphical interface for outbound Routing Table configuration preferably will merge the list of available IP destinations with the list of outbound Trunk Groups and present the combination to an administrator when they are selecting the destination for a routing table step. IP destinations, if chosen, will be used by the routing algorithm to route the call over the IP telephony. This is an important aspect of the present invention. The routing table may treat the VoIP telephony route as a step in the routing table. Thus, and as previously described, an assessment may be made of whether suitable conditions exist for a VoIP type call to be made, which may be made by attempting to establish a VoIP connection via a first step in a routing table. If the VoIP fails to complete, the system may automatically go to a next step in the routing table, which could be another VoIP step but more typically would be a type of traditional telephony Trunk Group/destination. Thus, in a desirable and automated manner, a VoIP call may be attempted, with a first step in the routing table, and with a traditional telephony call attempted (i.e., go the next step in the routing table) in the event of failure of the VoIP call, etc. This is illustrated in FIG. 46C, which shows a partial routing table with an initial IP telephony step, followed by voice digital and voice analog Trunk Group steps, etc. The First Digit Table user interface preferably will merge the list of available outbound Trunk Groups with the list of available IP destinations and present it to user as the list of destinations. IP destinations, if chosen, will be used by the routing algorithm to route the call over the IP telephony.

IP telephony inbound calls will be tagged by the IP address of the source of the call. Other than this, they preferably have all the characteristics of a non-IP call. Inbound routing algorithm determines if the call is an IP call based on the IP tag in which case it tries to match the source IP with one of the IP address patterns stored in a Source IP Address table. Based on this match it can determine the IP Source Settings record associated with this IP address. From this point on, an IP Source Settings record can be used like an inbound Trunk Group and inbound routing algorithm continues to route the call same way as a non-IP call. There are two tables preferably associated with inbound IP Telephony call configuration. Source IP Address table and IP Source Settings table. The Source IP Address Table preferably stores all the settings associated with a source IP address. The IP Source Settings Table preferably stores all of the information that inbound routing algorithm needs to know in order to be able to route the call correctly.

Based on the foregoing it will be understand that, in accordance with preferred embodiments, the system has the ability to take the next step in the call routing table if a VoIP call fails to complete. Codec settings, such as the codec, packet time and silence suppression may be defined on a per-destination basis, and the nominal and/or maximum sizes of the jitter buffer may be configured in terms of number of packets (i.e., a multiple of the negotiated Rx packet time) instead of specific times, all of which may be provided with a highly integrated system that also provides traditional telephony and data communications capabilities.

Figure 47A:
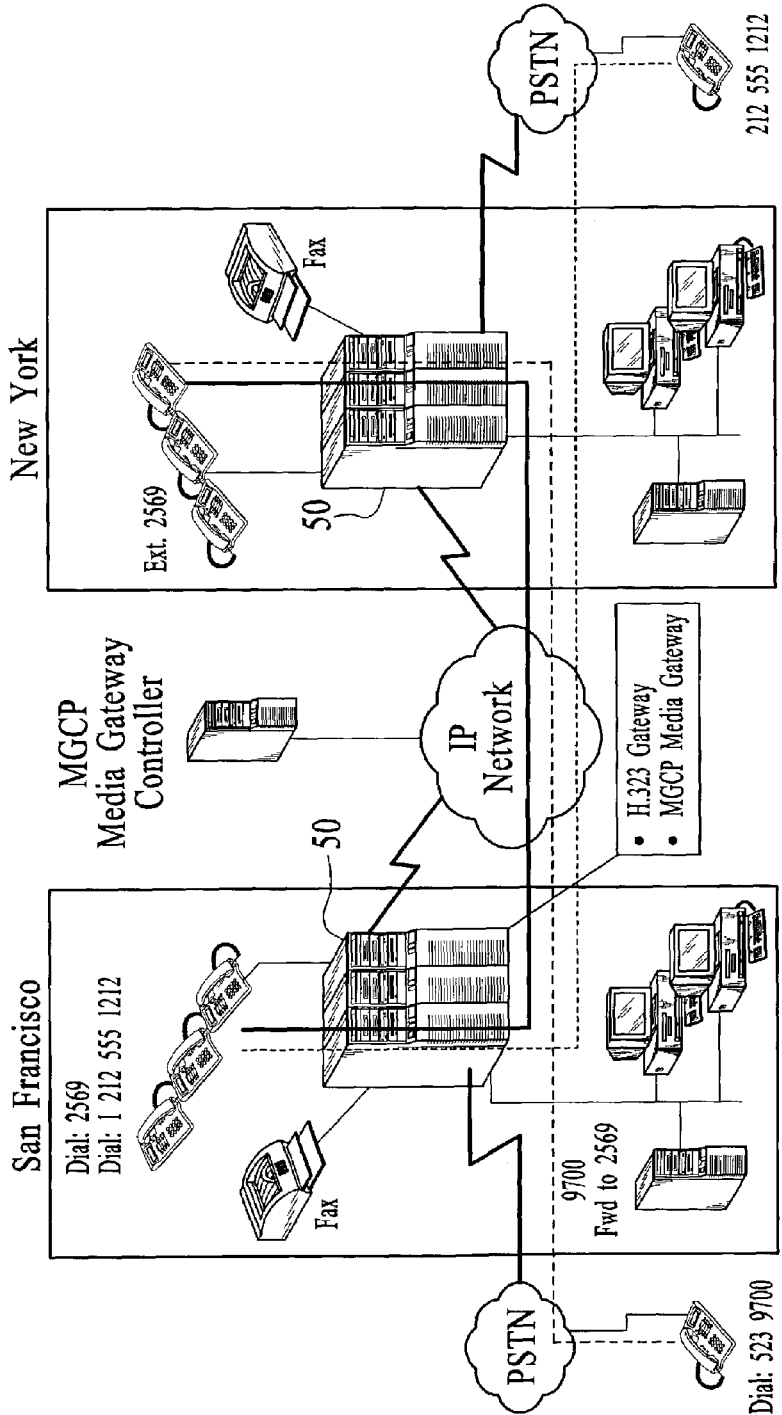

As previously discussed, embodiments of the present invention may implement, or work with, an H.323 gateway or gatekeeper, or may work with an external gateway (such as MGCP). FIGS. 47A and B illustrate additional VoIP scenarios that may be desirably provided in accordance with the present invention.

FIG. 47A illustrates two communication systems 50 in geographically remote locations, such as in San Francisco and New York. In a first scenario (indicted by the solid line), a call may be made from an extension of the San Francisco communication system 50 to an extension of the New York communication system 50. Note that the numbers dialed may be a simple extension as is to a local extension. Based on the call routing and IP telephony parameter selections as described earlier, an IP telephony call may be established with the New York extension, which may be completed with the user simply dialing a simple (e.g., four digit) extension number. In a second scenario (indicated by the dotted line), a call may be made from an extension of the San Francisco communication system 50 to and an external telephone reached via a PSTN through the New York communication system 50. As illustrated, the user may dial a number for a phone in New York, and the San Francisco communication system 50 routes the call as an IP telephony call to the New York communication system 50, which then completes the call over the PSTN. This call may offer cost advantages in that it avoids the long distance toll charges in going from San Francisco to New York. In a third scenario (indicated by the dashed line), a call is made from an external telephone coupled to the San Francisco communication system 50 via the PSTN to an extension of the New York communication system 50. Note that the user of the external extension dials a local number for the San Francisco communication system 50, which may then route the call as an IP telephony call to the New York communication system 50.

While the foregoing scenarios are exemplary, it is understood that they may be implemented using aspects of the preferred embodiments such as routing table selection, codec and codec parameter selection, jitter buffer sizing and the like (as described earlier herein) in order to provide more optimal and cost effective IP telephony solutions. It also should be noted that FIG. 47A shows an MGCP gateway controller coupled to the IP network, this is exemplary and is not required to implement such VoIP calling scenarios in accordance with the present invention. The MGCP gateway is not required, and other protocols such as H.323 could be utilized in an analogous manner.

Figure 47B:
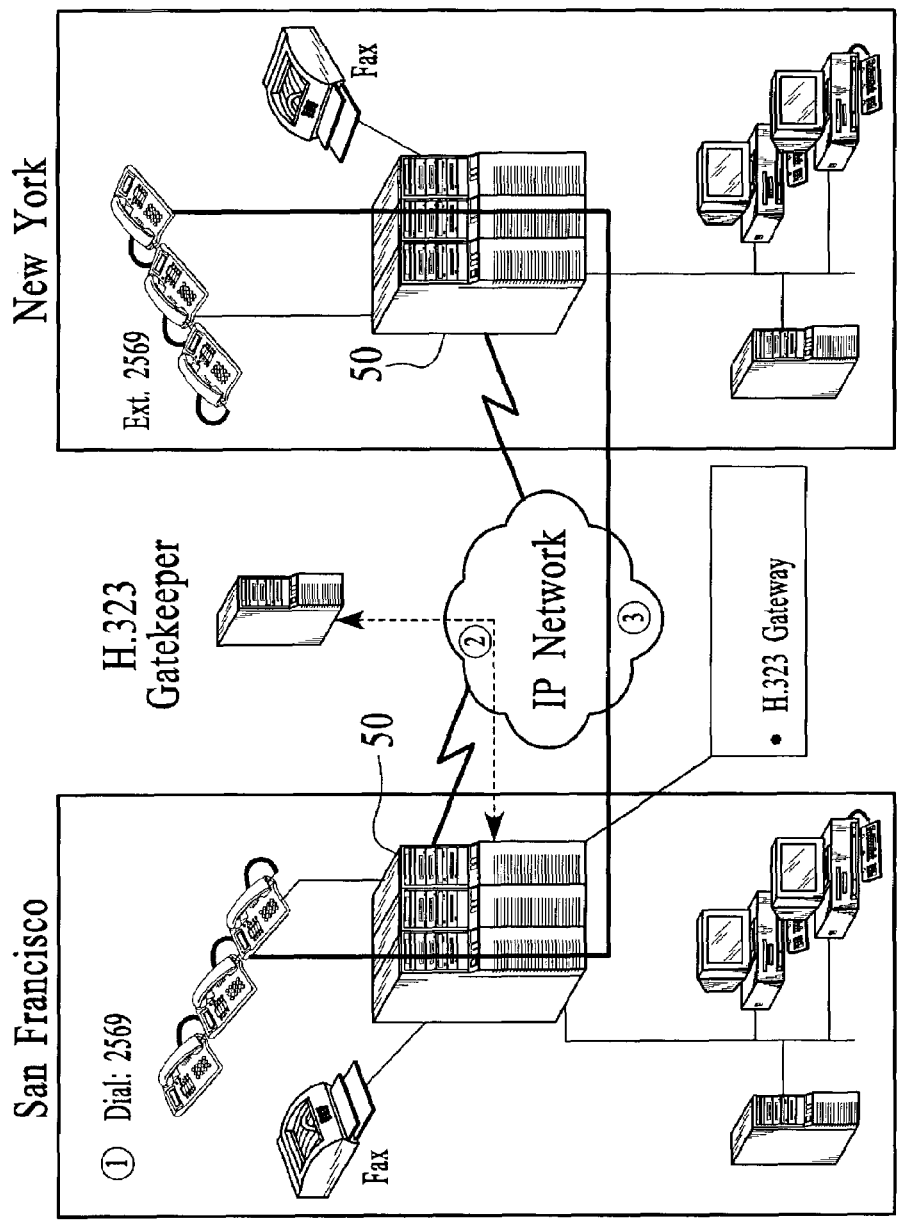

Referring now to FIG. 47B, an additional scenario in accordance with preferred embodiments of the present invention will now be described. In this exemplary scenario, an H.323 gatekeeper is coupled to the IP network. As an initial step of the scenario, a user enters an extension on a telephone coupled to the San Francisco communication system 50, which knows that the destination for this extension is an extension of the New York communication system 50. Based on the routing table information, etc., the San Francisco communication system 50 may then request a telephone number to IP address resolution from the H.323 gatekeeper coupled to the IP network. The call may then be routed by the San Francisco communication system 50 to the New York communication system 50 based on the IP address received from the H.323 gatekeeper. In such a scenario, various desirable aspects of preferred embodiments such as routing table selection, codec and codec parameter selection, jitter buffer sizing and the like (as described earlier herein) may be utilized in order to provide more optimal and cost effective IP telephony solutions.

Referring now to FIGS. 48A-48E, a preferred embodiment in which an VoIP call may switch over to a traditional telephony/PSTN call will now be described.

As described elsewhere herein, VoIP communications may be more desirably implemented in accordance with the present invention. Nonetheless, as IP telephony calls are still subject to performance unpredictability (such as due to packet network congestion or failure or the like), in preferred embodiments an IP telephony call may be switched, for example, to a PSTN call if undesirable packet network conditions are detected or the like. While this embodiment will be described in reference to a switch over from a VoIP call to a PSTN call, it is understood that the method could be implemented in reverse, with a PSTN call switching over to a VoIP call (such as if the system determined that detected packet network conditions are at the time indicating that desirable VoIP communications may occur over the packet network).

Figure 48A:
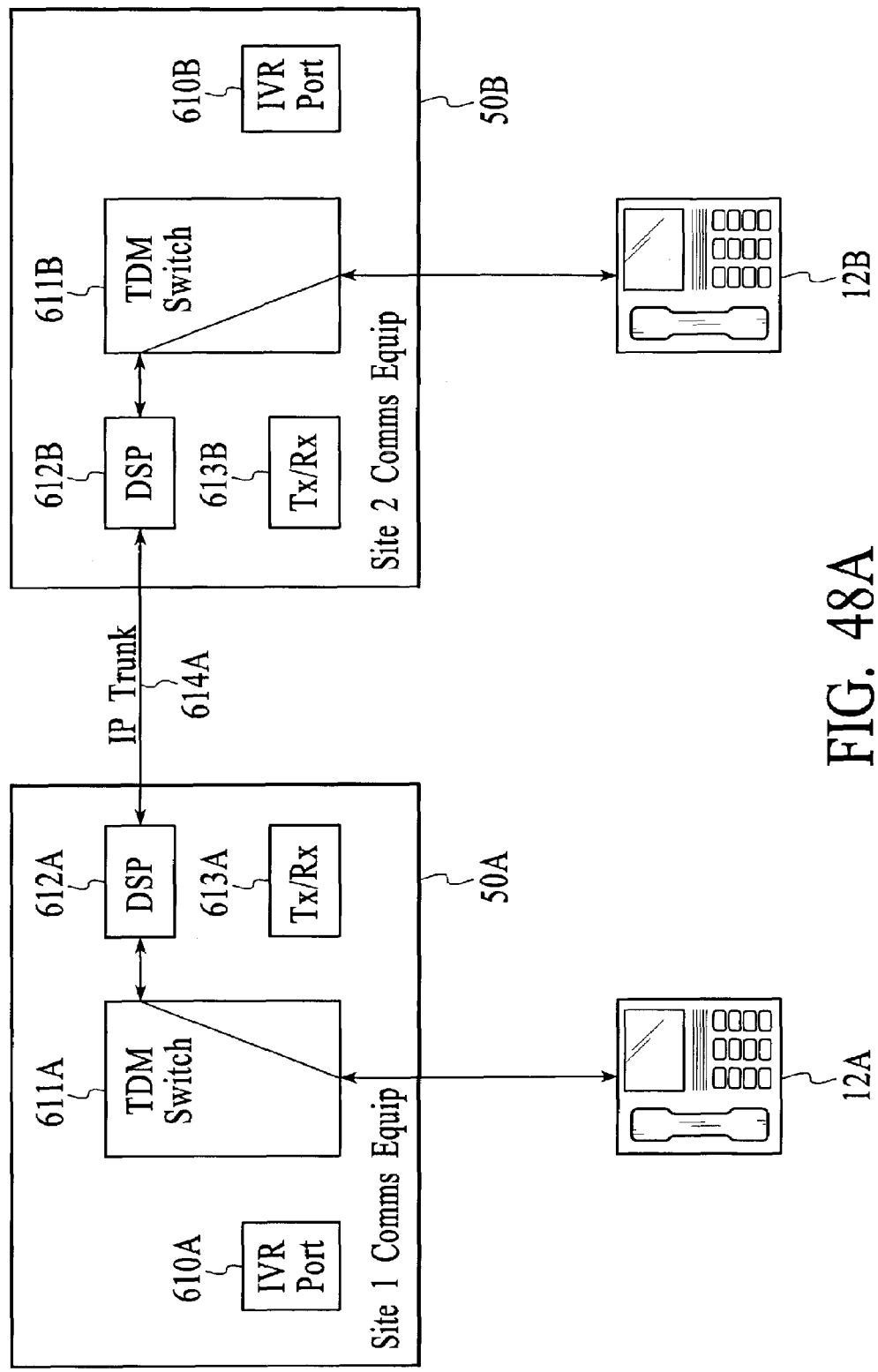
FIGS. 48A-48E illustrate a preferred for an IP telephony-ordinary telephony switchover in accordance with preferred embodiments of the present invention.

Referring to FIG. 48A, an exemplary embodiment of VoIP/PSTN switch over will now be described. In this embodiment, two communication systems 50A and 50B are provided in two locations, for purposes of this discussion local system 50A and remote system 50B, and IP telephony and PST are supporting between the two offices. It also assumes that, for example, interactive voice response (IVR) ports are available on both systems, and TDM switching is available on both sides (see, e.g., the switch/multiplexer described elsewhere herein).

In general, an IVR port (or similar port, which can, preferably, answer, listen and generate DTMF tones/commands) is used to support a seamless-type switchover. The IVR port is used to match up the PSTN call with the original IP call. Without such a mechanism, it would be possible to allow one party to hear a call-waiting tone and switch over only to discover that he is talking to the same party. Such an unreliable call waiting technique is complicated by the fact that the party hearing the call-waiting may not accept what appears to be a second call, causing the PSTN call to end up connecting to voice mail, etc. An alternate technique that is used in alternate embodiments utilizes caller IDs associated with each site (both sites know the caller ID of each site) and the PSTN trunk supports caller ID, then similar functionality is possible without the use of IVR ports; however, the switchover would tend to be audibly more noticeable, and in preferred embodiments an IVR port switchover technique is preferably utilized (caller ID functionality also could be utilized with ports such an IVR port, and in one alternate embodiment a VoIP caller registry that correlates established VoIP calls with caller ID/extension information, etc. is utilized to match up the PSTN call with the VoIP call).

Figure 48B:
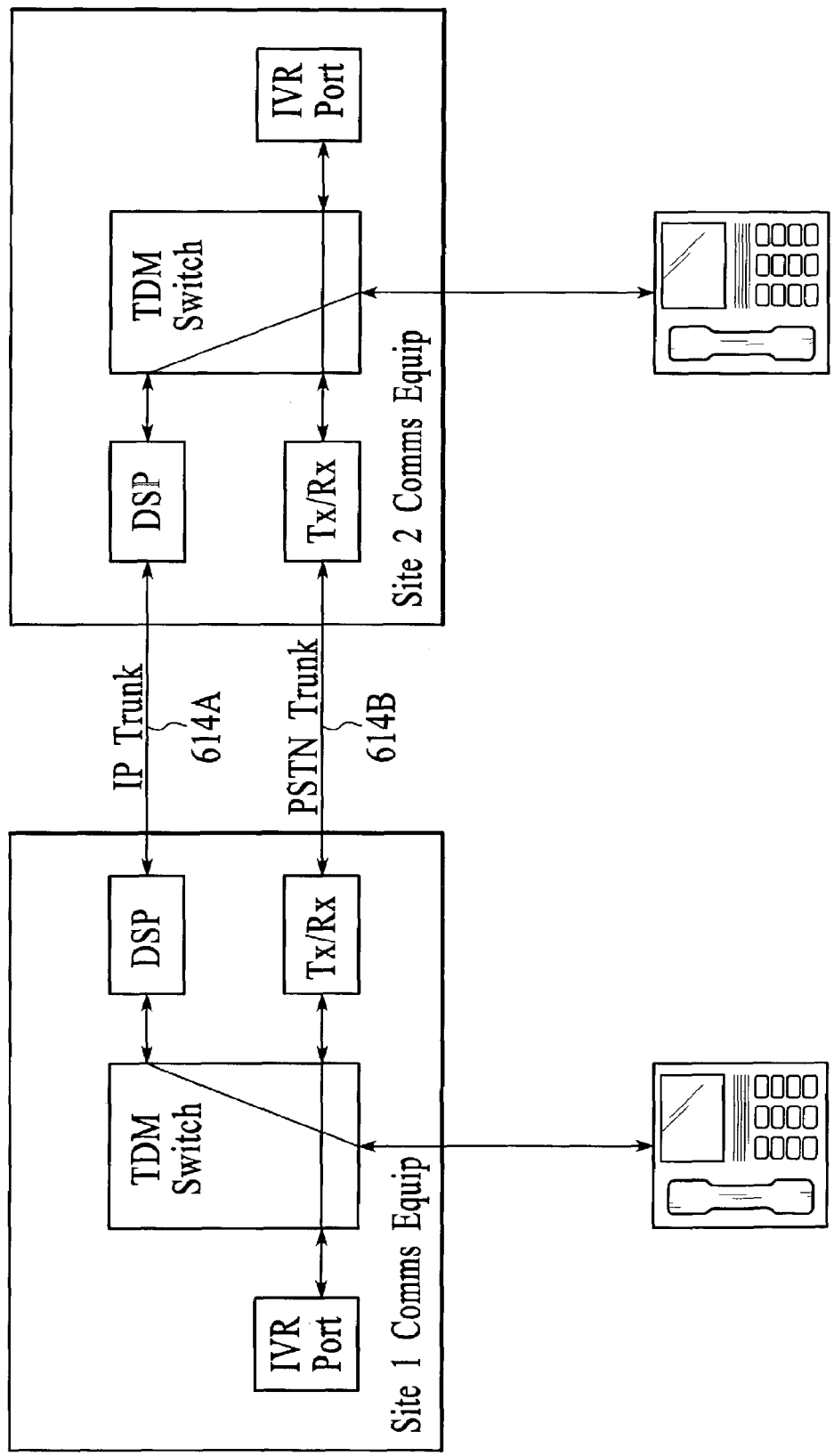
Figure 48C:
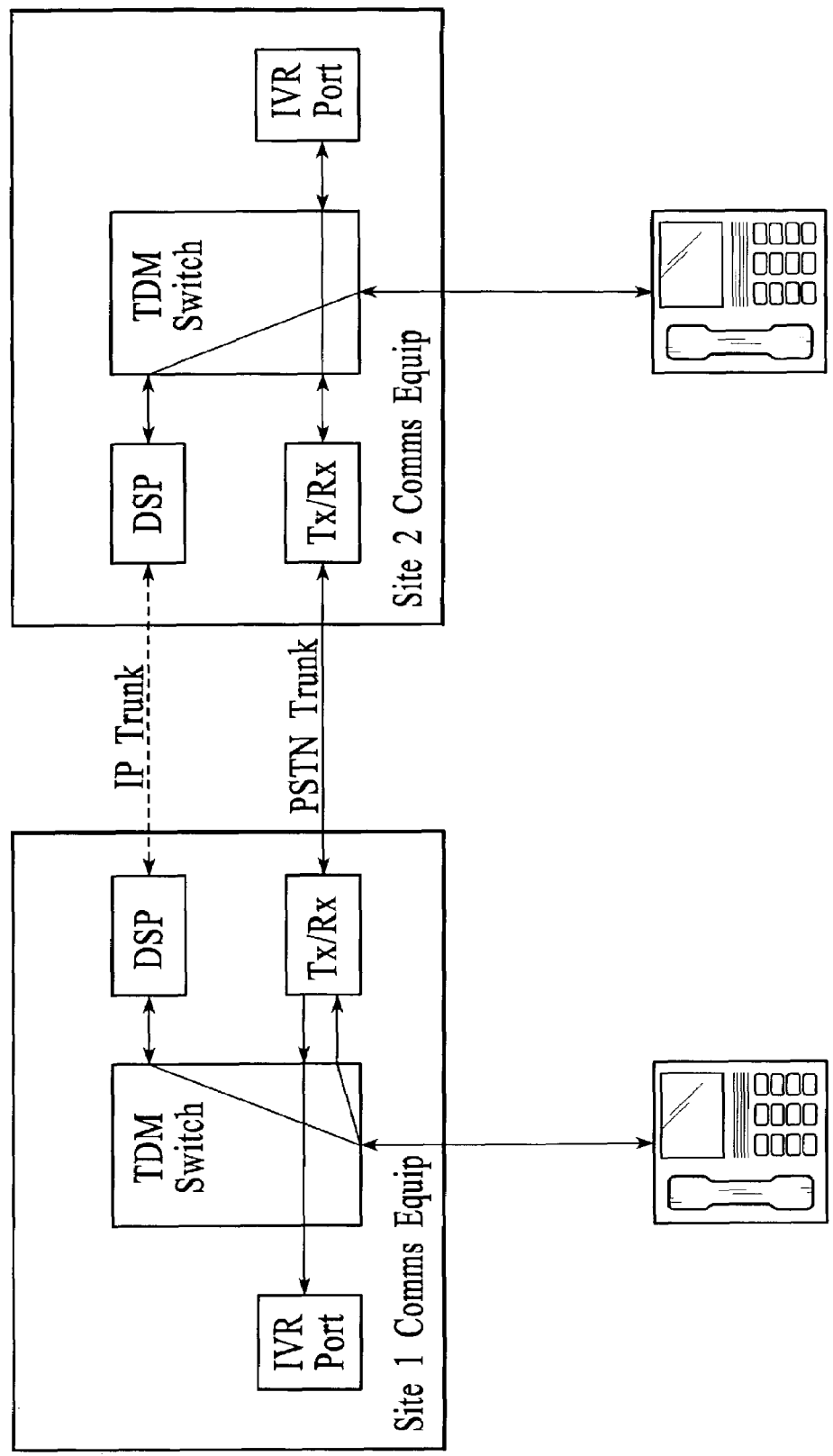
Figure 48D:
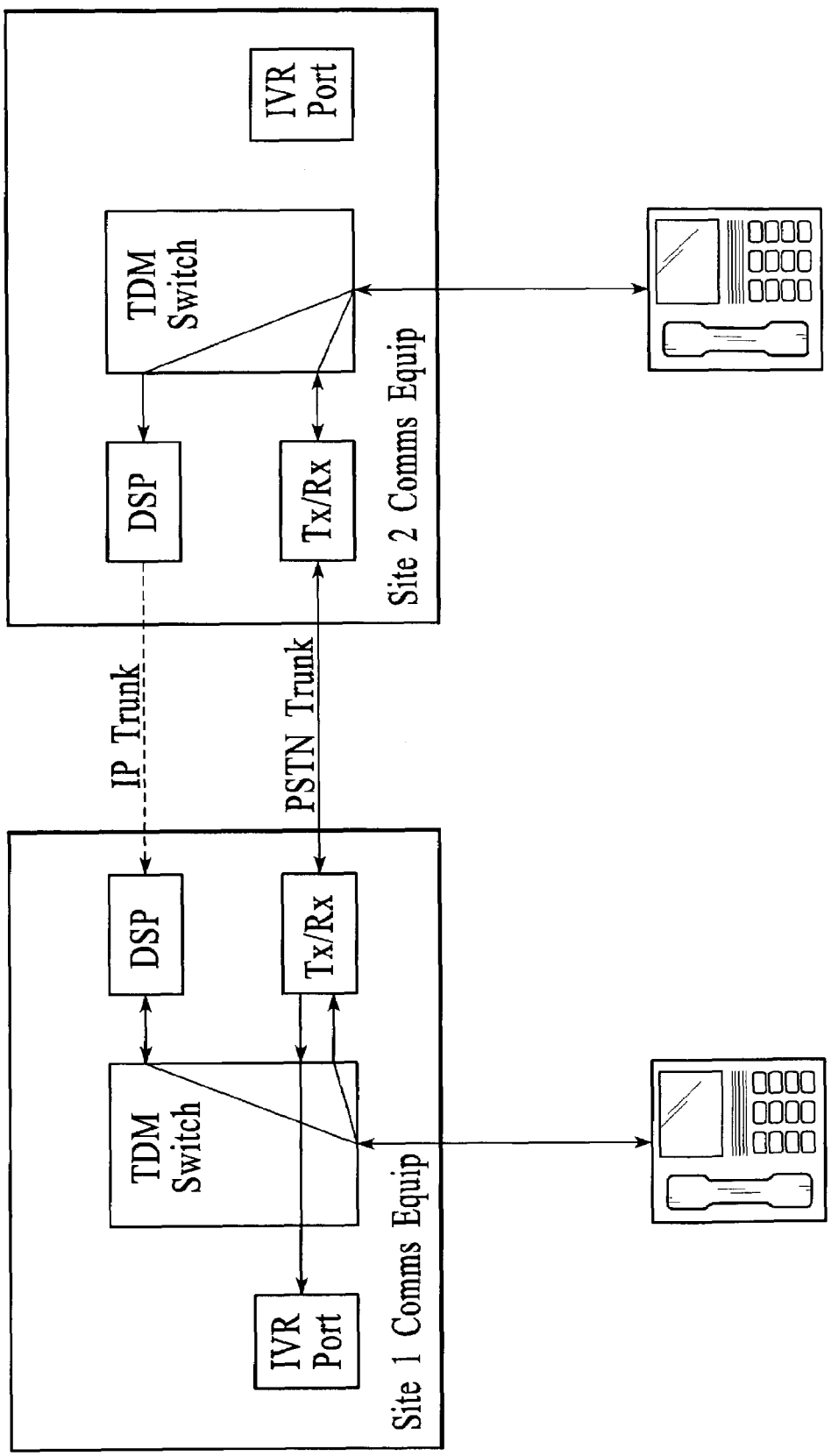
Figure 48E:
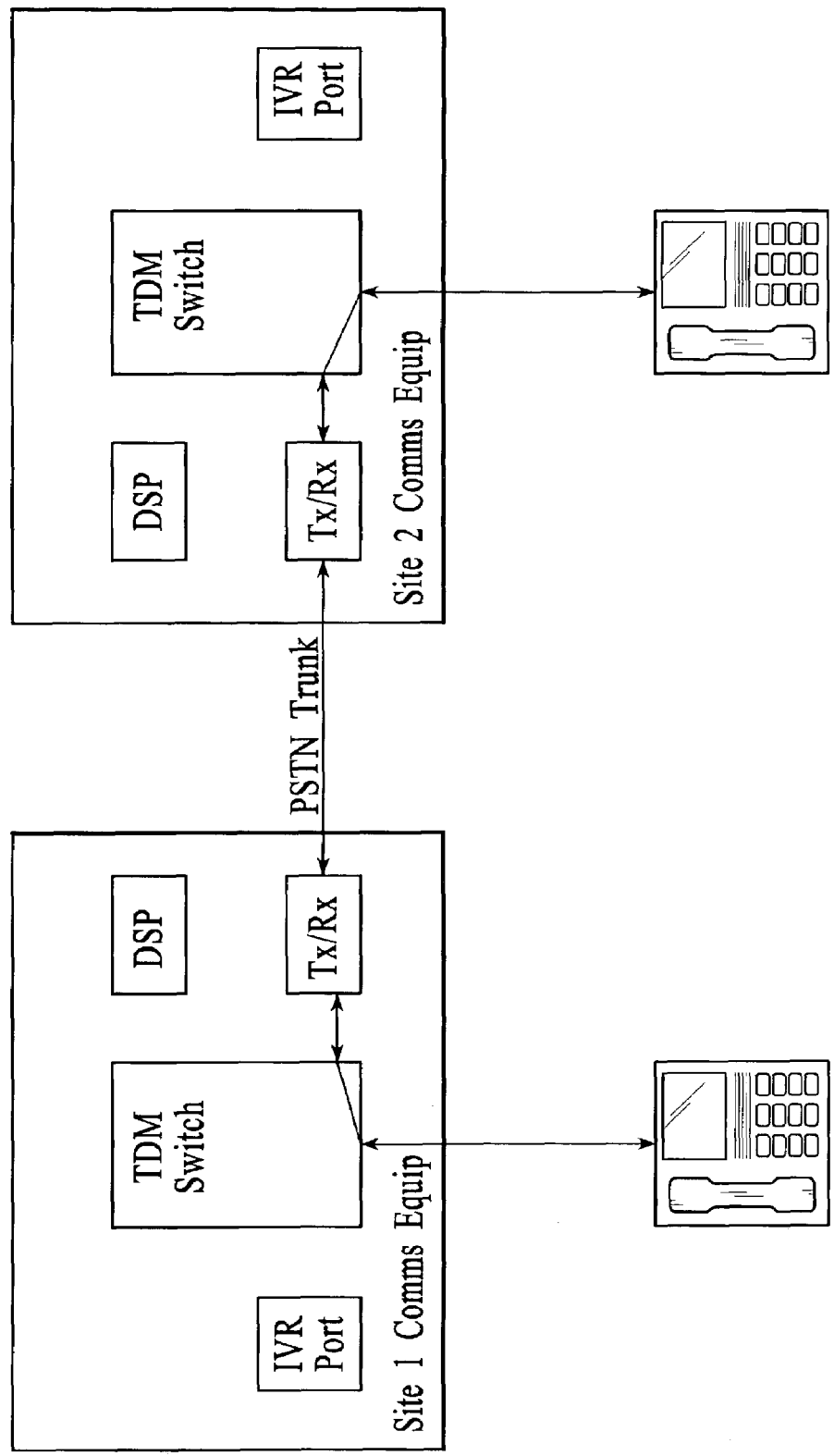

As illustrated in FIG. 48A, an IP call is established via phone 12A, TDM switch 611A, DSP 612A, IP trunk/network 614A, DSP 612B, TDM switch 611B and phone 12B (other components of such communication systems are not shown for purposes of clarity), which may be established as described elsewhere herein. Lets assume that local system 50A detects network problems first (such network problems could be DSP-related or other software that detects jitter buffer problems, lost packets, network load or congestion, MGCP quality alerts, etc.). Logic causes a PSTN call to be placed from IVR port 610A at local system 50A (via switch 611A and transmit/receive line interface circuitry 613A) to IVR port 610B at local system 50B (via switch 611B and transmit/receive line interface circuitry 613B) via PSTN line 614B, as illustrated in FIG. 48B. In preferred embodiments, one or more IVR ports could be dedicated for such a switchover purpose. The 16 DTMF tones (which may be, for example, a hex encoded RTP port set up at the time the VoIP call is established and stored or registered for later reference) may be used to identify the IP call to be switched over (if caller ID or other information is not utilized, etc.). Immediately after sending the call identifier, local system 50A begins transmitting voice on the PSTN trunk as illustrated in FIG. 48C. After receiving the call identifier, remote system 50B sends a DTMF acknowledge back to IVR port 610A on local system 50A and switches over as illustrated in FIG. 48D. Upon receipt of the acknowledge, local system 50A completes the switchover and terminates the IP call, as illustrated in FIG. 48E. As remote system 50B may have already terminated reception of RTP and is in an unusual switch configuration, while call termination initiates as per a normal IP disconnect, the systems desirably save the call/call switch overall context in order to complete termination of the IP call and return the switches to a normal state.

In alternate embodiments, a mechanism is provided to prevent undesirable affects that could result if both sites attempt to switch over at the same time. In one such embodiment, assuming that both locations are equally capable of detecting network problems, the switchover is always initiated by the side with the "smaller" IP address. In other embodiments, as the IP call is set up, it is determined in advance which system shall be responsible for detecting IP network problems and initiating the switch over.

As will be appreciated, systems of substantial performance and complexity may be provided in accordance with embodiments of the present invention. As such, it is desirable to be able to offer systems of varying degrees of performance, while maintaining the ability to remotely configure, manage and upgrade such systems. Preferably, a means is provided to charge for and selectively enable functionality based on the model number of the hardware that has been purchased. One way would be to put the model number on the included disk drive, but it would be relatively easy for a user to change the model number of the system. Yet, as many upgrades of the system may be made purely by software upgrade, the model number should be difficult to detect or change, yet changeable as part of a software upgrade (i.e., a software upgrade could upgrade the model number, etc.).

Figures 49A, 49D:
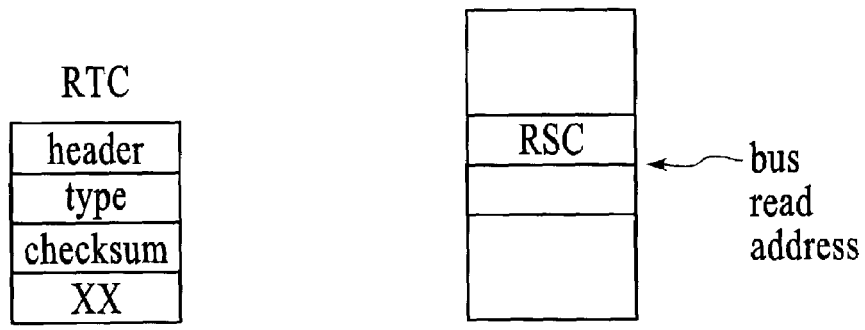
FIGS. 49A-49D illustrate aspects of model key information and backplane encoded information in accordance with preferred embodiments of the present invention.

As is known in the art, many PC motherboards (one or more of which is preferably included in communication system 50) often have what is known as a real-time clock (RTC) chip. Such a RTC typically includes non-volatile memory (which may be battery-backed up RAM or the like), which typically used for BIOS configuration or the like. In preferred embodiments, however, extra or spare locations of the RTC non-volatile memory are used to store in coded or unencoded form a model number or key of the particular system. This is illustrated in FIG. 49A, which diagrammatically illustrates a memory map of a portion of memory in an RTC chip on a motherboard that preferably is included in communication system 50. Special software, such as a key reading/modifying routine that runs upon bootup (which preferably does not have command line input, for purposes of avoiding having a user modify the stored key) may read the model key, and, such as in the case of a model upgrade, modify the keep from a first model number to a second model number. While only for purposes of illustration, the spare locations of the RTC memory could be used, for example, to include a header (which if correctly programmed would be of known value), a type (which could be a value keyed to a particular model), and a checksum for purposes of ensuring data integrity. What is important is that a location of memory, preferably non-volatile, that is not readily user accessible may be used to store model key information in a manner that special software may read and modify the model key information.

Figure 49B:
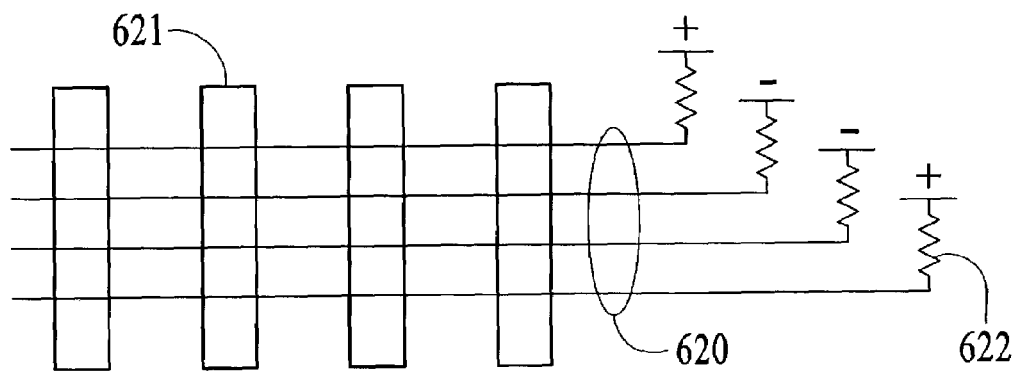

Preferably used in conjunction with a "hidden" model number key, is a hardware encoded backplane configuration, preferred implementations of which will be discussed in conjunction with FIGS. 49B-49D. In accordance with such embodiments, values are encoded into the hardware of the system backplane, such as via pull up or pull down resistors, which may be used to provided further information regarding the particular model, chassis type, etc. FIG. 49B illustrates various data bus lines 620 traversing card slots 621 on an exemplary backplane. Resistors 622 either pull up the data bus lines, or pull down the data bus lines, in a selective manner so that a number may be encoded into the hardware of the backplane. In the illustrated four line example, a number of 1001 could be encoded, with a pull up, followed by two pull downs, followed by-a pull up, etc. The encoded information could be read by, for example, attempting to read an empty slot on the backplane (i.e., reading a location in which no cards would be driving the data lines of the backplane so that the encoded pull up/pull down data may be read.

Figure 49C:
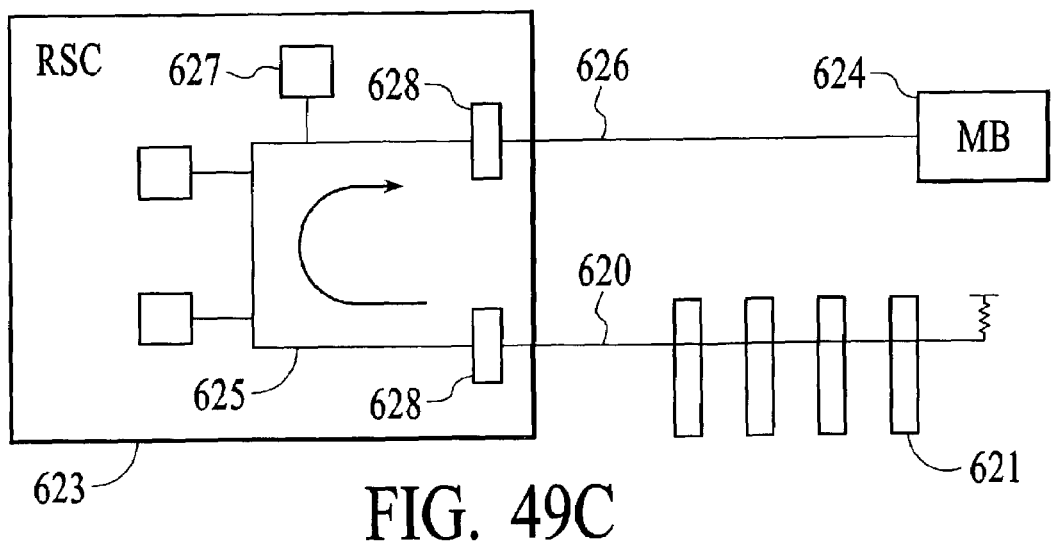

As illustrated in FIG. 49C, however, in alternative embodiments an address of a particular card is read, where the card has been designed to have one address that simply allows the data bus pull up/pull down information to flow through to the requesting unit. For example, a processor on motherboard 624 could attempt to read a particular address of exemplary resource switch card 623. The particular address of resource switch card 623, however, is designed so that the various elements of resource switch card 623 that may couple to either of buses 626 or 620 do not respond, while bus interfaces 628 allow the backplane encoded pull up/pull down information to pass from data bus 620 through resource switch card 623 to bus 626 (which may be a standard PC-type bus, such as an ISA bus) and motherboard 624. Thus, motherboard 624, which may be accessed remotely (as described elsewhere herein), may "poll" the hardware and determine the backplane encoded information by reading the particular address (the use of such a particular address is illustrated in FIG. 49D, which illustrates a bus read address of the location of the memory map allocated to resource switch card 623).

The model key information, which may be stored in the RTC memory, and the backplane encoded information may desirably be utilized in combination. For example, the backplane encoded information could define particular chassis types, which may also indicate electrical or other characteristics of the particular backplane. For example, certain cards that a user may attempt to install in a particular backplane may not be compatible with that backplane (such as, for example, cards that attach to appliances that have power consumption requirements that are not suited for the particular backplane). In this manner, if someone attempts to install software for cards that are incompatible with the backplane, a software utility could interrogate the backplane and determine if the backplane is suitable for the cards that are attempted to be installed, etc. In addition, the model key information in the RTC memory could be used to ascertain whether the user is properly authorized for certain software upgrades or the like; for example, a particular software upgrade, even if obtained by the user, may not be operable unless the software upgraded is indicated as authorized/compatible with the model key information and backplane encoded information (this can also be applied to controllably making available functionality that is built into the hardware, but for which the particular user has not obtained the necessary licenses, etc.). As will be appreciated, the use of model key information, and encoded backplane information, may be used to provide desirable ways of distributing, remotely interrogating, and upgrading such systems.

As previously described herein, communication systems 50 may be desirably used to provide integrated voice, data and video communications services to users in a variety of environments. Such complex systems, however, incur costs associated with manufacturing and deploying such systems. Typically, as part of the manufacturing or deployment process, a system is manufactured or installed, and a technique attaches a keyboard and monitor and installs the necessary software and configures the system. In the manufacturing environment, this might be conducted as part of a pre-shipment test of the system. While such manufacturing and deployment may be effectively utilized, there is a cost associated with such activities. In addition to being able to be manufactured and deployed in such a manner, in accordance with the present invention such systems may be manufactured and/or deployed in a "headless" manner.

Preferably, a deployment disk, which may be a CDROM or similar media, is provided with the particular system being manufactured or deployed. Such deployment disk may, for example, load an image of a latest or upgraded software release onto a disk drive of the system (this may be a cloning of an image on the CD ROM, etc.). It may update or load BIOS settings on a motherboard included in the system. It may also detect a model key or backplane encoded information (such as previously described herein) to ensure compatibility between the deployment disk and the particular hardware on which the software is being deployed. Similarly, it may also run a keying application that, depending upon such checks, updates or initially inputs model key information that may be stored in the system (again, such as previously described).

In general, a deployment disk in accordance with the present invention requires physical access to the system, and preferably provides for maintenance and setup functions that generally cannot be performed remotely. It preferably is a bootable CDROM, and as such, must be inserted into the system drive. To begin the process, the user must boot the system from the deployment CDROM. Preferably, the deployment disk will prevent a disk image from being applied to a non-compatible system. Still preferably, only systems that can be successfully pass an evaluation of the model key and/or backplane encoded information will be considered valid systems.

In accordance with preferred embodiments of the present invention, a headless mode is provided to eliminate the need to install a head on the system in the field. Headless operation provides a simple and expedient means to deploy software onto the system. The user requires physical access to the system, but no keyboard is required in order to execute the option. The user preferably interfaces via the red power button on a resource switch or other card in the system. Visual and audible prompts and feedback preferably are provided to indicate that the user needs to confirm the load action. This is important to the present invention, due to the irreversible affect of cloning over an existing installation. Likewise, visual and audible queues are given to indicate success or failure, once the load action has completed.

An exemplary proce ss flow for use of such a deployment disk is as follows. The system may be shutdown, and the system restarted with the deployment disk inserted into the CD ROM drive while the system is booting up (in certain embodiments, certain cards may be removed from the system that are not necessary for software deployment). Upon bootup, the system preferably provides a beep or series of beeps that provides an audible indication that the deployment disk is in the CD ROM drive and has been recognized by the system. Preferably, one or more cards in the system, such as a resource switch card, will provide visual feedback, such as by blinking LEDs, which indicate that the system is ready to proceed. Preferably, a physical button must be depressed for a sufficient, predetermined length of time, which serves to ensure that the installer intends to deploy the software. Preferably a change in the audible output occurs so that feedback is provided, which may be accompanied by other visual feedback, that the deployment process has properly commenced. Initially, the program preferably verifies the system BIOS, and the model key, and upgrades them if necessary (this may be accompanied by a check of backplane encoding information as well). Thereafter, files from the CD ROM preferably are copied onto a hard disk of the system. If successfully deployed, an audible tone is emitted to indicate successful deployment, which is preferably accompanied by visual feedback as well. Still preferably, the CD ROM is automatically ejected at the end of the process (typically the system must be rebooted in order to operate in accordance with the newly deployed software).

In preferred embodiments, if an incompatibility is detected at an initial stage of deployment, the CD ROM is ejected and an indication is provided that the deployment failed. If a deployment fails in the middle of the process, a different type of audible or visual feedback is provided (a partial deployment may indicate a need for more intensive technical assistance, etc.). For the many installations, tests of new equipment or other deployments where no problems occur, such headless deployment provides substantial advantages in that unnecessary time and expense associated with headed and technician/labor intensive deployment is avoided.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method for providing a caller ID configuration associated with a calling party ID for sending caller ID information to a called party, comprising the steps of:
   providing a communications service providing voice communications to a plurality of users, wherein caller ID information is transmitted between a first user and a second user in response to a call from the first user to the second user, and wherein the communications service transfers packetized call data between a computing system associated with the first user and the second user;
   providing a default caller ID setting comprised of a name and number associated with the first user;
   providing a software interface window on the computing system comprising a plurality of user-configurable options for the caller ID configuration associated with the calling party ID of the first user;
   wherein the plurality of user-configurable options comprise the default caller ID setting and one or more other options;
   wherein the caller ID information in accordance with a selected user-configurable option is provided to a telephone device associated with the second user.

2. The method of claim 1, wherein the packetized call data comprises VoIP data.

3. The method of claim 2, wherein the computing system comprises a personal computer.

4. The method of claim 3, wherein the plurality of user-configurable options comprises an option to send no caller ID information.

5. The method of claim 4, wherein the plurality of user-configurable options comprises an option to send a user-specified caller ID.

6. The method of claim 5, wherein the user-specified caller ID is a number.

7. The method of claim 1, wherein the plurality of user-configurable options comprises a setting for appending extension information to a default information pattern.

8. The method of claim 1, wherein the communications service controls voice communications between the first user and one or more telephony devices coupled to a circuit-switched wide area network.

* * * * *